US008372161B2

(12) United States Patent
Somogyi et al.

(10) Patent No.: US 8,372,161 B2

(45) Date of Patent: Feb. 12, 2013

(54) METHOD FOR THE REACTIVE COLORING OF LEATHER

(75) Inventors: Laszlo Somogyi, Limburgerhof (DE); Andrea Zamponi, Mannheim (DE); Rolf Streicher, Worms (DE); Harald Kiesow, Ludwigshafen (DE); Rainer Erhardt, Mannheim (DE)

(73) Assignee: BASF SE, Ludwigshafen (DE)

( * ) Notice: Subject to any disclaimer, the term of this patent is extended or adjusted under 35 U.S.C. 154(b) by 1552 days.

(21) Appl. No.: 10/577,776

(22) PCT Filed: Oct. 28, 2004

(86) PCT No.: PCT/EP2004/012231

§ 371 (c)(1), (2), (4) Date: Apr. 28, 2006

(87) PCT Pub. No.: WO2005/040490

PCT Pub. Date: May 6, 2005

(65) Prior Publication Data

US 2007/0033746 A1 Feb. 15, 2007

(30) Foreign Application Priority Data

Oct. 29, 2003 (DE) .................................. 103 50 368
Aug. 25, 2004 (DE) ......................... 10 2004 041 187

(51) Int. Cl.
*D06P 3/30* (2006.01)

(52) U.S. Cl. ..................... 8/437; 8/436; 8/669; 8/94.1 R

(58) Field of Classification Search .............. 8/669, 437, 8/94.1 R

See application file for complete search history.

(56) References Cited

U.S. PATENT DOCUMENTS 4,248,776 A * 2/1981 Papa et al. ..................... 534/810
5,488,101 A * 1/1996 Ogino et al. .................. 534/680
5,629,410 A * 5/1997 Deitz et al. .................... 534/642
5,964,900 A * 10/1999 Ruhlmann et al. ................ 8/549
RE38,531 E * 6/2004 Berenguer .................... 534/678
2004/0025260 A1* 2/2004 Fennen et al. ................. 8/94.15
2005/0223508 A1 10/2005 Eichhorn
2007/0234488 A1 10/2007 Somogyi et al.

FOREIGN PATENT DOCUMENTS

DE 2638236 A * 3/1978
DE 35 29 294 2/1986
DE 19825202 A1 * 12/1999
DE 100 44 642 3/2002
EP 0 201 868 11/1986
EP 0 647 685 4/1995
EP 0 861 879 9/1998
EP 0 887 386 12/1998
JP 2003183140 * 7/2003
WO WO 0220897 A1 * 3/2002
WO WO 03031520 A1 * 4/2003
WO 03/080741 10/2003

OTHER PUBLICATIONS

EIC Structure Search for Case U.S. Appl. No. 11/628,659 (same formula A), completed by STIC on Apr. 17, 2009.*
U.S. Appl. No. 11/628,659, in obviousness type double patenting rejection.*
Copending U.S. Appl. No. 11/628,659.*
English abstract of DE 19825202 A1, accessed via Derwent Acc. No. 2000-054407.*
Derwent abstract published in English for Rosenbusch, Derwent Acc. No. 1978-19783A.*
Mullen, T. C., “Practical Aspects of the Use of Reactive Dyes on Garment Leathers”, The Leather Manufacturer, p. 18, 20-24 & 35-37, Oct. 1964.
Mullen, T. C., “Recent Work on the Application of Procion Dyestuffs to Leather”, Journal of The Society of Leather Trades’ Chemists, vol. 46, No. 5, pp. 162-175, May 1962.
Fein, M. L. et al.,“Colorfast Dyes for Washable and Drycleanable Leather”, Journal of The American Leather Chemists Association, vol. LXV, No. 12, pp. 582, 584-593, Dec. 1970.
Rosenbusch, Von K. et al., “Das Faerben wasch-und reinigungsbestaendiger Saemischleder mit Vinylsulfonfarbstoffen”, Das Leder, pp. 294-297, 1968.

* cited by examiner

*Primary Examiner* — Harold Pyon
*Assistant Examiner* — Katie L Hammer
(74) *Attorney, Agent, or Firm* — Oblon, Spivak, McClelland, Maier & Neustadt, L.L.P.

(57) ABSTRACT

The present invention relates to a process for dyeing leather with at least one dye F which has at least one alkaline-activable group of the formula A;

(A)

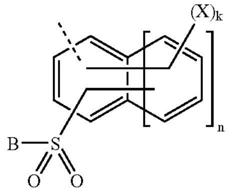

where
- - - - denotes the bond to the rest of the dye molecule;
X is an electron-attracting radical,
k is 1, 2 or 3,
n is 0 or 1 and
B is a $CH{=}CH_2$ group or a $CH_2{-}CH_2$-Q group, where Q is an alkaline-detachable group,
which comprises treating the leather with an aqueous float comprising at least one dye F at a pH of not less than 7.5. The present invention also relates to novel dyes which are particularly useful for reactive dyeing of leather.

30 Claims, No Drawings

METHOD FOR THE REACTIVE COLORING OF LEATHER

CROSS REFERENCE TO RELATED APPLICATION

This application is a 371 of PCT/EP04/012231, filed on Oct. 28, 2004, and claims priority to the following German Patent Applications: DE 103 50 368.4, filed on Oct. 29, 2004 and DE 10 2004 041 187.5, filed on Aug. 25, 2004.

The present invention relates to a process for dyeing leather and to novel dyes which are particularly useful for reactive dyeing of leather.

Tanned leather is currently dyed with acidic dyes, direct dyes, sulfur dyes or basic dyes. It is difficult to achieve high color intensities and high color stabilities, especially wet- and perspirationfastnesses, with these dyes, in fact impossible to this day to a satisfactory standard for medium to high depths of shade.

To improve wet- and perspirationfastness, the leather is frequently treated with cationic complexing agents which complex the dye and thus reduce its solubility on contact with water. However, the wet-, perspiration- and rubfastnesses which are achievable are still inadequate for intensive shades. Furthermore, leather articles fabricated therefrom tend to mark off in use. The achievement of high fastnesses at medium to high depths of shade also requires a very careful dye selection and that the dye used be coordinated with the leather assistants used, and also suitable fatliquoring agents and choice of retanning material. Moreover, achievement of desired fastnesses generally requires that the dye and the fatliquor and also, in some cases, the retanning agent be applied in separate floats; the requisite float changes prolong the overall process and entail more wastewater.

The dyeing operation with a conventional leather dye in an aqueous acidic medium is consequently complex, long-winded and costly owing to the different process steps and the chemicals used. Furthermore, these measures do not constitute a fundamental solution to the fastness problems described above. The reason for this is that the conventional dyes used are bound to the leather via ionic interactions. The action of aqueous alkaline solutions, such as for example wash liquors or in perspirationfastness tests, destroys the ionic bond between leather and dye, so that the dye becomes detached from the leather and stains surrounding materials, for example adjacent fabrics.

Various attempts have been made to improve the color- and wetfastness of dyed leather by reactive dyeing. Reactive dyeing refers to the use of dyes which have functional groups capable of forming a covalent chemical bond with the functional groups of leather.

For instance, T. C. Mullen in the Leather Manufacturer 1964, 18, and in J. Soc. Leather, Trades, Chem. 46, 1962, 162, and also M. L. Fein et al. in J. Am. Leather Chem. Assoc. 65, 1970, 584-591, describe the use of reactive dyes having a dichlorotriazine group as reactive moiety. However, the reported yields of fixation, i.e. the fraction of a chemically bound dye, are only moderate at about 70 to 75% and do not solve the problems described above. Moreover, the technique is limited to chrome-tanned leather.

To overcome these disadvantages, DE-A 3529294 proposes to use dyes for leather dyeing which have at least one 1,3,5-triazinyl group to which a substituent having a quaternary nitrogen atom is attached. However, assignee studies on N-acetyllysine as a model system have shown that, under the dyeing conditions described there, there is no significant formation of covalent bonds between the dye and the amino group of N-acetyllysine.

K. Rosenbusch et al. in Das Leder 19, 1968, 294, describe the use of Remazol® dyes, which have a vinyl sulfone group or a group from which a vinyl sulfone group is released under the action of alkalis, for dyeing chamois leather. Adequate fixation, however, requires long dyeing times at pH 10. Owing to the dyeing conditions employed, i.e., high pH in conjunction with long dyeing times of 7 h or more, this process can only be used for dyeing chamois leather, which is known to be stable to alkaline. With other leather varieties, the dyeing conditions described cause damage to the leather. Assignee studies have shown, moreover, that satisfactory fixation is not achieved with Remazol® dyes which have a vinyl sulfone group.

In summary, existing processes for dyeing leather with reactive dyes do not provide good fixation yields of 85% or higher at medium to high depths of shade. The fixation yields of 70 to 75% achieved in the prior art are not sufficient for high wet- and perspirationfastnesses and good migration stability since the unattached dye has to be laboriously washed off to solve the problems described here. The disadvantages which are described here of dyeing leather with reactive dyes are also pointed out in The Leather Manufacturer 1964, 18-23. No surprise therefore that dyeing leather with reactive dyes has not become established. On the contrary, the search is on today for different ways of bonding dyes covalently in leather, for example by pretreating the leather with polyfunctional aldehydes which have at least one reactive group capable of reacting with a reactive group of the dye by forming a bond (see DE 100 44 642 A1).

Owing to the disadvantages described herein, the processes are especially not suitable for producing leather goods for specific segments such as footwear, apparel, automotive, handwear and furniture where medium and high depth of shade are combined with high fastnesses, especially wash-, perspiration-, rub- and migrationfastnesses.

It is an object of the present invention to provide a process for dyeing leather to high fastnesses, especially wet-, perspiration- and rubfastnesses and also a high migrationfastness, even at medium and high depths of shade (color intensities). The process shall be able to be conducted under conditions leading to little if any leather damage. More particularly, the process shall be suitable for producing leather goods for specific segments such as footwear, apparel, automotive, handwear and furniture where medium and high depth of shade are combined with high fastnesses, especially wash-, perspiration-, rub- and migrationfastnesses.

We have found that this object is achieved, surprisingly, on using dyes F, which have at least one functional group in the hereinbelow defined formula A, in an aqueous float at pH 7.5 or higher. In fact, dyeing and fixation proceeds so rapidly under these conditions that a short dyeing time of 4 h or less is sufficient to achieve adequate color intensity and a high fixation of 85% or more.

The present invention accordingly provides a process for dyeing leather with at least one dye F which has at least one alkaline-activable group of the formula A;

(A)

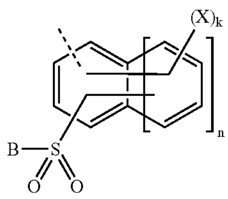

where

- - - - denotes the bond to the rest of the dye molecule;

X is an electron-attracting radical, k is 1, 2 or 3, n is 0 or 1 and

B is a $CH{=}CH_2$ group or a $CH_2{—}CH_2$-Q group, where Q is an alkaline-detachable group, which comprises treating the leather with an aqueous float comprising at least one dye F at a pH of not less than 7.5, generally in the range from 8 to 11, preferably in the range from 8.5 to 10.5 and specifically in the range from 8.5 to 10.

Here and hereinbelow, alkyl generally denotes a linear or branched hydrocarbyl radical having 1 to 6 and preferably having 1 to 4 carbon atoms ($C_1$-$C_6$-alkyl and $C_1$-$C_4$-alkyl respectively) such as methyl, ethyl, propyl, isopropyl and the like. Haloalkyl denotes alkyl as defined above wherein the hydrogen atoms are wholly or partly replaced by halogen atoms, especially by fluorine atoms, as in trifluoromethyl, trichloromethyl, pentafluoroethyl and the like. Alkoxy denotes an alkyl radical as defined above that is attached via an oxygen atom. Optionally substituted phenyl signifies that the phenyl radical may comprise one or more, for example 1, 2, 3 or 4, substituents which are selected for example from halogen, alkyl, alkoxy, nitro, cyano, COOH, $SO_3H$ and the like. Halogen represents in particular fluorine, chlorine or bromine.

Electron-attracting radicals X are those which exert an -M and/or -I effect on the aromatic radical to which they are attached. They include for example fluorine or chlorine, CN, $NO_2$ and also groups of the formulae —C(O)—$R^1$ and S(O) $2R^2$, wherein $R^1$ and $R^2$ independently represent OH, alkyl, haloalkyl, alkoxy or optionally substituted phenyl. When the radical A comprises a plurality of groups (k>1), the X groups may be the same or different. Preferably, at least one of the X groups is a hydroxysulfonyl group ($SO_3H$).

The variable k is preferably 1 or 2; that is, the A radical comprises 1 or 2 electron-attracting radicals X. Preferably n in the formula A is 0; that is, the radical A derives from benzene. When n is 1, the radical A derives from naphthalene. In these cases, the $SO_2$—B group can be situated on the same benzene nucleus as the at least one X group or on the other benzene nucleus.

An alkaline-detachable group Q is to be understood as meaning radicals which are detached under alkaline conditions, i.e., at pH 7.5 or higher, through elimination to form a vinyl sulfone group. Examples of such groups are halogen, for example chlorine, bromine or iodine, —O—$SO_3H$, —S—$SO_3H$, dialkylamino, quaternary ammonium radicals such as tri-$C_1$-$C_4$-alkylammonium, benzyldi-$C_1$-$C_4$-alkylammonium or N-attached pyridinium and also radicals of the formulae $R^3S(O)_2$—, $R^4S(O)_2$—O—, $R^5C(O)$—O—. In these formulae $R^3$, $R^4$ and $R^5$ are independently alkyl, haloalkyl or optionally substituted phenyl, although $R^5$ may also be hydrogen. Q is preferably an —O—(CO)$CH_3$ group and especially an —O—$SO_3H$ group.

According to the invention, B in formula A is preferably CH═$CH_2$, a $CH_2$—$CH_2$—O—C(O)$CH_3$ group or a $CH_2$—$CH_2$—O—$SO_3H$ group. More particularly, the radical A is selected from the following radicals A1 to A12:

(A2)

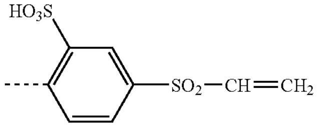

(A1)

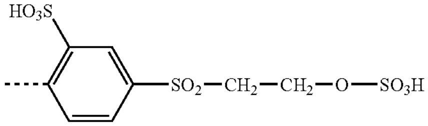

-continued (A3)

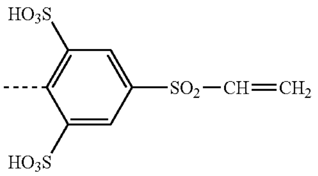

(A4)

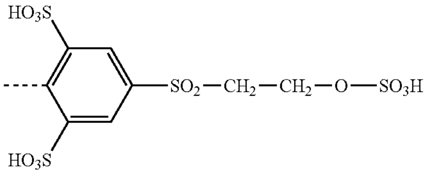

(A5)

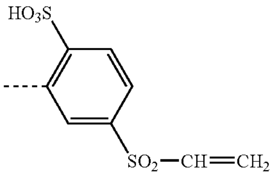

(A6)

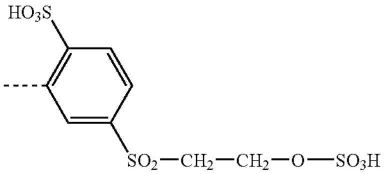

(A7)

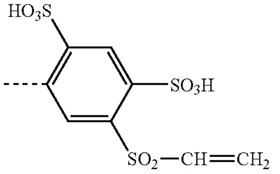

(A8)

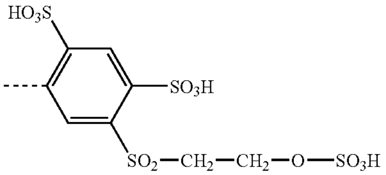

(A9)

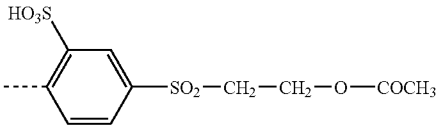

(A10)

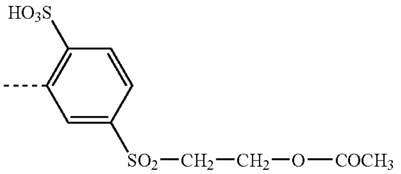

(A11)

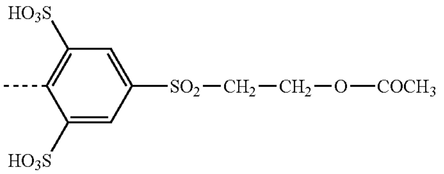

-continued (A12)

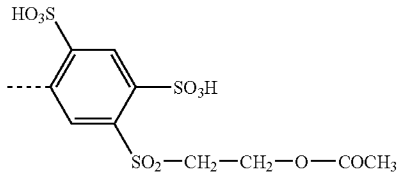

Particular preference among these is given to dyes wherein at least one A radical has the formula A1, A2 or A9.

Advantageously, the dye used in the process of the invention comprises 1, 2 or 3, and preferably 1 or 2 of the aforementioned A radicals. This radical A can but need not be part of the dye chromophore and is preferably attached to the dye molecule via an —NH— or —N═N— group.

In general, the dye F comprises one or more, for example 1 to 10 and especially 2 to 8 functional groups per dye molecule which endow the dye F with solubility in water. These groups are generally anionic or acidic functional groups which dissociate in an aqueous medium at a weakly acidic or alkaline pH, generally at above pH 4, to form anionic groups. Examples of such groups are hydroxysulfonyl groups (—$SO_3H$), carboxyl groups (COOH) and hydroxysulfonyloxy groups (—O—$SO_3H$) and also the anions of these groups. These anionic/acidic groups can be attached to the group A and/or to other parts of the dye molecule. When these groups are present as anionic groups in the dye F, it will be appreciated that the dye also comprises the counterions necessary for neutralization. Suitable counterions are in particular alkali metal ions, specifically sodium, potassium and lithium ions and also ammonium ions, for example ammonium ions derived from mono-, di- or triethanolamine.

The process of the invention may also be carried out using metal complexes, preferably transition metal complexes, of the aforementioned dyes F, especially complexes of transition metals of the groups 6 to 10 of the periodic table and of these especially Cu, Cr, Fe, Ni, Co, Mn, Zn and Cd. The molar ratio of transition metal to dye molecule in these metal complexes is customarily in the range from 2:1 to 1:2. In general, in these dyes, the metal ions are complexed not via the aforementioned anionic groups but via deprotonated hydroxyl groups, via amino groups, imino groups, nitrogen atoms incorporated in an aromatic π-electron system, or via azo groups.

Typical dyes F in the process of the invention are selected from the group of the following dye classes: dyes of the phthalocyanine series, anthraquinone dyes, azo dyes, formazan dyes, triphenyldioxazine dyes and triarylmethane dyes.

Such dyes F are known in part from the prior art, for example from WO 94/18381, EP-A 356 931, EP-A 559 617, EP-A 201 868, DE-A 195 23 245, DE-A 197 31 166, EP 745 640, EP-A 889 098, EP-A 1 097 971, EP-A 880 098 or can be prepared analogously to known methods of making structurally similar dyes, as known from the prior art cited herein and also from EP 602 562, EP-A 597 411, EP-A 592 105 or DE 43 196 74.

Dyes F are generally prepared by reacting an amino compound of the formula B (B)

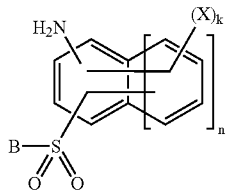

with a dye intermediate which comprises a nucleophilically displaceable group, in a conventional manner. Examples of nucleophilically displaceable groups are halogen, especially chlorine or bromine, that is attached to an aromatic as in halotriazine radicals, or is present in the form of a halosulfonyl group or of a halocarbonyl group. Processes for this purpose are known from the prior art cited herein or can be applied analogously to the preparation of dyes F. Alternatively, the amino compound B may also be initially diazotized and then coupled onto an appropriate dye intermediate. The reaction product obtained when reacting the amino compound B or its diazonium salt with the dye intermediate can already be the dye F or in turn constitute a dye F intermediate which is further processed to the dye F analogously to known processes.

It will be readily understood that dye mixtures can be used in the process of the present invention as well as pure dyes. Dyeings on leather, as well as the aforementioned high fastnesses, also have to meet requirements with regard to the quality of dyeing, for example penetration, hue, cleanness, levelness, hiding of damaged grain and also equality of hue between flesh side and grain side. The inventors of the present invention know from their own experience that it may be preferable for the performance profile as a whole to use dye mixtures.

Dye mixtures here refer not only to blended mixtures of various dyes F but also to synthesized mixtures of F dyes. The fraction of F dyes in these mixtures is preferably not less than 70% by weight, especially not less than 90% by weight and more preferably not less than 99% by weight, based on the colored organochemical moiety in the dye. As well as F dyes, the dye mixtures used in the process of the present invention may comprise conventional dyes for leather, which have no group A. The fraction of such dyes will generally be less than 30% by weight, especially less than 10% by weight and specifically not more than 5% by weight, based on the colored organochemical moiety in the dye.

When F dyes are mixtures of F dyes having similar hues, the amount of an individual dye will generally be not less than 10 mol % and especially not less than 20 mol %, based on the total amount of dye F in the mixture. Preference thereamong is given to mixtures of two dyes F, the individual components having a molar ratio in the range from 9:1 to 1:9 and especially in the range from 2:8 to 8:2.

Also of interest are dye mixtures in which the F dyes have different hues. One embodiment hereof is the shading of dyes, for example of black dyes with differently colored dyes, for example with red, green or blue dyes. When a dye is admixed with one or more further dyes for shading, the amount of shading dyes will generally be in the range from 0.1 to 15 mol %, based on the colored organochemical moiety in the dye. A further embodiment comprises dye mixtures for trichromatic dyeing, as it is known. A dye mixture for trichromatic dyeing comprises 3 or more dyes F having different hues. In this case, the individual component will account for generally not less than 1 mol % and especially not less than 5 mol %, for example from 5 to 90 mol %, based on the total amount of dye F in the mixture.

It must be borne in mind here that dyes may comprise inorganic salts and also standardizers due to their method of making. The fraction of such constituents, hereinbelow also referred to as noncolored constituents, will generally be not more than 60% by weight and is frequently in the range from 10% to 50% by weight, based on the total weight of colored and noncolored constituents of the dye.

In a preferred embodiment of the invention, the dye F is an azo dye and preferably an azo dye selected from the dyes of the general formulae I to XV and their metal complexes:

$Dk^1$-N═N—[P—N═N-]$_p$Kk$^1$[-N═N-Dk$^2$]$_m$ (I)

$Dk^1$-N═N-Napht$^1$[-N═N-Tk$^1$]$_r$[N═N-Kk$^1$]$_k$[-N═N-Dk$^2$]$_n$ (II)

$Dk^1$-N═N-Napht$^1$-N═N-Tk$^1$-N═N-Kk$^1$-N═N-Tk$^2$-N═N-Napht$^2$-N═N-Dk$^2$ (III)

$Dk^1$-N═N-Kk$^1$-N═N-Tk$^1$-N═N-Kk$^2$-N═N-Dk$^2$ (IV)

$Dk^1$-N═N—[P—N═N-]$_p$Napht$^1$[-N═N—R]$_r$—NH-Tr$^1$-NH-Dk$^2$ (V)

$Dk^1$-N═N—P—NH-Tr$^1$-NH—R—N═N-Dk$^2$ (VI)

$Dk^1$-N═N-Napht$^1$-N═N-Tk$^1$-N═N—P—NH-Tr$^1$-NH-Dk$^2$ (VII)

$Dk^1$-N═N-Napht$^1$-NH-Tr$^1$-NH—P—NH-Tr$^2$-NH-Napht$^2$-N═N-Dk$^2$ (VIII)

$Dk^1$-N═N-Napht$^1$-NH-Tr$^1$-NH-Tk$^1$-NH-Tr$^2$-NH-Napht$^2$-N═N-Dk$^2$ (IX)

$Dk^1$[-N═N-L]$_k$-NH-Tr$^1$-NH-M-N═N-Napht$^1$-N═N—P—NH-Tr$^2$-NH—[R—N═N-]$_n$Dk$^2$ (X)

$Dk^1$-N═N-Kk$^1$-N═N-Tk$^1$-NH-Tr$^1$-NH-Dk$^2$ (XI)

$Dk^1$-N═N—[P—N═N—]$_p$R—N═N-Kk$^1$[-N═N-Dk$^2$]$_n$ (XII)

$Dk^1$-N═N-Pyr-A (XIII)

$Kk^3$-N═N-Tk$^1$-N═N-Kk$^1$-N═N-A (XIV)

$Dk^1$-N═N—P—N═N-Kk$^1$-N═N—R—N═N-Dk$^2$ (XV)

where:

k, n, p and r are independently 0 or 1 subject to the condition that k+n+r in the formula II is =1, 2 or 3;

m is 0, 1 or 2;

$Dk^1$, $Dk^2$ independently represent a radical derived from an aromatic amine or denotes a group of the formula A subject to the condition that in each of the formulae I-XII and XV at least one of $Dk^1$ and $Dk^2$ represents a radical of the formula A $Kk^1$, $Kk^2$ independently represent a mono-, di- or trivalent aromatic radical which derives from benzene, naphthalene, pyrazole, quinoline, diphenylamine, diphenylmethane, pyrimidine, pyridine or diphenyl ether and which may optionally comprise one or more of the following radicals as substituents: $SO_3H$, COOH, CN, $CONH_2$, OH, $NH_2$, $NO_2$, halogen, $C_1$-$C_4$-alkyl, $C_1$-$C_4$-hydroxyalkyl, carboxy-$C_1$-$C_4$-alkyl, $C_1$-$C_4$-alkoxy, $C_1$-$C_4$-alkylamino, $C_1$-$C_4$-dialkylamino, $C_1$-$C_4$-alkylaminocarbonyl, $C_1$-$C_4$-dialkylaminocarbonyl, $C_1$-$C_4$-alkylcarbonylamino, N—($C_1$-$C_4$-alkylcarbonyl)-N—($C_1$-$C_4$-alkylcarbonyl)amino, $C_1$-$C_4$-alkylaminocarbonyloxy, $C_1$-$C_4$-dialkylaminocarbonyloxy, $C_1$-$C_4$-alkylaminocarbonylamino, $C_1$-$C_4$-dialkylaminocarbonylamino, phenylaminocarbonyloxy, phenylaminocarbonylamino, $C_1$-$C_4$-alkoxycarbonylamino, $C_1$-$C_4$-hydroxy-$C_1$-$C_4$-alkylamino, carboxy-$C_1$-$C_4$-alkylamino, phenylcarbonylamino, $C_1$-$C_4$-alkylsulfonyl, $C_1$-$C_4$-hydroxyalkylsulfonyl, $C_1$-$C_4$-alkylaminosulfonyl, $C_1$-$C_4$-alkylsulfonylamino, phenylsulfonyl, phenylsulfonylamino, formamide, a radical of the formula $SO_2NR^{56}R^{57}$, where $R^{56}$ and $R^{57}$ independently represent hydrogen, $C_1$-$C_4$-alkyl, formyl, $C_1$-$C_4$-alkylcarbonyl, $C_1$-$C_4$-alkoxycarbonyl, $NH_2$—CO or $C_1$-$C_4$-alkylaminocarbonyl, $C_1$-$C_4$-alkylaminosulfonylamino, di-$C_1$-$C_4$-alkylaminosulfonylamino, phenylsulfonylamino which may be substituted on the phenyl ring by one or two substituents selected from $C_1$-$C_4$-alkyl, $C_1$-$C_4$-alkoxy or halogen, or 5- or 6-membered heterocyclyl, which is optionally substituted by 1, 2 or 3 of the following radicals: OH, halogen, $C_1$-$C_4$-alkyl or phenyl, 5-membered aromatic heterocyclyl optionally bearing on the nitrogen a phenyl or naphthyl group which can optionally comprise one or two of the following radicals: OH, $SO_3H$, $C_1$-$C_4$-alkyl, and/or $C_1$-$C_4$-alkoxy;

$Kk^3$ is a monovalent radical which derives from benzene, pyrimidine, pyridine or naphthalene and which optionally comprises 1 or 2 hydroxysulfonyl groups and optionally 1, 2 or 3 further substituents selected from $SO_3H$, COOH, CN, $CONH_2$, OH, $NH_2$, $NO_2$, halogen, $C_1$-$C_4$-alkyl, $C_1$-$C_4$-hydroxyalkyl, carboxy-$C_1$-$C_4$-alkyl, $C_1$-$C_4$-alkoxy, $C_1$-$C_4$-alkylamino, $C_1$-$C_4$-dialkylamino, $C_1$-$C_4$-alkylaminocarbonyl, $C_1$-$C_4$-dialkylaminocarbonyl, $C_1$-$C_4$-alkylcarbonylamino, N—($C_1$-$C_4$-alkylcarbonyl)-N—($C_1$-$C_4$-alkylcarbonyl)amino, $C_1$-$C_4$-alkylaminocarbonyloxy, $C_1$-$C_4$-dialkylaminocarbonyloxy, $C_1$-$C_4$-alkylaminocarbonylamino, $C_1$-$C_4$-dialkylaminocarbonylamino, phenylaminocarbonyloxy, phenylaminocarbonylamino, $C_1$-$C_4$-alkoxycarbonylamino, $C_1$-$C_4$-hydroxy-$C_1$-$C_4$-alkylamino, carboxy-$C_1$-$C_4$-alkylamino, phenylcarbonylamino, $C_1$-$C_4$-alkylsulfonyl, $C_1$-$C_4$-hydroxyalkylsulfonyl, $C_1$-$C_4$-alkylsulfonylamino, phenylsulfonyl, phenylsulfonylamino, formamide, a radical of the formula $SO_2NR^{56}R^{57}$, where $R^{56}$ and $R^{57}$ independently represent hydrogen, $C_1$-$C_4$-alkyl, formyl, $C_1$-$C_4$-alkylcarbonyl, $C_1$-$C_4$-alkoxycarbonyl, $NH_2$—CO or $C_1$-$C_4$-alkylaminocarbonyl, $C_1$-$C_4$-alkylaminosulfonylamino, di-$C_1$-$C_4$-alkylaminosulfonylamino, phenylsulfonylamino which may be substituted on the phenyl ring by one or two substituents selected from $C_1$-$C_4$-alkyl, $C_1$-$C_4$-alkoxy or halogen, or 5- or 6-membered heterocyclyl, which is optionally substituted by 1, 2 or 3 of the following radicals: OH, halogen, $C_1$-$C_4$-alkyl or phenyl, 5-membered aromatic heterocyclyl optionally bearing on the nitrogen a phenyl or naphthyl group which can optionally comprise one or two of the following radicals: OH, $SO_3H$, $C_1$-$C_4$-alkyl, and/or $C_1$-$C_4$-alkoxy;

$Tk^1$, $Tk^2$ independently represent a divalent aromatic radical which derives from benzene, diphenylamine, biphenyl, diphenylmethane, 2-phenylbenzimidazole, phenylsulfonylbenzene, phenylaminosulfonylbenzene, stilbene or phenylaminocarbonylbenzene which may each optionally comprise one or more of the following radicals as substituents: $SO_3H$, COOH, OH, $NH_2$, $NO_2$, halogen, $C_1$-$C_4$-alkyl;

L, M, P and R independently represent a divalent aromatic radical which derives from benzene or naphthalene which may each optionally comprise one or more, for example 1, 2, 3, 4 or 5, of the following radicals as substituents: $SO_3H$, COOH, CN, $CONH_2$, OH, $NH_2$, $NO_2$, halogen, $C_1$-$C_4$-alkyl, $C_1$-$C_4$-hydroxyalkyl, carboxy-$C_1$-$C_4$-alkyl, $C_1$-$C_4$-alkoxy, $C_1$-$C_4$-alkylamino, $C_1$-$C_4$-dialkylamino, $C_1$-$C_4$-alkylaminocarbonyl, $C_1$-$C_4$-dialkylaminocarbonyl, $C_1$-$C_4$-alkylcarbonylamino, N—($C_1$-$C_4$-alkylcarbonyl)-N—($C_1$-$C_4$-alkylcarbonyl)amino, $C_1$-$C_4$-alkylaminocarbonyloxy, $C_1$-$C_4$-dialkylaminocarbonyloxy, $C_1$-$C_4$-alkylaminocarbonylamino, $C_1$-$C_4$-dialkylaminocarbonylamino, phenylaminocarbonyloxy, phenylaminocarbonylamino, $C_1$-$C_4$-alkoxycarbonylamino, $C_1$-$C_4$-hydroxy-$C_1$-$C_4$-alkylamino, carboxy-$C_1$-

$C_4$-alkylamino, phenylcarbonylamino, $C_1$-$C_4$-alkylsulfonyl, $C_1$-$C_4$-alkylaminosulfonyl, $C_1$-$C_4$-hydroxyalkylsulfonyl, $C_1$-$C_4$-alkylsulfonylamino, phenylsulfonyl, phenylsulfonylamino, formamide, a radical of the formula $SO_2NR^{56}R^{57}$, where $R^{58}$ and $R^{57}$ independently represent hydrogen, $C_1$-$C_4$-alkyl, formyl, $C_1$-$C_4$-alkylcarbonyl, $C_1$-$C_4$-alkoxycarbonyl, $NH_2$—CO or $C_1$-$C_4$-alkylaminocarbonyl, $C_1$-$C_4$-alkylaminosulfonylamino, di-$C_1$-$C_4$-alkylaminosulfonylamino, phenylsulfonylamino which may be substituted on the phenyl ring by one or two substituents selected from $C_1$-$C_4$-alkyl, $C_1$-$C_4$-alkoxy or halogen, or 5- or 6-membered heterocyclyl, which is optionally substituted by 1, 2 or 3 of the following radicals: OH, halogen, $C_1$-$C_4$-alkyl or phenyl, 5-membered aromatic heterocyclyl optionally bearing on the nitrogen a phenyl or naphthyl group which can optionally comprise one or two of the following radicals: OH, $SO_3H$, $C_1$-$C_4$-alkyl, and/or $C_1$-$C_4$-alkoxy;

Napht$^1$, Napht$^2$ independently represent a divalent radical which derives from naphthalene and which comprises 1 or 2 hydroxysulfonyl groups and may optionally comprise 1, 2 or 3 further substituents selected from OH, $NH_2$, $C_1$-$C_4$-alkylamino, $C_1$-$C_4$-dialkylamino, $C_1$-$C_4$-alkylsulfonylamino, phenylsulfonylamino, 4-methylphenylsulfonylamino, $C_1$-$C_4$-alkylaminosulfonyl, di-$C_1$-$C_4$-alkylaminosulfonyl, phenylaminosulfonyl, 4-methylphenylaminosulfonyl and $NHC(O)R^x$ radicals, where $R^x$ hydrogen, $C_1$-$C_4$-alkyl, maleyl or phenyl;

Pyr represents pyrazole-1,4-diyl which attaches through the nitrogen atom to the A group and optionally comprises one or 2 substituents selected from halogen, $C_1$-$C_4$-alkyl, hydroxyl or $C_1$-$C_4$-alkoxy;

Tr$^1$, Tr$^2$ independently represent a 1,3,5-triazine-2,4-diyl radical which optionally further comprises a halogen atom, a methyl group or a methoxy group as substituent.

Here and hereinbelow $C_1$-$C_4$-alkyl (as well as the alkyl moieties in $C_1$-$C_4$-alkoxy, $C_1$-$C_4$-alkylamino, di-$C_1$-$C_4$-alkylamino, $C_1$-$C_4$-alkylsulfonyl, $C_1$-$C_4$-hydroxyalkylsulfonyl, $C_1$-$C_4$-alkylaminosulfonyl, $C_1$-$C_4$-alkylaminocarbonyl, di-$C_1$-$C_4$-alkylaminosulfonyl, di-$C_1$-$C_4$-alkylaminocarbonyl and $C_1$-$C_4$-alkylcarbonylamino and the like) denotes a linear or branched aliphatic hydrocarbyl radical such as methyl, ethyl, N-propyl, isopropyl, n-butyl and the like.

$C_1$-$C_4$-Hydroxyalkyl denotes $C_1$-$C_4$-alkyl which bears an OH group such as 2-hydroxyethyl. Correspondingly, $C_1$-$C_4$-hydroxyalkylamino denotes $C_1$-$C_4$-alkylamino, which bears an OH group in the alkyl radical such as 2-hydroxyethylamino.

$C_1$-$C_4$-Carboxyalkyl denotes $C_1$-$C_4$-alkyl which bears a carboxyl group (COOH group) such as carboxymethyl ($CH_2COOH$) and 2-carboxyethyl ($CH_2CH_2COOH$). Correspondingly, $C_1$-$C_4$-carboxyalkylamino denotes $C_1$-$C_4$-alkylamino which bears a carboxyl group (COOH group) in the alkyl moiety such as carboxymethylamino (NH—$CH_2COOH$) and 2-carboxyethylamino (NH—$CH_2CH_2COOH$).

5- or 6-membered heterocyclyl generally comprises 1, 2 or 3 heteroatoms selected from nitrogen, oxygen and sulfur, especially 1 or 2 nitrogen atoms and optionally an oxygen or sulfur atom as ring members and can be saturated, unsaturated or aromatic. Examples of saturated heterocyclyl are morpholinyl, piperidinyl, piperazinyl and pyrrolidinyl. Examples of aromatic heterocyclyl are pyridinyl, pyrazolyl, oxazolyl, thiazolyl, etc.

The dyes of the formulae I to XV can be used in free form, in the form of their salts and—when two radicals joined together by a diazo group —N=N— each comprise an OH, COOH or $NH_2$ radical disposed ortho to the diazo group—as metal complexes.

The radicals DK$^1$ and DK$^2$ in the dyes of the formulae I to XIII and XV derive from aromatic amines DK$^1$—$NH_2$ and DK$^2$—$NH_2$ respectively, hereinafter also referred to as diazonium components. The amines DK$^1$—$NH_2$ and DK$^2$—$NH_2$ are generally optionally substituted aniline, optionally substituted α- or β-naphthylamine or optionally substituted aminoquinolines. Correspondingly, the radicals DK$^1$ and DK$^2$ are generally independently benzene-, naphthalene- or quinoline-derived radicals wherein naphthalene, quinoline and benzene optionally comprise one or more, for example 1, 2 or 3, substituents. Examples of substituents are the following radicals: $SO_3H$, COOH, OH, $NH_2$, $NO_2$, CN, $CONH_2$, halogen, $C_1$-$C_4$-alkyl, $C_1$-$C_4$-hydroxyalkyl, carboxy-$C_1$-$C_4$-alkyl, $C_1$-$C_4$-alkoxy, $C_1$-$C_4$-alkylamino, $C_1$-$C_4$-dialkylamino, $C_1$-$C_4$-alkylaminocarbonyl, $C_1$-$C_4$-dialkylaminocarbonyl, $C_1$-$C_4$-alkylaminocarbonyloxy, $C_1$-$C_4$-dialkylaminocarbonyloxy, $C_1$-$C_4$-alkylaminocarbonylamino, $C_1$-$C_4$-dialkylaminocarbonylamino, phenylaminocarbonyloxy, phenylaminocarbonylamino, $C_1$-$C_4$-alkoxycarbonylamino, $C_1$-$C_4$-alkylcarbonylamino, N—($C_1$-$C_4$-alkylcarbonyl)-N—($C_1$-$C_4$-alkylcarbonyl)amino, $C_1$-$C_4$-hydroxy-$C_1$-$C_4$-alkylamino, carboxy-$C_1$-$C_4$-alkylamino, phenylcarbonylamino, $C_1$-$C_4$-alkylsulfonyl, $C_1$-$C_4$-hydroxyalkylsulfonyl, $C_1$-$C_4$-alkylaminosulfonyl, $C_1$-$C_4$-alkylsulfonylamino, phenylsulfonyl, phenylsulfonylamino, formamide, $SO_2NR^{56}R^{57}$, where $R^{56}$ and $R^{57}$ independently represent hydrogen, $C_1$-$C_4$-alkyl, formyl, $C_1$-$C_4$-alkylcarbonyl, $C_1$-$C_4$-alkoxycarbonyl, $NH_2$—CO, $C_1$-$C_4$-alkylaminocarbonyl or 5- or 6-membered heterocyclyl, which is optionally substituted by 1, 2 or 3 of the following radicals: OH, halogen, $C_1$-$C_4$-alkyl or phenyl, 5-membered aromatic heterocyclyl optionally bearing on the nitrogen a phenyl or naphthyl group which can optionally comprise one or two of the following radicals: OH, $SO_3H$, $C_1$-$C_4$-alkyl, and/or $C_1$-$C_4$-alkoxy;

Useful amines Dk$^1$-$NH_2$ and Dk$^2$-$NH_2$ further include 4-amino-1-phenylpyrazoles wherein the pyrazole ring as well as the phenyl ring comprise one or more, for example 1, 2 or 3, substituents of the aforementioned kind or a B—$SO_2$— group wherein B is as defined above. In these cases, Dk$^1$ or Dk$^2$ represents in particular pyrazol-4-yl which has a phenyl radical or a group of the formula A in position 1 and optionally bears 1 or 2 substituents selected from halogen, $C_1$-$C_4$-alkyl, hydroxyl, COOH, hydroxysulfonyl or $C_1$-$C_4$-alkoxy.

Preferably, $Dk_1$ and Dk$^2$ are independently radicals derived from an optionally substituted aniline, an optionally substituted α- or β-naphthylamine or are independently an A group.

Examples of suitable amines Dk$^1$-$NH_2$ and Dk$^2$-$NH_2$ are the hereinbelow indicated compounds DK1 to DK39:

DK1

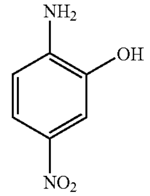

-continued
DK2
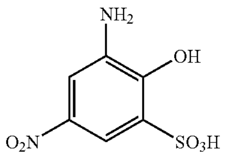
DK3
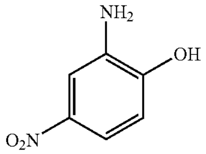
DK4
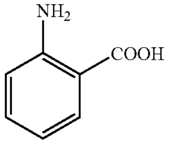
DK5
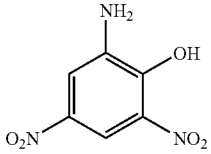
DK6
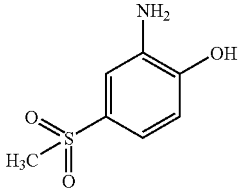
DK7
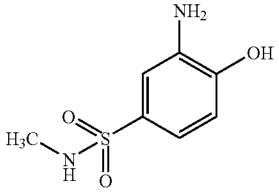
DK8
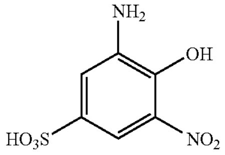
DK9
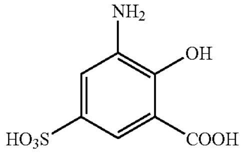
DK10
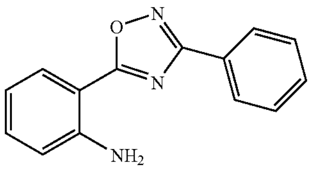
-continued
DK11
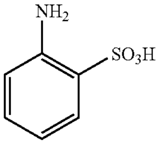
DK12
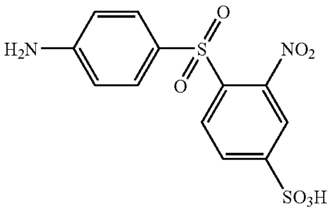
DK13
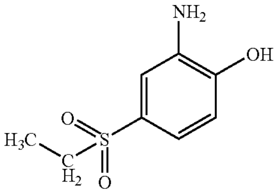
DK14
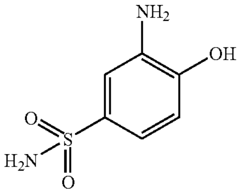
DK15
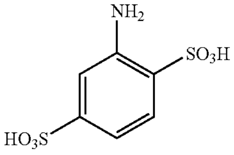
DK16
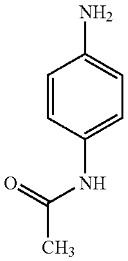
DK17
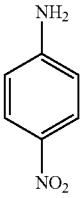
DK18
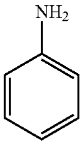

-continued
DK19
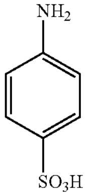
DK20
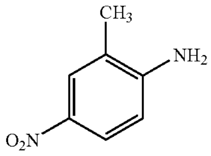
DK21
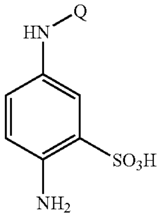
DK22
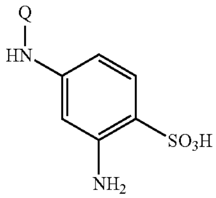
DK23
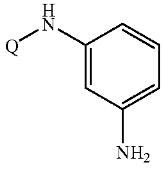
DK24
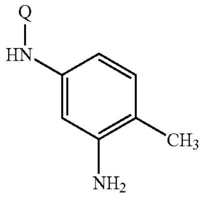
DK25
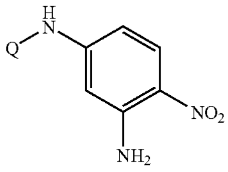
DK26
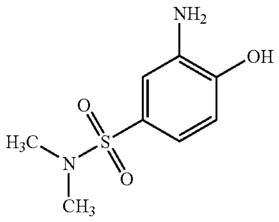
-continued
DK27
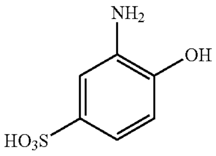
DK28
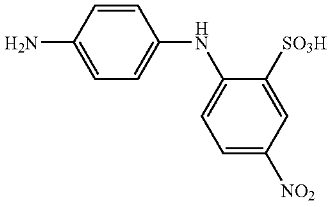
DK29
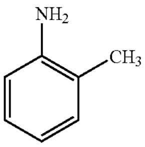
DK30
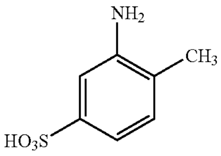
DK31
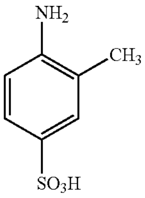
DK32
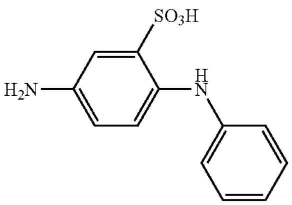
DK33
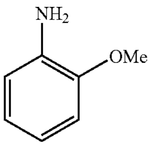
DK34
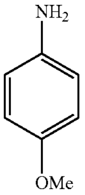

-continued

DK35

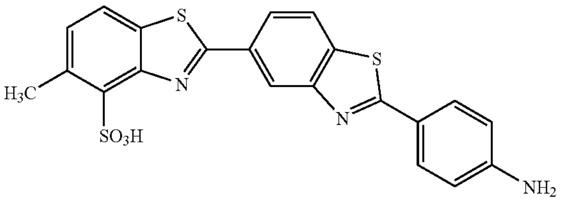

DK36

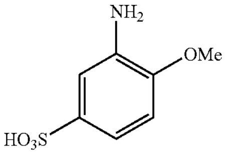

DK37

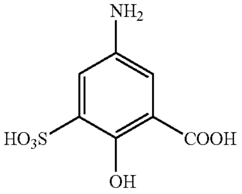

DK38

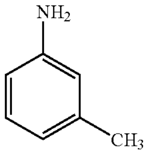

DK39

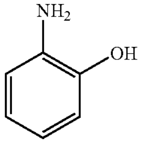

The Q radicals in the formulae DK21 to DK25 denote hydrogen, $C_1$-$C_4$-alkyl, carboxy-$C_1$-$C_4$-alkyl, $C_1$-$C_4$-hydroxyalkyl, $C_1$-$C_4$-alkoxy or phenylcarbonyl.

Suitable diazo components further include the hereinbelow indicated naphthylamines DK40 to 59: 4-amino-3-hydroxynaphthalene-1-sulfonic acid (DK40), 4-amino-3-hydroxy-6-nitronaphthalene-1-sulfonic acid (DK41), 6-amino-4-hydroxynaphthalene-2-sulfonic acid (gamma acid, DK42), 4-amino-5-hydroxynaphthalene-1-sulfonic acid (Chicago S acid, DK43), 4-amino-5-hydroxynaphthalene-2,7-disulfonic acid (H acid DK44), 4-amino-5-hydroxynaphthalene-1,7-disulfonic acid (K acid, DK45), 8-aminonaphthalene-2-sulfonic acid (Cleve's acid 7, DK46), 6-aminonaphthalene-1-sulfonic acid (D acid, DK47), 4-aminonaphthalene-2,7-sulfonic acid (DK48), 5-aminonaphthalene-2-sulfonic acid (DK49), 7-amino-4,8-dihydroxynaphthalene-2-sulfonic acid (DK50), 2-amino-5-hydroxynaphthalene-1,7-disulfonic acid (DK51), 3-amino-5-hydroxynaphthalene-2,7-disulfonic acid (DK52), 3-amino-1,5-disulfonic acid (DK53), 7-aminonaphthalene-1-sulfonic acid (DK54), 4-aminonaphthalene-1-sulfonic acid (DK55), 5-aminonaphthalene-1-sulfonic acid (DK56), 7-aminonaphthalene-1,3,5-trisulfonic acid (DK57), 4-amino-3-hydroxy-7-[(4-methylphenyl)sulfonylamino]-naphthalene-1-sulfonic acid (DK58) and 7-amino-4-hydroxynaphthalene-2-sulfonic acid (J acid, DK59), Examples of suitable monoamines $Dk^1$-$NH_2$ and $Dk^2$-$NH_2$ are the hereinbelow indicated compounds DK60 to DK83:

DK60

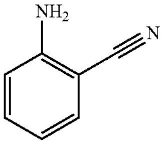

DK61

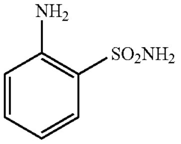

DK62

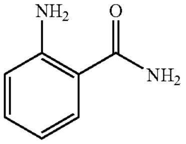

DK63

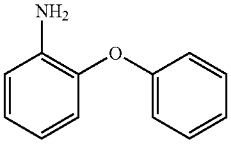

DK64

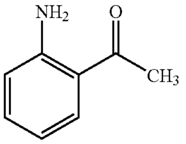

DK65

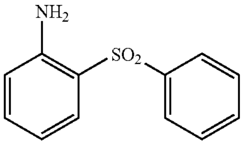

DK66

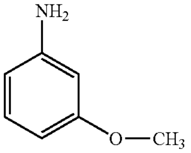

DK67

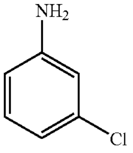

DK68

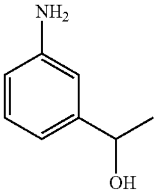

-continued

DK69

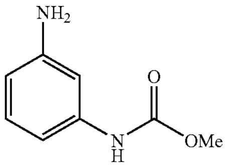

DK70

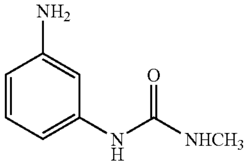

DK71

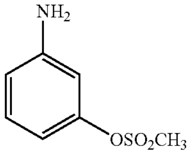

DK72

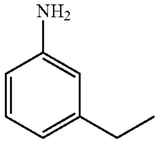

DK73

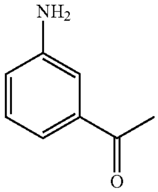

DK74

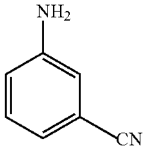

DK75

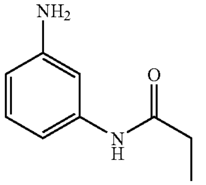

DK76

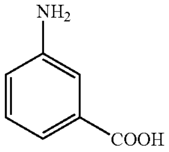

DK77

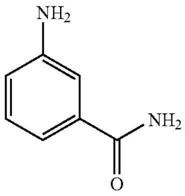

-continued

DK78

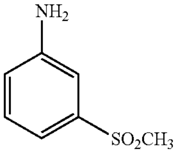

DK79

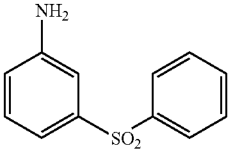

DK80

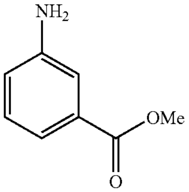

DK81

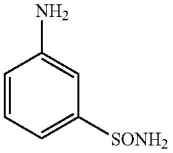

DK82

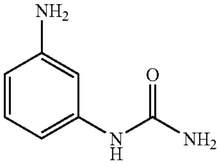

DK83

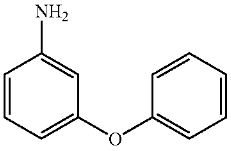

As $Kk^1$ and $Kk^2$ radicals there may in principle be used all mono-, di- or trivalent, as $Kk^3$ radicals all monovalent aromatic radicals which derive from an optionally substituted benzene, naphthalene, pyrazole, diphenylamine, diphenylmethane, pyridine, pyrimidine, or diphenyl ether which each have 1, 2 or 3 free positions left over onto which a diazonium compound can be coupled successively one, two or three times. The compounds underlying the $Kk^1$, $Kk^2$ and $Kk^3$ radicals are hereinafter also referred to as a coupling component.

Suitable coupling components are for example benzene-derived compounds of the general formula Kk-A, naphthalene-derived compounds of the formula Kk-B, quinoline-derived compounds of the formula Kk-C, pyrazole-derived compounds of the formula Kk-D, diphenylmethane-derived compounds of the formula Kk-E of diphenylamine-derived compounds of the formula Kk-F, of pyridine-derived compounds of the formula Kk-G and of pyridone-derived compounds of the formula Kk-H:

(Kk-A)

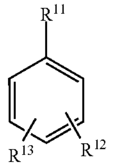

(Kk-B)

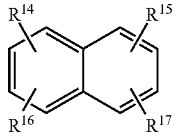

(Kk-C)

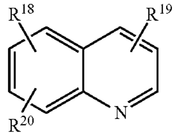

(Kk-D)

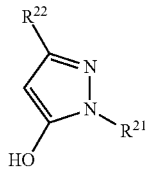

(Kk-E)

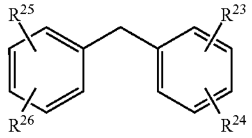

(Kk-F)

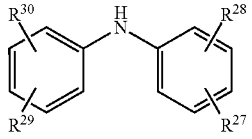

(Kk-G)

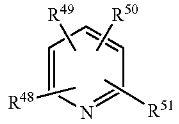

(Kk-H)

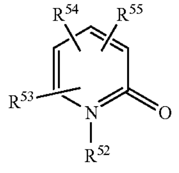

In the formula Kk-A, $R^{11}$ represents $NH_2$, OH, $C_1$-$C_4$-alkoxy, $C_1$-$C_4$-alkylamino, di-$C_1$-$C_4$-alkylamino, hydroxy-$C_1$-$C_4$-alkylamino, carboxy-$C_1$-$C_4$-alkylamino, $C_1$-$C_4$-alkylcarbonyl-amino or phenylamino, $R^{12}$ represents hydrogen, $NH_2$, OH, $C_1$-$C_4$-alkoxy, hydroxy-$C_1$-$C_4$-alkylamino, carboxy-$C_1$-$C_4$-alkylamino, $C_1$-$C_4$-alkylamino, di-$C_1$-$C_4$-alkylamino and $R^{13}$ represents hydrogen, $C_1$-$C_4$-alkyl, $C_1$-$C_4$-alkoxy, $C_1$-$C_4$-alkylaminocarbonyloxy, $C_1$-$C_4$-dialkylaminocarbonyloxy, $C_1$-$C_4$-alkylaminocarbonylamino, $C_1$-$C_4$-dialkylaminocarbonylamino, phenylaminocarbonyloxy, phenylaminocarbonylamino, $C_1$-$C_4$-alkoxycarbonylamino, $SO_3H$, $C_1$-$C_4$-alkylsulfonyl, $C_1$-$C_4$-hydroxyalkylsulfonyl, COOH, Cl, Br, F, $SO_2NR^{56}R^{57}$, $NO_2$ or $NH_2$, where $R^{56}$ and $R^{57}$ independently represent hydrogen, $C_1$-$C_4$-alkyl, formyl, $C_1$-$C_4$-alkylcarbonyl, $C_1$-$C_4$-alkyloxycarbonyl, $NH_2$—CO, $C_1$-$C_4$-alkylaminocarbonyl.

In the formula Kk-B, $R^{14}$ and $R^{15}$ independently represent hydrogen or have one of the meanings mentioned as $R^{11}$, although $R^{15}$ can represent $SO_3H$ as well. $R^{16}$ represents hydrogen, OH, $SO_3H$, $C_1$-$C_4$-alkylsulfonylamino, $C_1$-$C_4$-alkylaminosulfonyl, $C_1$-$C_4$-alkylaminosulfonylamino, di-$C_1$-$C_4$-alkylaminosulfonylamino, $C_1$-$C_4$-alkoxycarbonylamino, phenylsulfonylamino which may comprise one or two substituents selected from $C_1$-$C_4$-alkyl, $C_1$-$C_4$-alkoxy or halogen on the phenyl ring. $R^{17}$ represents hydrogen, OH or an $SO_3H$ group.

In the formula Kk-C, $R^{18}$ to $R^{20}$ independently represent hydrogen, OH or $C_1$-$C_4$-alkyl.

In the formula Kk-D, $R^{21}$ represents hydrogen, phenyl or naphthyl, wherein the 2 latter groups may comprise 1, 2 or 3 substituents selected from hydrogen, OH, halogen, $C_1$-$C_4$-alkyl, $SO_3H$, $NO_2$ and the above-defined group B—$SO_2$—. In one embodiment of the invention, $R^{21}$ represents one of the above-defined groups A and especially one of the groups A1 to A12. $R^{22}$ is hydrogen, COOH or $C_1$-$C_4$-alkyl.

In the formula Kk-E, $R^{23}$ and $R^{25}$ are independently hydrogen, COOH, hydroxyl or $C_1$-$C_4$-alkyl. $R^{24}$ and $R^{26}$ are independently hydrogen, hydroxyl or $C_1$-$C_4$-alkyl, In the formula Kk-F, $R^{27}$ and $R^{29}$ are independently hydrogen, $SO_3H$, COOH, hydroxyl or $C_1$-$C_4$-alkyl. $R^{28}$ and $R^{30}$ are independently hydrogen, hydroxyl or $C_1$-$C_4$-alkyl, In the formula Kk-G, $R^{48}$, $R^{49}$, $R^{50}$ and $R^{51}$ are independently hydrogen, $SO_3H$, COOH, $NH_2$, CN, hydroxyl or $C_1$-$C_4$-alkyl.

In the formula Kk-H, $R^{52}$, $R^{53}$, $R^{54}$ and $R^{55}$ are independently hydrogen, $SO_3H$, COOH, $NH_2$, CN, hydroxyl or $C_1$-$C_4$-alkyl.

Examples of coupling components of the formula Kk-A are the aforementioned aniline compounds DK3, DK4, DK6, DK7, DK11, DK13, DK14, DK15, DK18, DK21 to DK27, DK29, DK30, DK33, DK36, DK38, DK39, also salicylic acid (Kk1), 3-aminophenol (Kk2), resorcinol (Kk3), 3-phenylaminophenol (Kk4), 1,3-diaminobenzene (Kk5), 3-acetylaminoaniline (Kk6), 2-nitroaniline (Kk7), 3-(diethylamino)phenol (Kk8), 3-(morpholin-1-yl)phenol (Kk9), 3-(diethylamino)aniline (Kk10), N-acetyl-3-(diethylamino)aniline (Kk11), N-(3-hydroxyphenyl)glycine (Kk12), 3-(2-hydroxyethyl)aminophenol (Kk13), 2,4-diaminotoluene (Kk14), 2,4-diaminobenzenesulfonic acid (Kk15), 2,4-diamino-1-nitrobenzene (Kk16), N-(3-amino-6-methylphenyl)glycine (Kk17) and 2,4-diamino-5-methylbenzenesulfonic acid (Kk18), 2,4-diamino-1-hydroxybenzene (Kk54), 2,4-diamino-1-methoxybenzene (Kk55), 2,4-diamino-1-chlorobenzene (Kk56), 1,2,4-triaminobenzene (Kk57), 3-(dimethylamino)aniline (Kk58), 3-(dimethylamino)-1-nitrobenzene (Kk59), 2-(N,N-diethylamino)-4-acetylamino-1-methoxybenzene (Kk60), 2-(N,N-diethylamino)-4-amino-1-methoxybenzene (Kk61), 2,4-diamino-1-benzenesulfonamide (Kk62), 2-amino-4-acetylamino-1-methoxybenzene (Kk63), 2-amino-4-acetylamino-1-chlorobenzene (Kk64), 2,4-diamino-1-methylsulfonylbenzene (Kk65), 2,4-diamino-1-ethylsulfonylbenzene (Kk66) and 2,4-diamino-1-(2-hydroxyethyl)sulfonylbenzene (Kk67).

Examples of coupling components of the formula Kk-B are 2-naphthol (Kk19), 2-phenylaminonaphthalene (Kk20), 4-methyl-1-naphthol (Kk21), 8-methoxycarbonylamino-2- naphthol (Kk22), 8-acetylamino-2-naphthol (Kk23), 8-methylaminosulfonyl-2-naphthol (Kk24), 8-dimethylaminosulfonylamino-2-naphthol (Kk25), 6-[(4-methylphenyl)sulfonyl]amino-4-hydroxynaphthalene-2-sulfonic acid (Kk26), 8-phenylaminonaphthalene-1-sulfonic acid (Kk27), 6-amino-4-hydroxynaphthalene-2-sulfonic acid (DK42), 4-amino-5-hydroxynaphthalene-1-sulfonic acid (DK43), 7-amino-4-hydroxynaphthalene-2-sulfonic acid (DK59), 4-amino-5-hydroxynaphthalene-2,7-disulfonic acid (DK44), 4-amino-5-hydroxynaphthalene-1,7-disulfonic acid (DK45), 8-aminonaphthalene-2-sulfonic acid (DK46), 6-aminonaphthalene-1-sulfonic acid (DK47), 4-aminonaphthalene-2,7-sulfonic acid (DK48), 4-hydroxynaphthalene-2,7-disulfonic acid (Kk28), 3-hydroxynaphthalene-2,7-disulfonic acid (Kk29), 4-(phenylcarbonyl)amino-5-hydroxynaphthalene-2,7-disulfonic acid (Kk30), 4,6-dihydroxynaphthalene-2-sulfonic acid (Kk31), 4,5-dihydroxynaphthalene-2,7-disulfonic acid (Kk32), 4-(phenylcarbonyl)amino-5-hydroxynaphthalene-1-sulfonic acid (Kk33), 4-hydroxynaphthalene-1-sulfonic acid (Kk34), 4,5-dihydroxynaphthalene-1-sulfonic acid (Kk35), 5-aminonaphthalene-2-sulfonic acid (DK49), 7-hydroxynaphthalene-1,3-disulfonic acid (Kk36), 7-amino-4,8-dihydroxynaphthalene-2-sulfonic acid (DK50), 8-hydroxynaphthalene-1-sulfonic acid (Kk37), 2-amino-5-hydroxynaphthalene-1,7-disulfonic acid (DK51), 3-amino-5-hydroxynaphthalene-2,7-disulfonic acid (DK52), 3-amino-1,5-disulfonic acid (DK53), 4,6-dihydroxy-7-hydroxycarbonylnaphthalene-2-sulfonic acid (Kk38), 7-aminonaphthalene-1-sulfonic acid (DK54), 4-aminonaphthalene-1-sulfonic acid (DK55), 5-aminonaphthalene-1-sulfonic acid (DK56) 7-aminonaphthalene-1,3,5-trisulfonic acid (DK57) and 4-acetylamino-5-hydroxynaphthalene-2,7-disulfonic acid (Kk39).

Examples of coupling components Kk-C are 2,4-dihydroxyquinoline (Kk40) and 8-hydroxyquinoline (Kk41).

Examples of coupling components Kk-D are 3-methyl-5-hydroxypyrazole (Kk42), 1-phenyl-3-methyl-5-hydroxypyrazole (Kk43), 1-[4-(2-hydroxysulfonyloxyethyl)-2-hydroxysulfonylphenyl]-3-methyl-5-hydroxypyrazole (Kk44), 1-[4-(2-hydroxysulfonyloxyethyl)-2-hydroxysulfonylphenyl]-5-hydroxypyrazole-3-carboxylic acid (Kk45), 1-[4-hydroxysulfonylphenyl]-5-hydroxypyrazole-3-carboxylic acid (Kk46) and 1-[6-hydroxysulfonylnaphthalen-2-yl]-5-hydroxy-3-methylpyrazole (Kk47), 1-[4-hydroxysulfonylphenyl]-3-methyl-5-hydroxypyrazole (Kk48).

An example of a Kk-E coupling component is 4,4'-dihydroxydiphenylmethane-3,3'-dicarboxylic acid (Kk49).

An example of a Kk-F coupling component is 4,4'-dihydroxydiphenylamine (Kk50).

An example of a Kk-G coupling component is 2,6-diaminopyridine (Kk51).

Examples of Kk-H coupling components are 1-methyl-2-pyridone (Kk52) and 3-cyano-4-methyl-6-hydroxy-1-ethylpyridone (Kk53).

Suitable $Kk^3$ radicals are in particular monovalent radicals derived from optionally substituted benzene or naphthalene, for example the monovalent radicals derived from the coupling components Kk-A and Kk-B such as the radicals derived from the aniline compounds DK3, DK4, DK6, DK7, DK11, DK13, DK14, DK15, DK18, DK21 to DK27, DK29, DK30, DK33, DK36, DK38, DK39, DK42 to DK83, Kk1 to Kk48 and Kk51 to Kk67.

The radicals $Tk^1$ and $Tk^2$ are divalent aromatic radicals derived from aromatic amines of the formula $Tk^1(NH_2)_2$ and $Tk^2(NH_2)_2$ respectively. These diamines are hereinafter also referred to as a tetrazo component.

Suitable tetrazo components are for example benzene-derived compounds of the general formula Tk-A, biphenyl-derived compounds of the formula Tk-B, phenylbenzimidazole-derived compounds of the formula Tk-C, diphenylmethane-derived compounds of the formula Tk-D, diphenylamine-derived compounds of the formula Tk-E, phenylsulfonylbenzene-derived compounds of the formula Tk-F, phenylaminosulfonylbenzene-derived compounds of the formula Tk-G, stilbene-derived compounds of the formula Tk-H and phenylaminocarbonylbenzene-derived compounds of the formula Tk-J:

(Tk-A)

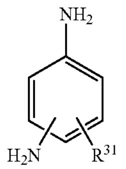

(Tk-B)

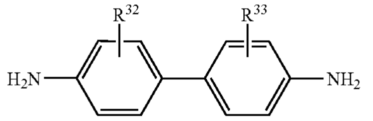

(Tk-C)

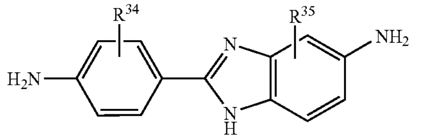

(Tk-D)

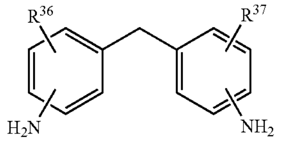

(Tk-E)

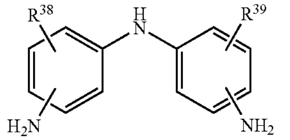

(Tk-F)

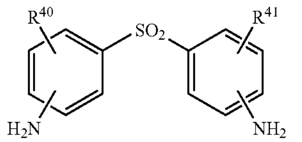

(Tk-G)

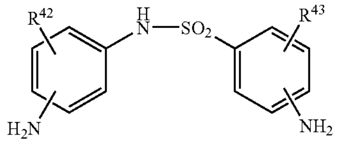

(Tk-H)

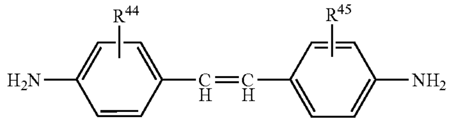

(Tk-J)

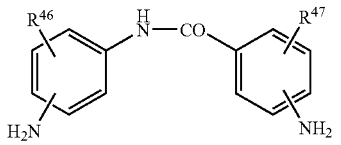

In the formula Tk-A, $R^{31}$ represents for example hydrogen, $C_1$-$C_4$-alkyl, $C_1$-$C_4$-alkoxy, COOH or $SO_3H$. Preferably, the two $NH_2$ groups are disposed para to each other. Examples of compounds of the formula Tk-A are 1,4-diaminobenzene (Tk1), 1,4-diamino-2-methoxybenzene (Tk2), 2,5-diaminobenzoic acid (Tk3) and 2,5-diaminobenzenesulfonic acid (Tk4).

In the formula Tk-B, $R^{32}$ and $R^{33}$ independently represent for example hydrogen, OH, $C_1$-$C_4$-alkyl, $C_1$-$C_4$-alkoxy, COOH or $SO_3H$. Preferably, the two $NH_2$ groups are disposed in positions 4 and 4'. Examples of compounds of the formula Tk-B are 4,4'-diaminobiphenyl (Tk5), 4,4'-diamino-3,3'-dimethylbiphenyl (Tk6), 4,4'-diamino-3,3'-dimethoxybiphenyl (Tk7), 4,4'-diamino-3,3'-dihydroxybiphenyl (Tk8), 4,4'-diamino-3-hydroxysulfonylbiphenyl (Tk9), 4,4'-diamino-3,3'-bis(hydroxysulfonyl)biphenyl (Tk10) and 4,4'-diamino-3,3'-dicarboxybiphenyl (Tk11).

In the formula Tk-C, $R^{34}$ and $R^{35}$ independently represent for example hydrogen, OH, $C_1$-$C_4$-alkyl or $C_1$-$C_4$-alkoxy. An example of a compound of the formula Tk-C is 6-amino-2-[4-aminophenyl]benzimidazole (Tk12).

In the formula Tk-D, $R^{36}$ and $R^{37}$ independently represent for example hydrogen, OH, $C_1$-$C_4$-alkyl, $C_1$-$C_4$-alkoxy, COOH or $SO_3H$. Preferably, the two $NH_2$ groups are disposed in positions 4 and 4'. Examples of Tk-D compounds are bis(4-aminophenyl)methane (Tk13), bis(4-amino-3-carboxyphenyl)methane (Tk14) and bis(4-amino-3-methylphenyl) methane (Tk15).

In the formula Tk-E, $R^{38}$ and $R^{39}$ independently represent for example hydrogen, OH, $C_1$-$C_4$-alkyl, $C_1$-$C_4$-alkoxy, COOH or $SO_3H$. Preferably, the two $NH_2$ groups are disposed in positions 4 and 4'. An example of a Tk-E compound is (4-aminophenyl)(4'-amino-2'-hydroxysulfonylphenyl)amine or 4,4'-diaminodiphenylamine-2-sulfonic acid (Tk16).

In the formula Tk-F, $R^{40}$ and $R^{41}$ independently represent for example hydrogen, OH, $C_1$-$C_4$-alkyl, $C_1$-$C_4$-alkoxy, COOH or $SO_3H$. Preferably, the two $NH_2$ groups are disposed in positions 4 and 4'. An example of a Tk-F compound is bis-(4-aminophenyl)sulfone (Tk17).

In the formula Tk-G, $R^{42}$ and $R^{43}$ independently represent for example hydrogen, OH, $C_1$-$C_4$-alkyl, $C_1$-$C_4$-alkoxy, COOH or $SO_3H$. Preferably, the two $NH_2$ groups are disposed in positions 4 and 4'. An example of a Tk-G compound is N-(4'-aminophenyl)-4-aminobenzenesulfonamide (Tk18).

In the formula Tk-H, $R^{44}$ and $R^{45}$ independently represent for example hydrogen, $C_1$-$C_4$-alkyl, COOH or $SO_3H$. Preferably, the two $NH_2$ groups are disposed in positions 4 and 4'. An example of a Tk-H compound is 1,2-bis(4-amino-2-hydroxysulfonylphenyl)ethene (flavonic acid, Tk19).

In the formula Tk-J, $R^{46}$ and $R^{47}$ independently represent for example hydrogen, OH, $C_1$-$C_4$-alkyl, $C_1$-$C_4$-alkoxy, COOH or $SO_3H$. Preferably, the two $NH_2$ groups are disposed in positions 4 and 4'. An example of a Tk-J compound is N-(4'-aminophenyl)-4-aminobenzamide (Tk20).

Preferred $Napht^1$ and $Napht^2$ radicals obey the general formula Napht-II:

(Napht-II)

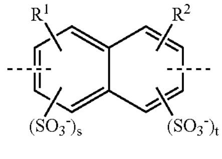

where $R^1$ and $R^2$ are independently hydrogen, OH, $NH_2$ or $NHC(O)R^3$, where $R^3$ is hydrogen, $C_1$-$C_4$-alkyl, maleyl or phenyl, and at least one of $R^1$ and $R^2$ is other than hydrogen, - - - - represents the bonds to the azo groups, s and t represent 0 or 1. The s+t sum is preferably 1 or 2.

Examples of suitable $Napht^1$ and $Napht^2$ radicals include the hereinbelow recited radicals II-1 to II-14:

2-hydroxysulfonyl-4-hydroxynaphthalene-3,6-diyl (II-1),
6-amino-2-hydroxysulfonyl-4-hydroxynaphthalene-3,5-diyl (II-2),
1-hydroxysulfonyl-5-hydroxynaphthalene-4,6-diyl (II-3),
4-amino-1-hydroxysulfonyl-5-hydroxynaphthalene-3,6-diyl (II-4),
2-hydroxysulfonyl-4-hydroxynaphthalene-3,7-diyl (II-5),
7-amino-2-hydroxysulfonyl-4-hydroxynaphthalene-3,8-diyl (II-6),
5-hydroxy-2,7-bishydroxysulfonylnaphthalene-4,6-diyl (II-7),
4-amino-5-hydroxy-2,7-bishydroxysulfonylnaphthalene-3,6-diyl (II-8),
5-hydroxy-1,7-bishydroxysulfonylnaphthalene-4,6-diyl (II-9),
4-amino-5-hydroxy-1,7-bishydroxysulfonylnaphthalene-3,6-diyl (II-10),
2-hydroxysulfonylnaphthalene-5,8-diyl (II-11),
2-amino-5-hydroxy-1,7-bishydroxysulfonylnaphthalene-3,6-diyl (II-12),
5-hydroxy-2,7-bishydroxysulfonylnaphthalene-3,6-diyl (II-13),
3-amino-5-hydroxy-2,7-bishydroxysulfonylnaphthalene-4,6-diyl (II-14),
2-hydroxysulfonylnaphthalene-5,8-diyl (II-15) and
1-hydroxysulfonylnaphthalene-5,8-diyl (II-16).

The radicals L, M, P and R are divalent radicals derived from benzene or naphthalene, for example radicals derived from the coupling components of the formulae Kk-A and Kk-B and also radicals which are derived from the aforementioned diazo components and still have a free position onto which a diazonium compound can be coupled. Examples thereof are the aniline compounds DK3, DK4, DK6, DK7, DK11, DK13, DK14, DK15, DK18, DK21 to DK27, DK29, DK30, DK33, DK36, DK38, DK39, and DK60 to DK83 and also the naphthylamines DK42 to DK59.

Particular preference among the aforementioned compounds of the formulae I to XV are given to the dyes of the general formulae IIa, IIIa and IVa:

$$Dk^1\text{-N=N-}Napht^1\text{-N=N-}Tk^1[\text{-N=N-}Kk^1]_k[\text{-N=N-}Dk^2]_n \quad \text{(IIa)}$$

$$Dk^1\text{-N=N-}Napht^1\text{-N=N-}Tk^1\text{-N=N-}Kk^1\text{-N=N-}Tk^2\text{-N=N-}Napht^2\text{-N=N-}Dk^2 \quad \text{(IIIa)}$$

$$Dk^1\text{-N=N-}Napht^1\text{-N=N-}Tk^1\text{-N=N-}Napht^2\text{-N=N-}Dk^2 \quad \text{(IVa)}$$

In the formulae IIa, IIIa and IVa, $Dk^1$, $Dk^2$, $Napht^1$, $Napht^2$, $Kk^1$, $TK^1$, $Tk^2$ and $Kk^1$ are each as defined above, although either or both of the $Dk^1$ and $Dk^2$ radicals represent a radical of the formula A as defined above and denote in particular one of the A1 to A12 radicals. The numbers n and k represent 0 or 1 subject to the condition that n+k is =1 or 2. Such compounds are novel when $Tk^1$ in the formula IIa does not represent a diphenylamine-derived radical when k is =0. Such compounds and mixtures thereof therefore likewise form part of the subject matter of the present invention.

A particularly preferred embodiment of the dyes II and IIa comprises the dyes of general formula IIb $$Dk^1\text{-N=N-}Napht^1\text{-N=N-}Tk^1\text{-N=N-}Kk^1[\text{-N=N-}Dk^2]_n \quad \text{(IIb)}$$

where A, $Dk^2$, $Napht^1$ and $Kk^1$ are each as defined above, n is 0 or 1 and where $Tk^1$ represents a divalent radical which derives from biphenyl, diphenylmethane, 2-phenylbenzimidazole, phenylsulfonylbenzene, phenylaminosulfonylbenzene, diphenylamine, stilbene or phenylaminocarbonylbenzene and may optionally comprise one or more of the following radicals as substituents: $SO_3H$, COOH, OH, $NH_2$, $NO_2$, halogen, $C_1$-$C_4$-alkyl, although $Tk^1$ does not represent a diphenylamine-derived radical when n=0 and the $Dk^2$ radical may also represent a radical of the formula A as defined above. Dyes of the general formula IIb and especially their mixtures are particularly preferred subject matter of the present invention.

Particular preference among the inventive dyes of the general formulae IIa, IIb, IIIa and IVa is given to those dyes wherein at least one of the $Tk^1$ and/or $Tk^2$ groups represents a radical of the formula

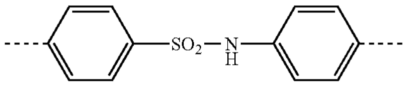

where - - - - represent the bonds to the azo groups.

Particular preference among the compounds of the general formulae IIa, IIb, IIIa and IVa is given to those dyes wherein $Napht^1$ and/or $Napht^2$ represent a bivalent radical of the above-defined general formula Napht-II and in particular have the concrete meanings recited there.

Particular preference among the compounds of the general formulae IIa, IIb, IIIa and IVa is given to those dyes wherein either or both of the $Dk^1$ and $Dk^2$ radicals represent one of the above-defined A1 to A12 radicals.

In the dyes of the general formula IIb, $Kk^1$ represents for example a radical derived from the coupling components of the formulae Kk1 to Kk67, DK3, DK4, DK6, DK7, DK11, DK13, DK14, DK15, DK18, DK21 to DK27, DK29, DK30, DK33, DK36, DK38, DK39 or DK42 to DK83. Preference among the dyes of the formulae IIa, IIb and IIIa is given especially to those in which $Kk^1$ is derived from a Kk-A compound.

Particular preference is given to mixtures of the dyes of the general formula IIb. The mixtures of the dyes IIb consist of two or more, for example 2, 3 or 4, individual dyes IIb. The amount of an individual IIb dye is not less than 10 mol % and especially not less than 20 mol %, based on the total amount of dye F. Preference is given to mixtures of two dyes F wherein the individual components are present in a molar ratio in the range from 9:1 to 1:9, especially in the range from 2:8 to 8:2 and more preferably in the range from 3:7 to 7:3. A particularly preferred embodiment comprises dye IIb mixtures in which the individual dyes differ only in the $Kk^1$ radical.

The azo dyes of the general formulae I to XV which are used according to the invention and their metal complexes are prepared in a conventional manner involving a multistep diazotization/coupling sequence which constructs the dye through successive diazotizing/coupling; that is, the linking of the individual diazo or NH group building blocks takes place successively, or through a convergent synthesis, i.e., moieties of the dye which already comprise diazo groups or NH groups are generated and subsequently linked via a further diazotization/coupling to a further moiety of the dye that likewise already comprises one or more diazo groups, optionally by means of a coupling or tetrazo component.

In the course of successive diazotizing/coupling, for example, first the diazonium components $Dk^1$ and $Dk^2$ is diazotized and coupled onto respectively $Napht^1$ and $Napht^2$, $Kk^1$ or $Kk^2$ or onto a P or R group, then the reaction product is again diazotized and coupled onto a further coupling partner and this operation is optionally repeated until the dye has been constructed. Alternatively, in the successive synthesis, the reaction product of the first coupling can also be reacted in succession with one or more diazonium compounds.

Successive coupling may involve a tetrazo component $Tk^1(NH_2)_2$ or $Tk^2(NH_2)_2$ being initially converted into the corresponding tetrazonium salt and then reacted in succession with $Kk^1$, P, $Napht^1$, $Napht^2$, etc. coupling partners and then further diazotization/coupling reactions being carried out.

Mixtures of two or more F dyes can be prepared not only by blending the desired mixing partners but also by using mixtures of the starting materials used for synthesizing the F dyes. Mixtures of azo dyes I to XV can be prepared for example by neutralizing mixtures of two or more amines $Dk^1$-$NH_2$, $Dk^2$-$NH_2$ or A-$NH_2$, mixtures of two or more coupling components H-$Kk^1$ and H-$Kk^2$, mixtures of two or more tetrazo components $(H_2N)_2$-$Tk^1$ and $(H_2N)_2$-$Tk^2$ or mixtures or two or more different compounds $Napth^1H_2$ and $Napth^2H_2$ in the synthesis. Mixtures of three or more components can be used as well, of course.

In keeping with the desired mixing ratio for the F dyes in the mixture, the synthesis of the F dye will utilize a mixture of the respective starting material wherein the individual starting material is present in an amount of not less than 10 mol %, especially not less than 20 mol % and more preferably not less than 30 mol %, based on the mixture. In the mixtures of two starting materials, for example in the case of a mixture of two coupling components H-Kk(1) and H-Kk(2), or in the case of mixtures of two diazo components or in the case of two mixed tetrazo components, the molar ratio of the individual constituents in the mixture is in the range from 9:1 to 1:9, especially in the range from 8:2 to 2:8 and more preferably in the range from 3:7 to 7:3.

The preparation of the azo dyes of the general formulae I to XV will now be explained by way of example with reference to the preparation of the dyes of the general formula IIb. The methods employed for this purpose can be modified in a conventional manner to construct other azo dyes of the general formulae I to XV. Dyes of the general formula IIb can be prepared for example by a first step of the diamino compound $Tk^1(NH_2)_2$, which underlies the tetrazo component $Tk^1$, being tetrazotized and subsequently coupled initially onto the $Napht^1H_2$ naphthalene compound which underlies the $Napht^1$ radical. Subsequently, the thus obtained diazonium compound H-$Napht^1$-N═N-$Tk^1$-$N_2^+$ is coupled onto a diazonium compound $Dk^1$-$N_2^+$ or A-$N_2^+$ to obtain the compound $Dk^1$-N═N-$Napht^1$-N═N-$Tk^1$-$N_2^+$ or A-N═N-$Napht^1$-N═N-$Tk^1$-$N_2^+$, respectively. This compound is coupled onto a coupling component $Kk^1H$ to obtain the compound of the formula IIb where n=0. Alternatively, the diazonium compound H-$Napht^1$-N═N-$Tk^1$-$N_2^+$ can be coupled onto a coupling component $Kk^1H$ to obtain the compound H-$Napht^1$-N═N-$Tk^1$-N═N-$Kk^1$. Onto this is coupled a diazonium compound $Dk^1$-$N_2^+$ or A-$N_2^+$ to obtain the dye of the formula IIb where n=0.

Dyes of the formula IIb can also be prepared by coupling the compound $Dk^1$-$N_2^+$ or A-$N_2^+$ onto a $Napht^1H_2$ compound to obtain the compound of the formula $Dk^1$-N═N-$Napht^1$-H or A-N═N-$Napht^1$-H respectively. This compound is then coupled onto the tetrazo component $Tk^1$'s parent tetrazotization product of the diamino compond $Tk^1(NH_2)_2$ to obtain the compound $Dk^1$-N═N-$Napht^1$-N═N-$Tk^1$-$N_2^+$ or A-N═N-$Napht^1$-N═N-$Tk^1$-$N_2^+$ respectively. This compound is coupled onto a $Kk^1H$ coupling component to obtain the dye of the formula IIb where n=0.

Dyes of the general formula IIb can also be prepared by a first step of the tetrazo component $Tk^1$'s parent diamino compound $Tk^1(NH_2)_2$ being tetrazotized and subsequently coupled initially onto the $Kk^1H$ coupling component to obtain the compound $^+N_2$-$Tk^1$-N═N-$Kk^1$, which is then coupled onto the $Napht^1H_2$ compound to obtain the compound of the formula H-$Napht^1$-N═N-$Tk^1$-N═N-$Kk^1$. Onto this is coupled a diazonium compound $Dk^1$-$N_2^+$ or A-$N_2^+$ to obtain the compound of the formula IIb where n=0. Alternatively, the compound $^+N_2$-$Tk^1$-N═N-$Kk^1$ can be coupled onto the compound $Dk^1$-N═N-$Napht^1$-H or A-N═N-$Napht^1$-H to obtain the dye of the formula IIb where n=0.

In a further reaction stage, it is then possible to couple a $Dk^2$-$N_2^+$ compound onto the compound of formula IIb where n=0 to obtain the dyes of the formula IIb where n=1.

Dyes of the general formula IIb where n=1 can also be prepared by initially a compound of the formula $Dk_2$-$NH_2$ being diazotized and subsequently coupled onto the $Kk^1H$ coupling component to obtain the compound of the formula $Kk^1$-N═N-$Dk^2$. Onto this compound is then coupled the compound $Dk^1$-N═N-$Napht^1$-N═N-$Tk^1$-$N_2^+$ or A-N═N-$Napht^1$-N═N-$Tk^1$-$N_2^+$ to obtain the dyes of the formula IIb where n=1.

Dyes of the general formula IIb where n=1 can also be prepared by the tetrazo component $Tk^1$'s parent diamino compound $Tk^1(NH_2)_2$ being tetrazotized and coupled onto the $Kk^1$-N═N-$Dk^2$ compound to obtain the compound $^+N_2$-$Tk^1$-N═N-$Kk^1$-N═N-$Dk^2$. This compound is then coupled onto the compound $Dk^1$-N═N-$Napht^1H$ to obtain the dyes of the formula IIb where n=1.

Preferred mixtures of the dyes of the general formula IIb, in which the individual IIb dyes differ with regard to their $HKk^1$ radical, are preferably prepared using a mixture of two or more different $Kk^1$ coupling components in which the individual constituents are as indicated above.

When the dyes comprise a triazine radical $Tr^1$ and/or $Tr^2$, the synthesis of the dyes will also include the reaction of a triazine compound of the formula C (C)

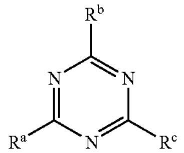

where $R^a$ and $R^c$ represent halogen, especially chlorine, and $R^b$ represents halogen, methyl or methoxy, with two amino components. The amino components are for example the monoamine compounds $Dk^1$-$NH_2$ and $Dk^2$-$NH_2$, which were mentioned as diazo components; the diamine compounds $Tk^1(NH_2)_2$ and $Tk^2(NH_2)_2$ which are mentioned as a tetrazo component; and also the moieties of the dye which comprise a primary amino group.

Such processes are known from the prior art for anionic azo dyes and can be applied analogously to the synthesis of the dyes I to XV.

The diazotization and coupling of the resulting diazonium or tetrazonium compound customarily takes place in an aqueous reaction medium under pH control in a conventional manner.

When the reacted moieties already comprise an A group which bears a B radical of the formula $CH_2CH_2$-Q, then the pH of the reaction mixture will preferably not exceed a value of pH 8, since otherwise the Q group will detach with vinyl group formation.

In couplings of a diazonium component or of a tetrazonium component onto a naphthalene compound of the formulae II and Kk-B respectively, which bears not only an OH group but also an amino group and comprises at least two possible coupling sites, it must be borne in mind that the first coupling takes place regioselectively ortho to the amino group at pH values of not more than 3, whereas at pH values of pH≧6 and preferably pH≧8 the regioselective coupling takes place in the ortho position of the OH group.

The reaction of an amine with a triazine compound C customarily takes place at acidic pH values, preferably below pH 7 and especially in the range from pH 1 to pH 4.

The reaction temperatures required for the diazotization/coupling or the reaction with triazines are generally in the range from 0° C. to 50° C. and especially in the range from 0 to 30° C. The required reaction times are customarily in the range from 5 min to 2 h and especially in the range from 20 min to 1 h.

The reactions are customarily carried out stoichiometrically; that is, the reaction partners are reacted with each other in the desired stoichiometry. However, individual reactants can also be used in excess or in deficiency, based on the desired stoichiometry. The deviation from the desired stoichiometry will be in general not more than 20 mol % and especially not more than 10 mol %. In other words, for the reaction of a diazonium component with a coupling partner the molar ratio of the two components will be in the range from 1:1.2 to 1.2:1 and especially in the range from 1.1:1 to 1:1.1. To react a tetrazonium compound with 2 mol equivalents of a coupling partner, this coupling partner will accordingly be used in an amount from 1.6 to 2.4 mol and especially in an amount from 1.8 to 2.2 mol per mole of tetrazonium compound.

Following the diazotization/coupling sequence, the transition metal complexes may be prepared by adding the desired transition metal salt in the form of a suitable, preferably water-soluble salt in the stoichiometrically desired amount and if necessary heating to the temperature required for complexing, for example to temperatures in the range from 40 to 100° C.

The dye is isolated from the aqueous reaction mixture in a conventional manner, for example by evaporating and especially by spray-drying the aqueous reaction mixture, by salting out the dye and drying the presscake. The preferably still moist presscake can be redissolved, preferably in water, and a dia- and/or ultrafiltration can be carried out in order that the inorganic salts produced in the synthesis may be depleted and/or the solution enriched with regard to the dye. Subsequently, the dye thus purified can be recovered from the solution by spray drying.

To prepare a liquid brand or liquid formulation of the dye, the dye presscake, or the powder obtained by evaporation or spray drying, can be dissolved, for example in water, a water-solvent mixture, an aqueous acid or an aqueous base, in which case the aqueous acid and the aqueous base may likewise comprise solvent. Useful solvents here include in particular water-miscible solvents such as $C_1$-$C_4$-alkanols, organic carboxylic acid such as formic acid, acetic acid and propionic acid, alkanolamines, dialkanolamines and trialkanolamines such as ethanolamine, diethanolamine, triethanolamine, also amides such as formamide, acetamide, dimethylformamide, dimethylacetamide, N-methylpyrrolidone, dimethyl sulfoxide and the like. It is also possible to prepare a liquid formulation of the dye directly from the reaction solution or by ultrafiltration and spray drying. It may then be necessary for a sufficiently high dye concentration and for the stability of the liquid brand to carry out a dia- and/or ultrafiltration operation in order that the inorganic salts formed in the course of the synthesis may be depleted and the solution concentrated.

The process of the invention comprises a dyeing step at a pH of at least 7.5. To this end, the leather to be dyed is treated in an aqueous float which has a pH of at least 7.5 and preferably at least 8.0 and which includes at least one dye F of the above-identified kind. The float pH customarily does not exceed pH 11 and preferably pH 10.5. More particularly, the float pH will be in the range from 8.5 to 10. The alkaline pH ensures that the dye is fixed on the leather, since, under these conditions, the group A will react with the amino groups of the leather to form a covalent bond.

To obtain the pH which is alkaline for the fixation, any desired alkalis and buffer systems can be used. Examples are alkali metal carbonates and bicarbonates such as sodium carbonate, potassium carbonate and sodium bicarbonate, also alkali metal hydroxides such as aqueous sodium hydroxide solution, sodium metasillicate, pyrophosphates such as sodium pyrophosphate or potassium pyrophosphate, tripotassium phosphate, trisodium phosphate, borax/aqueous sodium hydroxide solution buffer and phosphate buffer.

The temperatures required for fixing the dye are advantageously not more than 60° C., especially not more than 50° C., and more preferably not more than 40° C., enabling leather to be dyed benignly. Dyeing temperatures are generally at least 10° C., preferably at least 20° C., and especially at least 30° C. in order that a sufficient rate of reaction may be ensured and thus the dyeing process may be speeded. In principle, however, lower temperatures are possible as well. The temperature range for organically tanned leather is preferably 15 to 50° C. and particularly 30 to 40° C. The preferred temperature range for metal oxide tanned leather is 15 to 60° C. and particularly 30 to 50° C.

Adequate fixation generally requires treatment times from 0.5 h to 4 h, depending on pH and temperature. A person skilled in the art will be able to determine required treatment times for the particular dye used by performing simple routine experiments. Especially at strongly alkaline pH values in the range from 9.5 to 11 and especially from 9.5 to 10.5 the dyeing time is preferably not more than 2 h, for example in the range from 0.5 to 2 h.

Dyeing may be carried out in the presence of added salts, for example Glauber salt.

As well as the dyes F which are used according to the invention, the float may also include conventional acid or direct dyes. However, their fraction is preferably not more than 10% by weight and especially not more than 5% by weight, based on the total amount of dyes in the float (reckoned in each case as purely organochemical, colored constituent of the dye).

The amount of dye F used depends on the desired depth of shade and is customarily at least 0.2% by weight, frequently at least 0.5% by weight and especially at least 1% by weight, based on the shaved weight of the leather or intermediate article used, the amount indicated here being based on the dye including synthesis salts and any standardizers present. On the basis of the colored, organochemical constituents, the amount of dye used will typically be not less than 0.1% by weight, frequently not less than 0.3% by weight and especially not less than 0.5% by weight, based on the shaved weight of the leather or intermediate article used. Reckoned as mixture of organochemical constituents+synthetic salts and any standardizer present, the dye will generally be used in an amount up to 20% by weight; or reckoned as colored organochemical constituents and based on the shaved weight, the dye will generally be used in an amount of up to 15% by weight, although larger amounts of dye can be used as well. To achieve medium to high depths of shade, the dye F will be used in an amount which depends on the molar extinction coefficient of the dye and of the molecular weight of the dye and will be generally in the range from 2% to 20% by weight, frequently 3% to 20% by weight and especially in the range from 4% to 20% by weight, based on the shaved weight of the leather or intermediate article and reckoned as mixture of organochemical constituents+synthesis salts and any standardizer present, or in an amount from 1% to 15% by weight, frequently 1.5% to 10% by weight and especially 2% to 10% by weight, based on the shaved weight of the leather or intermediate article and reckoned as colored organochemical constituents.

The aqueous float may include customary anionic dyeing assistants, nonionic surface-active substances and also wet-end chemicals, for example tanning materials customarily used for retanning, for example polymeric retanning materials, synthetic retanning materials, vegetable tanning materials and also fatliquors and hydrophobicizers.

Useful retanning materials for the process of the present invention include all commercially available systems, for example:

1. vegetable tanning materials such as mimosa, chestnut, quebracho;
2. mineral tanning materials such as chromium, iron, aluminum and zircon tanning materials;
3. fillers, for example sheet-silicates, saccharides, polysaccharides such as starch and flour;
4. synthetic tanning materials (syntans), for example the substances described in EP 0459 168, EP 0 520 182, U.S. Pat. No. 5,342,916 and U.S. Pat. No. 5,186,846 such as:
   a. napthalenesulfonic acid-formaldehyde condensation products,
   b. phenolsulfonic acid-formaldehyde condensation products,
   c. cocondensation products of napthalenesulfonic acid and/or phenolsulfonic acid with hydroxyaryl sulfones such as bis(hydroxyphenyl) sulfone and formaldehyde,
   d. cocondensation products of napthalenesulfonic acid and/or phenolsulfonic acid with oligosulfones (mixtures of polynuclear aromatics which are linked via sulfone bridges and may be substituted by —OH or —$SO_3H$ for example) and formaldehyde,
   e. cocondensation products of napthalenesulfonic acid, phenolsulfonic acid with formaldehyde and with N-containing compounds and also, where appropriate, with hydroxyaryl sulfonenes or with oligosulfonenes. Examples of N-containing compounds are urea, melamine, melamine derivatives such as hydroxy-$C_2$-$C_{20}$-alkylmelamines, bis-hydroxy-$C_2$-$C_{20}$-alkylmelamines or tris-hydroxy-$C_2$-$C_{20}$-alkylmelamines, hydroxyaryl-melamines or melamines having one to three polyalkylene oxide chains on the N-atoms, melem (2,5,8-triamino-1,3,4,6,7,9,9b-heptaazaphenalene) or melem derivatives such as hydroxy-$C_2$-$C_{20}$-alkylmelems or melems having polyalkylene oxide side chains on the N-atoms, guanamines (6-substituted 2,4-diamino-1,3,5-triazines) such as benzoguanamine, acetoguanamine, caprinoguanamine or isobutyroguanamine; derivatives of guanamines such as N-hydroxy-$C_2$-$C_{20}$-alkylguanamines, and also guanamines having one or two polyalkylene oxide chains on the N-atoms, and dicyandiamide, f. mixtures of the 4.a to 4.e substances with Cr(III) compounds;

5. resin tanning materials; for example:
   a. sulfite-containing condensation products of naphthalenesulfonic acid and formaldehyde,
   b. sulfite-containing condensation products of phenylsulfonic acid and formaldehyde,
   c. mixtures of 5.a. and 5.b.;
6. polymeric tanning materials, which can be anionic, cationic or amphoteric in nature. Anionic polymeric tanning materials can bear for example carboxyl groups, cationic polymeric tanning materials can bear for example amino groups and amphoteric polymeric tanning materials bear not only cationic but also anionic groups. Depending on the pH, amphoteric polymers can be either anionic or cationic in character. Examples of polymeric tanning material are:
   a. homo- and copolymers of acrylic acid and methacrylic acid,
   b. homo- and copolymers of acrylic acid and/or methacrylic acid with $C_1$-$C_{30}$-alkyl acrylates and/or $C_1$-$C_{30}$-alkyl methacrylates,
   c. functionalized copolymers of $C_1$-$C_{30}$-alkyl acrylates and/or $C_1$-$C_{30}$-alkyl methacrylates with monomers bearing cationic or anionic/acidic groups,
   d. copolymers of ethylenically unsaturated dicarboxylic anhydrides such as maleic anhydride with $C_3$-$C_{40}$-alpha-olefins such as propene, 1-butene, 1-hexene, 1-octene, diisobutene, 1-decene and the like,
   e. dicarboxylic anhydride-styrene copolymers
   f. homo- and copolymers of ethylenically unsaturated nitriles such as acrylonitrile and methacrylonitrile, where appropriate with further monoethylenically unsaturated monomers such as acrylic acid, methacrylic acid, acrylamide, methacrylamide or $C_1$-$C_{10}$-alkyl(meth)acrylates Examples of polymeric tanning materials are indicated in EP-A 1335029 and WO 96/15276, both of which are hereby incorporated herein in this regard by reference.
7. Aldehydes such as for example:
   a. formaldehydes,
   b. glutaraldehydes,
   c. oligoaldehydes as described in WO 03/095681,
   d. aldehyde-generating tanning materials as described in Bibliothek des Leders volume 3, Umschau Verlag, 1984, page 26-27, examples being oxazolidines and phosphonium compounds;
8. dispersants as described in U.S. Pat. No. 5,186,846, for example:
   a. naphthalenesulfonic acid-formaldehyde condensation products and
   b. ligninsulfonates.

Useful tanning materials further include all commercially available tanning materials such as for example chrome tanning materials, mineral tanning materials, syntans, polymeric tanning materials and vegetable tanning materials as described for example in Ullmann's Encyclopedia of Industrial Chemistry, volume A 15 pages 259 to 282 and especially page 268 et seq., 5th edition, (1990), Verlag Chemie Weinheim. Commercially available tanning materials can also be mixtures of the tanning-material classes mentioned under 1.-8.

Useful fatliquors include all fatliquors customary in leather manufacture, especially all commercially available fatliquors. Fatliquors naturally comprise at least one hydrophobic substance based on a hydrocarbon, for example on a natural or synthetic wax, a native or synthetic oil or on a native or synthetic fat. Polyisobutene-based substances are also useful as hydrocarbon base for fatliquors. The hereinbelow more particularly described hydrocarbon base for fatliquors can be chemically modified, for example:

1. sulfated
2. sulfonated
3. sulfited
4. sulfoxidated
5. sulfochlorinated
6. ethoxylated or generally esterified The hydrocarbon base of fatliquors may also comprise mixtures of nonfunctionalized constituents, mixtures of functionalized constituents with nonfunctionalized constituents or mixtures of functionalized constituents.

Natural waxes useful for fatliquors include beeswax, cork wax, montan wax and carnauba wax.

Synthetic waxes useful for fatliquors include:

polyethylene waxes and ethylene copolymer waxes as obtainable for example by free-radical polymerization of ethylene or free-radical copolymerization of ethylene with for example (meth)acrylic acid or by Ziegler-Natta catalysis;

polyisobutylene waxes paraffin waxes, i.e., mixtures of hydrocarbons having 12 or more carbon atoms and typically having a melting point in the range from 25 to 45° C. Such paraffin waxes can be obtained for example in refineries or crackers and are known as paraffin slack wax and sasol waxes to one skilled in the art; and also montan ester waxes.

Natural oils useful for fatliquors include in particular room temperature liquid triglycerides such as fish oil, neat's-foot oil, olive oil, cottonseed oil, castor oil, sunflower oil and peanut oil.

Synthetic oils useful for fatliquors include in particular white oil, paraffin oil, functionalized paraffins such as for example chlorinated or sulfochlorinated paraffins and also polyalkylene glycols such as for example polyethylene glycol.

Natural fats useful for fatliquors include in particular room temperature solid native triglycerides such as lanolin, shellac wax and also mixtures thereof.

Examples of polyisobutene-based fatliquors are described in WO 03/023070.

Further examples of fatliquors are described in WO 03/023069.

As well as hydrocarbon base, fatliquors may further comprise surface-active substances. These include all emulsifiers present in fatliquors, tanning materials, hydrophobicizers and other auxiliaries for leather manufacture. The surface-active substances may be nonionic, anionic, cationic or else zwitterionic in nature. The fatliquors of the present invention advantageously utilize nonionic or anionic substances as emulsifiers, preferably fatty alcohols (i.e., alcohol mixtures having 10 to 25 carbon atoms) or alkoxylated fatty alcohols having 5 to 100 alkylene oxide groups as nonionic emulsifiers or their sulfates or phosphates as anionic emulsifiers, especially the sodium, potassium or ammonium salts of anionic emulsifiers.

Useful hydrophobicizers for the process of the present invention include all hydrophobicizers known for leather manufacture, especially commercially available systems as described in M. Hollstein, Bibliothek des Leders, volume 4—Defatting, fatliquoring and hydrophobicization of leather, 1983.

Commercially available products comprise in particular one or more of the hereinbelow recited components:

1. copolymers of alpha-olefins with dicarboxylic anhydrides such as maleic anhydride
2. paraffins
3. white oils
4. simple silicones
5. functionalized silicones
6. emulsifiers Hydrophobicizers may further comprise any of the components described for fatliquors.

As well as other fatliquor constituents silicone-based hydrophobicizers and hydrophobicizers based on copolymers of alpha-olefins with dicarboxylic anhydrides have been extensively described, for example in EP-A 213480, WO 95/22627, WO 98/04748, EP-A 1087021 and WO 01/68584. Further examples of hydrophobicizers are to be found in WO 93/17130 and EP-A 372746.

Identity and amount of tanning agents, fatliquoring agents and hydrophobicizing agents used depend on the identity of the leather article to be produced, on the type of tanning (mineral tanning or metal-free tanning), the desired haptic profile and required physical performance in a conventional manner.

Accordingly, tanning materials are used in the following amounts for leather manufacture:

polymeric tanning material (formulated as solution) in amounts up to 20% by weight, frequently 3-8% by weight and/or syntans (reckoned as powder) in amounts up to 30% by weight, frequently 4-12% by weight, and/or resin tanning material (reckoned as powder) up to 15% by weight, frequently 3-6% by weight and/or up to 30% by weight of vegetable tanning material, frequently 4-12% by weight the total amount of tanning material being typically up to 40% by weight, for example 4% to 40% by weight and frequently 10% to 40% by weight, all percentages being based on the moist weight of the leather.

Fatliquoring and hydrophobicizing agents are typically used in the following amounts: up to 20% by weight of fatliquor, frequently 6-12% by weight and up to 20% by weight of hydrophobicizer, frequently 4-8% by weight, each based on the moist weight of the leather.

Dyeing can be carried out not only in one stage but also in 2 stages. In the case of a two-stage dyeing, the leather will initially be treated, in a first stage, with the dye-containing float at below pH 7.5, for example pH 3 to 7.4 and preferably at pH values in the range from 4 to 7.4. This step serves to distribute the dye uniformly in the leather cross-section. Subsequently, in the second stage, the dye will be fixed in the above-described manner at pH values of at least 8, for example 8 to 11, especially 8.5 to 10.5 and specifically 8.5 to 10. It is also possible to carry out the dyeing in a one-stage process without the fixation stage being preceded by a distribution stage.

Although not absolutely necessary, a wash may be carried out after the dyeing operation in order that chemically unbound dye and also impurities in the dye, for example dyes without an A group, may be removed. The reason this wash is not absolutely necessary is that dye fixation will already be quantitative or almost quantitative in many cases. If a subsequent wash is carried out, the as-dyed leather will be washed with water one or more times, for example 1 to 6 times and especially 1 to 4 times. The amount of water will generally be not more than 300% by weight, based on the shaved weight of the intermediate article, for example in the range from 100% to 300% by weight. The duration of a single wash step will be typically in the range from 5 to 60 min and especially in the range from 10 to 30 min.

The washing operation may similarly utilize nonionic, anionic, cationic or else zwitterionic auxiliaries. Preference is given to commercially available ionic auxiliaries, for example based on polyvinylformamides, polyvinylpyrollidones, vinylpyrollidone-vinylimidazole copolymers or on condensates of dicarboxylic acid or dicarboxylic anhydrides with amines or of naphthalenesulfonic acid with formaldehyde. Such auxiliaries are described for example in EP 0459 168, EP 0 520 182, U.S. Pat. No. 5,342,916 and U.S. Pat. No. 5,186,846.

The use of auxiliaries is particularly sensible when colored byproducts are included in the dye or when colored byproducts have formed during fixation. The auxiliaries ensure that quantitative or substantially quantitative removal of all colored secondary components requires not more than three washes, possibly just two washes or ideally but a single wash.

Leather dyeing including retanning, fatliquoring and aftertreatment is effected in a conventional manner, for example by dyeing in a drum, or in a paddle. Such processes are extensively described in the prior art, for example in: "Bibliothek des Leders", volume 3 (tanning agents, tanning and retanning) [1985], volume 4 (defatting, fatliquoring and hydrophobicization in leather manufacture) [1987] & volume 5 (the dyeing of leather) [1987] Umschau Verlag; "Leather Technicians Handbook", 1983, by J. H. Sharphouse, published by Leather Producers Association; and "Fundamentals of Leather Manufacturing", 1993, by E. Heidenmann, published by Eduard Roether KG.

Dyeing is customarily carried out after pretanning, i.e., before, during or after retanning. The dyeing operation can be carried out not only in the same bath as the retanning operation but also in a separate bath. The dyeing operation is preferably carried out before retanning. It is preferable for one or more of the washing steps described above to be carried out after tanning and before retanning and fatliquoring.

The dyeing and retanning operation is generally followed by a fatliquoring operation in order that the leather be adjusted to desired haptic properties. However, retanning and fatliquoring can also be carried out in one process step. The fatliquoring step can be carried out at any stage of the wet end operation and is preferably carried out at the end of the wet end operation.

In general, not only the fatliquoring but also the retanning is fixed at the end of the operation by acidification, i.e., a final acidification takes place after dyeing and any retanning and fatliquoring. Typically, for acidification, the pH of the aqueous treatment bath is adjusted to a value below 3.7 by addition of an acid, especially formic acid.

The process of the invention can in principle be used to dye all types of leather, i.e., intermediate articles which have not been retanned, such as metal oxide tanned leather (wet blue with chromium oxide tanning and wet white with aluminum oxide tanning) and organically tanned, for example aldehyde-tanned, leather (wet white), or vegetable-tanned leather, and also intermediate articles which have been retanned, such as bark or crust leather.

The process of the present invention makes possible in particular the production of dyed leathers for any leather articles whatsoever, for example in the footwear, apparel, automotive, handwear and furniture sectors. The process of the present invention similarly permits the production of bag leather and of reptile leather for accessories. The haptic, mechanical and physical properties required for the particular leather article are achieved in a conventional manner through a choice or auxiliaries, fatliquors, hydrophobicizers and retanning materials that is suitable for the particular article.

The leather dyed according to the process of the invention is notable for an excellent fastness level even at very high depth of shade. Rubfastnesses and especially wash-, perspiration- and migrationfastnesses are particularly good, which is very difficult if not impossible to achieve in the case of conventionally dyed leathers. The leathers dyed according to the process of the invention exhibit no staining or almost no staining of the contact material in migrationfastness tests even at high humidity and high temperatures, i.e., above 50° C., for example 60 to 100° C.

Qualitative and quantitative determination via UV/VIS spectroscopy and HPLC show that the dyes of the invention give degrees of fixation between 85 and 100% and frequently above 90%.

The examples which follow illustrate the invention.

PREPARATION EXAMPLES

Example 1a

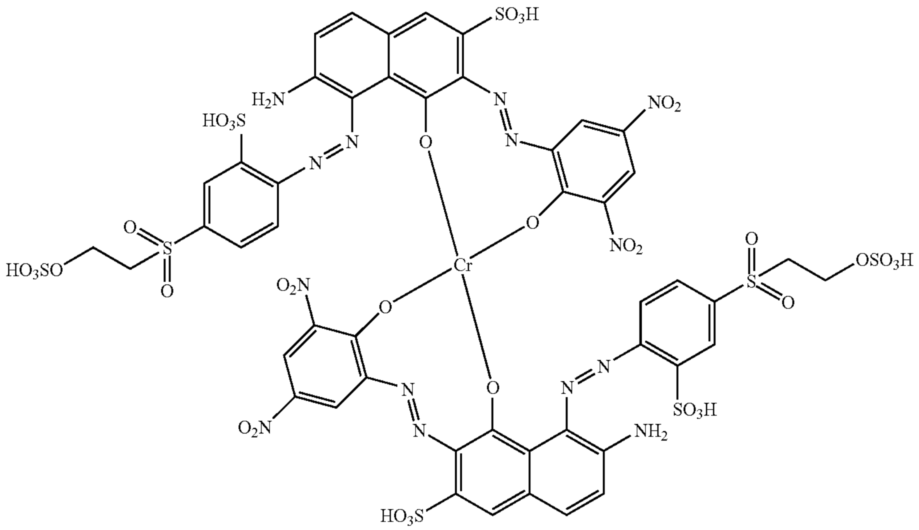

1) 1 mol of MSP (3-(2-sulfatoethylsulfonyl)-6-aminobenzenesulfonic acid) was suspended in ice-water and diazotized with the excess sodium nitrite and hydrochloric acid at pH<1 and 0-5° C. 1 mol of gamma acid was dissolved in 25% by weight aqueous sodium hydroxide solution and then the pH was adjusted to below 1 by addition of 21% by weight hydrochloric acid. The gamma acid precipitates to form a suspension. The diazotized MSP was tipped into the suspension. The reaction mixture was subsequently stirred at pH<1 for one hour until diazotized MSP or free gamma acid was no longer detectable. Thereafter, the pH was raised to 3-8 by addition of 15% by weight sodium carbonate solution.

2) 1 mol of 4,6-dinitro-2-aminophenol was diazotized at pH<1 and 0-5° C. with excess sodium nitrite and hydrochloric acid and then added to the reaction mixture obtained in step 1). The pH was maintained between 3-8 by addition of 10% by weight aqueous sodium hydroxide solution. After the reaction had ended, 0.20-0.30 mol of chromium(III) sulfate was added to the reaction mixture and subsequently stirred in for 1 hour. The dye was salted out by addition of NaCl and filtered off with suction.

Proceeding in a manner analogous to example 1a it is possible to obtain the metal complexes of the dyes of the general formula Dk-N═N-Napht-N═N-A (=dyes of the general formula II where r=k=0, n=1) wherein Dk represents a radical derived from the diazo components DK1 to DK9, DK13, DK14, DK26, DK27, DK39 to DK41 or DK58 or from A1 to A12, Napht represents one of the bivalent radicals II-2, II-4, II-6, II-8, II-10, II-12 and II-14 and A represents one of the radicals A1 to A12. The coupling of the radical A-N═N— takes place ortho to the amino group of the radicals II-2, II-4, II-6, II-8, II-10, II-12 and II-14. Examples thereof are reported below in table 1.

Example 2a

The reaction was carried out according to the method described in example 1a except that there was no subsequent reaction with chromium salts.

Proceeding in a manner analogous to example 2a it is possible to obtain the dyes of the general formula Dk-N═N-Napht-N═N-A (=dyes of the general formula II where r=k=0, n=1) wherein Dk represents a radical derived from the diazo components DK1 to DK83 or from A1 to A12, Napht represents one of the bivalent radicals II-2, II-4, II-6, II-8, II-10, II-12 and II-14 and A represents one of the radicals A1 to A12. The coupling of the radical A-N═N— takes place ortho to the amino group of the radicals II-2, II-4, II-6, II-8, II-10, II-12 and II-14. Examples thereof are reported below in table 1.

TABLE 1

| Example No. | Dk | Napht | A | Metal |
|---|---|---|---|---|
| 1a | DK5 | DK42 | A1 | Cr |
| 1b | DK41 | DK42 | A1 | Cr |
| 1c | DK41 | DK44 | A1 | Cr |
| 1d | DK5 | DK44 | A1 | Cr |
| 1e | DK3 | DK44 | A1 | Cr |
| 1f | DK5 | DK43 | A7 | Cr |
| 2a | DK5 | DK42 | A1 | — |

TABLE 1-continued

| Example No. | Dk | Napht | A | Metal |
|---|---|---|---|---|
| 2b | DK5 | DK44 | A1 | — |
| 2c | DK12 | DK44 | A1 | — |
| 2d | A1 | DK59 | A1 | — |
| 2e | A1 | DK44 | A1 | — |
| 2f | A7 | DK44 | A7 | — |
| 2g | A4 | DK44 | A4 | — |
| 2h | A6 | DK44 | A6 | — |
| 2i | A1 | DK44 | A6 | — |
| 2j | A1 | DK45 | A1 | — |
| 2k | A6 | DK45 | A6 | — |

Example 3

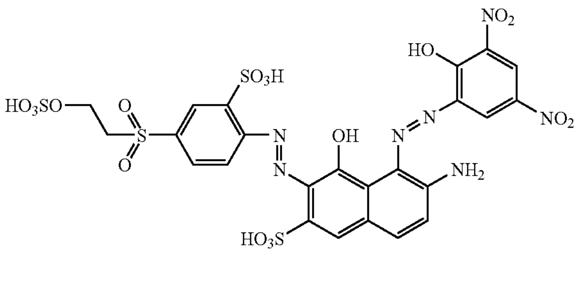

1) 1 mol of 4,6-dinitro-2-aminophenol was diazotized with excess sodium nitrite and hydrochloric acid at pH<1 and 0-5° C. 1 mol of gamma acid was dissolved in 25% by weight aqueous sodium hydroxide solution and then the pH was adjusted to below 1 by addition of 21% by weight hydrochloric acid. The gamma acid precipitates to form a suspension. The diazotized 4,6-dinitro-2-aminophenol was tipped into the suspension. The reaction mixture was subsequently stirred at pH<1 for one hour until diazotized 4,6-dinitro-2-aminophenol or free gamma acid was no longer detectable. Thereafter, the pH was raised to 3-8 by addition of 15% by weight sodium carbonate solution.

2) 1 mol of MSP was suspended in ice-water and diazotized at pH<1 and 0-5° C. with excess sodium nitrite and hydrochloric acid and subsequently added to the reaction mixture obtained in step 1). The pH was maintained between 3 and 8 by addition of 10% by weight aqueous sodium hydroxide solution. After the reaction had ended, NaCl was added and the dye which precipitated as a result was filtered off with suction.

Proceeding in a manner analogous to example 3 it is possible to obtain the dyes of the general formula Dk-N═N-Napht-N═N-A and their metal complexes (=dyes of the general formula II where r=k=0, n=1) wherein Dk represents a radical derived from the diazo components DK1 to DK83, Napht represents one of the bivalent radicals II-2, II-4, II-6, II-8, II-10, II-12 and II-14 and A represents one of the radicals A1 to A12. The coupling of the radical A-N═N— takes place ortho to the hydroxyl group of the radicals II-2, II-4, II-6, II-8, II-10, II-12 and II-14.

Example 4a

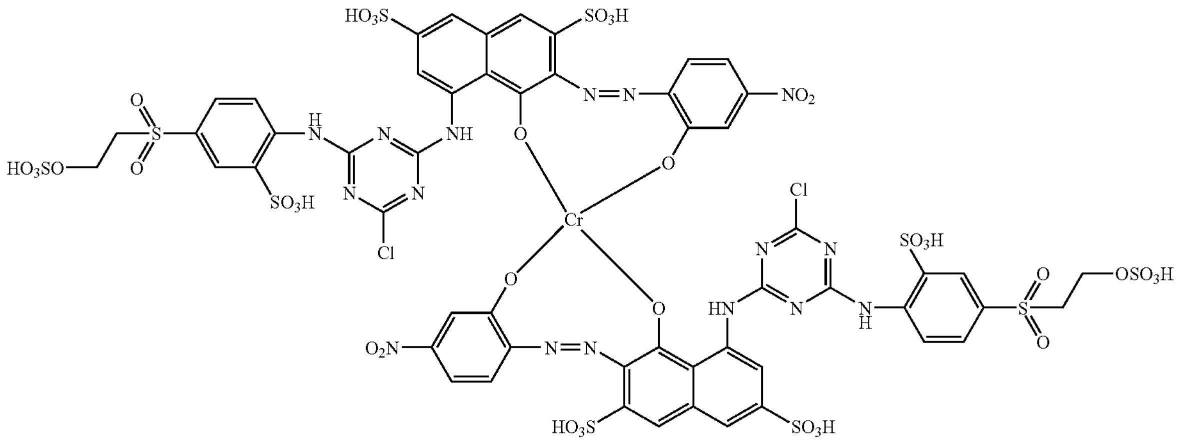

Method A 1) 1 mol of trichloro-1,3,5-triazine was suspended in water at 0-5° C. 1 mol of H acid was dissolved in 25% by weight aqueous sodium hydroxide solution and added dropwise to the suspension of trichlorotriazine at a pH of 1-4, which was followed by 30 min of stirring.

2) 1 mol of MSP was suspended in ice-water and added to the reaction mixture obtained in step 1). Thereafter, the pH was adjusted to between 5-8 by addition of sodium carbonate, which was followed by 1 hour of stirring.

3) 1 mol of 5-nitro-2-aminophenol was diazotized with excess sodium nitrite and hydrochloric acid at pH<1 and 0-5° C. and added to the reaction mixture obtained in step 2). The pH was maintained between 3-8 by addition of 10% by weight aqueous sodium hydroxide solution. After the reaction had ended, 0.20-0.30 mol of chromium(III) sulfate was added to the reaction mixture and subsequently stirred in for 1 hour. The dye was salted out by addition of NaCl and filtered off with suction.

Method B 1) 1 mol of trichlorotriazine was suspended in water at 0-5° C. 1 mol of H acid was dissolved in 25% by weight aqueous sodium hydroxide solution and added dropwise to the suspension of trichlorotriazine at a pH of 1-4, which was followed by 30 min of stirring.

2) 1 mol of 5-nitro-2-aminophenol was diazotized with excess sodium nitrite and hydrochloric acid at pH<1 and 0-5° C. and added to the reaction mixture obtained in step 1). The pH was maintained between 3-8 by addition of 10% by weight aqueous sodium hydroxide solution.

3) 1 mol of MSP was suspended in ice-water and added to the reaction mixture obtained in step 2). Thereafter, the pH was adjusted to between 5-8 by addition of sodium carbonate, which was followed by 1 hour of stirring. After the reaction had ended, 0.20-0.30 mol of chromium(III) sulfate was added to the reaction mixture and subsequently stirred in for 1 hour. The dye was salted out by addition of NaCl and filtered off with suction.

Proceeding in a manner analogous to example 4a it is possible to obtain the metal complexes of dyes of the general formula Dk-N═N-Napht-NH-Tr-NH-A (=dyes of the general formula V where r=p=0) wherein Dk is a radical derived from the diazo components DK1 to DK9, DK13, DK14, DK26, DK27, Dk39-Dk41, Dk58, Napht represents one of the bivalent radicals II-1, II-3, II-5, II-7, II-9, II-11 and II-13, Tr 2-chloro-1,3,5-triazine-4,6-diyl radical and A represents one of the radicals A1 to A12. The coupling of the radical Dk-N═N— takes place ortho to the hydroxyl group of the radicals II-1, II-3, II-5, II-7, II-9, II-11 and II-13.

Example 5a

The reaction was carried out according to the method described in example 4a except that there was no subsequent reaction with chromium salts.

Example 5b

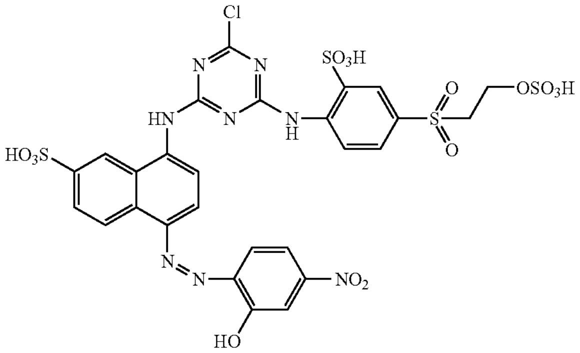

Method A:

1) 1 mol of 5-nitro-2-aminophenol was diazotized with excess sodium nitrite and hydrochloric acid at pH<1 and 0-5° C. and reacted with a solution of 1 mol of Cleve's acid 7 in 25% by weight aqueous sodium hydroxide solution. The pH was kept below 3.

2) 1 mol of trichlorotriazine was suspended in water at 0-5° C. The reaction mixture obtained in step 1) was added dropwise to the suspension at pH 1-4, which was followed by stirring for 30 min.

3) 1 mol of MSP was suspended in ice-water and added to the reaction mixture obtained in step 2). Thereafter, the pH was set to between 5-8 by addition of sodium carbonate, which was followed by stirring for 1 hour. After the reaction had ended, the dye was precipitated by addition of NaCl and filtered off with suction.

Method B:

1) 1 mol of trichlorotriazine was suspended in water at 0-5° C. 1 mol of MSP was suspended in ice-water and added to the suspension of trichlorotriazine at pH 1-4, which was followed by stirring for 30 min.

2) 1 mol of 5-nitro-2-aminophenol was diazotized with excess sodium nitrite and hydrochloric acid at pH<1 and 0-5° C. and reacted with a solution of 1 mol of Cleve's acid 7 in 25% by weight aqueous sodium hydroxide solution. The pH was kept below 3.

3) The product obtained in step 2) was added to the reaction mixture obtained in step 1). Thereafter, the pH was set to between 5-8 by addition of sodium carbonate, which was followed by stirring for 1 hour. After the reaction had ended, the dye was precipitated by addition of NaCl and filtered off with suction.

Proceeding in a manner analogous to examples 5a and 5b it is possible to obtain the dyes of the general formula $Dk^1$-N═N-Napht-NH-Tr-NH-$Dk^2$ and their metal complexes (=dyes of the general formula V where r=p=0) wherein $Dk^1$ and $Dk^2$ each represent a radical derived from the diazo components DK1 to DK 83 or a radical derived from A1 to A12 subject to the condition that at least one of $Dk^1$ or $Dk^2$ represents a radical of the formula A, Napht represents one of the bivalent radicals II-1, II-3, II-5, II-7, II-9, II-11, II-13, II-15 and II-16, Tr is a 2-chloro-1,3,5-triazine-4,6-diyl radical and A represents one of the radicals A1 to A12. The coupling of the radical $Dk^1$-N═N— takes place ortho to the hydroxyl group of the radicals II-1, II-3, II-5, II-7, II-9, II-11 and II-13.

Example 6a

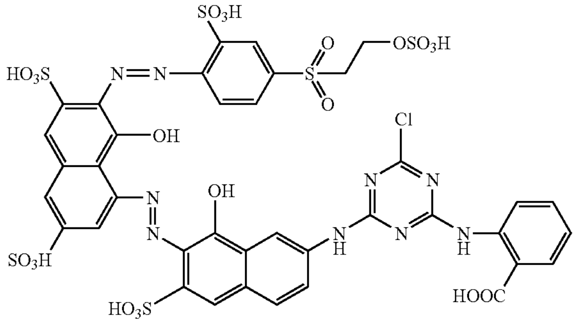

Method A:

1) 1 mol of trichlorotriazine was suspended in water at 0-5° C. 1 mol of gamma acid was dissolved in 25% by weight aqueous sodium hydroxide solution and added dropwise to the suspension of trichlorotriazine at pH 1-4 and subsequently stirred in for 30 min.

2) 1 mol of anthranilic acid was suspended in ice-water and added to the reaction mixture obtained in step 1). Thereafter, the pH was adjusted to between 5 and 8 by addition of sodium carbonate, which was followed by stirring for 1 hour.

3) 1 mol of H acid was diazotized with excess sodium nitrite and hydrochloric acid at pH<1 and 0-5° C. and added to the reaction mixture obtained in step 2). The pH was maintained between 3-8 by addition of 10% by weight aqueous sodium hydroxide solution.

4) 1 mol of MSP was suspended in ice-water, diazotized with excess sodium nitrite and hydrochloric acid at pH<1 and 0-5° C. and added to the reaction mixture obtained in step 3). The pH was maintained between 3 and 8 by addition of 10% by weight aqueous sodium hydroxide solution. After the reaction had ended, the dye was precipitated by addition of NaCl and filtered off with suction.

Method B:

1) 1 mol of trichlorotriazine was suspended in water at 0-5° C. 1 mol of gamma acid was dissolved in 25% by weight aqueous sodium hydroxide solution and added dropwise to the suspension of trichlorotriazine at pH 1-4 and subsequently stirred in for 30 min.

2) 1 mol of anthranilic acid was suspended in ice-water and added to the reaction mixture obtained in step 1). Thereafter, the pH was adjusted to between 5 and 8 by addition of sodium carbonate, which was followed by stirring for 1 hour.

3) 1 mol of H acid was dissolved in 25% by weight of aqueous sodium hydroxide solution and acetylated with 1.1-1.5 mol of acetic anhydride.

4) 1 mol of MSP was suspended in ice-water and diazotized with excess sodium nitrite and hydrochloric acid at pH<1 and 0-5° C. and added to the reaction mixture obtained in step 3). The pH was set and maintained between 4 and 7 by addition of sodium carbonate. After the coupling had ended, the pH was adjusted to below 1 by addition of 21% by weight hydrochloric acid and the reaction mixture was heated to 85-95° C. The acetyl group was detached in the process.

5) The product obtained in step 4) was diazotized with excess sodium nitrite and hydrochloric acid at pH<1 and 0-5° C. and added to the reaction mixture obtained in step 2). The pH was set and maintained between 4 and 7 by addition of sodium carbonate. After the reaction had ended, the reaction mixture was ultrafiltered and dried.

Proceeding in a manner analogous to example 6a it is possible to obtain the dyes of the general formula A-N═N—P—N═N-Napht$^1$-NH-Tr-NH-Dk and their metal complexes (=dyes of the general formula V where r=0, p=1 and P=Napht$^2$) wherein Dk represents a radical derived from the diazo components DK1 to Dk83, P and Napht$^1$ independently represent one of the bivalent radicals II-1, II-3, II-5, II-7, II-9, II-11, II-13, II-15 and II-16 or a radical derived from the diazo components DK3, DK4, DK6, DK7, DK11, DK13, DK14, DK15, DK18, DK21 to DK27, DK29, DK30, DK33, DK36, DK38, or DK39, Tr is a 2-chloro-1,3,5-triazine-4,6-diyl radical and A represents one of the radicals A1 to A12. The coupling of the radicals A-N═N— and A-N═N-Napht$^2$-N═N— takes place ortho to the hydroxyl group in Napht$^2$ and Napht$^1$ respectively. Examples thereof are reported below in table 2.

TABLE 2

| Example No. | A | P | Napht$^1$ | Dk | Metal |
|---|---|---|---|---|---|
| 6a | A1 | DK44 | DK42 | DK4 | — |
| 6b | A1 | DK39 | DK43 | DK5 | Cr |
| 6c | A1 | DK4 | DK42 | DK17 | Cr |
| 6d | A1 | DK27 | DK59 | DK4 | Cr |

TABLE 2-continued

| Example No. | A | P | Napht$^1$ | Dk | Metal |
|---|---|---|---|---|---|
| 6e | A7 | DK44 | DK42 | DK4 | — |
| 6f | A2 | DK44 | DK42 | DK4 | — |
| 6g | A4 | DK44 | DK42 | DK4 | — |
| 6h | A6 | DK27 | DK59 | DK4 | — |

Example 7

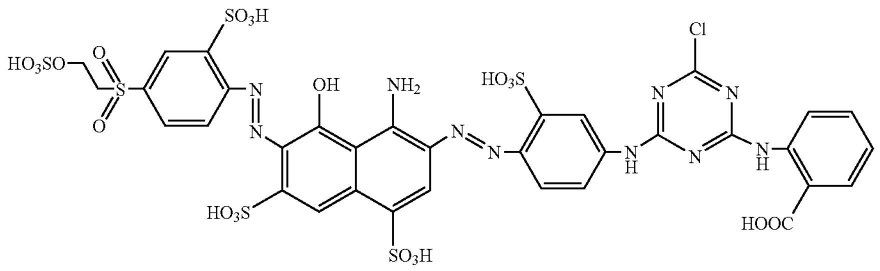

1) 1 mol of trichlorotriazine was suspended in water at 0-5° C. and 1 mol of Paramine acid was added to this suspension at pH 1-4, which was followed by stirring for 30 min.

2) 1 mol of anthranilic acid was suspended in ice-water and added to the reaction mixture obtained in step 1). Thereafter, the pH was adjusted to between 5 and 8 by addition of sodium carbonate, which was followed by 1 hour of stirring. The reaction product was diazotized at pH<1 and 0-5° C. by addition of excess sodium nitrite and hydrochloric acid.

3) 1 mol of K acid was dissolved in 25% by weight aqueous sodium hydroxide solution and added to the reaction mixture obtained in step 2). The pH was maintained below 2.

4) 1 mol of MSP was suspended in ice-water and diazotized at pH<1 and 0-5° C. by addition of excess sodium nitrite and hydrochloric acid. Subsequently, the diazotized MSP was added to the reaction mixture obtained in step 3). The pH was maintained between 3 and 8 by addition of 10% by weight aqueous sodium hydroxide solution. After the reaction had ended, the dye was precipitated by addition of NaCl and filtered off with suction.

Proceeding in a manner analogous to example 7 it is possible to obtain the dyes of the general formula A-N═N-Napht$^1$-N═N—R—NH-Tr-NH-Dk and their metal complexes (=dyes of the general formula V where p=0, r=1) wherein Dk represents a radical derived from the diazo components DK1 to DK83, Napht$^1$ represents one of the bivalent radicals II-2, II-4, II-6, II-8, II-10, II-12 and II-14, R represents DK21, wherein Q=H or represents a bivalent radical derived from Kk5 and Kk14 to Kk16, Tr is a 2-chloro-1,3,5-triazine-4,6-diyl radical and A represents one of the radicals A1 to A12. The coupling of the radical A-N═N— takes place ortho to the hydroxyl group in Napht$^1$.

Example 8

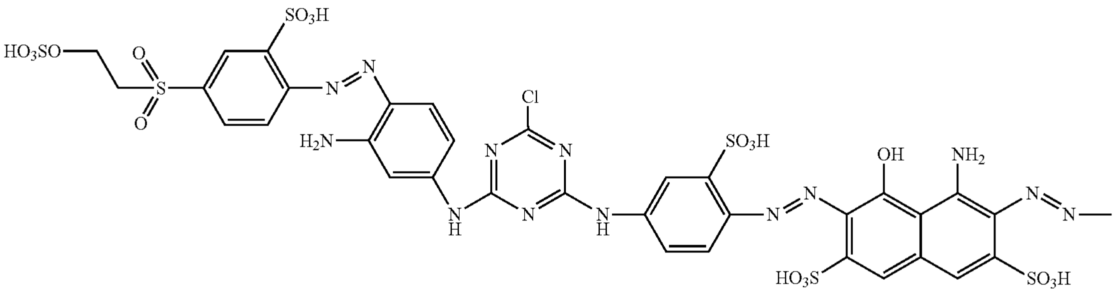

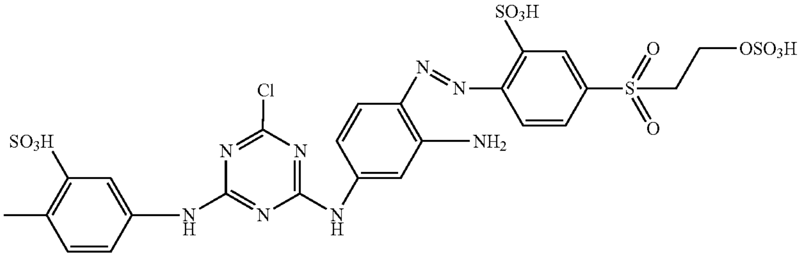

1) 1 mol of MSP was suspended in ice-water and diazotized at pH<1 and 0-5° C. with excess sodium nitrite and hydrochloric acid and reacted with an aqueous solution of 1 mol of metamine. The pH was maintained below 3.

2) 1 mol of trichlorotriazine was suspended in water at 0-5° C. and this suspension was admixed at pH 1 to 4 and 30 min with the reaction mixture obtained in step 1).

3) 1 mol of Paramine acid was suspended in ice-water and added to the reaction mixture obtained in step 2). Thereafter, the pH was set between 5-8 by addition of sodium carbonate, which was followed by 1 hour of stirring. The reaction product was diazotized at pH<1 and 0-5° C. by addition of excess sodium nitrite and hydrochloric acid.

4) 0.5 mol of H acid was dissolved in 25% by weight aqueous sodium hydroxide solution and added to the reaction mixture obtained in step 3). The pH was maintained below 2 for one hour and then set between 3-8 and maintained for one hour by addition of sodium carbonate. After the reaction had ended, the reaction mixture was ultrafiltered and dried.

Proceeding in a manner analogous to example 8 it is possible to obtain the dyes of general formula A-N═N—R—NH-Tr-NH—P—N═N-Napht-N═N—P—NH-Tr-NH—R—N═N-A and their metal complexes (=dyes of the general formula X where $Dk^1$=$Dk^2$=A, k=n=1) wherein Napht represents one of the bivalent radicals II-2, II-4, II-6, II-8, II-10, II-12 and II-14, P represents DK21 wherein Q=H or represents a bivalent radical derived from Kk5 and Kk14 to Kk16, R represents a bivalent radical derived from DK22 to DK25 or represents one bivalent radicals II-1, II-3, II-5, II-7, II-9, II-11, II-13, II-15 or II-16, Tr is a 2-chloro-1,3,5-triazine-4,6-diyl radical and A represent one of the radicals A1 to A12.

Example 9a

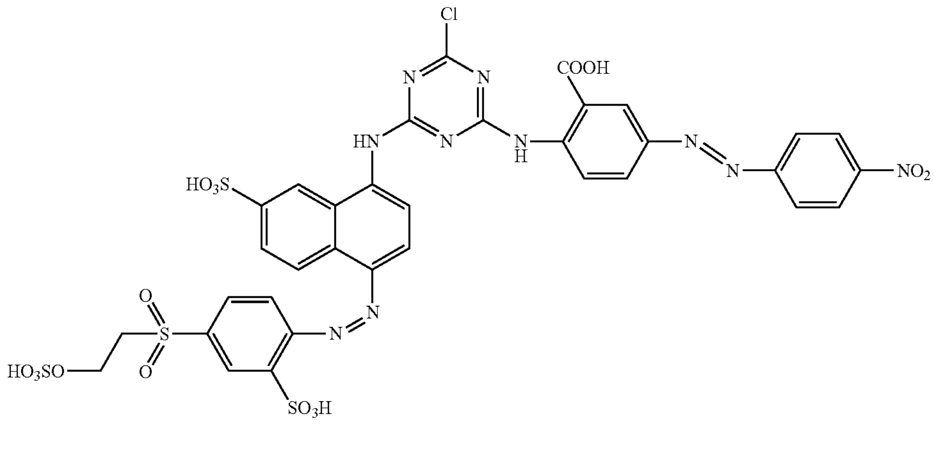

1) 1 mol of p-nitroaniline was dissolved in 21% by weight hydrochloric acid, then diazotized at pH<1 and 0-5° C. with excess sodium nitrite and subsequently added to a suspension of 1 mol of anthranilic acid and ice-water. The reaction mixture was subsequently stirred for 1 hour at pH<2 and T<10° C.

2) 1 mol of MSP was suspended in ice-water and diazotized at pH<1 and 0-5° C. with excess sodium nitrite and hydrochloric acid and reacted with a solution of 1 mol of Cleve's acid 7 in 25% by weight aqueous sodium hydroxide solution. The pH was maintained below 3.

3) 1 mol of trichlorotriazine was suspended in water at 0-5° C. and this suspension was admixed at pH 1 to 4 and 30 min with the reaction mixture obtained in step 1).

TABLE 3

| Example No. | $Dk^1$ | P | R | $Dk^2$ | Metal |
|---|---|---|---|---|---|
| 9a | A1 | DK46 | DK4 | DK17 | — |
| 9b | A1 | DK42 | DK4 | DK19 | — |
| 9c | DK5 | DK42 | DK4 | A1 | Cr |
| 9d | DK4 | DK43 | DK4 | A1 | Co |
| 9e | DK40 | DK59 | DK22 | A1 | Cr |
| 9f | DK5 | DK44 | DK22 | A1 | Cr |
| 9g | A7 | DK46 | DK4 | DK17 | — |
| 9h | DK5 | DK42 | DK4 | A4 | Cr |

Example 10

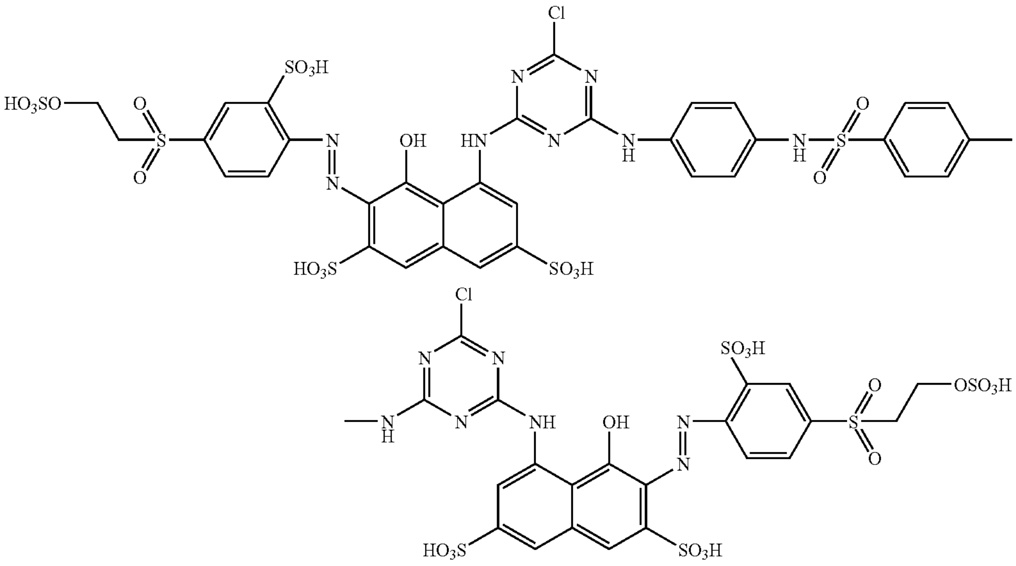

4) The product obtained in step 2) was added to the reaction mixture obtained in step 3). Thereafter, the pH was set between 5-8 by addition of sodium carbonate, which was followed by 1 hour of stirring. After the reaction had ended, the dye was precipitated by addition of NaCl and filtered off with suction.

Proceeding in a manner analogous to example 9a it is possible to obtain the dyes of the general formula $Dk^1$-N═N—P—NH-Tr-NH—R—N═N-$Dk^2$ and their metal complexes (=dyes of the general formula VI) wherein $Dk^1$ and $Dk^2$ each represent a radical derived from the diazo components DK1 to DK83 or represent a radical derived from A1 to A12, wherein at least one of $Dk^1$ or $Dk^2$ represents a radical of the formula A, P and R represent a bivalent radical derived from DK3, DK4, DK6, DK7, DK11, DK13, DK14, DK15, DK18, DK21 to DK27, DK29, DK30, DK33, DK36, DK38, DK39 or DK60 to DK83 or represent a bivalent radicals II-1, II-3, II-5, II-7, II-9, II-11, II-13, II-15 or II-16, Tr is a 2-chloro-1,3,5-triazine-4,6-diyl radical and A represents one of the radicals A1 to A12. The coupling of the radical A-N═N— takes place ortho to the hydroxyl group in II-1, II-3, II-5, II-7, II-9, II-11 and II-13. Examples of such dyes are reported in table 3.

1) 1 mol of trichlorotriazine was suspended in water at 0-5° C. and this suspension was admixed at pH 1 to 4 with 1 mol of H acid previously dissolved in 25% by weight aqueous sodium hydroxide solution, which was followed by 30 min of stirring.

2) 1 mol of MSP was suspended in ice-water and diazotized at pH<1 and 0-5° C. with excess sodium nitrite and hydrochloric acid and added to the reaction mixture obtained in step 1). The pH was maintained between 3 and 8 by addition of 10% by weight aqueous sodium hydroxide solution.

3) 0.5 mol of 4,4-diaminodiphenylsulfamide was suspended in water and added to the reaction mixture obtained in step 2). The pH was maintained between 3 and 8 by addition of 10% by weight aqueous sodium hydroxide solution. After the reaction had ended, the dye was precipitated by addition of NaCl and filtered off with suction.

Proceeding in a manner analogous to example 10 it is possible to obtain the dyes of the general formula A-N═N-Napht-NH-Tr-NH-Tk-NH-Tr-NH-Napht-N═N-A and their metal complexes (=dyes of the general formula IX where $DK^1$=$Dk^2$=A) wherein Napht represents a bivalent radicals II-1, II-3, II-5, II-7, II-9, II-11 or II-13, Tr is a 2-chloro-1,3,5-triazine-4,6-diyl radical, Tk represents a bivalent radical derived from a tetrazo component Tk1 to Tk20 and A represents one of the radicals A1 to A12. The coupling of the radicals A-N═N— takes place ortho to the hydroxyl group in Napht.

Example 11a

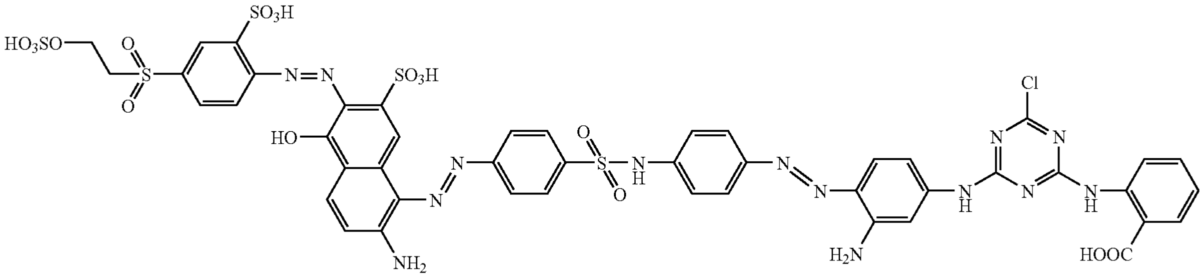

1) 1 mol of 4,4-diaminodiphenylsulfamide was tetrazotized at pH<1 and 0-5° C. with excess sodium nitrite and hydrochloric acid. 1 mol of J acid was dissolved in 25% by weight aqueous sodium hydroxide solution and added dropwise to the solution of the tetrazotized 4,4-diaminodiphenylsulfamide. In the process, the pH was maintained below 3 by addition of hydrochloric acid.

2) 1 mol of MSP was suspended in ice-water and diazotized at pH<1 and 0-5° C. with excess sodium nitrite and hydrochloric acid. Subsequently, the reaction mixture was added to the reaction mixture obtained in step 1). The pH was maintained between 3 and 8 by addition of 10% by weight aqueous sodium hydroxide solution.

3) 1 mol of metamine was added to the reaction mixture obtained in step 2) and the pH was maintained between 3 and 8 by addition of 10% by weight aqueous sodium hydroxide solution.

4) 1 mol of trichlorotriazine was suspended in water at 0-5° C. This suspension had metered into it 1 mol of anthranilic acid before stirring for 30 min at pH 1-4.

5) The product obtained in step 4) was added to the reaction mixture obtained in step 3). Thereafter, the pH was set between 5 and 8 by addition of sodium carbonate, which was followed by 1 hour of stirring. After the reaction had ended, the dye was precipitated by addition of NaCl and filtered off with suction.

Example 11b

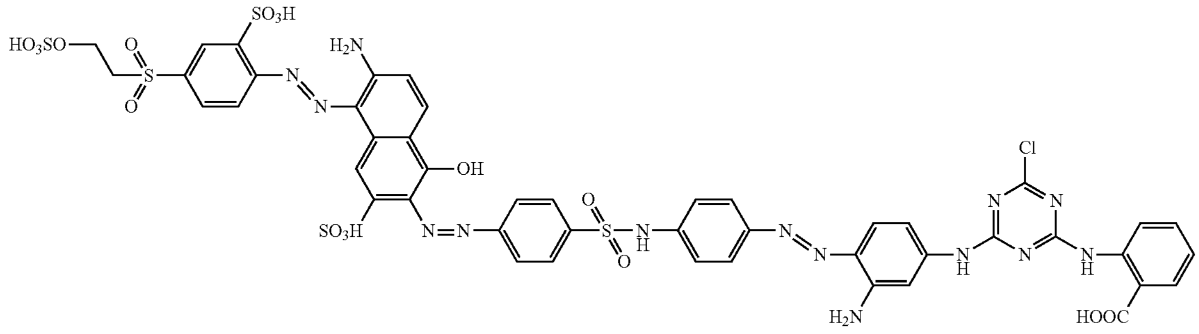

1) 1 mol of MSP was suspended in ice-water and diazotized at pH<1 and 0-5° C. with excess sodium nitrite and hydrochloric acid. 1 mol of J acid was dissolved in 25% by weight aqueous sodium hydroxide solution and added to the reaction mixture of the diazotized MSP. The pH was maintained below 2.

2) 1 mol of 4,4-diaminodiphenylsulfamide was tetrazotized at pH<1 and 0-5° C. with excess sodium nitrite and hydrochloric acid and added to the reaction mixture obtained in step 1). The pH was maintained between 3-8 by addition of 10% by weight aqueous sodium hydroxide solution.

3) 1 mol of metamine was added to the reaction mixture obtained in step 2) and the pH was maintained between 3-8 by addition of 10% by weight aqueous sodium hydroxide solution.

4) 1 mol of trichlorotriazine was suspended in water at 0-5° C. This suspension had metered into it 1 mol of anthranilic acid before stirring for 30 min at pH 1-4.

5) The product obtained in step 4) was added to the reaction mixture obtained in step 3). Thereafter, the pH was set between 5 and 8 by addition of sodium carbonate, which was followed by 1 hour of stirring. After the reaction had ended, the dye was precipitated by addition of NaCl and filtered off with suction.

Proceeding in a manner analogous to examples 11a and 11b it is possible to obtain the dyes of the general formula A-N═N-Napht-N═N-Tk-N═N—P—NH-Tr-NH-Dk and their metal complexes (=dyes of general formula VII where $DK^1$=A) wherein Dk represents a radical derived from the diazo components DK1 to DK83, Napht represents a bivalent radicals II-1, II-3, II-5, II-7, II-9, II-11 or II-13, Tr is a 2-chloro-1,3,5-triazine-4,6-diyl radical, Tk represents a bivalent radical derived from a tetrazo component Tk1 to Tk20 and A represents one of the radicals A1 to A12. The coupling of the radical A-N═N— takes place ortho to the hydroxyl group in Napht when the reaction is carried out as reported in example 11a and ortho to the amino group in Napht when the reaction is carried out as reported in example 11b.

Example 12a

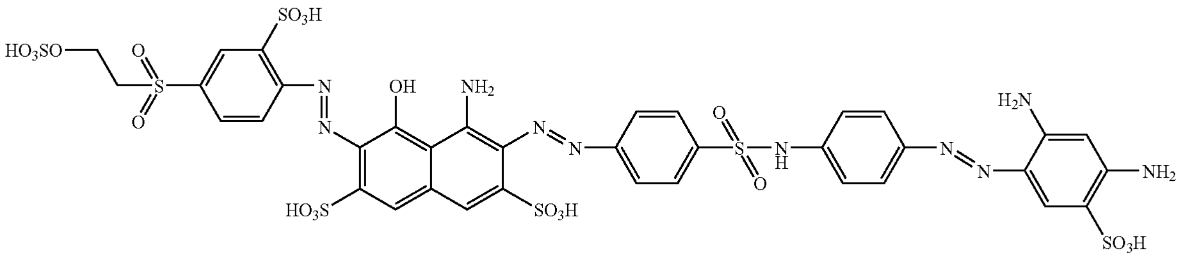

Method A 1) 1 mol of 4,4-diaminodiphenylsulfamide was tetrazotized at pH<1 and 0-5° C. with excess sodium nitrite and hydrochloric acid. 1 mol of H acid was dissolved in 25% by weight aqueous sodium hydroxide solution and added dropwise to the solution of the tetrazotized 4,4-diaminodiphenylsulfamide. In the process, the pH was maintained below 3 by addition of hydrochloric acid.

2) 1 mol of MSP was suspended in ice-water and diazotized at pH<1 and 0-5° C. with excess sodium nitrite and hydrochloric acid. Subsequently, the reaction mixture was added to the reaction mixture obtained in step 1). The pH was maintained between 3 and 8 by addition of 15% by weight aqueous sodium carbonate solution.

3) 1 mol of metamine acid was added to the reaction mixture obtained in step 2) and the pH was maintained between 3 and 8 by addition of 15% by weight aqueous sodium carbonate solution. After the reaction had ended, the dye was precipitated by addition of NaCl and filtered off with suction.

Method B:

1) 1 mol of 4,4-diaminodiphenylsulfamide was tetrazotized at pH<1 and 0-5° C. with excess sodium nitrite and hydrochloric acid. 1 mol of H acid was dissolved in 25% by weight aqueous sodium hydroxide solution and added dropwise to the reaction mixture of the tetrazotized 4,4-diaminodiphenylsulfamide. The pH was maintained below 3.

2) 1 mol of metamine acid was added to the reaction mixture obtained in step 1) and the pH was maintained between 3 and 8 by addition of 10% by weight aqueous sodium hydroxide solution.

3) 1 mol of MSP was suspended in ice-water and diazotized at pH<1 and 0-5° C. with excess sodium nitrite and hydrochloric acid. Subsequently, the reaction mixture was added to the reaction mixture obtained in step 2). The pH was maintained between 3 and 8 by addition of 10% by weight aqueous sodium hydroxide solution. After the reaction had ended, the dye was precipitated by addition of NaCl and filtered off with suction.

Proceeding in a manner analogous to example 12a it is possible to obtain the dyes of the general formula A-N═N-Napht[1]-N═N-Tk-N═N-Kk (=dyes of the general formula II where r=k=1, n=0) wherein Kk represents a radical derived from the coupling components Kk1 to Kk67, DK3, DK4, DK6, DK7, DK11, DK13, DK14, DK15, DK18, DK21 to DK27, DK29, DK30, DK33, DK36, DK38, DK39 or DK42 to DK83, Napht[1] represents one of the bivalent radicals II-2, II-4, II-6, II-8, II-10, II-12 and II-14, Tk represents a radical derived from a tetrazo component Tk1 to Tk20 and A represents one of the radicals A1 to A12. The coupling of the radical A-N═N— takes place ortho to the hydroxyl group in Napht[1]. Examples thereof are listed in table 4.

TABLE 4

| Example No. | A | Napht[1] | Tk | Kk |
|---|---|---|---|---|
| 12a | A1 | DK44 | Tk18 | Kk15 |
| 12b | A1 | DK44 | Tk18 | Kk5 |
| 12c | A1 | DK44 | Tk18 | Kk2 |
| 12d | A1 | DK44 | Tk18 | Kk3 |
| 12e | A1 | DK44 | Tk18 | Kk6 |
| 12f | A1 | DK44 | Tk18 | Kk1 |
| 12g | A1 | DK44 | Tk18 | Kk4 |
| 12h | A1 | DK44 | Tk18 | Kk7 |
| 12i | A1 | DK44 | Tk18 | Kk9 |
| 12j | A1 | DK44 | Tk18 | Kk10 |
| 12k | A1 | DK44 | Tk18 | Kk14 |
| 12l | A1 | DK44 | Tk18 | Kk16 |
| 12m | A1 | DK44 | Tk18 | Kk26 |
| 12n | A1 | DK44 | Tk18 | Kk27 |
| 12o | A1 | DK44 | Tk18 | Kk40 |
| 12p | A1 | DK44 | Tk18 | Kk46 |
| 12q | A1 | DK44 | Tk18 | Kk48 |
| 12r | A1 | DK44 | Tk18 | Dk4 |
| 12s | A1 | DK44 | Tk18 | Dk11 |
| 12t | A1 | DK44 | Tk18 | Dk18 |
| 12u | A1 | DK44 | Tk18 | Dk29 |
| 12v | A1 | DK44 | Tk18 | Dk30 |
| 12z | A1 | DK44 | Tk18 | Dk39 |
| 12aa | A1 | DK44 | Tk16 | Kk5 |
| 12ab | A1 | DK44 | Tk16 | Kk3 |
| 12ac | A1 | DK44 | Tk16 | Kk4 |
| 12ad | A1 | DK44 | Tk16 | Dk4 |
| 12ae | A1 | DK44 | Tk19 | Kk5 |
| 12af | A1 | DK45 | Tk18 | Kk5 |
| 12ag | A2 | DK44 | Tk18 | Kk5 |
| 12ah | A7 | DK44 | Tk18 | Kk15 |
| 12ai | A4 | DK44 | Tk18 | Kk15 |
| 12aj | A5 | DK45 | Tk18 | Kk10 |
| 12ak | A9 | DK45 | Tk18 | Kk14 |
| 12al | A10 | DK45 | Tk18 | Kk16 |
| 12am | A11 | DK45 | Tk18 | Kk26 |
| 12an | A1 | DK44 | Tk18 | Kk11 |
| 12ao | A1 | DK44 | Tk18 | Kk51 |
| 12ap | A1 | DK44 | Tk18 | Kk52 |
| 12aq | A1 | DK44 | Tk18 | Kk53 |
| 12ar | A1 | DK44 | Tk18 | Kk54 |
| 12as | A1 | DK44 | Tk18 | Kk55 |
| 12at | A1 | DK44 | Tk18 | Kk56 |
| 12au | A1 | DK44 | Tk18 | Kk57 |
| 12av | A1 | DK44 | Tk18 | Kk58 |
| 12aw | A1 | DK44 | Tk18 | Kk59 |
| 12ax | A1 | DK44 | Tk18 | Kk60 |
| 12ay | A1 | DK44 | Tk18 | Kk61 |
| 12az | A1 | DK44 | Tk18 | Kk62 |
| 12ba | A1 | DK44 | Tk18 | Kk63 |
| 12bb | A1 | DK44 | Tk18 | Kk64 |
| 12bc | A1 | DK44 | Tk18 | DK66 |
| 12bd | A1 | DK45 | Tk18 | Kk1 |
| 12be | A1 | DK45 | Tk18 | Kk2 |
| 12bf | A1 | DK45 | Tk18 | Kk3 |
| 12bg | A1 | DK45 | Tk18 | Kk4 |
| 12bh | A1 | DK45 | Tk18 | Kk6 |
| 12bi | A1 | DK45 | Tk18 | Kk7 |

TABLE 4-continued

| Example No. | A | Napht[1] | Tk | Kk |
|---|---|---|---|---|
| 12bj | A1 | DK45 | Tk18 | Kk10 |
| 12bk | A1 | DK45 | Tk18 | Kk11 |
| 12bl | A1 | DK45 | Tk18 | Kk14 |
| 12bm | A1 | DK45 | Tk18 | Kk15 |
| 12bn | A1 | DK45 | Tk18 | Kk16 |
| 12bo | A1 | DK45 | Tk18 | Kk51 |
| 12bp | A1 | DK45 | Tk18 | Kk53 |
| 12bq | A1 | DK45 | Tk18 | Kk54 |
| 12br | A1 | DK45 | Tk18 | Kk55 |
| 12bs | A1 | DK45 | Tk18 | Kk56 |
| 12bt | A1 | DK45 | Tk18 | Kk61 |
| 12bu | A1 | DK45 | Tk18 | Kk62 |
| 12bv | A1 | DK45 | Tk18 | Kk63 |
| 12bw | A1 | DK45 | Tk18 | Kk64 |
| 12bx | A1 | DK45 | Tk18 | DK66 |
| 12by | A1 | DK44 | Tk16 | Kk10 |
| 12bz | A1 | DK44 | Tk16 | Kk11 |
| 12ca | A1 | DK44 | Tk16 | Kk14 |
| 12cb | A1 | DK44 | Tk16 | Kk15 |
| 12cc | A1 | DK44 | Tk16 | Kk16 |
| 12cd | A1 | DK44 | Tk16 | Kk51 |
| 12ce | A1 | DK44 | Tk16 | Kk53 |
| 12cf | A1 | DK44 | Tk16 | Kk54 |
| 12cg | A1 | DK44 | Tk16 | Kk55 |
| 12ch | A1 | DK44 | Tk16 | Kk56 |
| 12ci | A1 | DK44 | Tk16 | Kk61 |
| 12cj | A1 | DK44 | Tk16 | Kk62 |
| 12ck | A1 | DK44 | Tk16 | Kk63 |
| 12cl | A1 | DK44 | Tk16 | Kk64 |
| 12cm | A1 | DK44 | Tk16 | DK66 |
| 12cn | A1 | DK44 | Tk19 | Kk2 |
| 12co | A1 | DK44 | Tk19 | Kk3 |
| 12cp | A1 | DK44 | Tk19 | Kk10 |
| 12cq | A1 | DK44 | Tk19 | Kk11 |
| 12cr | A1 | DK44 | Tk19 | Kk14 |
| 12cs | A1 | DK44 | Tk19 | Kk15 |
| 12ct | A1 | DK44 | Tk19 | Kk16 |
| 12cu | A1 | DK44 | Tk19 | Kk51 |
| 12cv | A1 | DK44 | Tk19 | Kk53 |
| 12cw | A1 | DK44 | Tk19 | Kk54 |
| 12cx | A1 | DK44 | Tk19 | Kk55 |
| 12cy | A1 | DK44 | Tk19 | Kk56 |
| 12cz | A1 | DK44 | Tk19 | Kk61 |
| 12da | A1 | DK44 | Tk19 | Kk62 |
| 12db | A1 | DK44 | Tk19 | Kk63 |
| 12dc | A1 | DK44 | Tk19 | Kk64 |
| 12dd | A1 | DK44 | Tk19 | DK66 |
| 12de | A1 | DK44 | Tk20 | Kk2 |
| 12df | A1 | DK44 | Tk20 | Kk3 |
| 12dg | A1 | DK44 | Tk20 | Kk5 |
| 12dh | A1 | DK44 | Tk20 | Kk10 |
| 12di | A1 | DK44 | Tk20 | Kk11 |
| 12dj | A1 | DK44 | Tk20 | Kk14 |
| 12dk | A1 | DK44 | Tk20 | Kk15 |
| 12dl | A1 | DK44 | Tk20 | Kk16 |
| 12dm | A1 | DK44 | Tk20 | Kk51 |
| 12dn | A1 | DK44 | Tk20 | Kk53 |
| 12do | A1 | DK44 | Tk20 | Kk54 |
| 12dp | A1 | DK44 | Tk20 | Kk55 |
| 12dq | A1 | DK44 | Tk20 | Kk56 |
| 12dr | A1 | DK44 | Tk20 | Kk61 |
| 12ds | A1 | DK44 | Tk20 | Kk62 |
| 12dt | A1 | DK44 | Tk20 | Kk63 |
| 12du | A1 | DK44 | Tk20 | Kk64 |
| 12dv | A1 | DK44 | Tk20 | DK66 |
| 12dw | A1 | DK45 | Tk16 | Kk2 |
| 12dx | A1 | DK45 | Tk16 | Kk3 |
| 12dy | A1 | DK45 | Tk16 | Kk5 |
| 12dz | A1 | DK45 | Tk16 | Kk10 |
| 12ea | A1 | DK45 | Tk16 | Kk11 |
| 12eb | A1 | DK45 | Tk16 | Kk14 |
| 12ec | A1 | DK45 | Tk16 | Kk15 |
| 12ed | A1 | DK45 | Tk16 | Kk16 |
| 12ee | A1 | DK45 | Tk16 | Kk51 |
| 12ef | A1 | DK45 | Tk16 | Kk53 |
| 12eg | A1 | DK45 | Tk16 | Kk54 |
| 12eh | A1 | DK45 | Tk16 | Kk55 |
| 12ei | A1 | DK45 | Tk16 | Kk56 |

TABLE 4-continued

| Example No. | A | Napht[1] | Tk | Kk |
|---|---|---|---|---|
| 12ej | A1 | DK45 | Tk16 | Kk61 |
| 12ek | A1 | DK45 | Tk16 | Kk62 |
| 12el | A1 | DK45 | Tk16 | Kk63 |
| 12em | A1 | DK45 | Tk16 | Kk64 |
| 12en | A1 | DK45 | Tk16 | DK66 |
| 12eo | A1 | DK45 | Tk19 | Kk2 |
| 12ep | A1 | DK45 | Tk19 | Kk3 |
| 12eq | A1 | DK45 | Tk19 | Kk5 |
| 12er | A1 | DK45 | Tk19 | Kk10 |
| 12es | A1 | DK45 | Tk19 | Kk11 |
| 12et | A1 | DK45 | Tk19 | Kk14 |
| 12eu | A1 | DK45 | Tk19 | Kk15 |
| 12ev | A1 | DK45 | Tk19 | Kk16 |
| 12ew | A1 | DK45 | Tk19 | Kk51 |
| 12ex | A1 | DK45 | Tk19 | Kk53 |
| 12ey | A1 | DK45 | Tk19 | Kk54 |
| 12ez | A1 | DK45 | Tk19 | Kk55 |
| 12fa | A1 | DK45 | Tk19 | Kk56 |
| 12fb | A1 | DK45 | Tk19 | Kk61 |
| 12fc | A1 | DK45 | Tk19 | Kk62 |
| 12fd | A1 | DK45 | Tk19 | Kk63 |
| 12fe | A1 | DK45 | Tk19 | Kk64 |
| 12ff | A1 | DK45 | Tk19 | DK66 |
| 12fg | A1 | DK45 | Tk20 | Kk2 |
| 12fh | A1 | DK45 | Tk20 | Kk3 |
| 12fi | A1 | DK45 | Tk20 | Kk5 |
| 12fj | A1 | DK45 | Tk20 | Kk10 |
| 12fk | A1 | DK45 | Tk20 | Kk11 |
| 12fl | A1 | DK45 | Tk20 | Kk14 |
| 12fm | A1 | DK45 | Tk20 | Kk15 |
| 12fn | A1 | DK45 | Tk20 | Kk16 |
| 12fo | A1 | DK45 | Tk20 | Kk51 |
| 12fp | A1 | DK45 | Tk20 | Kk53 |
| 12fq | A1 | DK45 | Tk20 | Kk54 |
| 12fr | A1 | DK45 | Tk20 | Kk55 |
| 12fs | A1 | DK45 | Tk20 | Kk56 |
| 12ft | A1 | DK45 | Tk20 | Kk61 |
| 12fu | A1 | DK45 | Tk20 | Kk62 |
| 12fv | A1 | DK45 | Tk20 | Kk63 |
| 12fw | A1 | DK45 | Tk20 | Kk64 |
| 12fx | A1 | DK45 | Tk20 | DK66 |
| 12fy | A1 | DK44 | Tk16 | Kk65 |
| 12fz | A1 | DK44 | Tk16 | Kk66 |
| 12ga | A1 | DK44 | Tk16 | Kk67 |
| 12gb | A1 | DK45 | Tk16 | Kk65 |
| 12gc | A1 | DK45 | Tk16 | Kk66 |
| 12gd | A1 | DK45 | Tk16 | Kk67 |
| 12ge | A1 | DK44 | Tk18 | Kk65 |
| 12gf | A1 | DK44 | Tk18 | Kk66 |
| 12gg | A1 | DK44 | Tk18 | Kk67 |
| 12gh | A1 | DK45 | Tk18 | Kk65 |
| 12gi | A1 | DK45 | Tk18 | Kk66 |
| 12gj | A1 | DK45 | Tk18 | Kk67 |
| 12gk | A1 | DK44 | Tk19 | Kk65 |
| 12gl | A1 | DK44 | Tk19 | Kk66 |
| 12gm | A1 | DK44 | Tk19 | Kk67 |
| 12gn | A1 | DK45 | Tk19 | Kk65 |
| 12go | A1 | DK45 | Tk19 | Kk66 |
| 12gp | A1 | DK45 | Tk19 | Kk67 |
| 12gq | A1 | DK44 | Tk20 | Kk65 |
| 12gr | A1 | DK44 | Tk20 | Kk66 |
| 12gs | A1 | DK44 | Tk20 | Kk67 |
| 12gt | A1 | DK45 | Tk20 | Kk65 |
| 12gu | A1 | DK45 | Tk20 | Kk66 |
| 12gv | A1 | DK45 | Tk20 | Kk67 |

Example 12gw

Method A 1) 1 mol of 4,4-diaminodiphenylsulfamide was tetrazotized at pH<1 and 0-5° C. with excess sodium nitrite and hydrochloric acid. 1 mol of H acid was dissolved in 25% by weight aqueous sodium hydroxide solution and added dropwise to the solution of the tetrazotized 4,4-diaminodiphenylsulfamide. The pH was maintained below 3 by addition of hydrochloric acid.

2) 1 mol of MSP was suspended in ice-water and diazotized at pH<1 and 0-5° C. with excess sodium nitrite and hydrochloric acid. The reaction mixture was subsequently added to the reaction mixture obtained in step 1). The pH was maintained between 3 and 8 by addition of 15% by weight sodium carbonate solution.

3) 0.45 mol of metamine acid and 0.55 mol of 2,4-diamino-1-methoxybenzene was concurrently added to the reaction mixture obtained in step 2) and the pH was maintained between 3 and 8 by addition of 15% by weight sodium carbonate solution. After the reaction had ended, the reaction mixture was ultrafiltered and spray dried.

Method B:

1) 1 mol of 4,4-diaminodiphenylsulfamide was tetrazotized at pH<1 and 0-5° C. with excess sodium nitrite and hydrochloric acid. 1 mol of H acid was dissolved in 25% by weight aqueous sodium hydroxide solution and added dropwise to the reaction mixture of the tetrazotized 4,4-diaminodiphenylsulfamide. The pH was maintained below 3.

2) 0.45 mol of metamine acid and 0.55 mol of 2,4-diamino-1-methoxybenzene was concurrently added to the reaction mixture obtained in step 2) and the pH was maintained between 3 and 8 by addition of 10% by weight aqueous sodium hydroxide solution.

3) 1 mol of MSP was suspended in ice-water and diazotized at pH<1 and 0-5° C. with excess sodium nitrite and hydrochloric acid. The reaction mixture was subsequently added to the reaction mixture obtained in step 2). The pH was maintained between 3 and 8 by addition of 10% by weight aqueous sodium hydroxide solution. After the reaction had ended, the dye was precipitated by addition of NaCl and filtered off with suction.

Proceeding in a manner analogous to example 12gw it is possible to prepare the table 4a dye mixtures of the general formula A-N=N-Napht[1]-N=N-Tk-N=N-Kk (formula IIb where n=0), in which case the A-N=N— radical couples ortho to the hydroxyl group in Napht[1].

TABLE 4a

| Example No. | A | Napht[1] | Tk | Kk *) |
|---|---|---|---|---|
| 12gw | A1 | DK44 | Tk18 | Kk15:Kk55 (45:55) |
| 12gz | A1 | DK44 | Tk18 | Kk15:Kk56 (30:70) |
| 12ha | A1 | DK44 | Tk18 | Kk15:Kk66 (80:20) |
| 12hb | A1 | DK44 | Tk18 | Kk5:Kk10 (10:90) |
| 12hc | A1 | DK44 | Tk18 | Kk5:Kk14 (15:85) |
| 12hd | A1 | DK44 | Tk18 | Kk5:Kk15 (60:40) |
| 12he | A1 | DK44 | Tk18 | Kk5:Kk55 (75:25) |
| 12hf | A1 | DK44 | Tk18 | Kk5:Kk56 (40:60) |
| 12hh | A1 | DK44 | Tk18 | Kk5:Kk67 (20:80) |
| 12hi | A1 | DK44 | Tk18 | Kk5:DK66 (50:50) |
| 12hj | A1 | DK45 | Tk18 | Kk15:Kk55 (45:55) |
| 12hk | A1 | DK45 | Tk18 | Kk15:Kk56 (30:70) |
| 12hl | A1 | DK45 | Tk18 | Kk15:Kk66 (80:20) |
| 12hm | A1 | DK45 | Tk18 | Kk5:Kk10 (10:90) |

TABLE 4a-continued

| Example No. | A | Napht[1] | Tk | Kk *) |
|---|---|---|---|---|
| 12hn | A1 | DK45 | Tk18 | Kk5:Kk14 (15:85) |
| 12ho | A1 | DK45 | Tk18 | Kk5:Kk15 (60:40) |
| 12hp | A1 | DK45 | Tk18 | Kk5:Kk55 (75:25) |
| 12hq | A1 | DK45 | Tk18 | Kk5:Kk56 (40:60) |
| 12hr | A1 | DK45 | Tk18 | Kk5:Kk67 (20:80) |
| 12hs | A1 | DK45 | Tk18 | Kk5:DK66 (50:50) |
| 12ht | A1 | DK44 | Tk16 | Kk5:Kk15 (45:55) |
| 12hu | A1 | DK44 | Tk16 | Kk15:Kk55 (45:55) |
| 12hv | A1 | DK44 | Tk19 | Kk15:Kk55 (45:55) |
| 12hw | A1 | DK44 | Tk20 | Kk15:Kk55 (45:55) |

*) The parenthetical value indicates the molar ratio of the respective coupling components to each other.

Example 13a

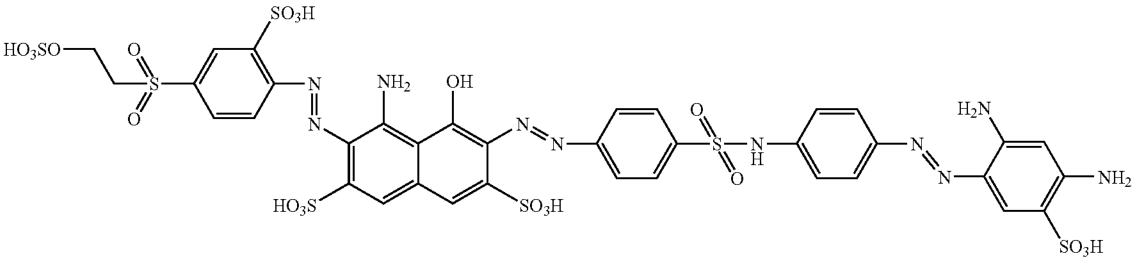

1) 1 mol of MSP was suspended in ice-water and diazotized at pH<1 and 0-5° C. with excess sodium nitrite and hydrochloric acid. 1 mol of H acid was dissolved in 25% by weight aqueous sodium hydroxide solution and added to the reaction mixture of the diazotized MSP. The pH was maintained below 2.

2) 1 mol of 4,4-diaminodiphenylsulfamide was tetrazotized at pH<1 and 0-5° C. with excess sodium nitrite and hydrochloric acid and added to the reaction mixture obtained in step 1). The pH was maintained between 3-8 by addition of 10% by weight aqueous sodium hydroxide solution.

3) 1 mol of metamine acid was added to the reaction mixture obtained in step 2) and the pH was maintained between 3-8 by addition of 10% by weight aqueous sodium hydroxide solution. After the reaction had ended, the dye was precipitated by addition of NaCl and filtered off with suction.

Proceeding in a manner analogous to example 13a it is possible to obtain the dyes of the general formula A-N=N-Napht[1]-N=N-Tk-N=N-Kk (=dyes of the general formula II where r=k=1, n=0) wherein Kk represents a radical derived from the coupling components Kk1 to Kk64, DK3, DK4, DK6, DK7, DK11, DK13, DK14, DK15, DK18, DK21 to DK27, DK29, DK30, DK33, DK36, DK38, DK39 or DK42 to DK83, Napht represents one of the bivalent radicals II-2, II-4, II-6, II-8, II-10, II-12 and II-14, Tk represents a bivalent radical derived from a tetrazo component Tk1 to Tk20 and A represents one of the radicals A1 to A12. The coupling of the radical A-N=N— takes place ortho the amino group in Napht[1]

TABLE 5

| Example No. | A | Napht[1] | Tk | Kk |
|---|---|---|---|---|
| 13a | A1 | DK44 | Tk18 | Kk15 |
| 13b | A1 | DK44 | Tk18 | Kk5 |

TABLE 5-continued

| Example No. | A | Napht[1] | Tk | Kk |
|---|---|---|---|---|
| 13c | A1 | DK44 | Tk18 | Kk2 |
| 13d | A1 | DK44 | Tk18 | Kk3 |
| 13e | A1 | DK44 | Tk18 | Kk6 |
| 13f | A1 | DK44 | Tk18 | Kk1 |
| 13g | A1 | DK44 | Tk18 | Kk4 |
| 13h | A1 | DK44 | Tk18 | Kk7 |
| 13i | A1 | DK44 | Tk18 | Kk9 |
| 13j | A1 | DK44 | Tk18 | Kk10 |
| 13k | A1 | DK44 | Tk18 | Kk14 |
| 13l | A1 | DK44 | Tk18 | Kk16 |
| 13m | A1 | DK44 | Tk18 | Kk26 |
| 13n | A1 | DK44 | Tk18 | Kk27 |
| 13o | A1 | DK44 | Tk18 | Kk40 |
| 13p | A1 | DK44 | Tk18 | Kk46 |
| 13q | A1 | DK44 | Tk18 | Kk48 |
| 13r | A1 | DK44 | Tk18 | Dk4 |
| 13s | A1 | DK44 | Tk18 | Dk11 |
| 13t | A1 | DK44 | Tk18 | Dk18 |
| 13u | A1 | DK44 | Tk18 | Dk29 |
| 13v | A1 | DK44 | Tk18 | Dk30 |
| 13z | A1 | DK44 | Tk18 | Dk39 |
| 13aa | A1 | DK44 | Tk16 | Kk5 |
| 13ab | A1 | DK44 | Tk16 | Kk3 |
| 13ac | A1 | DK44 | Tk16 | Kk4 |
| 13ad | A1 | DK44 | Tk16 | Dk4 |
| 13ae | A1 | DK44 | Tk19 | Kk5 |
| 13af | A1 | DK45 | Tk18 | Kk5 |
| 13ag | A2 | DK44 | Tk18 | Kk5 |
| 13ah | A7 | DK44 | Tk18 | Kk15 |
| 13ai | A4 | DK44 | Tk18 | Kk15 |
| 13aj | A1 | DK44 | Tk16 | Kk15 |
| 13ak | A1 | DK44 | Tk16 | Kk34 |
| 13al | A7 | DK44 | Tk18 | Kk3 |
| 13am | A7 | DK44 | Tk18 | Kk5 |
| 13an | A6 | DK45 | Tk18 | Kk10 |
| 13ao | A8 | DK45 | Tk18 | Kk14 |
| 13ap | A11 | DK45 | Tk18 | Kk16 |
| 13aq | A12 | DK45 | Tk18 | Kk26 |
| 13ar | A1 | DK44 | Tk18 | Kk11 |
| 13as | A1 | DK44 | Tk18 | Kk51 |
| 13at | A1 | DK44 | Tk18 | Kk52 |
| 13au | A1 | DK44 | Tk18 | Kk53 |
| 13av | A1 | DK44 | Tk18 | Kk54 |
| 13aw | A1 | DK44 | Tk18 | Kk55 |
| 13ax | A1 | DK44 | Tk18 | Kk56 |
| 13ay | A1 | DK44 | Tk18 | Kk57 |
| 13az | A1 | DK44 | Tk18 | Kk58 |
| 13ba | A1 | DK44 | Tk18 | Kk59 |
| 13bb | A1 | DK44 | Tk18 | Kk60 |
| 13bc | A1 | DK44 | Tk18 | Kk61 |
| 13bd | A1 | DK44 | Tk18 | Kk62 |
| 13be | A1 | DK44 | Tk18 | Kk63 |
| 13bf | A1 | DK44 | Tk18 | Kk64 |
| 13bg | A1 | DK44 | Tk18 | DK66 |
| 13bh | A1 | DK45 | Tk18 | Kk1 |
| 13bi | A1 | DK45 | Tk18 | Kk2 |
| 13bj | A1 | DK45 | Tk18 | Kk3 |
| 13bk | A1 | DK45 | Tk18 | Kk4 |
| 13bl | A1 | DK45 | Tk18 | Kk6 |
| 13bm | A1 | DK45 | Tk18 | Kk7 |
| 13bn | A1 | DK45 | Tk18 | Kk10 |
| 13bo | A1 | DK45 | Tk18 | Kk11 |
| 13bp | A1 | DK45 | Tk18 | Kk14 |
| 13bq | A1 | DK45 | Tk18 | Kk15 |
| 13br | A1 | DK45 | Tk18 | Kk16 |
| 13bs | A1 | DK45 | Tk18 | Kk51 |
| 13bt | A1 | DK45 | Tk18 | Kk53 |
| 13bu | A1 | DK45 | Tk18 | Kk54 |
| 13bv | A1 | DK45 | Tk18 | Kk55 |
| 13bw | A1 | DK45 | Tk18 | Kk56 |
| 13bx | A1 | DK45 | Tk18 | Kk61 |
| 13by | A1 | DK45 | Tk18 | Kk62 |
| 13bz | A1 | DK45 | Tk18 | Kk63 |
| 13ca | A1 | DK45 | Tk18 | Kk64 |
| 13cb | A1 | DK45 | Tk18 | DK66 |

TABLE 5-continued

| Example No. | A | Napht[1] | Tk | Kk |
|---|---|---|---|---|
| 13cc | A1 | DK44 | Tk16 | Kk10 |
| 13cd | A1 | DK44 | Tk16 | Kk11 |
| 13ce | A1 | DK44 | Tk16 | Kk14 |
| 13cf | A1 | DK44 | Tk16 | Kk16 |
| 13cg | A1 | DK44 | Tk16 | Kk51 |
| 13ch | A1 | DK44 | Tk16 | Kk53 |
| 13ci | A1 | DK44 | Tk16 | Kk54 |
| 13cj | A1 | DK44 | Tk16 | Kk55 |
| 13ck | A1 | DK44 | Tk16 | Kk56 |
| 13cl | A1 | DK44 | Tk16 | Kk61 |
| 13cm | A1 | DK44 | Tk16 | Kk62 |
| 13cn | A1 | DK44 | Tk16 | Kk63 |
| 13co | A1 | DK44 | Tk16 | Kk64 |
| 13cp | A1 | DK44 | Tk16 | DK66 |
| 13cq | A1 | DK44 | Tk19 | Kk2 |
| 13cr | A1 | DK44 | Tk19 | Kk3 |
| 13cs | A1 | DK44 | Tk19 | Kk10 |
| 13ct | A1 | DK44 | Tk19 | Kk11 |
| 13cu | A1 | DK44 | Tk19 | Kk14 |
| 13cv | A1 | DK44 | Tk19 | Kk15 |
| 13cw | A1 | DK44 | Tk19 | Kk16 |
| 13cx | A1 | DK44 | Tk19 | Kk51 |
| 13cy | A1 | DK44 | Tk19 | Kk53 |
| 13cz | A1 | DK44 | Tk19 | Kk54 |
| 13da | A1 | DK44 | Tk19 | Kk55 |
| 13db | A1 | DK44 | Tk19 | Kk56 |
| 13dc | A1 | DK44 | Tk19 | Kk61 |
| 13dd | A1 | DK44 | Tk19 | Kk62 |
| 13de | A1 | DK44 | Tk19 | Kk63 |
| 13df | A1 | DK44 | Tk19 | Kk64 |
| 13dg | A1 | DK44 | Tk19 | DK66 |
| 13dh | A1 | DK44 | Tk20 | Kk2 |
| 13di | A1 | DK44 | Tk20 | Kk3 |
| 13dj | A1 | DK44 | Tk20 | Kk5 |
| 13dk | A1 | DK44 | Tk20 | Kk10 |
| 13dl | A1 | DK44 | Tk20 | Kk11 |
| 13dm | A1 | DK44 | Tk20 | Kk14 |
| 13dn | A1 | DK44 | Tk20 | Kk15 |
| 13do | A1 | DK44 | Tk20 | Kk16 |
| 13dp | A1 | DK44 | Tk20 | Kk51 |
| 13dq | A1 | DK44 | Tk20 | Kk53 |
| 13dr | A1 | DK44 | Tk20 | Kk54 |
| 13ds | A1 | DK44 | Tk20 | Kk55 |
| 13dt | A1 | DK44 | Tk20 | Kk56 |
| 13du | A1 | DK44 | Tk20 | Kk61 |
| 13dv | A1 | DK44 | Tk20 | Kk62 |
| 13dw | A1 | DK44 | Tk20 | Kk63 |
| 13dx | A1 | DK44 | Tk20 | Kk64 |
| 13dy | A1 | DK44 | Tk20 | DK66 |
| 13dz | A1 | DK45 | Tk16 | Kk2 |
| 13ea | A1 | DK45 | Tk16 | Kk3 |
| 13eb | A1 | DK45 | Tk16 | Kk5 |
| 13ec | A1 | DK45 | Tk16 | Kk10 |
| 13ed | A1 | DK45 | Tk16 | kk11 |
| 13ee | A1 | DK45 | Tk16 | Kk14 |
| 13ef | A1 | DK45 | Tk16 | Kk15 |
| 13eg | A1 | DK45 | Tk16 | Kk16 |
| 13eh | A1 | DK45 | Tk16 | Kk51 |
| 13ei | A1 | DK45 | Tk16 | Kk53 |
| 13ej | A1 | DK45 | Tk16 | Kk54 |
| 13ek | A1 | DK45 | Tk16 | Kk55 |
| 13el | A1 | DK45 | Tk16 | Kk56 |
| 13em | A1 | DK45 | Tk16 | Kk61 |
| 13en | A1 | DK45 | Tk16 | Kk62 |
| 13eo | A1 | DK45 | Tk16 | Kk63 |
| 13ep | A1 | DK45 | Tk16 | Kk64 |
| 13eq | A1 | DK45 | Tk16 | DK66 |
| 13er | A1 | DK45 | Tk19 | Kk2 |
| 13es | A1 | DK45 | Tk19 | Kk3 |
| 13et | A1 | DK45 | Tk19 | Kk5 |
| 13eu | A1 | DK45 | Tk19 | Kk10 |
| 13ev | A1 | DK45 | Tk19 | Kk11 |
| 13ew | A1 | DK45 | Tk19 | Kk14 |
| 13ex | A1 | DK45 | Tk19 | Kk15 |
| 13ey | A1 | DK45 | Tk19 | Kk16 |

TABLE 5-continued

| Example No. | A | Napht[1] | Tk | Kk |
|---|---|---|---|---|
| 13ez | A1 | DK45 | Tk19 | Kk51 |
| 13fa | A1 | DK45 | Tk19 | Kk53 |
| 13fb | A1 | DK45 | Tk19 | Kk54 |
| 13fc | A1 | DK45 | Tk19 | Kk55 |
| 13fd | A1 | DK45 | Tk19 | Kk56 |
| 13fe | A1 | DK45 | Tk19 | Kk61 |
| 13ff | A1 | DK45 | Tk19 | Kk62 |
| 13fg | A1 | DK45 | Tk19 | Kk63 |
| 13fh | A1 | DK45 | Tk19 | Kk64 |
| 13fi | A1 | DK45 | Tk19 | DK66 |
| 13fj | A1 | DK45 | Tk20 | Kk2 |
| 13fk | A1 | DK45 | Tk20 | Kk3 |
| 13fl | A1 | DK45 | Tk20 | Kk5 |
| 13fm | A1 | DK45 | Tk20 | Kk10 |
| 13fn | A1 | DK45 | Tk20 | Kk11 |
| 13fo | A1 | DK45 | Tk20 | Kk14 |
| 13fp | A1 | DK45 | Tk20 | Kk15 |
| 13fq | A1 | DK45 | Tk20 | Kk16 |
| 13fr | A1 | DK45 | Tk20 | Kk51 |
| 13fs | A1 | DK45 | Tk20 | Kk53 |
| 13ft | A1 | DK45 | Tk20 | Kk54 |
| 13fu | A1 | DK45 | Tk20 | Kk55 |
| 13fv | A1 | DK45 | Tk20 | Kk56 |
| 13fw | A1 | DK45 | Tk20 | Kk61 |
| 13fx | A1 | DK45 | Tk20 | Kk62 |
| 13fy | A1 | DK45 | Tk20 | Kk63 |
| 13fz | A1 | DK45 | Tk20 | Kk64 |
| 13ga | A1 | DK45 | Tk20 | DK66 |
| 13gb | A1 | DK44 | Tk16 | Kk65 |
| 13gc | A1 | DK44 | Tk16 | Kk66 |
| 13gd | A1 | DK44 | Tk16 | Kk67 |
| 13ge | A1 | DK45 | Tk16 | Kk65 |
| 13gf | A1 | DK45 | Tk16 | Kk66 |
| 13gg | A1 | DK45 | Tk16 | Kk67 |
| 13gh | A1 | DK44 | Tk18 | Kk65 |
| 13gi | A1 | DK44 | Tk18 | Kk66 |
| 13gj | A1 | DK44 | Tk18 | Kk67 |
| 13gk | A1 | DK45 | Tk18 | Kk65 |
| 13gl | A1 | DK45 | Tk18 | Kk66 |
| 13gm | A1 | DK45 | Tk18 | Kk67 |
| 13gn | A1 | DK44 | Tk19 | Kk65 |
| 13go | A1 | DK44 | Tk19 | Kk66 |
| 13gp | A1 | DK44 | Tk19 | Kk67 |
| 13gq | A1 | DK45 | Tk19 | Kk65 |
| 13gr | A1 | DK45 | Tk19 | Kk66 |
| 13gs | A1 | DK45 | Tk19 | Kk67 |
| 13gt | A1 | DK44 | Tk20 | Kk65 |
| 13gr | A1 | DK44 | Tk20 | Kk66 |
| 13gs | A1 | DK44 | Tk20 | Kk67 |
| 13gt | A1 | DK45 | Tk20 | Kk65 |
| 13gu | A1 | DK45 | Tk20 | Kk66 |
| 13gv | A1 | DK45 | Tk20 | Kk67 |

Example 13gw 1) 1 mol of MSP was suspended in ice-water and diazotized at pH<1 and 0-5° C. with excess sodium nitrite and hydrochloric acid. 1 mol of H acid was dissolved in 25% by weight aqueous sodium hydroxide solution and added to the reaction mixture of the diazotized MSP. The pH was maintained below 2.

2) 1 mol of 4,4-diaminodiphenylsulfamide was tetrazotized at pH<1 and 0-5° C. with excess sodium nitrite and hydrochloric acid and added to the reaction mixture obtained in step 1). The pH was maintained between 3-8 by addition of 10% by weight aqueous sodium hydroxide solution.

3) 0.45 mol of metamine acid and 0.55 mol of 2,4-diamino-1-methoxybenzene were added to the reaction mixture obtained in step 2) and the pH was maintained between 3-8 by addition of 10% by weight aqueous sodium hydroxide solution. After the reaction had ended, the dye was precipitated by addition of NaCl and filtered off with suction.

Preceding in a manner analogous to example 13gw it is possible to obtain the table 5a dye mixtures of the general formula A-N═N-Napht[1]-N═N-Tk-N═N-Kk (formula IIb where n=0), in which case the coupling of the A-N═N— radical takes place ortho the amino group in Napht[1].

TABLE 5a

| Example | A | Napht[1] | Tk | Kk *) |
|---|---|---|---|---|
| 13gw | A1 | DK44 | Tk18 | Kk15:Kk55 (45:55) |
| 13gz | A1 | DK44 | Tk18 | Kk15:Kk56 (30:70) |
| 13ha | A1 | DK44 | Tk18 | Kk15:Kk66 (80:20) |
| 13hb | A1 | DK44 | Tk18 | Kk5:Kk10 (10:90) |
| 13hc | A1 | DK44 | Tk18 | Kk5:Kk14 (15:85) |
| 13hd | A1 | DK44 | Tk18 | Kk5:Kk15 (60:40) |
| 13he | A1 | DK44 | Tk18 | Kk5:Kk55 (75:25) |
| 13hf | A1 | DK44 | Tk18 | Kk5:Kk56 (40:60) |
| 13hh | A1 | DK44 | Tk18 | Kk5:Kk67 (20:80) |
| 13hi | A1 | DK44 | Tk18 | Kk5:DK66 (50:50) |
| 13hj | A1 | DK45 | Tk18 | Kk15:Kk55 (45:55) |
| 13hk | A1 | DK45 | Tk18 | Kk15:Kk56 (30:70) |
| 13hl | A1 | DK45 | Tk18 | Kk15:Kk66 (80:20) |
| 13hm | A1 | DK45 | Tk18 | Kk5:Kk10 (10:90) |
| 13hn | A1 | DK45 | Tk18 | Kk5:Kk14 (15:85) |
| 13ho | A1 | DK45 | Tk18 | Kk5:Kk15 (60:40) |
| 13hp | A1 | DK45 | Tk18 | Kk5:Kk55 (75:25) |
| 13hq | A1 | DK45 | Tk18 | Kk5:Kk56 (40:60) |
| 13hr | A1 | DK45 | Tk18 | Kk5:Kk67 (20:80) |
| 13hs | A1 | DK45 | Tk18 | Kk5:DK66 (50:50) |
| 13ht | A1 | DK44 | Tk16 | Kk5:Kk15 (45:55) |
| 13hu | A1 | DK44 | Tk16 | Kk15:Kk55 (45:55) |
| 13hv | A1 | DK44 | Tk19 | Kk15:Kk55 (45:55) |
| 13hw | A1 | DK44 | Tk20 | Kk15:Kk55 (45:55) |

*) The parenthetical value indicates the molar ratio of the respective coupling components to each other.

Example 14

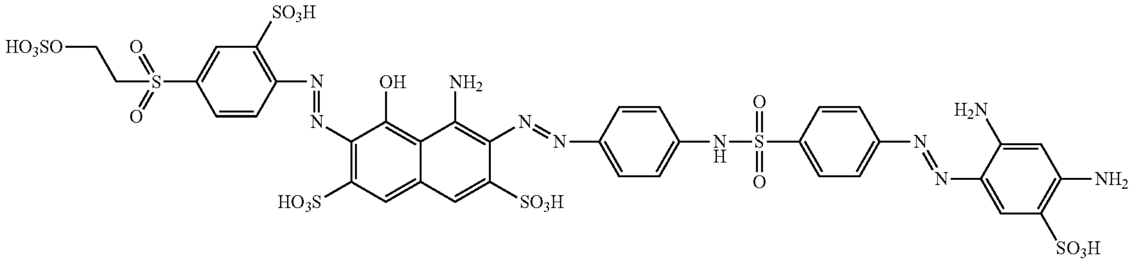

1) 1 mol of 4,4-diaminodiphenylsulfamide was tetrazotized at pH<1 and 0-5° C. with excess sodium nitrite and hydrochloric acid. 1 mol of metamine acid was dissolved in 25% by weight aqueous sodium hydroxide solution and added dropwise to the reaction mixture of the tetrazotized 4,4-diaminodiphenylsulfamide. The pH of the reaction mixture was maintained between 2-3 by addition of 15% by weight sodium carbonate solution.

2) 1 mol of H acid was dissolved in 25% by weight aqueous sodium hydroxide solution and added to the reaction mixture obtained in step 1). The pH of the reaction mixture was maintained between 2-4 by addition of 15% by weight aqueous sodium carbonate solution.

3) 1 mol of MSP was suspended in ice-water and diazotized at pH<1 and 0-5° C. with excess sodium nitrite and hydrochloric acid and subsequently added to the reaction mixture obtained in step 2). The pH was maintained between 3-8 by addition of 10% by weight aqueous sodium hydroxide solution. After the reaction had ended, the dye was precipitated by addition of NaCl and filtered off with suction.

Example 15

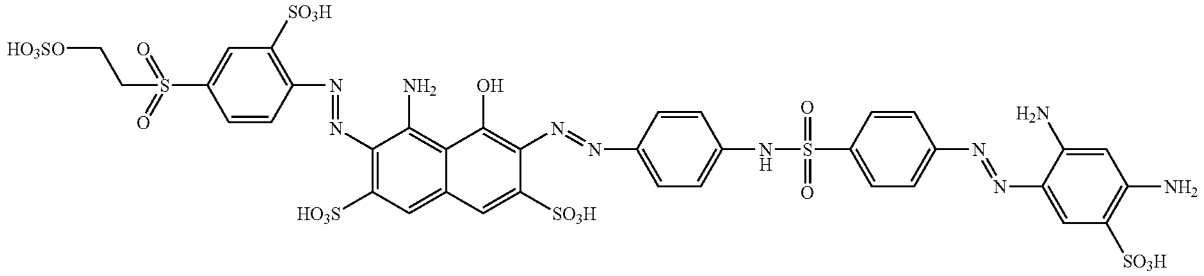

1) 1 mol of 4,4-diaminodiphenylsulfamide was tetrazotized at pH<1 and 0-5° C. with excess sodium nitrite and hydrochloric acid. 1 mol of metamine acid was dissolved in 25% by weight aqueous sodium hydroxide solution and added dropwise to the reaction mixture of the tetrazotized 4,4-diaminodiphenylsulfamide. The pH of the reaction mixture was maintained between 2-3 by addition of 15% by weight sodium carbonate solution.

2) 1 mol of MSP was suspended in ice-water and diazotized at pH<1 and 0-5° C. with excess sodium nitrite and hydrochloric acid. 1 mol of H acid was dissolved in 25% by weight aqueous sodium hydroxide solution and added to the reaction mixture of the diazotized MSP. The pH was maintained below 2.

3) The reaction mixture obtained in step 2) was added to the reaction mixture obtained in step 1). The pH was maintained between 3-8 by addition of 10% by weight aqueous sodium hydroxide solution. After the reaction had ended, the dye was precipitated by addition of NaCl and filtered off with suction.

Example 16a

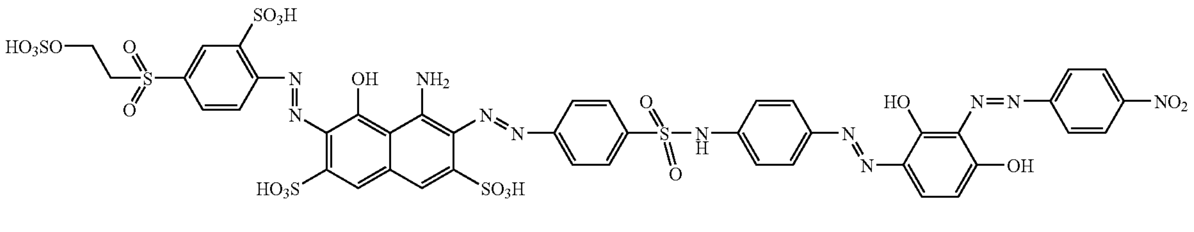

1) 1 mol of 4,4-diaminodiphenylsulfamide was tetrazotized at pH<1 and 0-5° C. with excess sodium nitrite and hydrochloric acid. 1 mol of H acid was dissolved in 25% by weight aqueous sodium hydroxide solution and added dropwise to the reaction mixture of the tetrazotized 4,4-diaminodiphenylsulfamide. The pH of the reaction mixture was maintained between 2 and 3 by addition of 15% by weight sodium carbonate solution.

2) 1 mol of MSP was suspended in ice-water and diazotized at pH<1 and 0-5° C. with excess sodium nitrite and hydrochloric acid and subsequently added to the reaction mixture obtained in step 1). The pH was maintained between 3 and 8 by addition of 10% by weight aqueous sodium hydroxide solution.

3) 1 mol of resorcinol was added to the reaction mixture obtained in step 2) and the pH was maintained between 3 and 8 by addition of 10% by weight aqueous sodium hydroxide solution.

4) 1 mol of p-nitroaniline was dissolved in 21% by weight hydrochloric acid, then diazotized at pH<1 and 0-5° C. with excess sodium nitrite and subsequently added to the reaction mixture obtained in step 3). The pH was maintained between 3 and 8 by addition of 10% by weight aqueous sodium hydroxide solution. After the reaction had ended, the dye was precipitated by addition of NaCl and filtered off with suction.

Example 17a

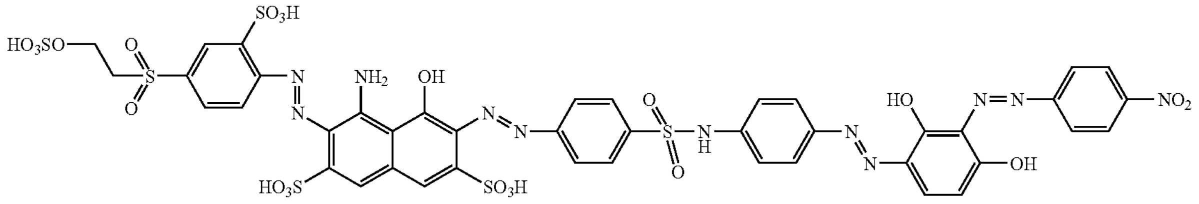

1) 1 mol of MSP was suspended in ice-water and diazotized at pH<1 and 0-5° C. with excess sodium nitrite and hydrochloric acid. 1 mol of H acid was dissolved in 25% by weight aqueous sodium hydroxide solution and added to the reaction mixture of the diazotized MSP. The pH was maintained below 2.

2) 1 mol of 4,4-diaminodiphenylsulfamide was tetrazotized at pH<1 and 0-5° C. with excess sodium nitrite and hydrochloric acid and added to the reaction mixture obtained in step 1). The pH was maintained between 3 and 8 by addition of 10% by weight aqueous sodium hydroxide solution.

3) 1 mol of resorcinol was added to the reaction mixture obtained in step 2) and the pH was maintained between 3 and 8 by addition of 10% by weight aqueous sodium hydroxide solution.

4) 1 mol of p-nitroaniline was dissolved in 21% by weight hydrochloric acid, then diazotized at pH<1 and 0-5° C. with excess sodium nitrite and subsequently added to the reaction mixture obtained in step 3). The pH was maintained between 3 and 8 by addition of 10% by weight aqueous sodium hydroxide solution. After the reaction had ended, the dye was precipitated by addition of NaCl and filtered off with suction.

Example 18

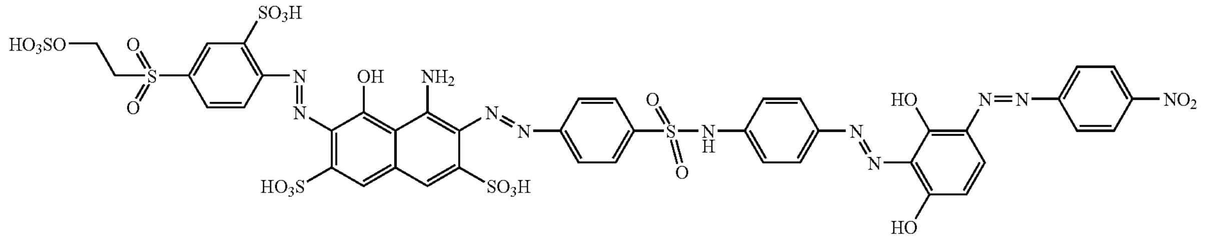

1) 1 mol of 4,4-diaminodiphenylsulfamide was tetrazotized at pH<1 and 0-5° C. with excess sodium nitrite and hydrochloric acid. 1 mol of H acid was dissolved in 25% by weight aqueous sodium hydroxide solution and added dropwise to the reaction mixture of the tetrazotized 4,4-diaminodiphenylsulfamide. The pH of the reaction mixture was maintained between 2 and 3 by addition of 15% by weight sodium carbonate solution.

2) 1 mol of MSP was suspended in ice-water and diazotized at pH<1 and 0-5° C. with excess sodium nitrite and hydrochloric acid and subsequently added to the reaction mixture obtained in step 1). The pH was maintained between 3-8 by addition of 10% by weight aqueous sodium hydroxide solution.

3) 1 mol of p-nitroaniline was dissolved in 21% by weight hydrochloric acid and thereafter diazotized at pH<1 and 0-5° C. with excess sodium nitrite. 1 mol of resorcinol was dissolved in 50% by weight aqueous sodium hydroxide solution at pH>12 and the diazotized p-nitroaniline was then added to this solution dropwise within 30 min at below 10° C., the pH being maintained above 9 by addition of 10% by weight aqueous sodium hydroxide solution.

4) The reaction mixture obtained in step 3) was added to the reaction mixture obtained in step 2). The pH was maintained between 3 and 8 by addition of 10% by weight aqueous sodium hydroxide solution. After the reaction had ended, the dye was precipitated by addition of NaCl and filtered off with suction.

Example 19

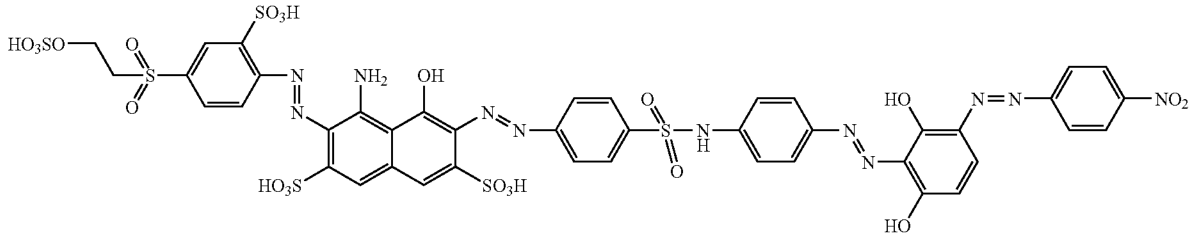

1) 1 mol of MSP was suspended in ice-water and diazotized at pH<1 and 0-5° C. with excess sodium nitrite and hydrochloric acid. 1 mol of H acid was dissolved in 25% by weight aqueous sodium hydroxide solution and added to the reaction mixture of the diazotized MSP. The pH was maintained below 2.

2) 1 mol of 4,4-diaminodiphenylsulfamide was tetrazotized at pH<1 and 0-5° C. with excess sodium nitrite and hydrochloric acid and added to the reaction mixture obtained in step 1). The pH was maintained between 3 and 8 by addition of 10% by weight aqueous sodium hydroxide solution.

3) 1 mol of p-nitroaniline was dissolved in 21% by weight hydrochloric acid and thereafter diazotized at pH<1 and 0-5° C. with excess sodium nitrite. 1 mol of resorcinol was dissolved in 50% by weight aqueous sodium hydroxide solution at pH>12 and the diazotized p-nitroaniline was then added to this solution dropwise within 30 min at below 10° C., the pH being maintained above 9 by addition of 10% by weight aqueous sodium hydroxide solution.

4) The reaction mixture obtained in step 3) was added to the reaction mixture obtained in step 2). The pH was maintained between 3 and 8 by addition of 10% by weight aqueous sodium hydroxide solution. After the reaction had ended, the dye was precipitated by addition of NaCl and filtered off with suction.

Example 20

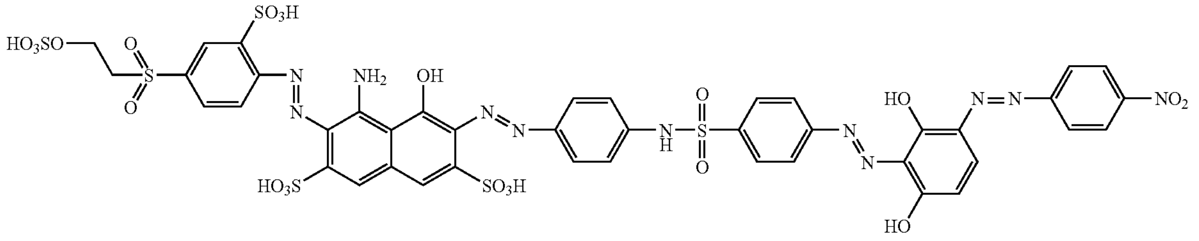

1) 1 mol of p-nitroaniline was dissolved in 21% by weight hydrochloric acid and thereafter diazotized at pH<1 and 0-5° C. with excess sodium nitrite. 1 mol of resorcinol was dissolved in 50% by weight aqueous sodium hydroxide solution at pH>12 and the diazotized p-nitroaniline was then added to this solution dropwise within 30 min at below 10° C., the pH being maintained above 9 by addition of 10% by weight aqueous sodium hydroxide solution.

2) 1 mol of 4,4-diaminodiphenylsulfamide was tetrazotized at pH<1 and 0-5° C. with excess sodium nitrite and hydrochloric acid and added to the reaction mixture obtained in step 1). The pH was maintained between 3 and 5 by addition of 10% by weight aqueous sodium hydroxide solution.

3) 1 mol of MSP was suspended in ice-water and diazotized at pH<1 and 0-5° C. with excess sodium nitrite and hydrochloric acid. 1 mol of H acid was dissolved in 25% by weight aqueous sodium hydroxide solution and added to the diazotized MSP. The pH was maintained below 2.

4) The reaction mixture obtained in step 3) was added to the reaction mixture obtained in step 2). The pH was maintained between 3 and 8 by addition of 10% by weight aqueous sodium hydroxide solution. After the reaction had ended, the dye was precipitated by addition of NaCl and filtered off with suction.

Proceeding in a manner analogous to examples 16a and 18 it is possible to obtain the dyes of the general formula $Dk^1$-N═N-$Napht^1$-N═N-Tk-N═N-Kk-N═N-$Dk^2$ and their metal complexes (=dyes of the general formula II where r=k=n=1) wherein $Dk^1$ and $Dk^2$ each represent a radical derived from the diazo components DK1 to DK 83 or from A1 to A12, at least one of $Dk^1$ or $Dk^2$ representing a radical of the formula A, Kk represents a bivalent radical derived from the coupling components Kk2, Kk3, Kk5, Kk6, Kk14, Kk15, Kk16, Kk49 or Kk50, $Napht^1$ represents one of the bivalent radicals II-2, II-4, II-6, II-8, II-10, II-12 and II-14, Tk represents a bivalent radical derived from a tetrazo component Tk1 to Tk20 and A represents one of the radicals A1 to A12. The coupling of the radical $Dk^1$-N═N— takes place ortho to the hydroxyl group in $Napht^1$. Examples thereof are the dyes and metal complexes reported below in table 6.

TABLE 6

| Example No. | $Dk^1$ | $Napht^1$ | Tk | Kk | $Dk^2$ | Metal |
|---|---|---|---|---|---|---|
| 16a | A1 | DK44 | Tk18 | Kk3 | DK17 | — |
| 16b | A1 | DK44 | Tk18 | Kk3 | DK5 | Fe |
| 16c | A1 | DK44 | Tk18 | Kk3 | DK5 | Cr |
| 16d | A1 | DK44 | Tk18 | Kk3 | DK40 | — |
| 16e | DK17 | DK44 | Tk18 | Kk3 | A1 | — |
| 16f | DK17 | DK44 | Tk18 | Kk3 | A7 | — |
| 16g | DK17 | DK44 | Tk18 | Kk5 | A7 | — |
| 16h | DK5 | DK44 | Tk18 | Kk3 | A1 | Fe |
| 16i | DK5 | DK44 | Tk18 | Kk3 | A1 | Cr |
| 16j | DK5 | DK44 | Tk16 | Kk5 | A12 | — |
| 16k | DK17 | DK45 | Tk16 | Kk3 | A10 | — |

Proceeding in a manner analogous to examples 17a, 19 and 20 it is possible to obtain the dyes of the general formula $Dk^1$-N═N-$Napht^1$-N═N-Tk-N═N-Kk-N═N-$Dk^2$ and their metal complexes (=dyes of the general formula II where r=k=n=1) wherein $Dk^1$ and $Dk^2$ each represent a radical derived from the diazo components DK1 to DK83 or from A1 to A12, at least one of $Dk^1$ or $Dk^2$ representing a radical of the formula A, Kk represents a bivalent radical derived from the coupling components Kk2, Kk3, Kk5, Kk6, Kk14, Kk15, Kk16, Kk49 or Kk50, $Napht^1$ represents one of the bivalent radicals II-2, II-4, II-6, II-8, II-10, II-12 and II-14, Tk represents a bivalent radical derived from a tetrazo component Tk1 to Tk20 and A represents one of the radicals A1 to A12. The coupling of the radical $Dk^1$-N═N— takes place ortho to the amino group in $Napht^1$. Examples thereof are the dyes and metal complexes reported below in table 7.

TABLE 7

| Example No. | $Dk^1$ | $Napht^1$ | Tk | Kk | $Dk^2$ | Metal |
|---|---|---|---|---|---|---|
| 17a | A1 | DK44 | Tk18 | Kk3 | DK17 | — |
| 17b | A1 | DK44 | Tk18 | Kk3 | DK5 | Fe |
| 17c | A1 | DK44 | Tk18 | Kk3 | DK5 | Cr |
| 17d | A1 | DK44 | Tk18 | Kk3 | DK40 | — |
| 17e | DK17 | DK44 | Tk18 | Kk3 | A1 | — |
| 17f | DK17 | DK44 | Tk18 | Kk3 | A7 | — |
| 17g | DK17 | DK44 | Tk18 | Kk5 | A1 | — |
| 17h | DK5 | DK44 | Tk18 | Kk3 | A1 | — |
| 17i | DK5 | DK44 | Tk18 | Kk3 | A5 | — |
| 17j | A1 | DK44 | Tk18 | Kk3 | A1 | — |
| 17k | DK5 | DK44 | Tk16 | Kk5 | A9 | — |
| 17l | DK17 | DK45 | Tk16 | Kk3 | A11 | — |

Example 21

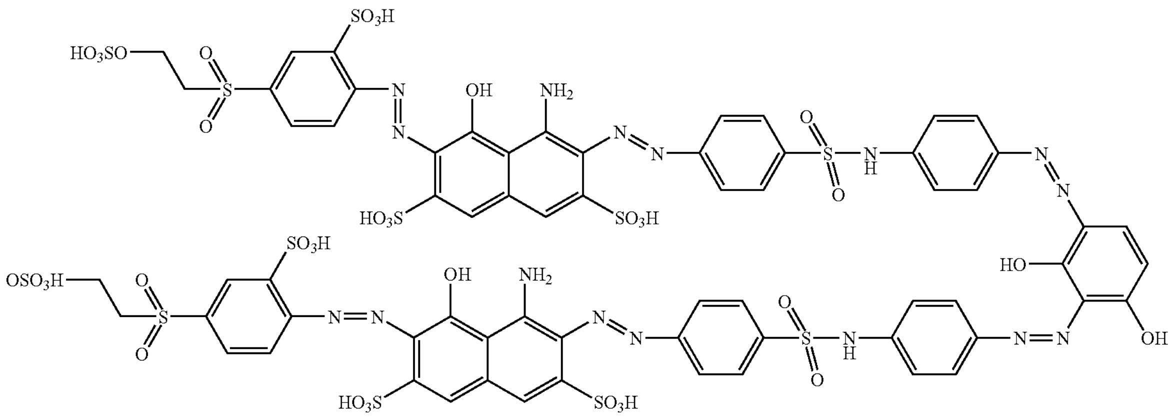 [SMILES: Nc1c(/N=N/c2ccc(S(=O)(=O)Nc3ccc(N=Nc4c(O)ccc(N=Nc5ccc(NS(=O)(=O)c6ccc(/N=N/c7c(S(=O)(=O)O)cc8cc(SOOO)c(/N=N/c9ccc(S(=O)(=O)CCOSOOO)cc9S(=O)(=O)O)c(O)c8c7N)cc6)cc5)c4O)cc3)cc2)c(S(=O)(=O)O)cc2cc(SOOO)c(N=Nc3ccc(S(=O)(=O)CCSOOOO)cc3S(=O)(=O)O)c(O)c12]

1) 1 mol of 4,4-diaminodiphenylsulfamide was tetrazotized at pH<1 and 0-5° C. with excess sodium nitrite and hydrochloric acid. 1 mol of H acid was dissolved in 25% by weight aqueous sodium hydroxide solution and added dropwise to the reaction mixture of the tetrazotized 4,4-diaminodiphenylsulfamide. The pH of the reaction mixture was maintained between 2 and 3 by addition of 15% by weight sodium carbonate solution.

2) 1 mol of MSP was suspended in ice-water and diazotized at pH<1 and 0-5° C. with excess sodium nitrite and hydrochloric acid and subsequently added to the reaction mixture obtained in step 1). The pH was maintained between 3 and 8 by addition of 10% by weight aqueous sodium hydroxide solution.

3) 0.5 mol of resorcinol was added to the reaction mixture obtained in step 2) and the pH was maintained between 3 and 8 by addition of 10% by weight aqueous sodium hydroxide solution. After the reaction had ended, the dye was precipitated by addition of NaCl and filtered off with suction.

Proceeding in a manner analogous to example 21 it is possible to obtain the dyes of the general formula [A-N═N-Napht$^1$-N═N-Tk-N═N]$_2$-Kk (=dyes of the general formula III where $Dk^1$=$Dk^2$=A, $Napht^1$=$Napht^2$ and $Tk^1$=$Tk^2$) wherein Kk represents a bivalent radical derived from the coupling components Kk2, Kk3, Kk5, Kk6, Kk14, Kk15, Kk16, Kk49 or Kk50, Napht1 represents one of the bivalent radicals II-2, II-4, II-6, II-8, II-10, II-12 and II-14, Tk represents a bivalent radical derived from a tetrazo component Tk1 to Tk20 and A represents one of the radicals A1 to A12. The coupling of the radical A-N═N— takes place ortho to the hydroxyl group in Napht$^1$.

Example 22

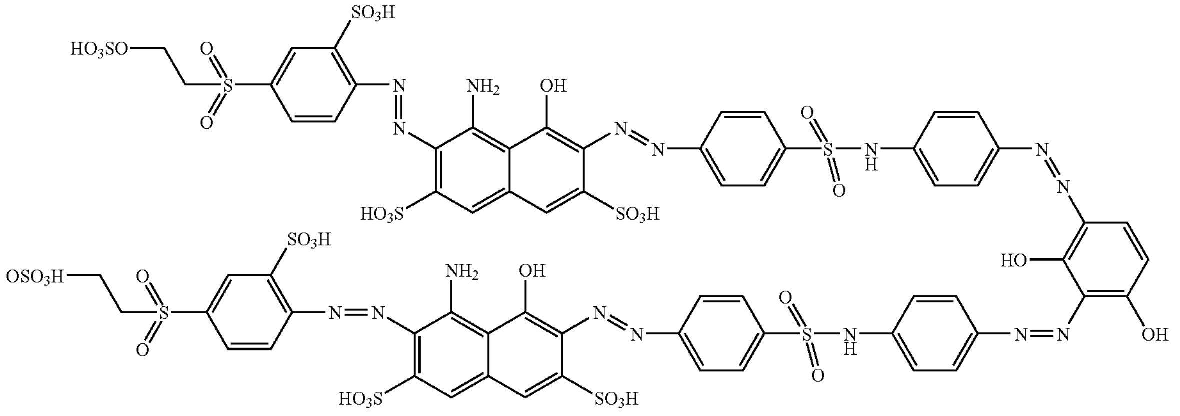 [SMILES: Nc1c(N=Nc2ccc(S(=O)(=O)CCSOOOO)cc2S(=O)(=O)O)c(SOOO)cc2cc(S(=O)(=O)O)c(/N=N/c3ccc(S(=O)(=O)Nc4ccc(N=Nc5c(O)ccc(N=Nc6ccc(NS(=O)(=O)c7ccc(/N=N/c8c(S(=O)(=O)O)cc9cc(SOOO)c(/N=N/c%10ccc(S(=O)(=O)CCOSOOO)cc%10S(=O)(=O)O)c(N)c9c8O)cc7)cc6)c5O)cc4)cc3)c(O)c12]

1) 1 mol of MSP was suspended in ice-water and diazotized at pH<1 and 0-5° C. with excess sodium nitrite and hydrochloric acid. 1 mol of H acid was dissolved in 25% by weight aqueous sodium hydroxide solution and added to the reaction mixture of the diazotized MSP. The pH was maintained below 2.

2) 1 mol of 4,4-diaminodiphenylsulfamide was tetrazotized at pH<1 and 0-5° C. with excess sodium nitrite and hydrochloric acid and added to the reaction mixture obtained in step 1). The pH was maintained between 3 and 8 by addition of 10% by weight aqueous sodium hydroxide solution.

3) 0.5 mol of resorcinol was added to the reaction mixture obtained in step 2) and the pH was maintained between 3 and 8 by addition of 10% by weight aqueous sodium hydroxide solution. After the reaction had ended, the dye was precipitated by addition of NaCl and filtered off with suction.

Proceeding in a manner analogous to example 22 it is possible to obtain the dyes of the general formula [A-N═N-Napht$^1$-N═N-Tk-N═N]$_2$-Kk (=dyes of the general formula III where $Dk^1$=$Dk^2$=A, $Napht^1$=$Napht^2$ and $Tk^1$=$Tk^2$) wherein Kk represents a bivalent radical derived from the coupling components Kk2, Kk3, Kk5, Kk6, Kk14, Kk15, Kk16, Kk49 or Kk50, Napht1 represents one of the bivalent radicals II-2, II-4, II-6, II-8, II-10, II-12 and II-14, Tk represents a bivalent radical derived from a tetrazo component Tk1 to Tk20 and A represents one of the radicals A1 to A12. The coupling of the radical A-N═N— takes place ortho to the amino group in Napht$^1$.

Example 23

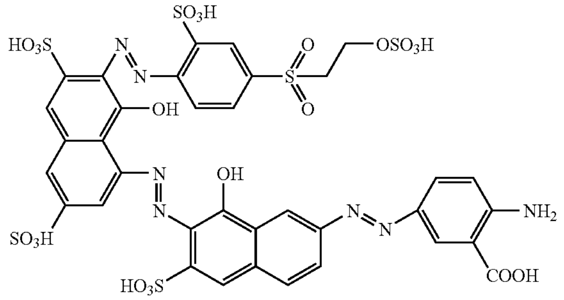

1) 1 mol of gamma acid was dissolved in 25% by weight aqueous sodium hydroxide solution, diazotized at pH<1 and 0-5° C. with excess sodium nitrite and hydrochloric acid and added dropwise to an aqueous solution of 1 mol of anthranilic acid. The pH of the reaction mixture was maintained between 5 and 10 by addition of 10% by weight aqueous sodium hydroxide solution.

2) 1 mol of H acid was dissolved in 25% by weight aqueous sodium hydroxide solution and diazotized at pH<1 and 0-5° C. with excess sodium nitrite and hydrochloric acid. This reaction mixture was admixed with the reaction mixture obtained in step 1). The pH was maintained between 3 and 8 by addition of 10% by weight aqueous sodium hydroxide solution.

3) 1 mol of MSP was suspended in ice-water and diazotized at pH<1 and 0-5° C. with excess sodium nitrite and hydrochloric acid and subsequently added to the reaction mixture obtained in step 2). The pH was maintained between 3 and 8 by addition of 10% by weight aqueous sodium hydroxide solution. After the reaction had ended, the dye was precipitated by addition of NaCl and filtered off with suction.

Proceeding in a manner analogous to example 23 it is possible to obtain the dyes of the general formula A-N═N-Napht[1]-N═N-Naphe-N═N-Kk (=dyes of the general formula XII where p=1, n=0, P=Napht[1], R=Napht[2]) wherein Kk represents a bivalent radical derived from the coupling components Kk1 to Kk48 or Kk51 to Kk67, Napht[1] and Napht[2] each represent one of the bivalent radicals II-1, II-3, II-5, II-7, II-9, II-11, II-13 or II-15 and A represents one of the radicals A1 to A12. The coupling of the radical Napht[1]-N═N— takes place ortho to the hydroxyl group in Naphe[2].

Example 24

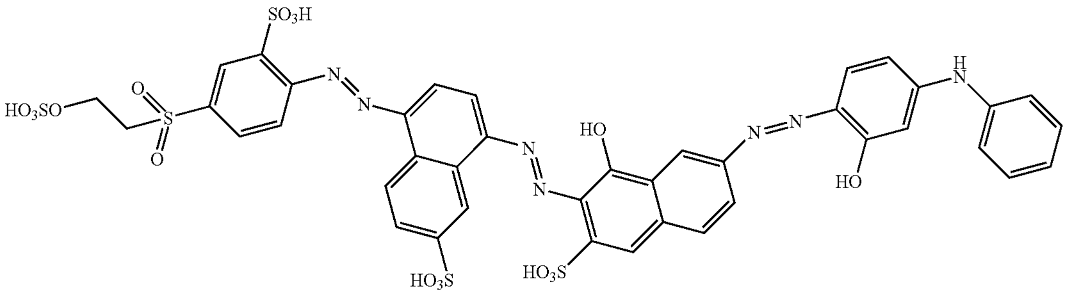

1) 1 mol of gamma acid was dissolved in 25% by weight aqueous sodium hydroxide solution, diazotized at pH<1 and 0-5° C. with excess sodium nitrite and hydrochloric acid and added dropwise to an aqueous solution of 1 mol of 3-phenylaminophenol. The pH of the reaction mixture was maintained between 5 and 10 by addition of 10% by weight aqueous sodium hydroxide solution.

2) 1 mol of Cleve's acid 7 was dissolved in 25% by weight aqueous sodium hydroxide solution. At the same time, 1 mol of MSP was suspended in ice-water and diazotized at pH<1 and 0-5° C. with excess sodium nitrite and hydrochloric acid and subsequently added to the Cleve's acid 7 solution while the pH was maintained below 2.

3) The reaction mixture obtained in step 2) was diazotized at pH<1 and 0-5° C. with excess sodium nitrite and hydrochloric acid. This reaction mixture was admixed with the reaction mixture obtained in step 1). The pH was maintained between 3-8 by addition of 10% by weight aqueous sodium hydroxide solution. After the reaction had ended, the dye was precipitated by addition of NaCl and filtered off with suction.

Proceeding in a manner analogous to example 24 it is possible to obtain the dyes of the general formula A-N═N-Napht[1]-N═N-Napht[2]-N═N-Kk (=dyes of the general formula XII where p=1, n=0, P=Napht[1], R=Napht[2]) wherein Kk represents a bivalent radical derived from the coupling components Kk1 to Kk48 or Kk51 to Kk67, Napht[1] and Napht[2] each represent one of the bivalent radicals II-1, II-3, II-5, II-7, II-9, II-11, II-13 or II-15 and A represents one of the radicals A1 to A12. The coupling of the radical A-N═N-Napht[1]-N═N— takes place ortho to the hydroxyl group in Napht[2].

Example 25

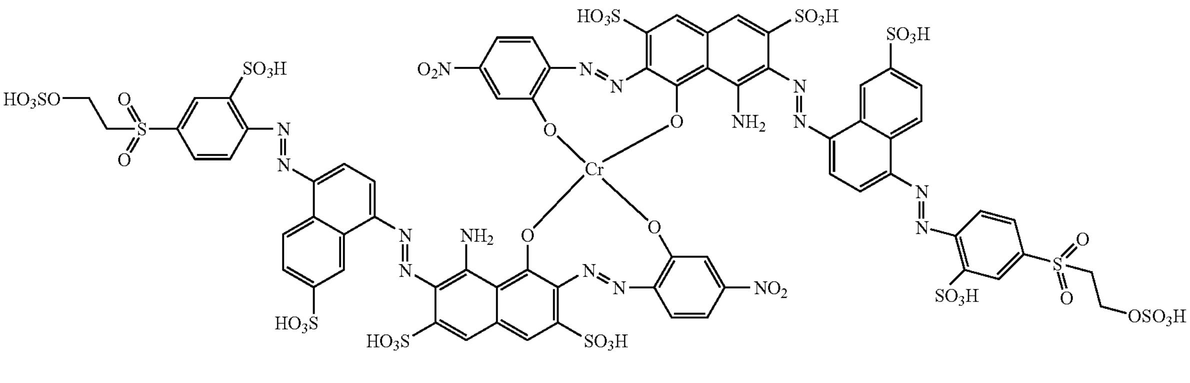

1) 1 mol of Cleve's acid 7 was dissolved in 25% by weight aqueous sodium hydroxide solution. At the same time, 1 mol of MSP was suspended in ice-water and diazotized at pH<1 and 0-5° C. with excess sodium nitrite and hydrochloric acid and subsequently added to the Cleve's acid 7 solution while the pH was maintained below 2.

2) 1 mol of H acid was dissolved in 25% by weight aqueous sodium hydroxide solution. At the same time, the reaction mixture obtained in step 1) was suspended in ice-water and diazotized at pH<1 and 0-5° C. with excess sodium nitrite and hydrochloric acid and subsequently added to the H acid solution. The pH was maintained between 1 and 4 by addition of 10% by weight aqueous sodium hydroxide solution 3) 1 mol of 5-nitro-2-aminophenol was diazotized with excess sodium nitrite and hydrochloric acid at pH<1 and 0-5° C. and subsequently added to the reaction mixture obtained in step 2). The pH was maintained between 3-8 by addition of 10% by weight aqueous sodium hydroxide solution. After the reaction had ended, 0.20-0.30 mol of chromium(III) sulfate was added to the reaction mixture and stirred in for 1 hour. The dye was precipitated by addition of NaCl and filtered off with suction.

Example 26

The preparation was carried out analogously to the prescription reported in example 25, although no-metal-complexing reaction was carried out in the last step.

Proceeding in a manner analogous to examples 25 and 26 it is possible to obtain the dyes of the general formula A-N═N-Napht$^1$-N═N-Napht$^2$-N═N-Dk and their metal complexes (=dyes of the general formula I where p=m=1, P=Napht$^1$, Kk$^1$=Napht$^2$) wherein Dk represents a radical derived from the diazo components DK1 to DK9, DK13, DK14, DK26, DK27, DK39 to DK41 and DK58, Napht$^1$ represents one of the bivalent radicals II-1, II-3, II-5, II-7, II-9, II-11, II-13, II-15 or II-16, Napht$^2$ represents one of the bivalent radicals II-2, II-4, II-6, II-8, II-10, II-12 or II-14 and A represents one of the radicals A1 to A12. The coupling of the radical A-N═N-Napht$^1$-N═N— takes place ortho to the amino group in Napht$^2$.

Example 27

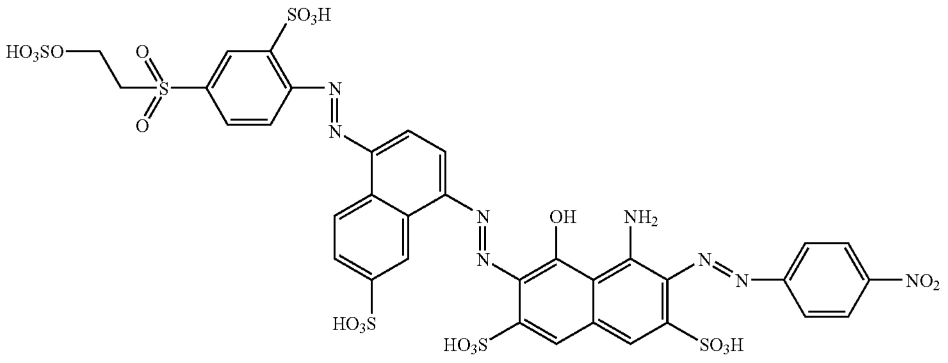

1) 1 mol of p-nitroaniline was dissolved in 21% by weight hydrochloric acid and thereafter diazotized at pH<1 and 0-5° C. with excess sodium nitrite. At the same time, 1 mol of H acid was dissolved in 25% by weight aqueous sodium hydroxide solution and thereafter the H acid was precipitated by addition of 21% by weight hydrochloric acid. The H acid suspension was added to the diazotized p-nitroaniline and the pH was maintained below 2. The reaction ends after 1 hour.

2) 1 mol of Cleve's acid 7 was dissolved in 25% by weight aqueous sodium hydroxide solution. At the same time, 1 mol of MSP was suspended in ice-water and diazotized at pH<1 and 0-5° C. with excess sodium nitrite and hydrochloric acid. The Cleve's acid 7 solution was added while maintaining the pH below 2.

3) The reaction mixture obtained in step 2) diazotized at pH<1 and 0-50° C. with excess sodium nitrite and hydrochloric acid and added to the product obtained in step 1). The pH was maintained between 5 and 8 by addition of 10% by weight aqueous sodium hydroxide solution, which was followed by stirring for 1 hour. The dye was precipitated by addition of NaCl and filtered off with suction.

Proceeding in a manner analogous to example 27 it is possible to obtain the dyes of the general formula A-N═N-Napht$^1$-N═N-Napht$^2$-N═N-Dk (=dyes of the general formula I where p=m=1, P=Napht$^1$, Kk$^1$=Napht$^2$) wherein Dk represents a radical derived from the diazo components DK1 to DK 83, Napht$^1$ represents one of the bivalent radicals II-1, II-3, II-5, II-7, II-9, II-11, II-13, II-15 or II-16, Napht$^2$ represents one of the bivalent radicals II-2, II-4, II-6, II-8, II-10, II-12 or II-14 and A represents one of the radicals A1 to A12. The coupling of the radical A-N═N-Napht$^1$-N═N— takes place ortho to the hydroxyl group in Napht$^2$.

Example 28a

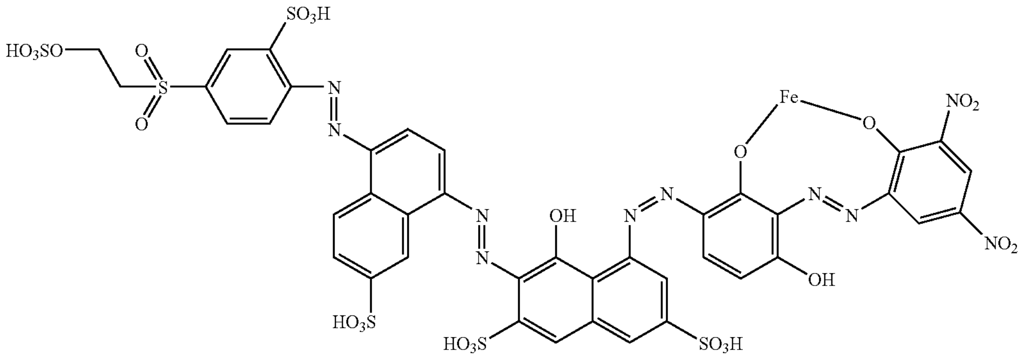

1) 1 mol of H acid was dissolved in 25% by weight aqueous sodium hydroxide solution, diazotized at pH<1 and 0-5° C. with excess sodium nitrite and hydrochloric acid. 1 mol of resorcinol was dissolved in 50% by weight aqueous sodium hydroxide solution at pH>12. This solution was admixed with the diazotized H acid by dropwise addition at below 10° C. within 30 min, while the pH was maintained above 9 by addition of 10% by weight aqueous sodium hydroxide solution.

2) 1 mol of 4,6-dinitro-2-aminophenol was diazotized with excess sodium nitrite and hydrochloric acid at pH<1 and 0-5° C. and added to the reaction mixture obtained in step 1). The pH was maintained between 3 and 8 by addition of 10% by weight aqueous sodium hydroxide solution.

3) 1 mol of Cleve's acid 7 was dissolved in 25% by weight aqueous sodium hydroxide solution. At the same time, 1 mol of MSP was suspended in ice-water and diazotized at pH<1 and 0-5° C. with excess sodium nitrite and hydrochloric acid and subsequently added to the Cleve's acid 7 solution while maintaining the pH below 2.

4) The reaction mixture obtained in step 3) was diazotized at pH<1 and 0-5° C. with excess sodium nitrite and hydrochloric acid. This reaction mixture was admixed with the reaction mixture obtained in step 2). The pH was maintained between 3 and 8 by addition of 10% by weight aqueous sodium hydroxide solution. After the reaction had ended, 0.40-0.60 mol of iron(III) sulfate was added to the reaction mixture and stirred in for 1 hour. The dye was precipitated by addition of NaCl and filtered off with suction.

Proceeding in a manner analogous to example 28a it is possible to obtain the metal complexes of dyes of the general formula A-N═N-Napht$^1$-N═N-Napht$^2$-N═N-Kk-N═N-Dk (=dyes of the general formula XII where p=n=1, P=Napht$^1$, R=Napht$^2$) wherein Dk represents a radical derived from the diazo components DK1 to DK9, DK13, DK14, DK26, DK27, DK39 to DK41 or DK58, Napht$^1$ represents one of the bivalent radicals II-1, II-3, II-5, II-7, II-9, II-11, II-13, II-15 or II-16, Napht$^2$ represents one of the bivalent radicals II-2, II-4, II-6, II-8, II-10, II-12 or II-14, Kk represents a bivalent radical from Kk2, Kk3, Kk49 or Kk50 and A represents one of the radicals A1 to A12. The coupling of the radical A-N═N-Napht$^1$-N═N— takes place ortho to the hydroxyl group in Naphte.

Example 28b

The reaction was carried out in accordance with the method described in example 28a except that there was no subsequent reaction with iron salts.

Proceeding in a manner analogous to example 28b it is possible to obtain the dyes of general formula A-N═N-Napht$^1$-N═N-Napht$^2$-N═N-Kk-N═N-Dk (=dyes of the general formula XII where p=n=1, P=Napht$^1$, R=Napht$^2$) wherein Dk represents a radical derived from the diazo components DK1 to DK83 or from A1 to A12, Napht$^1$ represents one of the bivalent radicals II-1, II-3, II-5, II-7, II-9, II-11, II-13, II-15 or II-16, Napht$^2$ represents one of the bivalent radicals II-2, II-4, II-6, II-8, II-10, II-12 or II-14, Kk represents a bivalent radical derived from Kk2, Kk3, Kk5, Kk6, Kk14, Kk15, Kk16, Kk49 or Kk50 and A represents one of the radicals A1 to A12. The coupling of the radical A-N═N-Napht$^1$-N═N— takes place ortho to the hydroxyl group in Napht$^2$.

Example 29a

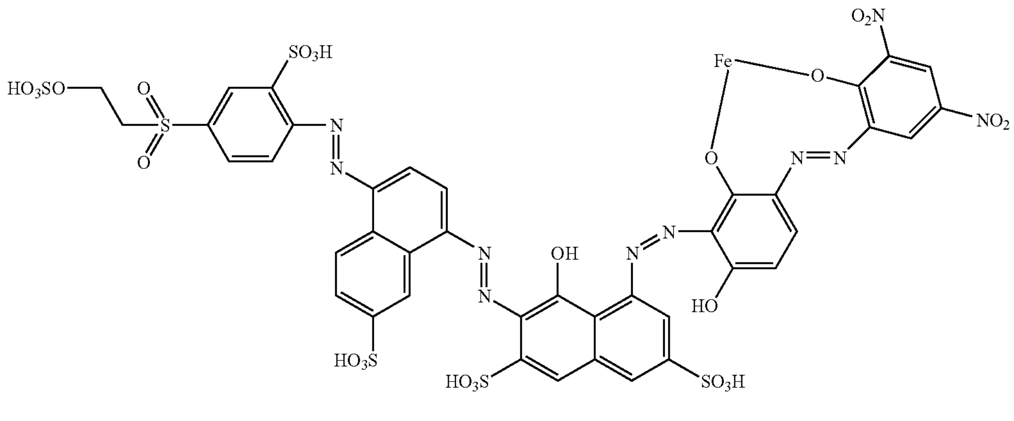

1) 1 mol of 4,6-dinitro-2-aminophenol was diazotized with excess sodium nitrite and hydrochloric acid at pH<1 and 0-5° C. 1 mol of resorcinol was dissolved in 50% by weight aqueous sodium hydroxide solution at pH>12 and this solution was admixed with the diazotized 4,6-dinitro-2-aminophenol added dropwise at below 10° C. in the course of 30 min while the pH was maintained above 9 by addition of a 10% by weight aqueous sodium hydroxide solution.

2) 1 mol of H acid was dissolved in 25% by weight aqueous sodium hydroxide solution, diazotized at pH<1 and 0-5° C. with excess sodium nitrite and hydrochloric acid and added to the reaction mixture obtained in step 1). The pH was maintained between 3 and 8 by addition of 10% by weight aqueous sodium hydroxide solution.

3) 1 mol of Cleve's acid 7 was dissolved in 25% by weight aqueous sodium hydroxide solution. At the same time, 1 mol of MSP was suspended in ice-water and diazotized at pH<1 and 0-5° C. with excess sodium nitrite and hydrochloric acid and subsequently added to the Cleve's acid 7 solution while maintaining the pH below 2.

4) The reaction mixture obtained in step 3) was diazotized at pH<1 and 0-5° C. with excess sodium nitrite and hydrochloric acid. This reaction mixture was admixed with the reaction mixture obtained in step 2). The pH was maintained between 3 and 8 by addition of 10% by weight aqueous sodium hydroxide solution. After the reaction had ended, 0.40-0.60 mol of iron(III) sulfate was added to the reaction mixture and stirred in for 1 hour. The dye was precipitated by addition of NaCl and filtered off with suction.

Proceeding in a manner analogous to example 29a it is possible to obtain the metal complexes of dyes of the general formula A-N═N-Napht[1]-N═N-Napht[2]-N═N-Kk-N═N-Dk (=dyes of the general formula XII where p=n=1, P=Napht[1], R=Napht[2]) wherein Dk represents a radical derived from the diazo components DK1 to DK9, DK13, DK14, DK26, DK27, DK39 to DK41 or DK58, Napht[1] represents one of the bivalent radicals II-1, II-3, II-5, II-7, II-9, II-1, II-13, II-15 or II-16, Napht[2] represents one of the bivalent radicals II-2, II-4, II-6, II-8, II-10, II-12 or II-14, Kk represents a bivalent radical derived from Kk2, Kk3, Kk49 or Kk50 and A represents one of the radicals A1 to A12. The coupling of the radical A-N═N-Napht[1]-N═N— takes place ortho to the hydroxyl group in Napht[2].

Example 29b

The reaction was carried out in accordance with the method described in example 29a except that there was no subsequent reaction with iron salts.

Proceeding in a manner analogous to example 29b it is possible to obtain the dyes of the general formula A-N═N-Napht[1]-N═N-Napht[2]-N═N-Kk-N═N-Dk (=dyes of the general formula XII where p=n=1, P=Napht[1], R=Napht[2]) wherein Dk represents a radical derived from the diazo components DK1 to DK 83 or from A1 to A12, Napht[1] represents one of the bivalent radicals II-1, II-3, II-5, II-7, II-9, II-11, II-13, II-15 or II-16, Napht[2] represents one of the bivalent radicals II-2, II-4, II-6, II-8, II-10, II-12 or II-14, Kk represents a bivalent radical derived from Kk2, Kk3, Kk5, Kk6, Kk14, Kk15, Kk16, Kk49 or Kk50 and A represents one of the radicals A1 to A12. The coupling of the radical A-N═N-Napht[1]-N═N— takes place ortho to the hydroxyl group in Napht[2].

Example 30

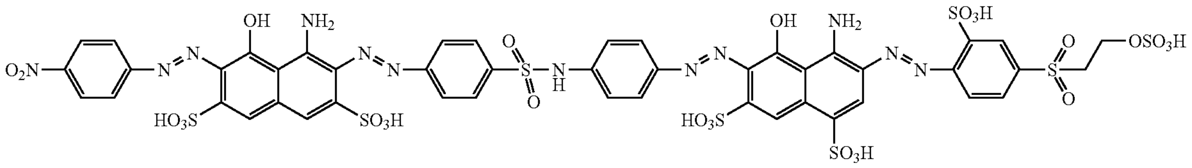

1) 1 mol of 4,4-diaminodiphenylsulfamide was tetrazotized at pH<1 and 0-5° C. with excess sodium nitrite and hydrochloric acid. 1 mol of H acid was dissolved in 25% by weight aqueous sodium hydroxide solution and added dropwise to the reaction mixture of the tetrazotized 4,4-diaminodiphenylsulfamide. The pH was maintained below 3.

2) 1 mol of p-nitroaniline was dissolved in 21% by weight hydrochloric acid, thereafter diazotized at pH<1 and 0-5° C. with excess sodium nitrite and added to the reaction mixture obtained in step 1). The pH was maintained between 3 and 8 by addition of 10% by weight aqueous sodium hydroxide solution.

3) 1 mol of MSP was suspended in ice-water and diazotized with excess sodium nitrite and hydrochloric acid at pH<1 and 0-5° C. 1 mol of K acid was dissolved in 25% by weight sodium hydroxide solution and added to the diazotized MSP. The pH was maintained below 2.

4) The product obtained in step 3) was added to the reaction mixture obtained in step 2). The pH was maintained between 3-8 by addition of 10% by weight aqueous sodium hydroxide solution. After the reaction had ended, the dye was precipitated by addition of NaCl and filtered off with suction.

Proceeding in a manner analogous to example 30 it is possible to obtain the dyes of the general formula Dk[1]-N═N-Napht[1]-N═N-Tk-N═N-Napht[2]-N═N-Dk[2] and their metal complexes (=dyes of the general formula IV) wherein Dk[1] and Dk[2] each represent a radical derived from the diazo components DK1 to DK83 or from A1 to A12, at least one of the radicals Dk[1] or Dk[2] representing a radical of the formula A, Napht[1] and Napht[2] each represent one of the bivalent radicals II-2, II-4, II-6, II-8, II-10, II-12 or II-14 and Tk represents a bivalent radical derived from Tk1 to Tk20. The coupling of the radicals Dk[1]-N═N— takes place ortho to the hydroxyl group in Napht[1] and the coupling of the radicals Dk[2]-N═N— takes place ortho to the amino group in Napht[2].

Example 31

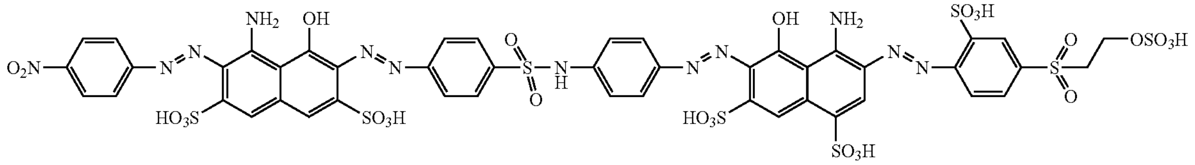

1) 1 mol of p-nitroaniline was dissolved in 21% by weight hydrochloric acid and thereafter diazotized with excess sodium nitrite at pH<1 and 0-5° C. To this was added 1 mol of H acid while the pH was maintained below 2.

2) 1 mol of 4,4-diaminodiphenylsulfamide was tetrazotized with excess sodium nitrite and hydrochloric acid at pH<1 and 0-5° C. and added to the reaction mixture obtained in step 1). The pH was maintained between 3 and 8 by addition of 10% by weight aqueous sodium hydroxide solution.

3) 1 mol of MSP was suspended in ice-water and diazotized with excess sodium nitrite and hydrochloric acid at pH<1 and 0-5° C. 1 mol of K acid was dissolved in 25% by weight sodium hydroxide solution and added to the diazotized MSP solution. The pH was maintained below 2.

4) The reaction mixture obtained in step 3) was added to the reaction mixture obtained in step 2). The pH was maintained between 3-8 by addition of 10% by weight aqueous sodium hydroxide solution. After the reaction had ended, the dye was precipitated by addition of NaCl and filtered off with suction.

Proceeding in a manner analogous to example 31 it is possible to obtain the dyes of the general formula $Dk^1$-N═N-$Napht^1$-N═N-Tk-N═N-$Napht^2$-N═N-$Dk^2$ and their metal complexes (=dyes of the general formula IV) wherein $Dk^1$ and $Dk^2$ each represent a radical derived from the diazo components DK1 to DK83 or from A1 to A12, at least one of the radicals $Dk^1$ or $Dk^2$ representing a radical of the formula A, $Napht^1$ and $Napht^2$ each represent one of the bivalent radicals II-2, II-4, II-6, II-8, II-10, II-12 or II-14 and Tk represents a bivalent radical derived from Tk1 to Tk20. The coupling of the radicals $Dk^1$-N═N— and $Dk^2$-N═N— takes place respectively ortho to the amino group in $Napht^1$ and $Napht^2$.

Example 32

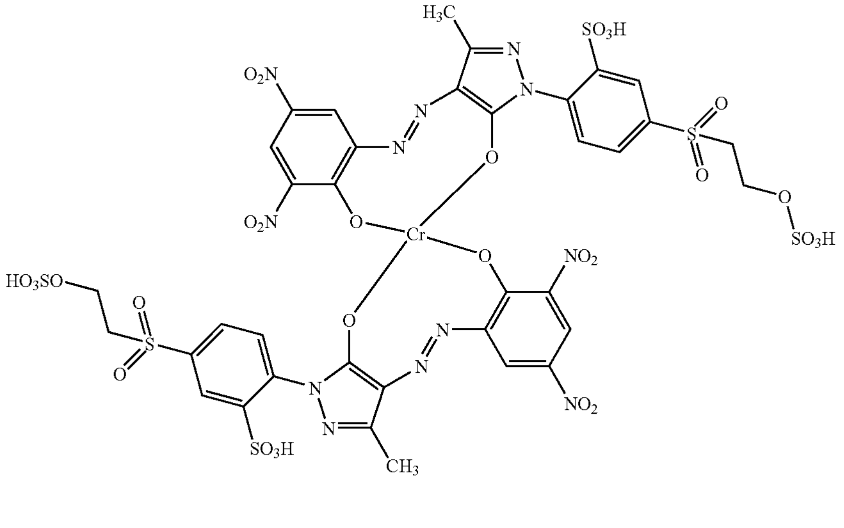

1 mol of 4,6-dinitro-2-aminophenol was diazotized with excess sodium nitrite and hydrochloric acid at pH<1 and 0-5° C. and coupled with 1 mol of 4-(β-sulfatoethylsulfonyl)pyrazole acid 2 (Kk44). The pH was maintained between 2 and 7. After the coupling had ended, 0.20-0.30 mol of chromium (III) sulfate was added to the reaction mixture and stirred in for 1 hour. The reaction mixture was then evaporated at 40° C.

Proceeding in a manner analogous to example 32 it is possible to obtain the metal complexes of dyes of the general formula Dk-N═N-Pyr-A (=dyes of the general formula XIII) wherein Dk represents a radical derived from the diazo components DK1 to DK9, DK13, DK14, DK26, DK27, DK39 to DK41 or DK58, Pyr represents 5-hydroxy-3-methylpyrazole-1,4-diyl or 5-hydroxy-3-carboxypyrazole-1,4-diyl and A represents one of the radicals A1 to A12 which is attached via the nitrogen of Pyr.

Example 33

The reaction was carried out in accordance with the method described in example 32 except there was no subsequent reaction with chromium salts.

Proceeding in a manner analogous to example 33 it is possible to obtain the dyes of the general formula Dk-N═N-Pyr-A (=dyes of the general formula XIII) wherein Dk represents a radical derived from the diazo components DK1 to DK83, Pyr represents 5-hydroxy-3-methylpyrazole-1,4-diyl or 5-hydroxy-3-carboxypyrazole-1,4-diyl and A represents one of the radicals A1 to A12 which is attached via the nitrogen of Pyr.

Example 34a

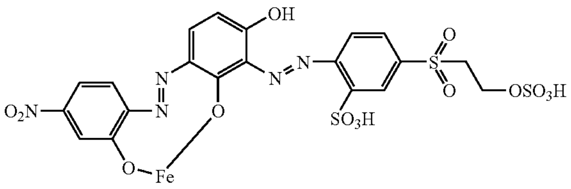

1) 1 mol of 5-nitro-2-aminophenol was diazotized at pH<1 and 0-5° C. with excess sodium nitrite and hydrochloric acid. 1 mol of resorcinol was dissolved in 50% by weight aqueous sodium hydroxide solution at pH>12 and this solution was admixed with the diazotized 5-nitro-2-aminophenol added dropwise at below 10° C. in the course of 30 min while the pH was maintained above 9 by addition of 10% by weight aqueous sodium hydroxide solution.

2) 1 mol of MSP was suspended in ice-water, diazotized with excess sodium nitrite and hydrochloric acid at pH<1 and 0-5° C. and added to the reaction mixture obtained in step 1). The pH was maintained between 3 and 8 by addition of 10% by weight aqueous sodium hydroxide solution. After the reaction had ended, 0.40-0.60 mol of iron(III) sulfate was added to the reaction mixture and stirred in for 1 hour. The dye was precipitated by addition of NaCl and filtered off with suction.

Example 35a

The reaction was carried out in accordance with the method described in example 34a except that there was no subsequent reaction with iron salts.

Example 36

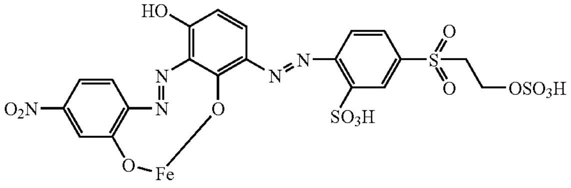

1) 1 mol of MSP was diazotized at pH<1 and 0-5° C. with excess sodium nitrite and hydrochloric acid. 1 mol of resorcinol was dissolved in 50% by weight aqueous sodium hydroxide solution and this solution was admixed with the diazotized MSP added dropwise at below 10° C. in the course of 30 min while the pH was maintained between 3 and 8 by addition of 10% by weight aqueous sodium hydroxide solution.

2) 1 mol of 5-nitro-2-aminophenol was suspended in ice-water, diazotized with excess sodium nitrite and hydrochloric acid at pH<1 and 0-5° C. and added to the reaction mixture obtained in step 1). The pH was maintained between 3 and 8 by addition of 10% by weight aqueous sodium hydroxide solution. After the reaction had ended, 0.40-0.60 mol of iron (III) sulfate was added to the reaction mixture and stirred in for 1 hour. The dye was precipitated by addition of NaCl and filtered off with suction.

Example 37

The reaction was carried out in accordance with the method described in example 36 except that there was no subsequent reaction with iron salts.

Proceeding in a manner analogous to examples 34a and 36 it is possible to obtain the metal complexes of dyes of the general formula Dk-N═N-Kk-N═N-A (=dyes of the general formula I where p=0 and m=1) wherein Dk represents a radical derived from the diazo components DK1 to DK9, DK13, DK14, DK26, DK27, DK39 to DK41 or DK58, Kk represents a bivalent radical derived from Kk2, Kk3, Kk49 or Kk50 and A represents one of the radicals A1 to A12. Examples thereof are reported in table 8.

TABLE 8

| Example No. | Dk | Kk | A | Metal |
|---|---|---|---|---|
| 34a | DK1 | Kk3 | A1 | Fe |
| 34b | DK2 | Kk3 | A1 | Fe |
| 34c | DK3 | Kk3 | A1 | Fe |
| 34d | DK4 | Kk3 | A1 | Fe |
| 34e | DK4 | Kk3 | A1 | Fe |
| 34f | DK5 | Kk3 | A1 | Fe |
| 34g | DK6 | Kk3 | A1 | Fe |
| 34h | DK7 | Kk3 | A1 | Fe |
| 34i | DK8 | Kk3 | A1 | Fe |
| 34j | DK9 | Kk3 | A1 | Fe |
| 34k | DK13 | Kk3 | A1 | Fe |
| 34l | DK14 | Kk3 | A1 | Fe |
| 34m | DK27 | Kk3 | A1 | Fe |
| 34n | DK39 | Kk3 | A1 | Fe |
| 34o | DK40 | Kk3 | A1 | Fe |
| 34p | DK41 | Kk3 | A1 | Fe |
| 34q | DK58 | Kk3 | A1 | Fe |
| 34r | DK5 | Kk49 | A1 | Fe |
| 34s | DK5 | Kk50 | A1 | Fe |
| 34t | DK5 | Kk3 | A1 | Cr |
| 34u | DK5 | Kk49 | A1 | Co |
| 34v | DK5 | Kk50 | A1 | Cr |
| 34z | DK4 | Kk3 | A3 | Fe |
| 34aa | DK5 | Kk3 | A6 | Fe |
| 34ab | DK6 | Kk3 | A10 | Fe |
| 34ac | DK7 | Kk3 | A11 | Fe |

Proceeding in a manner analogous to examples 35a and 37 it is possible to obtain the dyes of the general formula Dk-N═N-Kk-N═N-A (=dyes of the general formula I where p=0 and m=1) wherein Dk represents a radical derived from the diazo components DK1 to DK83, Kk represents a bivalent radical derived from Kk2, Kk3, Kk49 or Kk50 and A represents one of the radicals A1 to A12. Examples thereof are reported in table 9.

TABLE 9

| Example No. | Dk | Kk | A |
|---|---|---|---|
| 35a | DK1 | Kk3 | A1 |
| 35b | DK2 | Kk3 | A1 |
| 35c | DK3 | Kk3 | A1 |
| 35d | DK4 | Kk3 | A1 |
| 35e | DK5 | Kk3 | A1 |
| 35f | DK6 | Kk3 | A1 |
| 35g | DK7 | Kk3 | A1 |
| 35h | DK8 | Kk3 | A1 |
| 35i | DK9 | Kk3 | A1 |
| 35j | DK10 | KK3 | A1 |
| 35k | DK12 | KK3 | A1 |
| 35l | DK13 | Kk3 | A1 |
| 35m | DK14 | Kk3 | A1 |
| 35n | DK17 | Kk3 | A1 |
| 35o | DK27 | Kk3 | A1 |
| 35p | DK28 | Kk3 | A1 |

TABLE 9-continued

| Example No. | Dk | Kk | A |
|---|---|---|---|
| 35q | DK32 | Kk3 | A1 |
| 35r | DK39 | Kk3 | A1 |
| 35s | DK40 | Kk3 | A1 |
| 35t | DK41 | Kk3 | A1 |
| 35u | DK42 | Kk3 | A1 |
| 35v | DK46 | Kk3 | A1 |
| 35z | DK47 | Kk3 | A1 |
| 35aa | DK58 | Kk3 | A1 |
| 35ab | DK5 | Kk49 | A1 |
| 35ac | DK5 | Kk50 | A1 |
| 35ad | DK47 | Kk49 | A1 |
| 35ae | DK47 | Kk50 | A1 |
| 35af | DK4 | Kk3 | A4 |
| 35ag | DK5 | Kk3 | A7 |
| 35ah | DK6 | Kk3 | A9 |
| 35ai | DK7 | Kk3 | A12 |

Example 38a

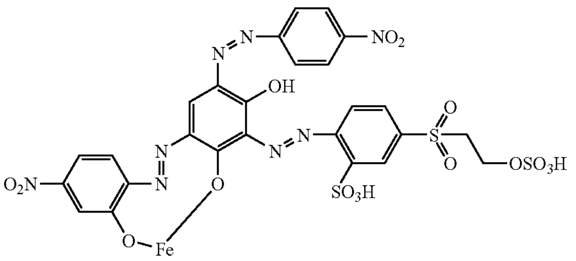

Method A:

1) 1 mol of 4,6-dinitro-2-aminophenol was diazotized at pH<1 and 0-5° C. with excess sodium nitrite and hydrochloric acid. 1 mol of resorcinol was dissolved in 50% by weight aqueous sodium hydroxide solution at pH>12 and this solution was admixed with the diazotized 4,6-dinitro-2-aminophenol added dropwise at >10° C. within 30 min while the pH was maintained above 9 by addition of 10% by weight aqueous sodium hydroxide solution.

2) 1 mol of MSP was suspended in ice-water, diazotized with excess sodium nitrite and hydrochloric acid at pH<1 and 0-5° C. and then added to the reaction mixture obtained in step 1). The pH was maintained between 3 and 8 by addition of 10% by weight aqueous sodium hydroxide solution.

3) 1 mol of p-nitroaniline was dissolved in 21% by weight hydrochloric acid, thereafter diazotized with excess sodium nitrite at pH<1 and 0-5° C. and added to the reaction mixture obtained in step 2). The pH was maintained between 3 and 8 by addition of 10% by weight aqueous sodium hydroxide solution. After the reaction had ended, 0.40-0.60 mol of iron (III) sulfate was added to the reaction mixture and stirred in for 1 hour. The dye was precipitated by addition of NaCl and filtered off with suction.

Method B:

1) 1 mol of p-nitroaniline was dissolved in 21% by weight hydrochloric acid and thereafter diazotized with excess sodium nitrite at pH<1 and 0-5° C. 1 mol of resorcinol was dissolved in 50% by weight aqueous sodium hydroxide solution at pH>12. This solution was admixed with the diazotized p-nitroaniline added dropwise at below 10° C. within 30 min while the pH was maintained above 9 by addition of 10% by weight aqueous sodium hydroxide solution.

2) 1 mol of MSP was suspended in ice-water, diazotized with excess sodium nitrite and hydrochloric acid at pH<1 and 0-5° C. and then added to the reaction mixture obtained in step 1). The pH was maintained between 3-8 by addition of 10% by weight aqueous sodium hydroxide solution.

3) 1 mol of 4,6-dinitro-2-aminophenol was diazotized at pH<1 and 0-5° C. with excess sodium nitrite and hydrochloric acid and added to the reaction mixture obtained in step 2). The pH was maintained between 3 and 8 by addition of 10% by weight aqueous sodium hydroxide solution. After the reaction had ended, 0.40-0.60 mol of iron(III) sulfate was added to the reaction mixture and stirred in for 1 hour. The dye was precipitated by addition of NaCl and filtered off with suction.

Example 39a

The reaction was carried out in accordance with the method described in example 38 except that there was no subsequent reaction with iron salts.

Example 40a

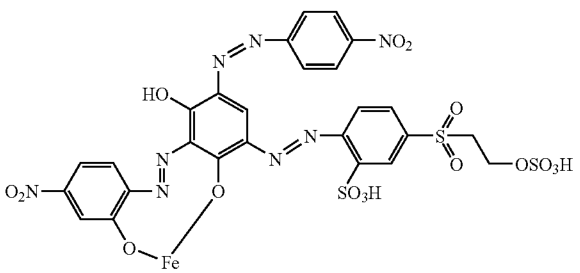

Method A:

1) 1 mol of p-nitroaniline was dissolved in 21% by weight hydrochloric acid, thereafter diazotized with excess sodium nitrite at pH<1 and 0-5° C. 1 mol of resorcinol was dissolved in 50% by weight aqueous sodium hydroxide solution at pH>12. This solution was admixed with the diazotized p-nitroaniline added dropwise at below 10° C. within 30 min while the pH was maintained above 9 by addition of 10% by weight aqueous sodium hydroxide solution.

2) 1 mol of 4,6-dinitro-2-aminophenol was diazotized at pH<1 and 0-5° C. with excess sodium nitrite and hydrochloric acid and then added to the reaction mixture obtained in step 1). The pH was maintained between 3 and 8 by addition of 10% by weight aqueous sodium hydroxide solution.

3) 1 mol of MSP was suspended in ice-water, diazotized with excess sodium nitrite and hydrochloric acid at pH<1 and 0-5° C. and added to the reaction mixture obtained in step 2). The pH was maintained between 3 and 8 by addition of 10% by weight aqueous sodium hydroxide solution. After the reaction had ended, 0.40-0.60 mol of iron(III) sulfate was added to the reaction mixture and stirred in for 1 hour. The dye was precipitated by addition of NaCl and filtered off with suction.

Method B:

1) 1 mol of MSP was suspended in ice-water, diazotized with excess sodium nitrite and hydrochloric acid at pH<1 and 0-5° C. 1 mol of resorcinol was dissolved in 50% by weight aqueous sodium hydroxide solution. This solution was admixed with the diazotized MSP added dropwise at below 10° C. within 30 min while the pH was maintained between 6 and 7 by addition of 10% by weight aqueous sodium hydroxide solution.

2) 1 mol of 4,6-dinitro-2-aminophenol was diazotized at pH<1 and 0-5° C. with excess sodium nitrite and hydrochloric acid and then added to the reaction mixture obtained in step 1). The pH was maintained between 3 and 8 by addition of 10% by weight aqueous sodium hydroxide solution.

3) 1 mol of p-nitroaniline was dissolved in 21% by weight hydrochloric acid, thereafter diazotized with excess sodium nitrite at pH<1 and 0-5° C. and added to the reaction mixture obtained in step 2). The pH was maintained between 3-8 by addition of 10% by weight aqueous sodium hydroxide solution. After the reaction had ended, 0.40-0.60 mol of iron(III) sulfate was added to the reaction mixture and stirred in for 1 hour. The dye was precipitated by addition of NaCl and filtered off with suction.

Example 41a

The reaction was carried out in accordance with the methods described in example 40 except there was no subsequent reaction with iron salts.

Proceeding in a manner analogous to examples 38a and 40a it is possible to obtain the metal complexes of dyes of the general formula

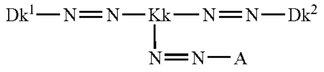

(=dyes of the general formula I where p=0 and m=2) wherein $Dk^1$ and $Dk^2$ each represent a radical derived from the diazo components DK1 to DK83, at least one of the radicals $Dk^1$ or $Dk^2$ representing a radical derived from the diazo components DK1 to DK9, DK13, DK14, DK26, DK27, DK39 to DK41 or DK58, Kk represents a trivalent radical derived from Kk2 or Kk3 and A represents one of the radicals A1 to A12. Examples thereof are reported in table 10.

TABLE 10

| Example No. | $Dk^1$ | Kk | $Dk^2$ | A | Me |
|---|---|---|---|---|---|
| 38a | DK1 | KK3 | DK17 | A1 | Fe |
| 38b | DK1 | KK3 | DK5 | A1 | Fe |
| 38c | DK1 | KK3 | DK10 | A1 | Fe |
| 38d | DK2 | KK3 | DK17 | A1 | Fe |
| 38e | DK4 | KK3 | DK17 | A1 | Cu |
| 38f | DK4 | KK3 | DK12 | A1 | Co |
| 38g | DK4 | KK3 | DK56 | A1 | Cr |
| 38h | DK5 | KK3 | DK9 | A1 | Fe |
| 38i | DK5 | KK3 | DK10 | A1 | Fe |
| 38j | DK5 | KK3 | DK12 | A1 | Fe |
| 38k | DK5 | KK3 | DK17 | A1 | Fe |
| 38l | DK5 | KK3 | DK19 | A1 | Fe |
| 38m | DK5 | KK3 | DK27 | A1 | Fe |
| 38n | DK5 | KK3 | DK28 | A1 | Fe |
| 38o | DK5 | KK3 | DK30 | A1 | Fe |
| 38p | DK5 | KK3 | DK32 | A1 | Fe |
| 38q | DK5 | KK3 | DK35 | A1 | Fe |
| 38r | DK5 | KK3 | DK41 | A1 | Fe |
| 38s | DK5 | KK3 | DK46 | A1 | Fe |
| 38t | DK5 | KK3 | DK47 | A1 | Fe |
| 38u | DK5 | KK3 | DK58 | A1 | Fe |
| 38v | DK5 | KK3 | DK12 | A5 | Fe |
| 38z | DK5 | KK3 | DK17 | A9 | Fe |
| 40a | DK1 | KK3 | DK17 | A1 | Fe |
| 40b | DK1 | KK3 | DK5 | A1 | Fe |
| 40c | DK1 | KK3 | DK10 | A1 | Fe |
| 40d | DK2 | KK3 | DK17 | A1 | Fe |
| 40e | DK4 | KK3 | DK17 | A1 | Cu |
| 40f | DK4 | KK3 | DK12 | A1 | Co |
| 40g | DK4 | KK3 | DK56 | A1 | Cr |
| 40h | DK5 | KK3 | DK9 | A1 | Fe |
| 40i | DK5 | KK3 | DK10 | A1 | Fe |
| 40j | DK5 | KK3 | DK12 | A1 | Fe |
| 40k | DK5 | KK3 | DK17 | A1 | Fe |
| 40l | DK5 | KK3 | DK19 | A1 | Fe |
| 40m | DK5 | KK3 | DK27 | A1 | Fe |
| 40n | DK5 | KK3 | DK28 | A1 | Fe |
| 40o | DK5 | KK3 | DK30 | A1 | Fe |

TABLE 10-continued

| Example No. | $Dk^1$ | Kk | $Dk^2$ | A | Me |
|---|---|---|---|---|---|
| 40p | DK5 | KK3 | DK32 | A1 | Fe |
| 40q | DK5 | KK3 | DK35 | A1 | Fe |
| 40r | DK5 | KK3 | DK41 | A1 | Fe |
| 40s | DK5 | KK3 | DK46 | A1 | Fe |
| 40t | DK5 | KK3 | DK47 | A1 | Fe |
| 40u | DK5 | KK3 | DK58 | A1 | Fe |
| 40v | DK5 | KK3 | DK12 | A4 | Fe |
| 40z | DK5 | KK3 | DK17 | A11 | Fe |

Proceeding in a manner analogous to examples 39a and 41a it is possible to obtain the dyes of the general formula

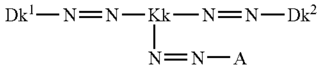

(=dyes of the general formula I where p=0 and m=2) wherein $Dk^1$ and $Dk^2$ each represent a radical derived from the diazo components DK1 to DK83, Kk represents a trivalent radical derived from Kk2, Kk3 or Kk5 and A represents one of the radicals A1 to A12. Examples thereof are reported in table 11.

TABLE 11

| Example No. | $Dk^1$ | Kk | $Dk^2$ | A |
|---|---|---|---|---|
| 39a | DK1 | KK3 | DK17 | A1 |
| 39b | DK1 | KK3 | DK5 | A1 |
| 39c | DK1 | KK3 | DK10 | A1 |
| 39d | DK2 | KK3 | DK17 | A1 |
| 39e | DK4 | KK3 | DK17 | A1 |
| 39f | DK4 | KK3 | DK12 | A1 |
| 39g | DK4 | KK3 | DK56 | A1 |
| 39h | DK5 | KK3 | DK9 | A1 |
| 39i | DK5 | KK3 | DK10 | A1 |
| 39j | DK5 | KK3 | DK12 | A1 |
| 39k | DK5 | KK3 | DK17 | A1 |
| 39l | DK5 | KK3 | DK19 | A1 |
| 39m | DK5 | KK3 | DK27 | A1 |
| 39n | DK5 | KK3 | DK28 | A1 |
| 39o | DK5 | KK3 | DK30 | A1 |
| 39p | DK5 | KK3 | DK32 | A1 |
| 39q | DK5 | KK3 | DK35 | A1 |
| 39r | DK5 | KK3 | DK41 | A1 |
| 39s | DK5 | KK3 | DK46 | A1 |
| 39t | DK5 | KK3 | DK47 | A1 |
| 39u | DK5 | KK3 | DK58 | A1 |
| 39v | DK5 | KK3 | DK12 | A7 |
| 39z | DK5 | KK3 | DK17 | A12 |
| 41a | DK1 | KK3 | DK17 | A1 |
| 41b | DK1 | KK3 | DK5 | A1 |
| 41c | DK1 | KK3 | DK10 | A1 |
| 41d | DK2 | KK3 | DK17 | A1 |
| 41e | DK4 | KK3 | DK17 | A1 |
| 41f | DK4 | KK3 | DK12 | A1 |
| 41g | DK4 | KK3 | DK56 | A1 |
| 41h | DK5 | KK3 | DK9 | A1 |
| 41i | DK5 | KK3 | DK10 | A1 |
| 41j | DK5 | KK3 | DK12 | A1 |
| 41k | DK5 | KK3 | DK17 | A1 |
| 41l | DK5 | KK3 | DK19 | A1 |
| 41m | DK5 | KK3 | DK27 | A1 |
| 41n | DK5 | KK3 | DK28 | A1 |
| 41o | DK5 | KK3 | DK30 | A1 |
| 41p | DK5 | KK3 | DK32 | A1 |
| 41q | DK5 | KK3 | DK35 | A1 |
| 41r | DK5 | KK3 | DK41 | A1 |
| 41s | DK5 | KK3 | DK46 | A1 |
| 41t | DK5 | KK3 | DK47 | A1 |
| 41u | DK5 | KK3 | DK58 | A1 |

Example 42a

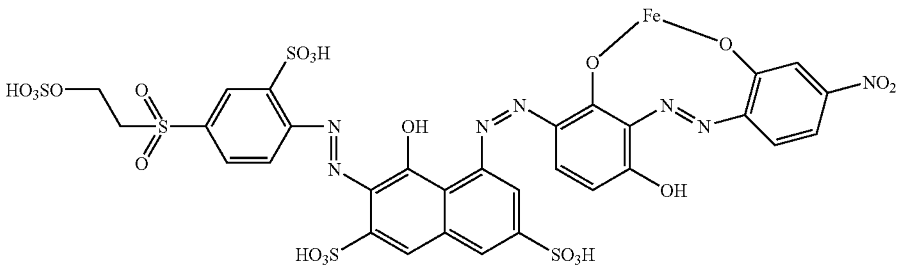

Method A:

1) 1 mol of H acid was dissolved in 25% by weight aqueous sodium hydroxide solution, diazotized at pH<1 and 0-5° C. with excess sodium nitrite and hydrochloric acid. 1 mol of resorcinol was dissolved in 50% by weight aqueous sodium hydroxide solution at pH>12. This solution was admixed with the diazotized H acid added dropwise at below 10° C. within 30 min while the pH was maintained above 9 by addition of 10% by weight aqueous sodium hydroxide solution.

2) 1 mol of 5-nitro-2-aminophenol was suspended in ice-water, thereafter diazotized with excess sodium nitrite at pH<1 and 0-5° C. and then added to the reaction mixture obtained in step 1). The pH was maintained between 3 and 8 by addition of 10% by weight aqueous sodium hydroxide solution.

3) 1 mol of MSP was suspended in ice-water, diazotized with excess sodium nitrite and hydrochloric acid at pH<1 and 0-5° C. and added to the reaction mixture obtained in step 2). The pH was maintained between 3 and 8 by addition of 10% by weight aqueous sodium hydroxide solution. After the reaction had ended, 0.40-0.60 mol of iron(III) sulfate was added to the reaction mixture and stirred in for 1 hour. The dye was precipitated by addition of NaCl and filtered off with suction.

Method B:

1) 1 mol of H acid was dissolved in 25% by weight aqueous sodium hydroxide solution and acetylated with 1.1-1.5 mol of acetic anhydride.

2) 1 mol of MSP was suspended in ice-water and diazotized at pH<1 and 0-5° C. with excess sodium nitrite and hydrochloric acid and added to the reaction mixture obtained in step 1). The pH was maintained between 4 and 7 by addition of sodium carbonate. After the coupling had ended, the pH was adjusted to below 1 by addition of 21% by weight hydrochloric acid and the reaction mixture was heated to 85-95° C. This detached the acetyl group.

3) The product obtained in step 2) was diazotized at pH<1 and 0-5° C. with excess sodium nitrite and hydrochloric acid and added to an aqueous solution of 1 mol of resorcinol. The pH was maintained between 3 and 8 by addition of 10% by weight aqueous sodium hydroxide solution.

4) 1 mol of 5-nitro-2-aminophenol was suspended in ice-water, diazotized with excess sodium nitrite and hydrochloric acid at pH<1 and 0-5° C. and added to the reaction mixture obtained in step 3). The pH was maintained between 3 and 8 by addition of 10% by weight aqueous sodium hydroxide solution. After the reaction had ended, 0.40-0.60 mol of iron (III) sulfate was added to the reaction mixture and stirred in for 1 hour. The dye was precipitated by addition of NaCl and filtered off with suction.

Example 43a

The reaction was carried out in accordance with the methods described in example 42a except that there was no subsequent reaction with iron salts.

Example 44

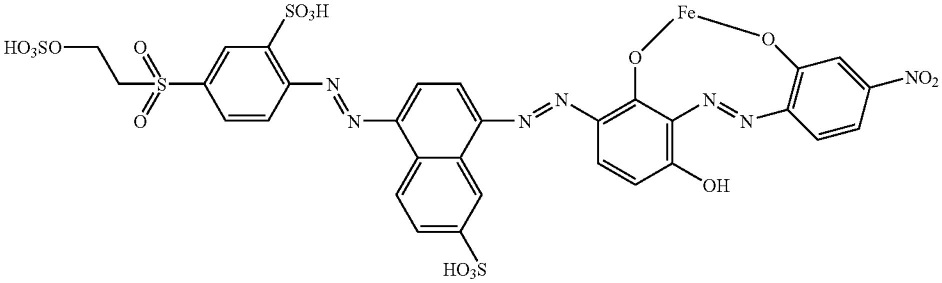

1) 1 mol of Cleve's acid 7 was dissolved in 25% by weight aqueous sodium hydroxide solution. At the same time, 1 mol of MSP was suspended in ice-water and diazotized with excess sodium nitrite and hydrochloric acid at pH<1 and 0-5° C. and subsequently added to the solution of the Cleve's acid 7 while the pH was maintained below 2.

2) The product obtained in step 1) was diazotized at pH<1 and 0-5° C. with excess sodium nitrite and hydrochloric acid. Subsequently, the reaction mixture was added to an aqueous solution of 1 mol of resorcinol. The pH was maintained between 3 and 8 by addition of 10% by weight aqueous sodium hydroxide solution.

3)1 mol of 5-nitro-2-aminophenol was suspended in ice-water, diazotized with excess sodium nitrite and hydrochloric acid at pH<1 and 0-5° C. and added to the reaction mixture obtained in step 2). The pH was maintained between 3 and 8 by addition of 10% by weight aqueous sodium hydroxide solution. After the reaction had ended, 0.40-0.60 mol of iron (III) sulfate was added to the reaction mixture and stirred in for 1 hour. The dye was precipitated by addition of NaCl and filtered off with suction.

Example 45

The reaction was carried out in accordance with the method described in example 44 except that there was no subsequent reaction with iron salts.

Example 46a

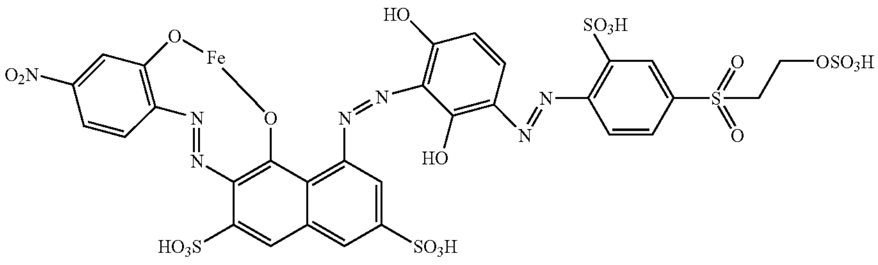

Method A:

1) 1 mol of MSP was suspended in ice-water, diazotized at pH<1 and 0-5° C. with excess sodium nitrite and hydrochloric acid. 1 mol of resorcinol was dissolved in 50% by weight aqueous sodium hydroxide solution. This solution was admixed with the diazotized MSP added dropwise at below 10° C. within 30 min while the pH was maintained between 6 and 8 by addition of 10% by weight aqueous sodium hydroxide solution.

2) 1 mol of H acid was dissolved in 25% by weight aqueous sodium hydroxide solution, diazotized with excess sodium nitrite and hydrochloric acid at pH<1 and 0-5° C. and added to the reaction mixture obtained in step 1). The pH was maintained between 3 and 8 by addition of 10% by weight aqueous sodium hydroxide solution.

3) 1 mol of 5-nitro-2-aminophenol was suspended in ice-water, thereafter diazotized with excess sodium nitrite at pH<1 and 0-5° C. and then added to the reaction mixture obtained in step 3). The pH was maintained between 3 and 8 by addition of 10% by weight aqueous sodium hydroxide solution. After the reaction had ended, 0.40-0.60 mol of iron (III) sulfate was added to the reaction mixture and stirred in for 1 hour. The dye was precipitated by addition of NaCl and filtered off with suction.

Method B:

1) 1 mol of MSP was suspended in ice-water, diazotized at pH<1 and 0-5° C. with excess sodium nitrite and hydrochloric acid. 1 mol of resorcinol was dissolved in 50% by weight aqueous sodium hydroxide solution. This solution was admixed with the diazotized MSP added dropwise at below 10° C. within 30 min while the pH was maintained between 6 and 8 by addition of 10% by weight aqueous sodium hydroxide solution.

2) 1 mol of H acid was dissolved in 25% by weight aqueous sodium hydroxide solution and acetylated with 1.1-1.5 mol of acetic anhydride.

2) 1 mol of 5-nitro-2-aminophenol was suspended in ice-water and diazotized at pH<1 and 0-5° C. with excess sodium nitrite and added to the reaction mixture obtained in step 2). The pH was maintained between 4 and 7 by addition of sodium carbonate. After the coupling had ended, the pH was adjusted to below 1 by addition of 21% by weight hydrochloric acid and the reaction mixture was heated to 85-95° C. This detaches the acetyl group.

4) The product obtained in step 3) was diazotized at pH<1 and 0-5° C. with excess sodium nitrite and hydrochloric acid and added to the reaction mixture obtained in step 1) between 3-8 and then addition of 10% by weight sodium hydroxide solution. After the reaction had ended, 0.40-0.60 mol of iron (III) sulfate was added to the reaction mixture and stirred in for 1 hour. The dye was precipitated by addition of NaCl and filtered off with suction.

Example 47a

The reaction was carried out in accordance with the methods described in example 46a except there was no subsequent reaction with iron salts.

Example 48

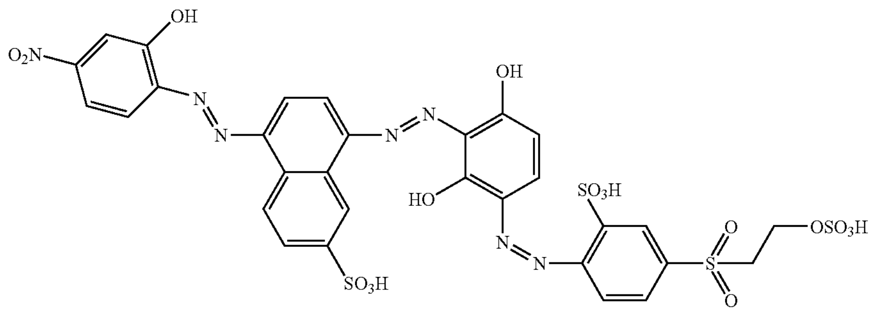

1) 1 mol of MSP was suspended in ice-water diazotized at pH<1 and 0-5° C. with excess sodium nitrite and hydrochloric acid. 1 mol of resorcinol was dissolved in 50% by weight aqueous sodium hydroxide solution. This solution was admixed with the diazotized MSP added dropwise at below 10° C. within 30 min while the pH was maintained between 6 and 8 by addition of 10% by weight aqueous sodium hydroxide solution.

2) 1 mol of 5-nitro-2-aminophenol was suspended in ice-water, diazotized with excess sodium nitrite and hydrochloric acid at pH<1 and 0-5° C. and added to a 25% by weight aqueous sodium hydroxide solution with 1 mol of Cleve's acid 7 while the pH was maintained below 2.

3) The product obtained in step 2) was diazotized with excess sodium nitrite and hydrochloric acid at pH<1 and 0-5° C. and subsequently added to the reaction mixture obtained in step 1). The pH was maintained between 3-8 by addition of 10% by weight aqueous sodium hydroxide solution. After the reaction had ended, the dye was precipitated by addition of NaCl and filtered off with suction.

Proceeding in a manner analogous to examples 42a, 44 and 46a it is possible to obtain the metal complexes of dyes of the general formula $Dk^1$-N═N-Napht-N═N-Kk-N═N-$Dk^2$ (=dyes of the general formula I where P=Napht, p=1 and m=1) wherein $Dk^1$ and $DK^2$ each represent a radical derived from the diazo components DK1 to DK9, DK13, DK14, DK26, DK27, DK39 to DK41 or DK58 or from A1 to A12, at least one of the radicals $Dk^1$ or $Dk^2$ representing a radical of the formula A, Kk represents a bivalent radical derived from Kk2 or Kk3 and Napht is a bivalent radical of the formulae II-1, II-3, II-5, II-7, II-9, II-11, II-13, II-15 or II-16. Examples thereof are reported in table 12.

TABLE 12

| Example No. | $Dk^1$ | Napht | Kk | $Dk^2$ | Me |
|---|---|---|---|---|---|
| 42a | A1 | DK44 | Kk3 | DK1 | Fe |
| 42b | A1 | DK44 | Kk3 | DK4 | Cu |
| 42c | A1 | DK44 | Kk3 | DK5 | Fe |
| 42d | A7 | DK44 | Kk3 | DK5 | Fe |
| 42e | A1 | DK44 | Kk3 | DK40 | Fe |
| 42f | A1 | DK44 | Kk3 | DK58 | Cr |
| 42g | A1 | DK57 | Kk3 | DK5 | Fe |
| 42h | DK1 | DK44 | Kk3 | A1 | Fe |
| 42i | DK2 | DK44 | Kk3 | A1 | Fe |
| 42j | DK4 | DK44 | Kk3 | A1 | Fe |
| 42k | DK5 | DK44 | Kk3 | A1 | Fe |
| 42l | DK27 | DK44 | Kk3 | A1 | Fe |
| 42m | DK41 | DK44 | Kk3 | A1 | Fe |
| 42n | A3 | DK44 | Kk3 | DK5 | Fe |

TABLE 12-continued

| Example No. | $Dk^1$ | Napht | Kk | $Dk^2$ | Me |
|---|---|---|---|---|---|
| 42o | A9 | DK44 | Kk3 | DK40 | Fe |
| 46a | DK1 | DK44 | Kk3 | A1 | Fe |
| 46b | DK2 | DK44 | Kk3 | A1 | Fe |
| 46c | DK4 | DK44 | Kk3 | A1 | Fe |
| 46d | DK5 | DK44 | Kk3 | A1 | Fe |
| 46e | DK27 | DK44 | Kk3 | A1 | Fe |
| 46f | DK41 | DK44 | Kk3 | A1 | Fe |
| 46g | A1 | DK44 | Kk3 | DK1 | Fe |
| 46h | A1 | DK44 | Kk3 | DK4 | Cu |
| 46i | A1 | DK44 | Kk3 | DK5 | Fe |
| 46j | A7 | DK44 | Kk3 | DK5 | Fe |
| 46k | A1 | DK44 | Kk3 | DK40 | Fe |
| 46l | A1 | DK44 | Kk3 | DK58 | Cr |
| 46m | A1 | DK57 | Kk3 | DK5 | Fe |

Proceeding in a manner analogous to examples 43a, 45, 47a and 48 it is possible to obtain the dyes of the general formula $Dk^1$-N═N-Napht-N═N-Kk-N═N-$Dk^2$ (=dyes of the general formula I where P=Napht, p=1 and m=1) wherein $Dk^1$ and $DK^2$ represent a radical derived from the diazo components DK1 to DK83 or from A1 to A12, at least one of the radicals $Dk^1$ or $Dk^2$ representing a radical of formula A, Kk represents a bivalent radical derived from Kk2, Kk3, Kk5, Kk49 or Kk50 and Napht is a bivalent radical of the formulae II-1, II-3, II-5, II-7, II-9, II-11, II-13, II-15 or II-16. Examples thereof are reported in table 13.

TABLE 13

| Example No. | $Dk^1$ | Napht | Kk | $Dk^2$ |
|---|---|---|---|---|
| 43a | A1 | DK44 | Kk3 | DK1 |
| 43b | A1 | DK44 | Kk3 | DK4 |
| 43c | A1 | DK44 | Kk3 | DK5 |
| 43d | A7 | DK44 | Kk3 | DK5 |
| 43e | A1 | DK44 | Kk3 | DK9 |

TABLE 13-continued

| Example No. | Dk[1] | Napht | Kk | Dk[2] |
|---|---|---|---|---|
| 43f | A1 | DK44 | Kk3 | DK10 |
| 43g | A1 | DK44 | Kk3 | DK12 |
| 43h | A1 | DK44 | Kk3 | DK28 |
| 43i | A1 | DK44 | Kk3 | DK32 |
| 43j | A1 | DK44 | Kk3 | DK37 |
| 43k | A1 | DK44 | Kk3 | DK40 |
| 43l | A1 | DK44 | Kk3 | DK46 |
| 43m | A1 | DK44 | Kk3 | DK58 |
| 43n | A1 | DK57 | Kk3 | DK5 |
| 43o | DK1 | DK44 | Kk3 | A1 |
| 43p | DK2 | DK44 | Kk3 | A1 |
| 43q | DK4 | DK44 | Kk3 | A1 |
| 43r | DK5 | DK44 | Kk3 | A1 |
| 43s | DK8 | DK44 | Kk3 | A1 |
| 43t | DK10 | DK44 | Kk3 | A1 |
| 43u | DK12 | DK44 | Kk3 | A1 |
| 43v | DK17 | DK44 | Kk3 | A1 |
| 43z | DK27 | DK44 | Kk3 | A1 |
| 43aa | DK28 | DK44 | Kk3 | A1 |
| 43ab | DK32 | DK44 | Kk3 | A1 |
| 43ac | DK41 | DK44 | Kk3 | A1 |
| 43ad | DK46 | DK44 | Kk3 | A1 |
| 43ae | DK47 | DK44 | Kk3 | A1 |
| 43af | DK28 | DK44 | Kk3 | A3 |
| 43ag | DK32 | DK45 | Kk3 | A7 |
| 43ah | DK41 | DK45 | Kk3 | A8 |
| 43ai | DK46 | DK45 | Kk3 | A11 |
| 47a | DK1 | DK44 | Kk3 | A1 |
| 47b | A1 | DK44 | Kk3 | DK4 |
| 47c | A1 | DK44 | Kk3 | DK5 |
| 47d | A7 | DK44 | Kk3 | DK5 |

TABLE 13-continued

| Example No. | Dk[1] | Napht | Kk | Dk[2] |
|---|---|---|---|---|
| 47e | A1 | DK44 | Kk3 | DK9 |
| 47f | A1 | DK44 | Kk3 | DK10 |
| 47g | A1 | DK44 | Kk3 | DK12 |
| 47h | A1 | DK44 | Kk3 | DK28 |
| 47i | A1 | DK44 | Kk3 | DK32 |
| 47j | A1 | DK44 | Kk3 | DK37 |
| 47k | A1 | DK44 | Kk3 | DK40 |
| 47l | A1 | DK44 | Kk3 | DK46 |
| 47m | A1 | DK44 | Kk3 | DK58 |
| 47n | A1 | DK57 | Kk3 | DK5 |
| 47o | A1 | DK44 | Kk3 | DK1 |
| 47p | DK2 | DK44 | Kk3 | A1 |
| 47q | DK4 | DK44 | Kk3 | A1 |
| 47r | DK5 | DK44 | Kk3 | A1 |
| 47s | DK8 | DK44 | Kk3 | A1 |
| 47t | DK10 | DK44 | Kk3 | A1 |
| 47u | DK12 | DK44 | Kk3 | A1 |
| 47v | DK17 | DK44 | Kk3 | A1 |
| 47z | DK27 | DK44 | Kk3 | A1 |
| 47aa | DK28 | DK44 | Kk3 | A1 |
| 47ab | DK32 | DK44 | Kk3 | A1 |
| 47ac | DK41 | DK44 | Kk3 | A1 |
| 47ad | DK46 | DK44 | Kk3 | A1 |
| 47ae | DK47 | DK44 | Kk3 | A1 |
| 47af | DK28 | DK44 | Kk3 | A2 |
| 47ag | DK32 | DK45 | Kk3 | A6 |
| 47ah | DK41 | DK45 | Kk3 | A9 |
| 47ai | DK46 | DK45 | Kk3 | A10 |

Example 49a

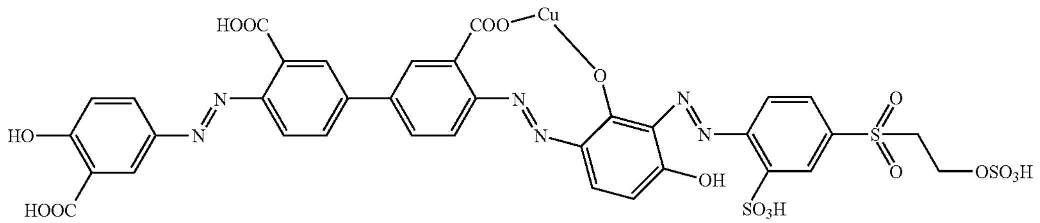

1) 1 mol of 4,4'-diaminobiphenyl-3,3'-dicarboxylic acid was tetrazotized with excess sodium nitrite and hydrochloric acid at pH<1 and 0-5° C. and reacted with 1 mol of salicylic acid at a pH from 5 to 11.

2) 1 mol of resorcinol was dissolved in 50% by weight aqueous sodium hydroxide solution at pH>12. This solution was admixed with the reaction product obtained in step 1) added dropwise at below 10° C. in the course of 30 min during which the pH was maintained above 9 by addition of 10% by weight aqueous sodium hydroxide solution.

3) 1 mol of MSP was suspended in ice-water, diazotized with excess sodium nitrite and hydrochloric acid at pH<1 and 0-5° C. Subsequently, the diazotized MSP was added to the reaction mixture obtained in step 2) while the pH was maintained between 5 and 8 by addition of 10% by weight aqueous sodium hydroxide solution. After the reaction has ended, 1 mol of copper(II) sulfate was added to the reaction mixture and stirred in at 70° C. for 1 hour. The dye was precipitated by addition of NaCl and filtered off with suction.

Example 50a

The reaction was carried out in accordance with the method described in example 49a except that there was no subsequent reaction with copper salts.

Example 51

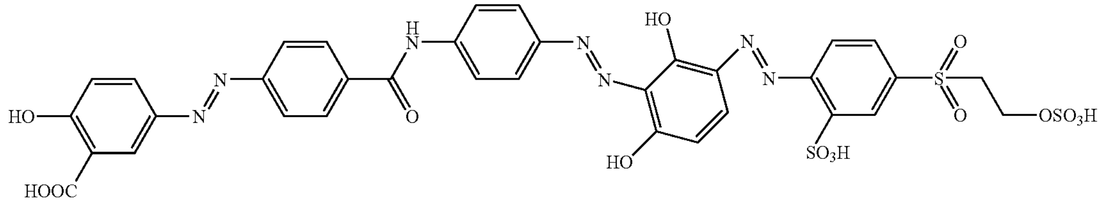

1) 1 mol of 4,4-diaminobenzanilide was tetrazotized with excess sodium nitrite and hydrochloric acid at pH<1 and 0-5° C. and reacted with 1 mol of salicylic acid at pH 5-11.

2) 1 mol of MSP was suspended in ice-water, diazotized with excess sodium nitrite and hydrochloric acid at pH<1 and 0-5° C. 1 mol of resorcinol was dissolved in 50% by weight aqueous sodium hydroxide solution. The diazotized MSP was added dropwise to this within 30 min at below 10° C. while the pH was held between 6 and 8 by addition of 10% by weight aqueous sodium hydroxide solution.

3) The product obtained in step 2) was added to the reaction mixture obtained in step 1) while the pH was maintained between 5 and 8 by addition of 10% by weight aqueous sodium hydroxide solution. After the reaction had ended, the dye was precipitated by addition of NaCl and filtered off with suction.

Proceeding in a manner analogous to examples 49a, 50a and 51 it is possible to obtain the dyes of the general formula $Kk^3$-N═N-Tk-N═N-$Kk^1$-N═N-A and their metal complexes (=dyes of the general formula XIV) wherein $Kk^3$ represents a radical derived from coupling components Kk1 to Kk48 or Kk51 to Kk67 or represents Dk42 to Dk83, Tk represents a bivalent radical derived from TK1 to Tk20, $Kk^1$ represents a bivalent radical derived from Kk2, Kk3, Kk5, Kk49 or Kk50 and A represents one of the radicals A1 to A12. Examples thereof are reported in table 14.

TABLE 14

| Example No. | $Kk^3$ | Tk | $Kk^1$ | A | Me |
|---|---|---|---|---|---|
| 49a | Kk1 | Tk11 | Kk3 | A1 | Cu |
| 49b | Kk40 | Tk11 | Kk3 | A1 | Cu |
| 49c | Dk46 | Tk8 | Kk3 | A1 | Cu |
| 50a | DK44 | Tk16 | Kk3 | A1 | |
| 50b | DK44 | Tk18 | Kk3 | A1 | |
| 50c | Kk39 | Tk18 | Kk3 | A1 | |

Example 52a

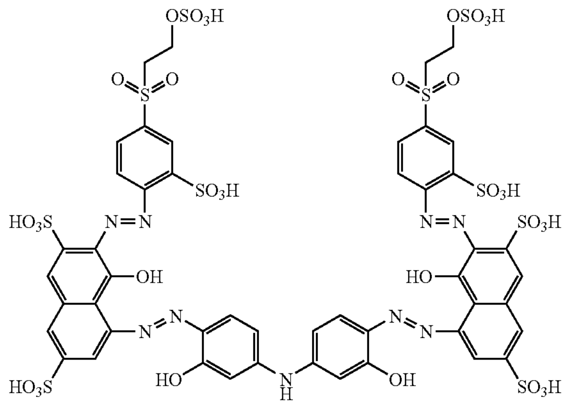

1) 2 mol of H acid was dissolved in 25% by weight aqueous sodium hydroxide solution, diazotized with excess sodium nitrite and hydrochloric acid at pH<1 and 0-5° C. and added to an aqueous solution of 1 mol of 3,3'-dihydroxydiphenylamine. The pH was maintained between 3 and 10 by addition of 10% by weight aqueous sodium hydroxide solution.

2) 2 mol of MSP was suspended in ice-water, diazotized with excess sodium nitrite and hydrochloric acid at pH<1 and 0-5° C. and added to the reaction mixture obtained in step 1). The pH was maintained between 3-8 by addition of 10% by weight aqueous sodium hydroxide solution. After the reaction had ended, the dye was precipitated by addition of NaCl and filtered off with suction.

Proceeding in a manner analogous to example 52a it is possible to obtain the dyes of the general formula $Dk^1$-N═N—P—N═N-$Kk^1$-N═N—R—N═N-$Dk^2$ and their metal complexes (dyes of the general formula XV) wherein $Dk^1$ and $DK^2$ represent a radical derived from the diazo components DK1 to DK83 or from A1 to A12, at least one of the radicals $Dk^1$ or $Dk^2$ representing a radical of formula A, Kk represents a bivalent radical derived from Kk2, Kk3, Kk5, Kk49 or Kk50 and P and R each represent a bivalent radical of the formulae II-1, II-3, II-5, II-7, II-9, II-11 and II-13 derived divalent radical. Examples thereof are reported in table 15.

TABLE 15

| Example No. | $Dk^1$ | P | $Kk^1$ | R | $Dk^2$ | Metal |
|---|---|---|---|---|---|---|
| 52a | A1 | DK44 | Kk50 | DK44 | A1 | |
| 52b | A1 | DK44 | Kk50 | DK44 | A1 | Cu |
| 52c | A1 | DK44 | Kk50 | DK44 | A1 | Co |
| 52d | A1 | DK44 | Kk49 | DK44 | A1 | Cu |
| 52e | A1 | DK44 | Kk49 | DK44 | A1 | Co |

Example 53a

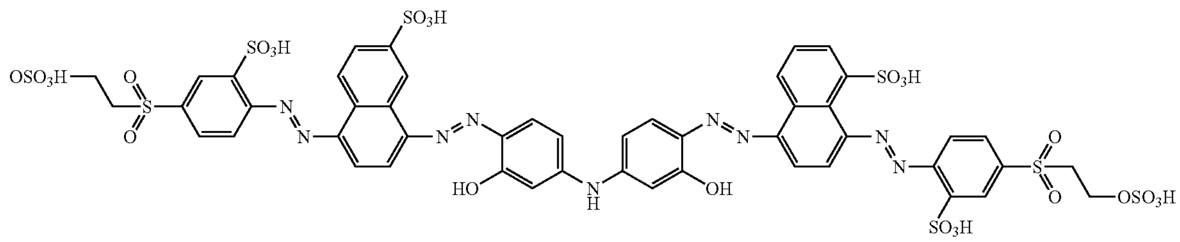

1) 1 mol of MSP was suspended in ice-water, diazotized with excess sodium nitrite and hydrochloric acid at pH<1 and 0-5° C. and added to an alkaline solution of 1 mol of Cleve's acid 7. The pH was maintained between 3 and 8 by addition of 10% by weight aqueous sodium hydroxide solution.

2) 1 mol of MSP was suspended in ice-water, diazotized with excess sodium nitrite and hydrochloric acid at pH<1 and 0-5° C. and added to an alkaline solution of 1 mol of 8-aminonaphthalene-1-sulfonic acid (Dk56). The pH was maintained between 3 and 8 by addition of 10% by weight aqueous sodium hydroxide solution.

TABLE 16

| Example No. | $Dk^1$ | P | $Kk^1$ | R | $Dk^2$ | Metal |
|---|---|---|---|---|---|---|
| 53a | A1 | DK46 | Kk50 | DK56 | A1 | |
| 53b | A1 | DK4 | Kk49 | DK46 | A1 | Cu |
| 53c | A1 | DK4 | Kk49 | DK46 | A1 | Co |
| 53d | A1 | DK4 | Kk50 | DK46 | A1 | Cu |

Example 54

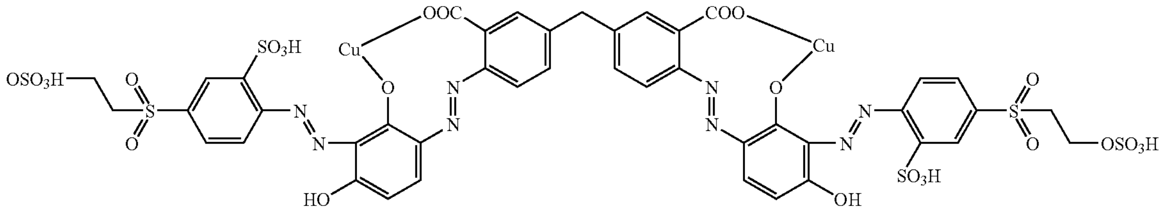

3) The product obtained in step 1) was diazotized at pH<1 and 0-5° C. with excess sodium nitrite and hydrochloric acid and added in the course of 30 min to an alkaline solution of 1 mol of 3,3'-dihydroxydiphenylamines. The pH was maintained between 3 and 8 by addition of 10% by weight aqueous sodium hydroxide solution.

4) The product obtained in step 2) was diazotized at pH<1 and 0-5° C. with excess sodium nitrite and hydrochloric acid and added to the reaction mixture obtained in step 3) while the pH was maintained between 5 and 8 by addition of 10% by weight aqueous sodium hydroxide solution. After the reaction had ended, the dye was precipitated by addition of NaCl and filtered off with suction.

Proceeding in a manner analogous to example 53a it is possible to obtain the dyes of the general formula $Dk^1$-N═N—P—N═N-$Kk^1$-N═N—R—N═N-$Dk^2$ and their metal complexes (dyes of the general formula XV) wherein $Dk^1$ and $DK^2$ represent a radical derived from the diazo components DK1 to DK83 or from A1 to A12, at least one of the radicals $Dk^1$ or $Dk^2$ representing a radical of formula A, Kk represents a bivalent radical derived from Kk2, Kk3, Kk5, Kk49 or Kk50 and P and R each represent a bivalent radical of the formulae II-15 or II-16 or a divalent radical derived from the diazo components DK3, DK4, DK6, DK7, DK11, DK13, DK14, DK15, DK18, DK22 to DK27, DK29, DK30, DK33, DK36, DK38, or DK39. Examples thereof are reported in table 16.

1) 2 mol of anthranilic acid was dissolved in sulfuric acid (96%) at 70-80° C. and reacted with 0.5-0.6 mol of formaldehyde. After 2 hours at 70-80° C. the reaction mixture was cooled to about 0° C. by addition of ice and the product obtained was tetrazotized with excess sodium nitrite and hydrochloric acid at pH<1 and 0-5° C. 1.8-2.2 mol of resorcinol was dissolved in 50% by weight aqueous sodium hydroxide solution at pH>12 and this solution was admixed with the tetrazotized compound added dropwise at below 5° C. in the course of 30 min during which the pH was maintained above 8 by addition of 10% by weight aqueous sodium hydroxide solution.

2) 2 mol of MSP was suspended in ice-water, diazotized with excess sodium nitrite and hydrochloric acid at pH<1 and 0-5° C. and added to the reaction mixture obtained in step 1). The pH was maintained between 3 and 8 by addition of 10% by weight aqueous sodium hydroxide solution. After the reaction had ended, the reaction solution was heated to 80° C. and 2 mol of $CuSO_4$ were added. Subsequently, the reaction mixture obtained was evaporated to obtain the complexed dye.

Example 55

The reaction was carried out in accordance with the method described in example 54 except that there was no subsequent reaction with copper salts.

Example 56

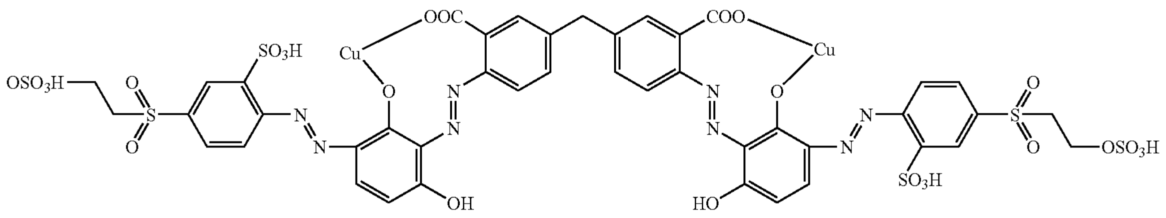

1) 2 mol of anthranilic acid was dissolved in sulfuric acid (96%) at 70-80° C. and reacted with 0.5-0.6 mol of formaldehyde. After 2 hours at 70-80° C. the reaction mixture was cooled to about 0° C. by addition of ice and the product obtained was tetrazotized with excess sodium nitrite and hydrochloric acid at pH<1 and 0-5° C.

2) 2 mol of MSP was suspended in ice-water, diazotized with excess sodium nitrite and hydrochloric acid at pH<1 and 0-5° C. 2 mol of resorcinol was dissolved in 50% by weight aqueous sodium hydroxide solution. The diazotized MSP was added dropwise to this at below 10° C. within 30 min during which the pH was maintained between 6 and 8 by addition of 10% by weight aqueous sodium hydroxide solution.

3) The reaction mixture obtained in step 1) was added to the reaction mixture obtained in step 2). The pH was maintained between 3 and 8 by addition of 10% by weight aqueous sodium hydroxide solution. After the reaction had ended, the reaction solution was heated to 80° C. and 2 mol of $CuSO_4$ were added. Subsequently, the reaction mixture obtained was evaporated to dryness to obtain the complexed dye.

Example 57

The reaction was carried out in accordance with the method described in example 56a except that there was no subsequent reaction with copper salts.

Proceeding in a manner analogous to examples 54 and 56 it is possible to obtain the metal complexes of the dyes of the general formula $Dk^1$-N═N-$Kk^1$-N═N-$Tk^1$-N═N-$Kk^2$-N═N-$Dk^2$ (dyes of the general formula IV) wherein $Dk^1$ and $Dk^2$ represent a radical derived from the diazo components DK1 to DK83 or from A1 to A12, at least one of the radicals $Dk^1$ or $Dk^2$ representing a radical of formula A, $Tk^1$ represents a bivalent radical derived from Tk3, Tk4, Tk8 to Tk11, Tk14, Tk16 or Tk19 and $Kk^1$ and also $Kk^2$ independently represent a bivalent radical derived from Kk2, Kk3, Kk5, Kk49 or Kk50 or a bivalent radical of the formulae II-2, II-4, II-6, II-8, II-10, II-12 or II-14.

Proceeding in a manner analogous to examples 55 and 57 it is possible to obtain the dyes of the general formula $Dk^1$-N═N-$Kk^1$-N═N-$Tk^1$-N═N-$Kk^2$-N═N-$Dk^2$ (dyes of the general formula IV) wherein $Dk^1$ and $Dk^2$ represent a radical derived from the diazo components DK1 to DK83 or from A1 to A12, at least one of the radicals $Dk^1$ or $Dk^2$ representing a radical of formula A, $Tk^1$ represents a bivalent radical derived from Tk1 to Tk20, and $Kk^1$ and also $Kk^2$ independently represent a bivalent radical derived from Kk2, Kk3, Kk5, Kk49 or Kk50 or a bivalent radical of the formulae II-2, II-4, II-6, II-8, II-10, II-12 or II-14.

Example 58

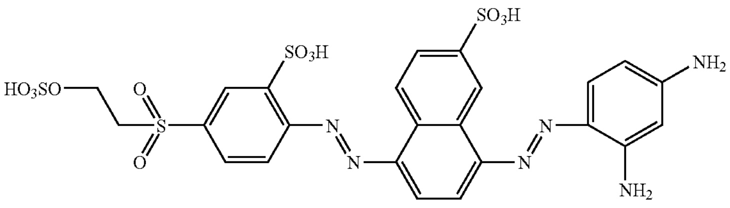

1) 1 mol of Cleve's acid 7 was dissolved in 25% by weight aqueous sodium hydroxide solution. At the same time, 1 mol of MSP was suspended in ice-water and diazotized with excess sodium nitrite and hydrochloric acid at pH<1 and 0-5° C. and subsequently added to the solution of the Cleve's acid 7 while the pH was maintained below 2.

2) The product obtained in step 1) was diazotized with excess sodium nitrite and hydrochloric acid at pH<1 and 0-5° C. and subsequently reacted with 1 mol of metamine at pH 3-8. After the reaction had ended, the dye was precipitated by addition of NaCl and filtered off with suction.

Proceeding in a manner analogous to example 58 it is possible to obtain the dyes of the general formula A-N═N-Napht-N═N-Kk (=dyes of the general formula I where P=Napht, p=1 and m=0) wherein Napht represents a radical derived from DK42 to DK59, Kk represents a radical derived from Kk1 to Kk48 or Kk51 to Kk67 and A represents one of the radicals A1 to A12. Examples thereof are reported in table 17.

TABLE 17

| Example No. | A | Napht | Kk |
|---|---|---|---|
| 58a | A1 | Dk46 | Kk5 |
| 58b | A1 | Dk46 | Kk27 |
| 58c | A1 | Dk44 | Kk27 |

Example 59a

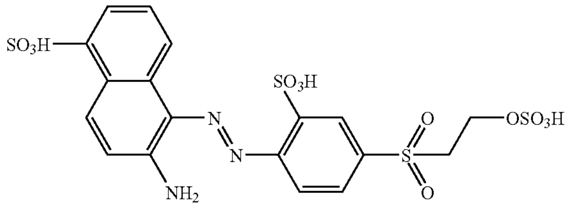

1 mol of Cleve's acid 7 was dissolved in 25% by weight aqueous sodium hydroxide solution. At the same time, 1 mol of MSP was suspended in ice-water and diazotized with excess sodium nitrite and hydrochloric acid at pH<1 and 0-5° C. and subsequently added to the solution of the Cleve's acid 7 while the pH was maintained below 2. After the reaction had ended, the dye solution was spray dried.

Proceeding in a manner analogous to example 59a it is possible to obtain the dyes of the general formula A-N═N-Kk (=dyes of the general formula I where p=m=0) wherein Kk represents a radical derived from Kk1 to Kk48, Kk51 to Kk67 or from DK3, DK4, DK6, DK7, DK11, DK13, DK14, DK15, DK18, DK21 to DK27, DK29, DK30, DK33, DK36, DK38, DK39, or Dk42 to Dk83 and A represents one of the radicals A1 to A12. Depending on the pH of the reaction, the coupling of the radical A-N═N— can take place not only ortho to the hydroxyl group but also ortho to the amino group in Dk42 to Dk57 and in Dk59. Examples thereof are reported in table 18.

TABLE 18

| Example No. | A | Napht |
|---|---|---|
| 59a | A1 | DK47 |
| 59b | A1 | Kk32 |
| 59c | A1 | DK44 |
| 59d | A1 | Kk15 |
| 59e | A1 | DK42 |
| 59f | A7 | DK42 |
| 59g | A7 | DK47 |
| 59h | A7 | Kk46 |
| 59i | A7 | DK52 |
| 59j | A4 | DK52 |
| 59k | A4 | DK47 |

Dyeing Prescriptions:

Parts are by weight. All data relating to tanning materials, hydrophobicizers, fatliquors and auxiliaries are based on commercially available products. The data regarding dye are based on the total amount of colored, organochemical constituents, any salts present because of the conditions of the synthesis (synthesis salts) and any standardizers present.

The fixation yield was determined qualitatively by HPLC analysis and quantitatively by UV-VIS spectroscopy of the dyeing float. To this end, 5 ml samples were taken after the dyeing (pH<7), after 60 min, 120 min, 180 min of fixation (pH>7) and of every wash liquor float and adjusted to pH 34 with 1 ml of formic acid solution. The samples were analyzed for dye and its hydrolysis products by HPLC. The HPLC columns used were Nucleodur C18 Gravity 3μ, CC70/2 and Hypersil 120-5 ODS, CC100/2 from Macherey-Nagel. The eluent used was acetonitrile/buffer (1.6 g of tetrabutylammonium hydrogensulfate, 6 g of dipotassium hydrogenphosphate trihydrate in 1 L of water).

Fastnesses were determined according to the following, internationally recognized standards:

Perspirationfastness: on the lines of Veslic C4260

Washfastness: on the lines of DIN EN ISO 15703

Migrationfastness: on the lines of DIN EN ISO 15701 and also by 16 h storage at 85° C. in a humidity of 95% under otherwise analogous conditions to DIN EN ISO 15701

Rubfastness: on the lines of DIN EN ISO 105-X12 (Crockmeter, rubbing with woven cotton) and also on the lines of DIN EN ISO 11640 (Veslic, rubbing with felt)

Maeser: on the lines of ASTM D 2099

Penetrometer: on the lines of DIN EN ISO 5403

Water vapor permeability: on the lines of DIN EN ISO 14268

Flex resistance: on the lines of DIN EN ISO 5402

Stitch pullout test: on the lines of DIN 5331

Tear strength: on the lines of DIN EN ISO 3377

Tensile strength: on the lines of DIN EN ISO 3376

Dyeing Prescription 1:

a) A piece of 100 parts by weight of a conventionally organic-tanned cattlehide leather 1.1 mm in shaved thickness was washed at 30° C. for 20 minutes in a drum filled with 200 parts of water. This was followed by dyeing using 150 parts of water, 2 parts of a dispersant and 5 parts of dye from example 2d at pH 4.4 and 30° C. for 60 minutes. The pH was maintained between 10.0 and 10.2 at 40° C. by portionwise addition of 100 parts of 15% sodium carbonate solution to fix the dye in the course of 60 minutes of drumming. This was followed by 6 10 minute washes in 200 parts of water at 40° C. A pH of 4.7 was set by adding 200 parts of water and 0.7 part of formic acid.

b) The leather thus dyed was retanned in a freshly set float composed of 100 parts of water, 2 parts of polymeric tanning material and 2 parts of a naturally based fatliquor at 35° C. for 30 minutes. The float was then admixed with 15 parts of a liquid synthetic tanning material, 6 parts of polymeric tanning material, 10 parts of Tara vegetable tanning material and drummed for 20 minutes. The leather was subsequently fatliquored in the same float with 8 parts of a fishoil-based fatliquor and 2 parts of a lecithin-based fatliquor at 35° C. by drumming for 2 hours. Finally, the leather was acidified to pH 3.6 with 2 parts of concentrated formic acid and drummed twice for 10 minutes and once for 30 minutes. The dyed, retanned and fatliquored leather was additionally rinsed with cold water at 15° C. for 10 minutes and subsequently set out, suspension dried at room temperature overnight, conditioned, staked and strained.

The leather obtained had a brilliant deep red color having excellent wash-, perspiration-, rub- and migrationfastness.

Dyeing Prescription 2:

a) A piece of 100 parts by weight of a conventionally organic-tanned cattlehide leather 1.1 mm in shaved thickness was washed at 30° C. for 20 minutes in a drum filled with 200 parts of water. This was followed by dyeing using 150 parts of water, 2 parts of a dispersant and 5 parts of dye from example 2a at pH 4.4 and 30° C. for 60 minutes. The pH was maintained at 10.0 at 40° C. by portionwise addition of 15 parts of solid sodium carbonate to fix the dye in the course of 60 minutes of drumming. This was followed by 4 10 minute washes in 200 parts of water at 40° C. A pH of 4.7 was set by adding 200 parts of water and 0.7 part of formic acid. This was followed by treatment as described in part b) of dyeing prescription 1.

The leather obtained had a brilliant deep red color having excellent wash-, perspiration-, rub- and migrationfastness.

Dyeing Prescription 3:

a) A piece of 100 parts by weight of a conventionally organic-tanned cattlehide leather 1.1 mm in shaved thickness was washed at 30° C. for 20 minutes in a drum filled with 200 parts of water. This was followed by dyeing using 150 parts of water, 2 parts of a dispersant and 5 parts of dye from example 24 at pH 4.4 and 30° C. for 60 minutes. The pH was maintained at 10.0 at 50° C. by portionwise addition of 100 parts of 15% sodium carbonate solution to fix the dye in the course of 60 minutes of drumming. This was followed by 4 10 minute washes in 200 parts of water at 40° C. A pH of 4.7 was set by adding 200 parts of water and 0.7 part of formic acid. This was followed by treatment as described in part b) of dyeing prescription 1.

The leather obtained had a brilliant deep red color having excellent wash-, perspiration-, rub- and migrationfastness.

Dyeing Prescription 4:

A piece of 100 parts by weight of a conventionally organic-tanned cattlehide leather 1.1 mm in shaved thickness was washed at 30° C. for 20 minutes in a drum filled with 200 parts of water. This was followed by dyeing using 150 parts of water, 2 parts of a dispersant and 5 parts of dye from example 58a at pH 4.4 and 30° C. for 60 minutes. The pH was maintained at 10.0 at 40° C. by portionwise addition of 100 parts of 15% sodium carbonate solution to fix the dye in the course of 90 minutes of drumming. This was followed by 3 10 minute washes in 200 parts of water at 40° C. A pH of 4.7 was set by adding 200 parts of water and 0.7 part of formic acid. This was followed by treatment as described in part b) of dyeing prescription 1.

The leather obtained had a brilliant deep red color having excellent wash-, perspiration-, rub- and migrationfastness.

Dyeing Prescription 5:

A piece of 100 parts by weight of a conventionally organic-tanned cattlehide leather 1.1 mm in shaved thickness was washed at 30° C. for 20 minutes in a drum filled with 200 parts of water. This was followed by dyeing using 150 parts of water, 2 parts of a dispersant and 5 parts of dye from example 58b at pH 4.4 and 30° C. for 60 minutes. The pH was maintained at 10.0 at 40° C. by portionwise addition of 100 parts of 15% sodium carbonate solution to fix the dye in the course of 60 minutes of drumming. Concurrently with the addition of sodium carbonate solution, a total of 15 parts of Glauber salt was added in 3 portions. This was followed by 5 10 minute washes in 200 parts of water at 40° C. A pH of 4.7 was set by adding 200 parts of water and 0.7 part of formic acid. This was followed by treatment as described in part b) of dyeing prescription 1.

The leather obtained had a brilliant deep red color having excellent wash-, perspiration-, rub- and migrationfastness.

Dyeing Prescription 6:

A piece of 100 parts by weight of a conventionally organic-tanned cattlehide leather 1.0 mm in shaved thickness was washed at 30° C. for 20 minutes in a drum filled with 200 parts of water. This was followed by dyeing using 150 parts of water, 2 parts of a dispersant and 5 parts of dye from example 59a at pH 4.1 and 30° C. for 60 minutes.

The pH was maintained between 7.9 and 9.0 at 40° C. by portionwise addition of 100 parts of a borax buffer to fix the dye in the course of 180 minutes of drumming. This was followed by 5 10 minute washes in 200 parts of water at 40° C. A pH of 4.3 was set by adding 200 parts of water and 0.6 part of formic acid. This was followed by treatment as described in part b) of dyeing prescription 1.

The leather obtained had a brilliant deep red color having excellent wash-, perspiration-, rub- and migrationfastness.

Dyeing Prescription 7:

A piece of 100 parts by weight of a conventionally organic-tanned cattlehide leather 1.0 mm in shaved thickness was washed at 30° C. for 20 minutes in a drum filled with 200 parts of water. This was followed by dyeing using 150 parts of water, 2 parts of a dispersant and 5 parts of dye from example 59e at pH 4.1 and 30° C. for 60 minutes. The pH was maintained between 9.4-9.9 at 40° C. by single addition of 30 parts of 15% sodium carbonate solution to fix the dye in the course of 180 minutes of drumming. This was followed by 3 10 minute washes in 200 parts of water at 40° C. A pH of 4.5 was set by adding 200 parts of water and 0.7 part of formic acid. This was followed by treatment as described in part b) of dyeing prescription 1.

The leather obtained had a brilliant deep red color having excellent wash-, perspiration-, rub- and migrationfastness.

Dyeing Prescription 8:

A piece of 100 parts by weight of a conventionally organic-tanned cattlehide leather 1.0 mm in shaved thickness was washed at 30° C. for 20 minutes in a drum filled with 200 parts of water. This was followed by dyeing using 150 parts of water, 2 parts of a dispersant and 5 parts of dye from example 2b at pH 4.1 and 30° C. for 60 minutes. The pH was maintained between 8.0 and 9.0 at 40° C. by portionwise addition of 100 parts of a borax buffer to fix the dye in the course of 180 minutes of drumming. This was followed by 3 10 minute washes in 200 parts of water at 40° C. A pH of 4.5 was set by adding 200 parts of water and 0.7 part of formic acid. This was followed by treatment as described in part b) of dyeing prescription 1.

The leather obtained had a deep blue color having excellent wash-, perspiration-, rub- and migrationfastness.

Dyeing Prescription 9:

A piece of 100 parts by weight of a conventionally organic-tanned cattlehide leather 1.0 mm in shaved thickness was washed at 30° C. for 20 minutes in a drum filled with 200 parts of water. This was followed by dyeing using 150 parts of water, 2 parts of a dispersant and 5 parts of dye from example 2k at pH 4.2 and 30° C. for 60 minutes. The pH was maintained between 9.4-9.9 at 40° C. by single addition of 30 parts of 15% sodium carbonate solution to fix the dye in the course of 180 minutes of drumming. This was followed by 3 10 minute washes in 200 parts of water at 40° C. A pH of 4.8 was set by adding 200 parts of water and 0.7 part of formic acid. This was followed by treatment as described in part b) of dyeing prescription 1.

The leather obtained had a deep blue color having excellent wash-, perspiration-, rub- and migrationfastness.

Dyeing Prescription 10:

A piece of 100 parts by weight of a conventionally organic-tanned cattlehide leather 1.0 mm in shaved thickness was washed at 30° C. for 20 minutes in a drum filled with 200 parts of water. This was followed by dyeing using 100 parts of water, 2 parts of a dispersant and 5 parts of dye from example 11a at pH 4.2 and 30° C. for 30 minutes. The pH was maintained between 8.6-9.3 at 40° C. by portionwise addition of 20 parts of 15% sodium carbonate solution to fix the dye in the course of 180 minutes of drumming. This was followed by 3 10 minute washes in 200 parts of water at 40° C. A pH of 4.8 was set by adding 200 parts of water and 0.7 part of formic acid. This was followed by treatment as described in part b) of dyeing prescription 1.

The leather obtained had a deep bordeaux color having excellent wash-, perspiration-, rub- and migrationfastness.

Dyeing Prescription 11:

A piece of 100 parts by weight of a conventionally organic-tanned cattlehide leather 1.0 mm in shaved thickness was washed at 30° C. for 20 minutes in a drum filled with 200 parts of water. This was followed by dyeing using 150 parts of water, 2 parts of a dispersant and 5 parts of dye from example 12ae at pH 4.3 and 30° C. for 45 minutes. The pH was maintained between 7.3-8.2 at 40° C. by portionwise addition of 40 parts of 7% sodium bicarbonate solution to fix the dye in the course of 240 minutes of drumming. This was followed by 6 10 minute washes in 200 parts of water at 40° C. A pH of 3.9 was set by adding 200 parts of water and 1.2 parts of formic acid. This was followed by treatment as described in part b) of dyeing prescription 1.

The leather obtained had a brilliant deep blue color having excellent wash-, perspiration-, rub- and migrationfastness.

Dyeing Prescription 12:

A piece of 100 parts by weight of a conventionally organic-tanned cattlehide leather 1.0 mm in shaved thickness was washed at 30° C. for 20 minutes in a drum filled with 200 parts of water. This was followed by dyeing using 150 parts of water, 2 parts of a dispersant and 5 parts of dye from example 13c at pH 4.1 and 30° C. for 30 minutes. The pH was adjusted to between 7.9-8.1 by portionwise addition of 40 parts of 7% sodium bicarbonate solution to fix the dye and drumming was carried out for 60 minutes, then 15 parts of Glauber salt were added in three portions and drumming was continued at pH 8.1-9.0 for a further 120 minutes. This was followed by 3 10 minute washes in 200 parts of water at 40° C. A pH of 3.8 was set by adding 200 parts of water and 1.0 part of formic acid. This was followed by treatment as described in part b) of dyeing prescription 1.

The leather obtained had a dark green color having excellent wash-, perspiration-, rub- and migrationfastness.

Dyeing Prescription 13:

A piece of 100 parts by weight of a conventionally organic-tanned cattlehide leather 1.0 mm in shaved thickness was washed at 30° C. for 20 minutes in a drum filled with 200 parts of water. This was followed by dyeing using 150 parts of water, 2 parts of a dispersant and 5 parts of dye from example 12n at pH 4.2 and 30° C. for 45 minutes. The pH was adjusted to between 8.4-9.2 by portionwise addition of 20 parts of 15% sodium carbonate solution to fix the dye and drumming was carried out for 120 minutes. This was followed by 2 10 minute washes in 200 parts of water at 40° C. A pH of 3.9 was set by adding 200 parts of water and 1.1 parts of formic acid. This was followed by treatment as described in part b) of dyeing prescription 1.

The leather obtained had a black color having excellent wash-, perspiration- and migrationfastness.

Dyeing Prescription 14:

A piece of 100 parts by weight of a conventionally organic-tanned cattlehide leather 1.0 mm in shaved thickness was washed at 30° C. for 20 minutes in a drum filled with 200 parts of water. This was followed by dyeing using 150 parts of water, 2 parts of a dispersant and 5 parts of dye from example 13i at pH 4.2 and 30° C. for 60 minutes. The pH was adjusted to between 8.8-9.3 by portionwise addition of 21 parts of 15% sodium carbonate solution to fix the dye and drumming was carried out for 180 minutes. This was followed by 6 10 minute washes in 200 parts of water at 40° C. A pH of 4.5 was set by adding 200 parts of water and 0.7 part of formic acid. This was followed by treatment as described in part b) of dyeing prescription 1.

The leather obtained had a dark green color having excellent wash-, perspiration-, rub- and migrationfastness.

Dyeing Prescription 15:

A piece of 100 parts by weight of a conventionally organic-tanned cattlehide leather 1.0 mm in shaved thickness was washed at 30° C. for 20 minutes in a drum filled with 200 parts of water. This was followed by dyeing using 150 parts of water and 5 parts of dye from example 59e at pH 4.1 and 30° C. for 60 minutes. The pH was adjusted to between 8.8-9.3 by portionwise addition of 21 parts of 15% sodium carbonate solution to fix the dye and drumming was carried out for 180 minutes. This was followed by 6 minute washes in 200 parts of water at 40° C. A pH of 4.5 was set by adding 200 parts of water and 0.7 part of formic acid. This was followed by treatment as described in part b) of dyeing prescription 1.

The leather obtained had a brilliant deep red color having excellent wash-, perspiration-, rub- and migrationfastness.

Dyeing Prescription 16:

A piece of 100 parts by weight of a conventional chrome-tanned cattlehide leather 1.8 mm in shaved thickness was washed at 35° C. for 10 minutes in a drum filled with 200 parts of water and 0.1 part of formic acid and subsequently neutralized at 35° C. for 120 minutes in a float consisting of 100 parts of water, 2 parts of sodium formate, 1 part of sodium acetate, 0.5 part of sodium bicarbonate and 1 part of a dispersant. The deacidifying float then had a pH of 5.0. The leather was then washed with 200 parts of water at 35° C. for 10 minutes. The leather thus neutralized was retanned in a freshly set float composed of 30 parts of water and 2 parts of a polymeric tanning material at 30° C. for 30 minutes. The float was subsequently admixed with 2 parts of a hydrophobicizing fatliquor. Following a drumming time of a further 30 minutes 5 parts of a sulfone type tanning material and 4 parts of a resin type tanning material were added before drumming for a further 60 minutes. Finally, the leather was acidified to pH 4.0 with 0.5% formic acid and drummed once for 10 minutes and once for 30 minutes.

The leather was dyed for 90 minutes at pH 4.8 and 35° C. in a freshly set float composed of 150 parts of water, 2 parts of a dispersant, 5 parts of dye from example 59f and 0.2 part of sodium bicarbonate. The pH was adjusted to between 9.0-9.3 by portionwise addition of 40 parts of 15% sodium carbonate solution to fix the dye and drumming was carried out at 40° C. for 180 minutes. This was followed by 6 minute washes in 200 parts of water at 40° C. A pH of 4.5 was set by adding 200 parts of water and 0.7 part of formic acid.

The leather was fatliquored by drumming for 40 minutes at 55° C. in a new float consisting of 100 parts of water, 4.5 parts of a mixed fatliquor based on sulfited fishoil and synthetic oil, 0.5 part of a lanolin-based fatliquor. This was followed by acidification to pH 3.5 with 1.5 parts of concentrated formic acid and drumming for 40 minutes. The dyed and fatliquored leather was additionally rinsed for 10 minutes with cold water at 15° C. and then set out, suspension dried at room temperature overnight, conditioned, staked and strained.

The leather obtained had a brilliant deep red color having excellent wash-, perspiration-, rub- and migrationfastness.

Dyeing Prescription 17:

A piece of 100 parts by weight of a conventional chrome-tanned cattlehide leather 1.8 mm in shaved thickness was washed at 35° C. for 10 minutes in a drum filled with 200 parts of water and 0.1 part of formic acid and subsequently neutralized at 35° C. for 120 minutes in a float consisting of 100 parts of water, 2 parts of sodium formate, 1 part of sodium acetate, 1.5 parts of sodium bicarbonate and 1 part of a dispersant. The deacidifying float then had a pH of 6.3. The leather was then washed with 200 parts of water at 35° C. for 10 minutes.

The leather was dyed for 60 minutes at pH 5.6 and 30° C. in a freshly set float composed of 150 parts of water and 5 parts of dye from example 35g. The pH of the float was adjusted to between 8.5-9.1 by portionwise addition of 13 parts of 15% sodium carbonate solution, which was followed by drumming at 40° C. for 180 minutes. This was followed by 3 10 minute washes in 200 parts of water at 40° C. A pH of 4.8 was set by adding 200 parts of water and 1.5 parts of formic acid.

The leather thus dyed was retanned for 30 minutes at 30° C. in a freshly set float composed of 30 parts of water and 2 parts of a polymeric tanning material. The float was subsequently admixed with 2 parts of a hydrophobicizing fatliquor. Following a drumming time of a further 30 minutes 5 parts of a sulfone type tanning material and 4 parts of a resin type tanning material were added before drumming for a further 60 minutes. Finally, the leather was acidified to pH 4.4 with 0.5 part of formic acid and drummed once for 10 minutes and once for 30 minutes. Following a 10 minute wash with 100 parts of water the leather was fatliquored in a new float consisting of 100 parts of water, 4.5 parts of a mixed fatliquor based on sulfited fishoil and synthetic oil, 0.5 part of a lanolin-based fatliquor by drumming at 55° C. for 40 minutes. This was followed by acidification to pH 3.5 with 1.5 parts of concentrated formic acid and drumming for 40 minutes. The dyed and fatliquored leather was additionally rinsed for 10 minutes with cold water at 15° C. and then set out, suspension dried at room temperature overnight, conditioned, staked and strained.

The leather obtained had a deep brown color having excellent wash-, perspiration-, rub- and migrationfastness.

Dyeing Prescription 18:

A piece of 100 parts by weight of a conventional chrome-tanned cattlehide leather 1.8 mm in shaved thickness was washed at 35° C. for 10 minutes in a drum filled with 200 parts of water and 0.1 part of formic acid and subsequently neutralized at 35° C. for 120 minutes in a float consisting of 100 parts of water, 2 parts of sodium formate, 1 part of sodium acetate, 1.5 parts of sodium bicarbonate and 1 part of a dispersant. The deacidifying float then had a pH of 6.5. The leather was then washed with 200 parts of water at 35° C. for 10 minutes.

The leather was dyed for 45 minutes at pH 5.9 and 30° C. in a freshly set float composed of 150 parts of water and 5 parts of dye from example 35h. The pH of the float was adjusted to between 8.8-9.6 by portionwise addition of 15 parts of 15% sodium carbonate solution, which was followed by drumming at 50° C. for 120 minutes. This was followed by 3 10 minute washes in 200 parts of water at 40° C. A pH of 5.1 was set by adding 200 parts of water and 0.5 part of formic acid.

The leather thus dyed was retanned for 30 minutes at 30° C. in a freshly set float composed of 30 parts of water and 2 parts of a polymeric tanning material. The float was subsequently admixed with 2 parts of a hydrophobicizing fatliquor. Following a drumming time of a further 30 minutes 5 parts of a sulfone type tanning material and 4 parts of a resin type tanning material were added before drumming for a further 60 minutes. Finally, the leather was acidified to pH 4.1 with 1.0 part of formic acid and drummed once for 10 minutes and once for 30 minutes. Following a 10 minute wash with 200 parts of water the leather was fatliquored in a new float consisting of 100 parts of water, 4.5 parts of a mixed fatliquor based on sulfited fishoil and synthetic oil, 0.5 part of a lanolin-based fatliquor by drumming at 55° C. for 40 minutes. This was followed by acidification to pH 3.3 with 1.5 parts of concentrated formic acid and drumming for 40 minutes. The dyed and fatliquored leather was additionally rinsed for 10 minutes with cold water at 15° C. and then set out, suspension dried at room temperature overnight, conditioned, staked and strained.

The leather obtained had a dark brown color having excellent wash-, perspiration-, rub- and migrationfastness.

Dyeing Prescription 19:

A piece of 100 parts by weight of a conventional chrome-tanned cattlehide leather 1.8 mm in shaved thickness was washed at 35° C. for 10 minutes in a drum filled with 200 parts of water and 0.1 part of formic acid and subsequently neutralized at 35° C. for 120 minutes in a float consisting of 100 parts of water, 2 parts of sodium formate, 1 part of sodium acetate, 1.5 parts of sodium bicarbonate and 1 part of a dispersant. The deacidifying float then had a pH of 6.6. The leather was then washed with 200 parts of water at 35° C. for 10 minutes.

The leather was dyed for 60 minutes at pH 6.0 and 30° C. in a freshly set float composed of 150 parts of water and 5 parts of dye from example 12a. The pH of the float was adjusted to between 8.8-9.8 by portionwise addition of 18 parts of 15% sodium carbonate solution. This was followed by drumming at 50° C. for 120 minutes. This was followed by 2 10 minute washes in 200 parts of water at 40° C. A pH of 5.0 was set by adding 200 parts of water and 0.5 part of formic acid.

The leather thus dyed was retanned for 30 minutes at 30° C. in a freshly set float composed of 30 parts of water and 2 parts of a polymeric tanning material. The float was subsequently admixed with 2 parts of a hydrophobicizing fatliquor. Following a drumming time of a further 30 minutes 5 parts of a sulfone type tanning material and 4 parts of a resin type tanning material were added before drumming for a further 60 minutes. Finally, the leather was acidified to pH 4.1 with 1.0 part of formic acid and drummed once for 10 minutes, once for 30 and twice for 20 minutes. Following a 10 minute wash with 200 parts of water the leather was fatliquored in a new float consisting of 100 parts of water, 4.5 parts of a mixed fatliquor based on sulfited fishoil and synthetic oil, 0.5 part of a lanolin-based fatliquor by drumming at 55° C. for 40 minutes. This was followed by acidification to pH 3.4 with 1.5 parts of concentrated formic acid and drumming for 40 minutes. The dyed and fatliquored leather was additionally rinsed for 10 minutes with cold water at 15° C. and then set out, suspension dried at room temperature overnight, conditioned, staked and strained.

The leather obtained had a black color having excellent wash-, perspiration-, rub- and migrationfastness.

Dyeing Prescription 20:

A piece of 100 parts by weight of a conventional chrome-tanned cattlehide leather 1.8 mm in shaved thickness was washed at 35° C. for 10 minutes in a drum filled with 200 parts of water and 0.1 part of formic acid and subsequently neutralized at 35° C. for 120 minutes in a float consisting of 100 parts of water, 2 parts of sodium formate, 1 part of sodium acetate, 1.5 parts of sodium bicarbonate and 1 part of a dispersant. The deacidifying float then had a pH of 6.4. The leather was then washed with 200 parts of water at 35° C. for 10 minutes.

The leather was dyed for 90 minutes at pH 5.7 and 30° C. in a freshly set float composed of 150 parts of water and 4.25 parts of dye from example 17h. The pH of the float was adjusted to between 8.6-9.3 by portionwise addition of 16 parts of 15% sodium carbonate solution, which was followed by drumming at 50° C. for 180 minutes. This was followed by 3 10 minute washes in 200 parts of water at 40° C. A pH of 4.7 was set by adding 200 parts of water and 0.7 part of formic acid.

The leather thus dyed was retanned for 30 minutes at 30° C. in a freshly set float composed of 30 parts of water and 2 parts of a polymeric tanning material. The float was subsequently admixed with 2 parts of a hydrophobicizing fatliquor. Following a drumming time of a further 30 minutes 5 parts of a sulfone type tanning material and 4 parts of a resin type tanning material were added before drumming for a further 60 minutes. Finally, the leather was acidified to pH 4.7 with 0.5 part of formic acid and drummed once for 10 minutes and once for 30 minutes. Following a 10 minute wash with 200 parts of water at 40° C. the leather was fatliquored in a new float consisting of 100 parts of water, 4.5 parts of a mixed fatliquor based on sulfited fishoil and synthetic oil, 0.5 part of a lanolin-based fatliquor by drumming at 55° C. for 40 minutes. This was followed by acidification to pH 3.7 with 1.5 parts of concentrated formic acid and drumming for 40 minutes. The dyed and fatliquored leather was additionally rinsed for 10 minutes with cold water at 15° C. and then set out, suspension dried at room temperature overnight, conditioned, staked and strained.

The leather obtained had a black color having excellent wash-, perspiration-, rub- and migrationfastness.

Dyeing Prescription 21:

A piece of 100 parts by weight of a conventional chrome-tanned cattlehide leather 1.8 mm in shaved thickness was washed at 35° C. for 10 minutes in a drum filled with 200 parts of water and 0.1 part of formic acid and subsequently neutralized at 35° C. for 120 minutes in a float consisting of 100 parts of water, 2 parts of sodium formate, 1 part of sodium acetate, 1.5 parts of sodium bicarbonate and 1 part of a dispersant. The deacidifying float then had a pH of 6.4. The leather was then washed with 200 parts of water at 35° C. for 10 minutes.

The leather was dyed for 45 minutes at pH 5.4 and 30° C. in a freshly set float composed of 150 parts of water and 10 parts of dye from example 25. The pH of the float was adjusted to between 8.4-9.1 by portionwise addition of 20 parts of 15% sodium carbonate solution, which was followed by drumming at 50° C. for 120 minutes. This was followed by 2 10 minute washes in 200 parts of water at 40° C. A pH of 4.6 was set by adding 200 parts of water and 0.7 part of formic acid.

The leather thus dyed was retanned for 30 minutes at 30° C. in a freshly set float composed of 30 parts of water and 2 parts of a polymeric tanning material. The float was subsequently admixed with 2 parts of a hydrophobicizing fatliquor. Following a drumming time of a further 30 minutes 5 parts of a sulfone type tanning material and 4 parts of a resin type tanning material were added before drumming for a further 60 minutes. Finally, the leather was acidified to pH 4.7 with 0.5 part of formic acid and drummed once for 10 minutes and once for 30 minutes. Following a 10 minute wash with 200 parts of water at 40° C. the leather was fatliquored in a new float consisting of 100 parts of water, 4.5 parts of a mixed fatliquor based on sulfited fishoil and synthetic oil, 0.5 part of a lanolin-based fatliquor by drumming at 55° C. for 40 minutes. This was followed by acidification to pH 3.7 with 1.5 parts of concentrated formic acid and drumming for 40 minutes. The dyed and fatliquored leather was additionally rinsed for 15 minutes with cold water at 15° C. and then set out, suspension dried at room temperature overnight, conditioned, staked and strained.

The leather obtained had a deep black color having excellent wash-, perspiration-, rub- and migrationfastness.

Dyeing Prescription 22:

A piece of 100 parts by weight of a conventionally organic-tanned cattlehide leather 1.0 mm in shaved thickness was washed at 30° C. for 20 minutes in a drum filled with 200 parts of water. This was followed by dyeing using a float consisting of 150 parts of water, 2 parts of a dispersant and 10 parts of dye from example 32 at pH 4.3 and 30° C. for 60 minutes. A pH between 8.7 and 9.3 was then set in the float at 40° C. by portionwise addition of 27 parts of 15% sodium carbonate solution and maintained in the course of 180 minutes of drumming. This was followed by 3 10 minute washes in 200 parts of water at 40° C. A pH of 4.2 was set by adding 200 parts of water and 0.7 part of formic acid. The retanning/fatliquoring/mechanical operations were carried out as described in part b) of dyeing prescription 1.

The leather obtained had a deep black color having excellent wash-, perspiration-, rub- and migrationfastness.

Dyeing Prescription 23:

A piece of 100 parts by weight of a conventionally organic-tanned cattlehide leather 1.0 mm in shaved thickness was washed at 30° C. for 20 minutes in a drum filled with 200 parts of water. This was followed by dyeing using a float consisting of 150 parts of water and 10 parts of dye from example 40b at pH 4.3 and 30° C. for 60 minutes. A pH between 8.7 and 9.3 was set in the float at 40° C. by portionwise addition of 27 parts of 15% sodium carbonate solution to fix the dye and maintained in the course of 180 minutes of drumming. This was followed by 3 10 minute washes in 200 parts of water at 40° C. A pH of 4.3 was set by adding 200 parts of water and 0.7 part of formic acid. The retanning/fatliquoring/mechanical operations were carried out as described in part b) of dyeing prescription 1.

The leather obtained had a deep brown color having excellent wash-, perspiration-, rub- and migrationfastness.

Dyeing Prescription 24:

A piece of 100 parts by weight of a conventional chrome-tanned cattlehide leather 1.8 mm in shaved thickness was washed at 35° C. for 10 minutes in a drum filled with 200 parts of water and 0.1 part of formic acid and subsequently neutralized at 35° C. for 120 minutes in a float consisting of 100 parts of water, 2 parts of sodium formate, 1 part of sodium acetate, 1.5 parts of sodium bicarbonate and 1 part of a dispersant. The deacidifying float then had a pH of 6.4. The leather was then washed with 200 parts of water at 35° C. for 10 minutes.

The leather was dyed for 60 minutes at pH 6.1 and 30° C. in a freshly set float composed of 150 parts of water and 4.25 parts of dye from example 42g. The pH of the float was adjusted to between 8.5-9.1 by portionwise addition of 3 parts of 15% sodium carbonate solution, which was followed by drumming at 50° C. for 180 minutes. This was followed by 4 10 minute washes in 200 parts of water at 40° C. A pH of 4.3 was set by adding 200 parts of water and 1.5 parts of formic acid.

The leather thus dyed was retanned for 30 minutes at 30° C. in a freshly set float composed of 30 parts of water and 2 parts of a polymeric tanning material. The float was subsequently admixed with 2 parts of a hydrophobicizing fatliquor. Following a drumming time of a further 30 minutes 5 parts of a sulfone type tanning material and 4 parts of a resin type tanning material were added before drumming for a further 60 minutes. Finally, the leather was acidified to pH 3.8 with 2.0 parts of formic acid and drummed once for 10 minutes and three times for 30 minutes. Following a 10 minute wash with 200 parts of water at 40° C. the leather was fatliquored in a new float consisting of 100 parts of water, 4.5 parts of a mixed fatliquor based on sulfited fishoil and synthetic oil, 0.5 part of a lanolin-based fatliquor by drumming at 55° C. for 40 minutes. This was followed by acidification to pH 3.3 with 1.5 parts of concentrated formic acid and drumming for 40 minutes. The dyed and fatliquored leather was additionally rinsed for 15 minutes with cold water at 15° C. and then set out, subjected to reduced pressure, suspension dried at room temperature overnight, conditioned, staked and strained.

The leather obtained had a deep brown color having excellent wash-, perspiration-, rub- and migrationfastness.

Dyeing Prescription 25:

A piece of 100 parts by weight of a conventionally organic-tanned cattlehide leather 1.0 mm in shaved thickness was washed at 30° C. for 20 minutes in a drum filled with 200 parts of water. This was followed by dyeing using a float consisting of 150 parts of water and 4.25 parts of dye from example 43a at pH 4.2 and 30° C. for 60 minutes. A pH between 8.5 and 9.4 was set in the float at 40° C. by portionwise addition of 30 parts of 15% sodium carbonate solution and maintained in the course of 180 minutes of drumming. This was followed by 2 10 minute washes in 200 parts of water at 40° C. A pH of 4.0 was set by adding 200 parts of water and 1.4 parts of formic acid. The retanning/fatliquoring/mechanical operations were carried out as described in part b) of dyeing prescription 1.

The leather obtained had a brown color having excellent wash-, perspiration-, rub- and migrationfastness.

Dyeing Prescription 26:

A piece of 100 parts by weight of a conventional chrome-tanned cattlehide leather 1.8 mm in shaved thickness was washed at 35° C. for 10 minutes in a drum filled with 200 parts of water and 0.1 part of formic acid and subsequently neutralized at 35° C. for 120 minutes in a float consisting of 100 parts of water, 2 parts of sodium formate, 1 part of sodium acetate, 1.5 parts of sodium bicarbonate and 1 part of a dispersant. The deacidifying float then had a pH of 6.2. The leather was then washed with 200 parts of water at 35° C. for 10 minutes.

The leather was dyed for 60 minutes at pH 5.3 and 30° C. in a freshly set float composed of 150 parts of water and 11.5 parts of dye from example 1c. The pH of the float was adjusted to between 8.8-9.3 by portionwise addition of 28 parts of 15% sodium carbonate solution, which was followed by drumming at 50° C. for 180 minutes. This was followed by 3 10 minute washes in 200 parts of water at 40° C. A pH of 4.5 was set by adding 200 parts of water and 1.0 part of formic acid.

The leather thus dyed was retanned for 30 minutes at 30° C. in a freshly set float composed of 30 parts of water and 2 parts of a polymeric tanning material. The float was subsequently admixed with 2 parts of a hydrophobicizing fatliquor. Following a drumming time of a further 30 minutes 5 parts of a sulfone type tanning material and 4 parts of a resin type tanning material were added before drumming for a further 60 minutes. Finally, the leather was acidified to pH 3.8 with 2.0 parts of formic acid and drummed once for 10 minutes and three times for 30 minutes. Following a 10 minute wash with 200 parts of water at 40° C. the leather was fatliquored in a new float consisting of 100 parts of water, 4.5 parts of a mixed fatliquor based on sulfited fishoil and synthetic oil, 0.5 part of a lanolin-based fatliquor by drumming at 55° C. for 40 minutes. This was followed by acidification to pH 4.0 with 1.5 parts of concentrated formic acid and drumming for 40 minutes. The dyed and fatliquored leather was additionally rinsed for 15 minutes with cold water at 15° C. and then set out, subjected to reduced pressure, suspension dried at room temperature overnight, conditioned, staked and strained.

The leather obtained had a deep black color having excellent wash-, perspiration-, rub- and migrationfastness.

Dyeing Prescription 27:

A piece of 100 parts by weight of a conventional chrome-tanned cattlehide leather 1.8 mm in shaved thickness was washed at 35° C. for 10 minutes in a drum filled with 200 parts of water and 0.1 part of formic acid and subsequently neutralized at 35° C. for 120 minutes in a float consisting of 100 parts of water, 2 parts of sodium formate, 1 part of sodium acetate, 1.5 parts of sodium bicarbonate and 1 part of a dispersant. The deacidifying float then had a pH of 6.2. The leather was then washed with 200 parts of water at 35° C. for 10 minutes.

The leather was dyed for 60 minutes at pH 5.3 and 30° C. in a freshly set float composed of 150 parts of water and 14.3 parts of dye from example 6c. The pH of the float was adjusted to between 8.7-9.3 by portionwise addition of 28 parts of 15% sodium carbonate solution, which was followed by drumming at 50° C. for 180 minutes. This was followed by 3 10 minute washes in 200 parts of water at 40° C. A pH of 4.6 was set by adding 200 parts of water and 1.0 part of formic acid.

The leather thus dyed was retanned for 30 minutes at 30° C. in a freshly set float composed of 30 parts of water and 2 parts of a polymeric tanning material. The float was subsequently admixed with 2 parts of a hydrophobicizing fatliquor. Following a drumming time of a further 30 minutes 5 parts of a sulfone type tanning material and 4 parts of a resin type tanning material were added before drumming for a further 60 minutes. Finally, the leather was acidified to pH 4.0 with 1.8 parts of formic acid and drummed once for 10 minutes and three times for 30 minutes. Following a 10 minute wash with 200 parts of water at 40° C. the leather was fatliquored in a new float consisting of 100 parts of water, 4.5 parts of a mixed fatliquor based on sulfited fishoil and synthetic oil, 0.5 part of a lanolin-based fatliquor by drumming at 55° C. for 40 minutes. This was followed by acidification to pH 3.3 with 1.5 parts of concentrated formic acid and drumming for 40 minutes. The dyed and fatliquored leather was additionally rinsed for 15 minutes with cold water at 15° C. and then set out, subjected to reduced pressure, suspension dried at room temperature overnight, conditioned, staked and strained.

The leather obtained had a deep black color having excellent wash-, perspiration-, rub- and migrationfastness.

Dyeing Prescription 28:

A piece of 100 parts by weight of a conventionally organic-tanned cattlehide leather 1.0 mm in shaved thickness was washed at 30° C. for 20 minutes in a drum filled with 200 parts of water. This was followed by dyeing using a float consisting of 150 parts of water, 2 parts of a dispersant and 11.5 parts of dye from example 6d at pH 4.3 and 30° C. for 60 minutes. The pH was maintained between 8.8 and 9.2 at 40° C. in the course of 180 minutes of drumming by portionwise addition of 30 parts of 15% sodium carbonate solution. This was followed by 3 10 minute washes in 200 parts of water at 40° C. A pH of 4.4 was set by adding 200 parts of water and 1.0 part of formic acid.

The retanning/fatliquoring/mechanical operations were carried out as described in part b) of dyeing prescription 1.

The leather obtained had a deep black color having excellent wash-, perspiration-, rub- and migrationfastness.

Dyeing Prescription 29:

A piece of 100 parts by weight of a conventionally organic-tanned cattlehide leather 1.0 mm in shaved thickness was washed at 30° C. for 20 minutes in a drum filled with 200 parts of water. This was followed by dyeing using 150 parts of water, 2 parts of a dispersant and 14.3 parts of dye from example 9f at pH 4.3 and 30° C. for 60 minutes. The pH of the float was maintained between 8.7 and 9.2 at 40° C. in the course of 180 minutes of drumming by portionwise addition of 30 parts of 15% sodium carbonate solution. This was followed by 3 10 minute washes in 200 parts of water at 40° C. A pH of 4.5 was set by adding 200 parts of water and 1.0 part of formic acid.

The retanning/fatliquoring/mechanical operations were carried out as described in part b) of dyeing prescription 1.

The leather obtained had a deep black color having excellent wash-, perspiration-, rub- and migrationfastness.

Dyeing Prescription 30:

A piece of 100 parts by weight of a conventionally organic-tanned cattlehide leather 1.0 mm in shaved thickness was washed at 30° C. for 20 minutes in a drum filled with 200 parts of water. This was followed by dyeing using a float consisting of 150 parts of water and 11.5 parts of dye from example 1f at pH 4.3 and 30° C. for 60 minutes. The pH of the float was maintained between 8.8 and 9.4 at 40° C. by portionwise addition of 30 parts of 15% sodium carbonate solution to fix the dye in the course of 180 minutes of drumming. This was followed by 3 10 minute washes in 200 parts of water at 40° C. A pH of 4.6 was set by adding 200 parts of water and 1.0 part of formic acid.

The retanning/fatliquoring/mechanical operations were carried out as described in part b) of dyeing prescription 1.

The leather obtained had a deep black color having excellent wash-, perspiration-, rub- and migrationfastness.

Dyeing Prescription 31:

A piece of 100 parts by weight of a conventionally organic-tanned cattlehide leather 1.0 mm in shaved thickness was washed at 30° C. for 20 minutes in a drum filled with 200 parts of water. This was followed by dyeing using a float consisting of 150 parts of water and 14.3 parts of dye from example 12q at pH 4.3 and 30° C. for 60 minutes. The pH of the float was maintained between 8.6 and 9.3 at 40° C. by portionwise addition of 30 parts of 15% sodium carbonate solution to fix the dye in the course of 180 minutes of drumming. This was followed by 3 10 minute washes in 200 parts of water at 40° C. A pH of 4.6 was set by adding 200 parts of water and 1.0 part of formic acid.

The retanning/fatliquoring/mechanical operations were carried out as described in part b) of dyeing prescription 1.

The leather obtained had a deep black color having excellent wash-, perspiration-, rub- and migrationfastness.

Dyeing Prescription 32:

A piece of 100 parts by weight of a conventionally organic-tanned cattlehide leather 1.0 mm in shaved thickness was washed at 30° C. for 20 minutes in a drum filled with 200 parts of water. This was followed by immediately adjusting the pH of the new float consisting of 150 parts of water, 2 parts of a dispersant and 8 parts of dye from example 12s to >8.5 by portionwise addition of 30 parts of 15% sodium carbonate solution and maintaining the pH between 8.7 and 9.2 at 40° C. to fix the dye in the course of 220 minutes of drumming. This was followed by 3 10 minute washes in 200 parts of water at 40° C. A pH of 4.5 was set by adding 200 parts of water and 1.0 part of formic acid.

The retanning/fatliquoring/mechanical operations were carried out as described in part b) of dyeing prescription 1.

The leather obtained had a deep black color having excellent wash-, perspiration-, rub- and migrationfastness.

Dyeing Prescription 33:

A piece of 100 parts by weight of a conventional chrome-tanned cattlehide leather 1.8 mm in shaved thickness was washed at 35° C. for 10 minutes in a drum filled with 200 parts of water and 0.1 part of formic acid and subsequently neutralized at 35° C. for 120 minutes in a float consisting of 100 parts of water, 2 parts of sodium formate, 1 part of sodium acetate, 1.5 parts of sodium bicarbonate and 1 part of a dispersant. The deacidifying float then had a pH of 6.4. The leather was then washed with 200 parts of water at 35° C. for 10 minutes.

The pH was immediately adjusted to >8.5 in a freshly set float composed of 150 parts of water and 8 parts of dye from example 12 by portionwise addition of 23 parts of 15% sodium carbonate solution and maintained between 8.7-9.5 at 50° C. to fix the dye in the course of 240 minutes of drumming. This was followed by 4 10 minute washes in 200 parts of water at 40° C. A pH of 4.2 was set by adding 200 parts of water and 1.1 parts of formic acid.

The leather thus dyed was retanned for 30 minutes at 30° C. in a freshly set float composed of 30 parts of water and 2 parts of a polymeric tanning material. The float was subsequently admixed with 2 parts of a hydrophobicizing fatliquor. Following a drumming time of a further 30 minutes 5 parts of a sulfone type tanning material and 4 parts of a resin type tanning material were added before drumming for a further 60 minutes. Finally, the leather was acidified to pH 3.8 with 2.0 parts of formic acid and drummed once for 10 minutes and three times for 30 minutes. Following a 10 minute wash with 200 parts of water at 40° C. the leather was fatliquored in a new float consisting of 100 parts of water, 4.5 parts of a mixed fatliquor based on sulfited fishoil and synthetic oil, 0.5 part of a lanolin-based fatliquor by drumming at 55° C. for 40 minutes. This was followed by acidification to pH 3.3 with 1.5 parts of concentrated formic acid and drumming for 40 minutes. The dyed and fatliquored leather was additionally rinsed for 15 minutes with cold water at 15° C. and then set out, subjected to reduced pressure, suspension dried at room temperature overnight, conditioned, staked and strained.

The leather obtained had a deep black color having excellent wash-, perspiration-, rub- and migrationfastness.

Dyeing Prescription 34:

A piece of 100 parts by weight of a conventionally organic-tanned cattlehide leather 1.0 mm in shaved thickness was washed at 30° C. for 20 minutes in a drum filled with 200 parts of water. This was followed by dyeing using a float consisting of 150 parts of water, 2 parts of a dispersant and 7 parts of dye from example 12u at pH 4.3 and 30° C. for 60 minutes. The pH of the float was maintained between 8.7 and 9.2 at 40° C. by portionwise addition of 30 parts of 15% sodium carbonate solution to fix the dye in the course of 200 minutes of drumming. After changing the float a pH of 4.5 was set by adding 200 parts of water and 1.0 part of formic acid.

The retanning/fatliquoring/mechanical operations were carried out as described in part b) of dyeing prescription 1.

The leather obtained had a deep black color having excellent wash-, perspiration-, rub- and migrationfastness.

Dyeing Prescription 35:

A piece of 100 parts by weight of a conventional chrome-tanned cattlehide leather 1.8 mm in shaved thickness was washed at 35° C. for 10 minutes in a drum filled with 200 parts of water and 0.1 part of formic acid and subsequently neutralized at 35° C. for 120 minutes in a float consisting of 100 parts of water, 2 parts of sodium formate, 1 part of sodium acetate, 1.5 parts of sodium bicarbonate and 1 part of a dispersant. The deacidifying float then had a pH of 6.4. The leather was then washed with 200 parts of water at 35° C. for 10 minutes.

The leather was dyed for 60 minutes at pH 6.3 and 30° C. in a freshly set float composed of 150 parts of water and 7 parts of dye from example 13n. The pH of the float was adjusted to between 8.7-9.5 by portionwise addition of 23 parts of 15% sodium carbonate solution to fix the dye, which is followed by drumming at 50° C. for 210 minutes. After changing the float a pH of 4.3 was set by adding 200 parts of water and 1.0 part of formic acid.

The leather thus dyed was retanned for 30 minutes at 30° C. in a freshly set float composed of 30 parts of water and 2 parts of a polymeric tanning material. The float was subsequently admixed with 2 parts of a hydrophobicizing fatliquor. Following a drumming time of a further 30 minutes 5 parts of a sulfone type tanning material and 4 parts of a resin type tanning material were added before drumming for a further 60 minutes. Finally, the leather was acidified to pH 3.8 with 2.0 parts of formic acid and drummed once for 10 minutes and three times for 30 minutes. Following a 10 minute wash with 200 parts of water at 40° C. the leather was fatliquored in a new float consisting of 100 parts of water, 4.5 parts of a mixed fatliquor based on sulfited fishoil and synthetic oil, 0.5 part of a lanolin-based fatliquor by drumming at 55° C. for 40 minutes. This was followed by acidification to pH 3.3 with 1.5 parts of concentrated formic acid and drumming for 40 minutes. The dyed and fatliquored leather was additionally rinsed for 15 minutes with cold water at 15° C. and then set out, subjected to reduced pressure, suspension dried at room temperature overnight, conditioned, staked and strained.

Dyeing Prescription 36:

A piece of 100 parts by weight of a conventionally chrome-tanned cattlehide leather 1.8 mm in shaved thickness was washed at 35° C. for 10 minutes in a drum filled with 300 parts of water and subsequently neutralized at 40° C. for 120 minutes in a float consisting of 100 parts of water, 2 parts of sodium formate, 1 part of sodium acetate and 2.2 parts of sodium bicarbonate. The deacidifying float then had a pH of 7.2. The deacidfying float was admixed with 10.5 parts of dye 12bj and dyed at pH 6.9 and 40° C. for 30 minutes. The pH of the float was set between 9.2-9.7 by portionwise addition of 8 parts of sodium carbonate, which was followed by drumming at 40° C. for 75 minutes. This was followed by two 20-minute washing operations in 300 parts of water at 40° C. 200 parts of water and 1.2 parts of formic acid were added to set a pH of 3.9.

The leather thus dyed was retanned for 30 minutes at 30° C. in a freshly set float composed of 100 parts of water and 2 parts of a polymeric tanning material. The float was subsequently admixed with 2 parts of a hydrophobicizing fatliquor. Following a drumming time of a further 30 minutes 5 parts of a sulfone type tanning material and 4 parts of a resin type tanning material were added before drumming for a further 60 minutes. The retanning float was mixed with 4.5 parts of a mixed fatliquor based on sulfited fish oil and synthetic oil and 0.5 part of a lanolin-based fatliquor and the leather was fatliquored by drumming at 55° C. for 40 minutes. This was followed by acidification to pH 3.6 with 1.6 parts of concentrated formic acid and drumming for 45 minutes. The dyed and fatliquored leather was additionally washed for 10 minutes with 300 parts of cold water at 20° C. and subsequently set out, subjected to reduced pressure at 70° C., suspension dried at room temperature overnight, conditioned, staked and strained.

The leather obtained was jet black and possessed excellent wash-, perspiration-, rub- and migrationfastnesses.

The dyeings reported in table 19 were carried out in an analogous manner:

TABLE 19

| Dye example No. | Dyeing prescription | Parts by weight (%) | Color of leather |
|---|---|---|---|
| 1a | 4 | 5 | black |
| 1b | 11 | 7 | black |
| 1b | 26 | 14.1 | black |
| 1c | 4 | 6.7 | black |
| 1d | 19 | 11.3 | black |
| 1e | 30 | 6.4 | black |
| 1f | 19 | 9.5 | black |
| 2a | 35 | 7.9 | red |
| 2b | 5 | 4.7 | blue |
| 2c | 6 | 5.8 | blue |
| 2d | 9 | 18.6 | red |

TABLE 19-continued

| Dye example No. | Dyeing prescription | Parts by weight (%) | Color of leather |
|---|---|---|---|
| 2e | 25 | 14.6 | blue |
| 2f | 12 | 12.4 | blue |
| 2g | 34 | 12.0 | violet |
| 2h | 35 | 7.9 | blue |
| 2i | 26 | 18.6 | blue |
| 2j | 4 | 14.6 | blue |
| 2k | 19 | 12.4 | blue |
| 3 | 30 | 12.0 | violet |
| 4a | 31 | 6.3 | dark brown |
| 5a | 34 | 7.8 | brown |
| 6a | 9 | 17.4 | blue |
| 6b | 1 | 5.2 | black |
| 6b | 16 | 8.3 | black |
| 6c | 15 | 8.8 | black |
| 6d | 13 | 8.9 | black |
| 6d | 17 | 12.0 | black |
| 6e | 9 | 17.4 | blue |
| 6f | 9 | 17.4 | blue |
| 6g | 9 | 17.4 | blue |
| 6h | 9 | 17.4 | red |
| 7 | 18 | 6.7 | blue |
| 8 | 21 | 9.2 | blue |
| 9a | 2 | 17.1 | red |
| 9b | 17 | 11.4 | red |
| 9c | 14 | 9.5 | black |
| 9c | 22 | 16.7 | black |
| 9d | 33 | 15.4 | brown |
| 9e | 33 | 15.4 | black |
| 9f | 34 | 4.9 | black |
| 9g | 2 | 17.1 | red |
| 9h | 14 | 9.5 | black |
| 10 | 24 | 7.9 | blue |
| 11a | 27 | 12.0 | bordeaux |
| 11b | 21 | 10.2 | bordeaux |
| 12a | 3 | 2.3 | black |
| | 28 | 8.4 | black |
| | 34 | 17.9 | black |
| | 21 | 10.0 | black |
| 12b | 5 | 2.4 | black |
| | 23 | 8.4 | black |
| | 32 | 16.9 | black |
| | 18 | 4.7 | black |
| | 27 | 10.5 | black |
| | 33 | 18.7 | black |
| 12c | 6 | 9.8 | dark green |
| | 16 | 9.8 | dark green |
| 12d | 1 | 18.1 | dark green |
| | 29 | 4.6 | dark green |
| 12e | 20 | 3.3 | dark green |
| 12f | 35 | 11.7 | dark green |
| 12g | 7 | 15.4 | dark green |
| 12h | 8 | 5.0 | green |
| | 24 | 5.2 | green |
| 12i | 7 | 2.7 | dark green |
| | 7 | 15.4 | dark green |
| | 17 | 5.1 | dark green |
| 12j | 4 | 2.7 | black |
| | 10 | 15.4 | black |
| | 31 | 5.1 | black |
| 12k | 12 | 10.0 | black |
| | 19 | 10.0 | black |
| 12l | 15 | 15.1 | green |
| 12m | 26 | 8.8 | black |
| 12n | 15 | 15.1 | black |
| 12o | 26 | 8.8 | dark green |
| 12p | 13 | 6.5 | black |
| 12q | 14 | 8.3 | black |
| 12r | 22 | 15.1 | black |
| 12s | 1 | 8.3 | black |
| 12t | 3 | 12.0 | black |
| 12u | 11 | 3.8 | black |
| 12v | 22 | 4.7 | black |
| 12z | 33 | 9.0 | dark green |
| 12aa | 13 | 7.6 | dark blue |
| 12ab | 6 | 6.2 | dark blue |
| 12ac | 2 | 7.9 | dark blue |

TABLE 19-continued

| Dye example No. | Dyeing prescription | Parts by weight (%) | Color of leather |
|---|---|---|---|
| 12ad | 7 | 5.3 | dark blue |
| 12ae | 9 | 8.8 | blue |
| 12af | 8 | 7.4 | black |
| 12ag | 4 | 7.9 | black |
| 12ah | 14 | 8.8 | black |
| 12ai | 5 | 10.1 | black |
| 12aj | 23 | 5.9 | black |
| 12ak | 17 | 14.3 | black |
| 12al | 31 | 13.2 | black |
| 12am | 1 | 19.3 | black |
| 12an | 4 | 1.8 | black |
| 12ao | 11 | 5.7 | green |
| 12ap | 28 | 3.8 | green |
| 12aq | 20 | 6.4 | green |
| 12ar | 13 | 12.5 | black |
| 12as | 26 | 10.5 | black |
| 12at | 35 | 7.7 | black |
| | 7 | 10.2 | black |
| | 19 | 14.3 | black |
| | 36 | 3.5 | black |
| 12au | 15 | 4.6 | black |
| 12av | 16 | 2.3 | black |
| 12aw | 6 | 3.1 | green |
| 12ax | 34 | 8.6 | black |
| 12ay | 18 | 17.3 | black |
| 12az | 31 | 2.8 | black |
| 12ba | 8 | 5.1 | black |
| 12bb | 10 | 6.2 | black |
| 12bc | 33 | 11.3 | black |
| 12bd | 1 | 7.1 | dark green |
| 12be | 25 | 13.7 | dark green |
| 12bf | 29 | 18.1 | dark green |
| 12bg | 21 | 4.4 | dark green |
| 12bh | 12 | 3.5 | dark green |
| 12bi | 17 | 6.2 | green |
| 12bj | 2 | 2.1 | black |
| 12bk | 23 | 3.6 | green |
| 12bl | 30 | 5.2 | black |
| 12bm | 27 | 8.9 | black |
| 12bn | 14 | 5.6 | green |
| 12bo | 32 | 3.1 | green |
| 12bp | 22 | 14.5 | green |
| 12bq | 24 | 9.6 | black |
| 12br | 9 | 5.4 | black |
| 12bs | 7 | 7.5 | black |
| 12bt | 5 | 2.9 | black |
| 12bu | 3 | 9.8 | black |
| 12bv | 19 | 4.9 | black |
| 12bw | 8 | 1.8 | black |
| 12bx | 10 | 5.7 | black |
| 12by | 33 | 3.8 | blue |
| 12bz | 1 | 6.4 | blue |
| 12ca | 25 | 12.5 | blue |
| 12cb | 29 | 10.5 | blue |
| 12cc | 21 | 7.7 | blue |
| 12cd | 12 | 4.6 | blue |
| 12ce | 17 | 2.3 | blue |
| 12cf | 2 | 3.1 | blue |
| 12cg | 23 | 8.6 | blue |
| 12ch | 30 | 17.3 | blue |
| 12ci | 27 | 2.8 | blue |
| 12cj | 14 | 5.1 | blue |
| 12ck | 32 | 6.2 | blue |
| 12cl | 22 | 12.5 | blue |
| 12cm | 24 | 10.5 | blue |
| 12cn | 9 | 7.7 | blue |
| 12co | 7 | 4.6 | blue |
| 12cp | 5 | 2.3 | blue |
| 12cq | 3 | 3.1 | blue |
| 12cr | 19 | 8.6 | blue |
| 12cs | 35 | 17.3 | blue |
| 12ct | 15 | 2.8 | blue |
| 12cu | 16 | 5.1 | blue |
| 12cv | 6 | 6.2 | blue |
| 12cw | 34 | 11.3 | blue |
| 12cx | 18 | 7.1 | blue |

TABLE 19-continued

| Dye example No. | Dyeing prescription | Parts by weight (%) | Color of leather |
|---|---|---|---|
| 12cy | 31 | 13.7 | blue |
| 12cz | 4 | 18.1 | blue |
| 12da | 11 | 4.4 | blue |
| 12db | 28 | 3.5 | blue |
| 12dc | 20 | 6.2 | blue |
| 12dd | 13 | 2.1 | blue |
| 12de | 26 | 3.6 | green |
| 12df | 35 | 5.2 | green |
| 12dg | 15 | 8.9 | black |
| 12dh | 16 | 5.6 | black |
| 12di | 6 | 3.1 | black |
| 12dj | 25 | 14.5 | black |
| 12dk | 29 | 9.6 | black |
| 12dl | 21 | 5.4 | green |
| 12dm | 12 | 7.5 | green |
| 12dn | 17 | 2.9 | green |
| 12do | 2 | 9.8 | black |
| 12dp | 23 | 4.9 | black |
| 12dq | 30 | 1.8 | black |
| 12dr | 27 | 5.7 | black |
| 12ds | 14 | 3.8 | black |
| 12dt | 32 | 6.4 | black |
| 12du | 22 | 12.5 | black |
| 12dv | 24 | 10.5 | black |
| 12dw | 9 | 7.7 | blue |
| 12dx | 7 | 4.6 | blue |
| 12dy | 5 | 2.3 | blue |
| 12dz | 3 | 3.1 | blue |
| 12ea | 19 | 8.6 | blue |
| 12eb | 35 | 17.3 | blue |
| 12ec | 15 | 2.8 | blue |
| 12ed | 16 | 5.1 | blue |
| 12ee | 6 | 6.2 | blue |
| 12ef | 14 | 5.6 | blue |
| 12eg | 32 | 3.1 | blue |
| 12eh | 22 | 14.5 | blue |
| 12ei | 24 | 9.6 | blue |
| 12ej | 9 | 5.4 | blue |
| 12ek | 7 | 7.5 | blue |
| 12el | 5 | 2.9 | blue |
| 12em | 3 | 1.8 | blue |
| 12en | 19 | 5.7 | blue |
| 12eo | 35 | 3.8 | blue |
| 12ep | 15 | 6.4 | blue |
| 12eq | 16 | 12.5 | blue |
| 12er | 6 | 10.5 | blue |
| 12es | 34 | 7.7 | blue |
| 12et | 18 | 4.6 | blue |
| 12eu | 31 | 2.3 | blue |
| 12ev | 4 | 3.1 | blue |
| 12ew | 11 | 8.6 | blue |
| 12ex | 28 | 17.3 | blue |
| 12ey | 20 | 2.8 | blue |
| 12ez | 13 | 5.1 | blue |
| 12fa | 15 | 6.2 | blue |
| 12fb | 16 | 11.3 | blue |
| 12fc | 6 | 7.1 | blue |
| 12fd | 14 | 13.7 | blue |
| 12fe | 32 | 18.1 | blue |
| 12ff | 22 | 7.7 | blue |
| 12fg | 24 | 4.6 | green |
| 12fh | 9 | 2.3 | green |
| 12fi | 7 | 3.1 | black |
| 12fj | 5 | 8.6 | black |
| 12fk | 3 | 17.3 | black |
| 12fl | 19 | 2.8 | black |
| 12fm | 34 | 5.1 | black |
| 12fn | 18 | 6.2 | green |
| 12fo | 31 | 5.6 | green |
| 12fp | 4 | 3.1 | green |
| 12fq | 11 | 14.5 | black |
| 12fr | 28 | 9.6 | black |
| 12fs | 20 | 5.4 | black |
| 12ft | 13 | 8.2 | black |
| 12fu | 15 | 1.9 | black |
| 12fv | 16 | 2.6 | black |

TABLE 19-continued

| Dye example No. | Dyeing prescription | Parts by weight (%) | Color of leather |
|---|---|---|---|
| 12fw | 6 | 14.3 | black |
| 12fx | 5 | 6.7 | black |
| 12fy | 1 | 5.9 | blue |
| 12fz | 14 | 3.2 | blue |
| 12ga | 36 | 4.6 | blue |
| 12gb | 15 | 17.9 | blue |
| 12gc | 27 | 6.8 | blue |
| 12gd | 4 | 2.4 | blue |
| 12ge | 20 | 10.1 | black |
| 12gf | 9 | 6.6 | black |
| 12gg | 3 | 7.5 | black |
| 12gh | 33 | 3.5 | black |
| 12gi | 15 | 11.2 | black |
| 12gj | 7 | 8.6 | black |
| 12gk | 11 | 3.6 | blue |
| 12gl | 2 | 19 | blue |
| 12gm | 4 | 10.9 | blue |
| 12gn | 8 | 5.6 | blue |
| 12go | 15 | 6.1 | blue |
| 12gp | 16 | 4.8 | blue |
| 12gq | 7 | 3.1 | black |
| 12gr | 13 | 9.9 | black |
| 12gs | 21 | 12.6 | black |
| 12gt | 30 | 13.5 | black |
| 12gu | 36 | 14.8 | black |
| 12gv | 25 | 2.8 | black |
| 12gw | 15 | 15.1 | black |
| | 29 | 4.8 | black |
| 12gz | 26 | 8.8 | black |
| 12ha | 15 | 15.1 | black |
| | 8 | 5.5 | black |
| 12hb | 26 | 8.8 | black |
| | 11 | 6.1 | black |
| 12hc | 13 | 6.5 | black |
| | 24 | 11.2 | black |
| 12hd | 14 | 8.3 | black |
| | 35 | 4.1 | black |
| 12he | 22 | 15.1 | black |
| | 16 | 7.5 | black |
| 12hf | 1 | 8.3 | black |
| | 33 | 4.6 | black |
| 12hh | 3 | 12.0 | black |
| | 27 | 6.1 | black |
| 12hi | 11 | 3.8 | black |
| 12hj | 22 | 4.7 | black |
| 12hk | 33 | 9.0 | black |
| 12hl | 13 | 7.6 | black |
| 12hm | 6 | 6.2 | black |
| 12hn | 2 | 7.9 | black |
| 12ho | 7 | 5.3 | black |
| 12hp | 9 | 8.8 | black |
| 12hq | 8 | 7.4 | black |
| 12hr | 4 | 7.9 | black |
| 12hs | 14 | 8.8 | black |
| 12ht | 5 | 10.1 | blue |
| 12hu | 23 | 5.9 | blue |
| 12hv | 17 | 14.3 | blue |
| 12hw | 31 | 13.2 | black |
| 13a | 2 | 2.3 | black |
| | 6 | 8.4 | black |
| | 11 | 17.9 | black |
| | 17 | 10.0 | black |
| 13b | 9 | 2.4 | black |
| | 25 | 8.4 | black |
| | 21 | 4.7 | black |
| | 21 | 10.5 | black |
| | 21 | 18.7 | black |
| 13c | 25 | 11.0 | dark green |
| 13d | 17 | 10.8 | dark green |
| 13e | 30 | 17.0 | dark green |
| 13f | 34 | 11.5 | dark green |
| 13g | 7 | 11.2 | dark green |
| 13h | 3 | 8.4 | black |
| | 24 | 8.4 | black |
| 13i | 16 | 8.4 | dark green |
| 13j | 27 | 11.4 | black |

TABLE 19-continued

| Dye example No. | Dyeing prescription | Parts by weight (%) | Color of leather |
|---|---|---|---|
| 13k | 10 | 6.6 | black |
| | 10 | 13.2 | black |
| 13l | 12 | 15.1 | green |
| 13m | 15 | 8.8 | black |
| 13n | 15 | 8.8 | black |
| 13o | 1 | 8.2 | dark green |
| 13p | 19 | 2.9 | black |
| 13q | 21 | 4.5 | black |
| 13r | 4 | 6.7 | black |
| 13s | 20 | 15.0 | black |
| 13t | 5 | 4.6 | black |
| 13u | 17 | 6.7 | black |
| 13v | 19 | 8.2 | black |
| 13z | 8 | 2.9 | dark green |
| 13aa | 9 | 4.5 | dark blue |
| 13ab | 10 | 6.7 | dark blue |
| 13ac | 11 | 7.7 | dark blue |
| 13ad | 18 | 9.1 | dark blue |
| 13ae | 16 | 8.3 | blue |
| 13af | 14 | 5.9 | black |
| 13ag | 15 | 11.0 | black |
| 13ah | 14 | 8.8 | black |
| 13ai | 6 | 10.9 | black |
| 13aj | 7 | 11.1 | dark blue |
| 13ak | 15 | 9.7 | dark blue |
| 13al | 12 | 8.4 | dark green |
| 13am | 13 | 7.6 | black |
| 13an | 23 | 5.9 | black |
| 13ao | 17 | 14.3 | black |
| 13ap | 31 | 13.2 | black |
| 13aq | 1 | 19.3 | black |
| 13ar | 4 | 1.8 | black |
| 13as | 11 | 5.7 | green |
| 13at | 28 | 3.8 | green |
| 13au | 20 | 6.4 | green |
| 13av | 13 | 12.5 | black |
| 13aw | 26 | 10.5 | black |
| 13ax | 35 | 7.7 | black |
| 13ay | 15 | 4.6 | black |
| 13az | 16 | 2.3 | black |
| 13ba | 6 | 3.1 | black |
| 13bb | 34 | 8.6 | black |
| 13bc | 18 | 17.3 | black |
| 13bd | 31 | 2.8 | black |
| 13be | 8 | 5.1 | black |
| 13bf | 10 | 6.2 | black |
| 13bg | 33 | 11.3 | black |
| 13bh | 1 | 7.1 | dark green |
| 13bi | 25 | 13.7 | dark green |
| 13bj | 29 | 18.1 | dark green |
| 13bk | 21 | 4.4 | dark green |
| 13bl | 12 | 3.5 | dark green |
| 13bm | 17 | 6.2 | dark green |
| 13bn | 2 | 2.1 | black |
| 13bo | 23 | 3.6 | dark green |
| 13bp | 30 | 5.2 | green |
| 13bq | 27 | 8.9 | black |
| 13br | 14 | 5.6 | green |
| 13bs | 32 | 3.1 | green |
| 13bt | 22 | 14.5 | green |
| 13bu | 24 | 9.6 | black |
| 13bv | 9 | 5.4 | black |
| 13bw | 7 | 7.5 | black |
| 13bx | 5 | 2.9 | black |
| 13by | 3 | 9.8 | black |
| 13bz | 19 | 4.9 | black |
| 13ca | 8 | 1.8 | black |
| 13cb | 10 | 5.7 | black |
| 13cc | 33 | 3.8 | blue |
| 13cd | 1 | 6.4 | blue |
| 13ce | 25 | 12.5 | blue |
| 13cf | 29 | 10.5 | blue |
| 13cg | 21 | 7.7 | blue |
| 13ch | 12 | 4.6 | blue |
| 13ci | 17 | 2.3 | blue |
| 13cj | 2 | 3.1 | blue |

TABLE 19-continued

| Dye example No. | Dyeing prescription | Parts by weight (%) | Color of leather |
|---|---|---|---|
| 13ck | 23 | 8.6 | blue |
| 13cl | 30 | 17.3 | blue |
| 13cm | 27 | 2.8 | blue |
| 13cn | 14 | 5.1 | blue |
| 13co | 32 | 6.2 | blue |
| 13cp | 22 | 12.5 | blue |
| 13cq | 24 | 10.5 | blue |
| 13cr | 9 | 7.7 | blue |
| 13cs | 7 | 4.6 | blue |
| 13ct | 5 | 2.3 | blue |
| 13cu | 3 | 3.1 | blue |
| 13cv | 19 | 8.6 | blue |
| 13cw | 35 | 17.3 | blue |
| 13cx | 15 | 2.8 | blue |
| 13cy | 16 | 5.1 | blue |
| 13cz | 6 | 6.2 | blue |
| 13da | 34 | 11.3 | blue |
| 13db | 18 | 7.1 | blue |
| 13dc | 31 | 13.7 | blue |
| 13dd | 4 | 18.1 | blue |
| 13de | 11 | 4.4 | blue |
| 13df | 28 | 3.5 | blue |
| 13dg | 20 | 6.2 | blue |
| 13dh | 13 | 2.1 | green |
| 13di | 26 | 3.6 | green |
| 13dj | 35 | 5.2 | black |
| 13dk | 15 | 8.9 | black |
| 13dl | 16 | 5.6 | black |
| 13dm | 6 | 3.1 | black |
| 13dn | 25 | 14.5 | black |
| 13do | 29 | 9.6 | green |
| 13dp | 21 | 5.4 | green |
| 13dq | 12 | 7.5 | green |
| 13dr | 17 | 2.9 | black |
| 13ds | 2 | 9.8 | black |
| 13dt | 23 | 4.9 | black |
| 13du | 30 | 1.8 | black |
| 13dv | 27 | 5.7 | black |
| 13dw | 14 | 3.8 | black |
| 13dx | 32 | 6.4 | black |
| 13dy | 22 | 12.5 | black |
| 13dz | 24 | 10.5 | blue |
| 13ea | 9 | 7.7 | blue |
| 13eb | 7 | 4.6 | blue |
| 13ec | 5 | 2.3 | blue |
| 13ed | 3 | 3.1 | blue |
| 13ee | 19 | 8.6 | blue |
| 13ef | 35 | 17.3 | blue |
| 13eg | 15 | 2.8 | blue |
| 13eh | 16 | 5.1 | blue |
| 13ei | 6 | 6.2 | blue |
| 13ej | 14 | 5.6 | blue |
| 13ek | 32 | 3.1 | blue |
| 13el | 22 | 14.5 | blue |
| 13em | 24 | 9.6 | blue |
| 13en | 9 | 5.4 | blue |
| 13eo | 7 | 7.5 | blue |
| 13ep | 5 | 2.9 | blue |
| 13eq | 3 | 1.8 | blue |
| 13er | 19 | 5.7 | blue |
| 13es | 35 | 3.8 | blue |
| 13et | 15 | 6.4 | blue |
| 13eu | 16 | 12.5 | blue |
| 13ev | 6 | 10.5 | blue |
| 13ew | 34 | 7.7 | blue |
| 13ex | 18 | 4.6 | blue |
| 13ey | 31 | 2.3 | blue |
| 13ez | 4 | 3.1 | blue |
| 13fa | 11 | 8.6 | blue |
| 13fb | 28 | 17.3 | blue |
| 13fc | 20 | 2.8 | blue |
| 13fd | 13 | 5.1 | blue |
| 13fe | 15 | 6.2 | blue |
| 13ff | 16 | 11.3 | blue |
| 13fg | 6 | 7.1 | blue |
| 13fh | 14 | 13.7 | blue |

TABLE 19-continued

| Dye example No. | Dyeing prescription | Parts by weight (%) | Color of leather |
|---|---|---|---|
| 13fi | 32 | 18.1 | blue |
| 13fj | 22 | 7.7 | green |
| 13fk | 24 | 4.6 | green |
| 13fl | 9 | 2.3 | black |
| 13fm | 7 | 3.1 | black |
| 13fn | 5 | 8.6 | black |
| 13fo | 3 | 17.3 | black |
| 13fp | 19 | 2.8 | black |
| 13fq | 34 | 5.1 | green |
| 13fr | 18 | 6.2 | green |
| 13fs | 31 | 5.6 | green |
| 13ft | 4 | 3.1 | black |
| 13fu | 11 | 14.5 | black |
| 13fv | 28 | 9.6 | black |
| 13fw | 20 | 5.4 | black |
| 13fx | 13 | 8.2 | black |
| 13fy | 11 | 8.6 | black |
| 13fz | 28 | 17.3 | black |
| 13ga | 20 | 2.8 | black |
| 13gb | 1 | 5.9 | blue |
| 13gc | 14 | 3.2 | blue |
| 13gd | 36 | 4.6 | blue |
| 13ge | 15 | 17.9 | blue |
| 13gf | 27 | 6.8 | blue |
| 13gg | 4 | 2.4 | blue |
| 13gh | 20 | 10.1 | black |
| 13gi | 9 | 6.6 | black |
| 13gj | 3 | 7.5 | black |
| 13gk | 33 | 3.5 | black |
| 13gl | 15 | 11.2 | black |
| 13gm | 7 | 8.6 | black |
| 13gn | 11 | 3.6 | blue |
| 13go | 2 | 19 | blue |
| 13gp | 4 | 10.9 | blue |
| 13gq | 8 | 5.6 | blue |
| 13gr | 15 | 6.1 | blue |
| 13gs | 16 | 4.8 | blue |
| 13gt | 7 | 3.1 | black |
| 13gr | 13 | 9.9 | black |
| 13gs | 21 | 12.6 | black |
| 13gt | 30 | 13.5 | black |
| 13gu | 36 | 14.8 | black |
| 13gv | 25 | 2.8 | black |
| 13gw | 15 | 15.1 | black |
| | 29 | 4.8 | black |
| 13gz | 26 | 8.8 | black |
| 13ha | 15 | 15.1 | black |
| | 8 | 5.5 | black |
| 13hb | 26 | 8.8 | black |
| | 11 | 6.1 | black |
| 13hc | 13 | 6.5 | black |
| | 24 | 11.2 | black |
| 13hd | 14 | 8.3 | black |
| | 35 | 4.1 | black |
| 13he | 22 | 15.1 | black |
| | 16 | 7.5 | black |
| 13hf | 1 | 8.3 | black |
| | 33 | 4.6 | black |
| 13hh | 3 | 12.0 | black |
| | 27 | 6.1 | black |
| 13hi | 11 | 3.8 | black |
| 13hj | 22 | 4.7 | black |
| 13hk | 33 | 9.0 | black |
| 13hl | 13 | 7.6 | black |
| 13hm | 6 | 6.2 | black |
| 13hn | 2 | 7.9 | black |
| 13ho | 7 | 5.3 | black |
| 13hp | 9 | 8.8 | black |
| 13hq | 8 | 7.4 | black |
| 13hr | 4 | 7.9 | black |
| 13hs | 14 | 8.8 | black |
| 13ht | 5 | 10.1 | blue |
| 13hu | 23 | 5.9 | blue |
| 13hv | 17 | 14.3 | blue |
| 13hw | 31 | 13.2 | black |
| 14 | 2 | 6.9 | black |

TABLE 19-continued

| Dye example No. | Dyeing prescription | Parts by weight (%) | Color of leather |
|---|---|---|---|
| 15 | 3 | 3.9 | black |
| 16a | 8 | 10.0 | green |
| 16b | 22 | 7.3 | black |
| 16c | 16 | 10.0 | black |
| 16d | 24 | 10.9 | dark green |
| 16e | 30 | 11.1 | dark green |
| 16f | 28 | 11.1 | green |
| 16g | 23 | 12.4 | black |
| 16h | 31 | 12.4 | black |
| 16i | 26 | 12.4 | black |
| 16j | 15 | 3.6 | dark blue |
| 16k | 27 | 12.3 | dark blue |
| 17a | 13 | 8.4 | green |
| 17b | 28 | 14.4 | black |
| 17c | 32 | 14.4 | black |
| 17d | 35 | 12.4 | dark green |
| 17e | 34 | 8.4 | dark green |
| 17f | 33 | 14.4 | green |
| 17g | 4 | 3.4 | black |
| | 4 | 13.6 | black |
| | 19 | 3.4 | black |
| | 19 | 13.6 | black |
| 17h | 18 | 5.8 | black |
| 17i | 35 | 19.8 | black |
| 17j | 17 | 9.7 | green |
| 17k | 14 | 7.6 | dark blue |
| 17l | 26 | 17.3 | dark blue |
| 18 | 16 | 8.6 | dark green |
| 19 | 15 | 6.8 | dark green |
| 20 | 31 | 5.9 | dark green |
| 21 | 29 | 3.9 | dark green |
| 22 | 30 | 10.0 | dark green |
| 23 | 22 | 7.3 | blue |
| 24 | 21 | 10.0 | red |
| 25 | 18 | 7.3 | black |
| 26 | 13 | 8.2 | brown |
| 27 | 34 | 11.1 | brown |
| 28a | 33 | 8.4 | brown |
| 28b | 32 | 7.6 | brown |
| 29a | 11 | 6.9 | brown |
| 29b | 2 | 10.9 | brown |
| 30 | 1 | 11.1 | blue |
| 31 | 5 | 8.8 | blue |
| 32 | 4 | 10.4 | black |
| 33 | 12 | 11.2 | red |
| 34a | 28 | 4.2 | brown |
| | 28 | 8.4 | brown |
| | 28 | 16.8 | brown |
| 34b | 21 | 4.2 | dark brown |
| | 21 | 8.4 | dark brown |
| | 21 | 16.8 | dark brown |
| 34c | 5 | 8.8 | brown |
| 34d | 4 | 10.4 | brown |
| 34e | 12 | 11.2 | brown |
| 34f | 9 | 10.2 | brown |
| | 18 | 10.2 | brown |
| 34g | 5 | 14.4 | brown |
| | 7 | 7.7 | brown |
| | 24 | 14.4 | brown |
| 34h | 7 | 5.5 | brown |
| 34i | 13 | 7.7 | dark brown |
| 34j | 29 | 7.7 | dark brown |
| 34k | 11 | 9.2 | brown |
| 34l | 15 | 4.9 | brown |
| 34m | 9 | 7.0 | brown |
| 34n | 8 | 6.3 | brown |
| 34o | 32 | 11.1 | brown |
| 34p | 14 | 13.1 | dark brown |
| 34q | 12 | 12.5 | dark brown |
| 34r | 13 | 7.8 | brown |
| 34s | 27 | 8.4 | brown |
| 34t | 11 | 7.7 | dark brown |
| 34u | 18 | 9.1 | light brown |
| 34v | 16 | 8.3 | dark brown |
| 34z | 7 | 4.6 | brown |
| 34aa | 14 | 5.7 | brown |

TABLE 19-continued

| Dye example No. | Dyeing prescription | Parts by weight (%) | Color of leather |
|---|---|---|---|
| 34ab | 21 | 18.6 | brown |
| 34ac | 28 | 12.2 | brown |
| 35a | 14 | 5.9 | brown |
| 35b | 1 | 4.2 | dark brown |
| | 1 | 8.4 | dark brown |
| | 1 | 16.8 | dark brown |
| 35c | 6 | 8.1 | dark brown |
| 35d | 19 | 5.4 | light brown |
| 35e | 2 | 7.2 | reddish brown |
| | 2 | 14.4 | reddish brown |
| | 2 | 20 | reddish brown |
| | 27 | 7.2 | reddish brown |
| | 27 | 14.4 | reddish brown |
| | 27 | 20 | reddish brown |
| 35f | 33 | 14.4 | brown |
| 35g | 26 | 12.4 | brown |
| 35h | 31 | 9.4 | dark brown |
| 35i | 34 | 7.9 | brown |
| 35j | 15 | 8.8 | brown |
| 35k | 27 | 6.3 | brown |
| 35l | 22 | 8.8 | brown |
| 35m | 18 | 8.9 | brown |
| 35n | 12 | 5.7 | light brown |
| 35o | 26 | 8.2 | brown |
| 35p | 24 | 3.9 | brown |
| 35q | 29 | 6.4 | brown |
| 35r | 18 | 5.7 | brown |
| 35s | 30 | 4.1 | brown |
| | 30 | 17.6 | brown |
| | 26 | 4.1 | brown |
| | 26 | 17.6 | brown |
| 35t | 28 | 7.4 | brown |
| 35u | 25 | 8.9 | dark brown |
| 35v | 24 | 4.7 | light brown |
| 35z | 11 | 4.7 | light brown |
| 35aa | 23 | 8.8 | dark brown |
| 35ab | 11 | 16.6 | light brown |
| 35ac | 12 | 6.8 | brown |
| 35ad | 14 | 6.8 | brown |
| 35ae | 20 | 7.4 | brown |
| 35af | 34 | 4.8 | brown |
| 35ag | 33 | 4.8 | brown |
| 35ah | 18 | 4.2 | brown |
| 35ai | 29 | 17.9 | brown |
| 36 | 10 | 7.4 | brown |
| 37 | 16 | 7.4 | brown |
| 38a | 20 | 7.4 | brown |
| 38b | 3 | 8.8 | brown |
| 38c | 9 | 16.6 | brown |
| 38d | 7 | 15.4 | brown |
| 38e | 6 | 5.6 | yellowish brown |
| 38f | 4 | 5.2 | light brown |
| 38g | 12 | 13.3 | dark brown |
| 38h | 10 | 5.6 | brown |
| | 35 | 5.6 | brown |
| 38i | 25 | 16.6 | brown |
| 38j | 33 | 15.4 | brown |
| 38k | 34 | 4.9 | brown |
| 38l | 24 | 7.9 | brown |
| 38m | 27 | 12.0 | brown |
| 38n | 31 | 10.0 | brown |
| 38o | 26 | 7.7 | brown |
| 38p | 31 | 9.2 | brown |
| 38q | 34 | 4.9 | brown |
| 38r | 15 | 7.0 | brown |
| 38s | 27 | 12.4 | brown |
| 38t | 22 | 9.4 | brown |
| 38u | 18 | 7.9 | brown |
| 38v | 17 | 11.3 | brown |
| 38z | 3 | 18.2 | brown |
| 39a | 12 | 8.8 | brown |
| 39b | 26 | 6.3 | brown |
| 39c | 23 | 5.6 | brown |
| 39d | 3 | 8.8 | brown |
| 39e | 34 | 6.4 | brown |
| 39f | 12 | 6.4 | brown |

TABLE 19-continued

| Dye example No. | Dyeing prescription | Parts by weight (%) | Color of leather |
|---|---|---|---|
| 39g | 4 | 5.6 | brown |
| 39h | 7 | 4.4 | brown |
| 39i | 8 | 13.3 | brown |
| 39j | 5 | 10.6 | brown |
| | 20 | 10.6 | brown |
| 39k | 14 | 10.2 | brown |
| 39l | 17 | 10.2 | brown |
| 39m | 34 | 14.6 | brown |
| 39n | 15 | 7.3 | brown |
| 39o | 19 | 7.3 | brown |
| 39p | 17 | 11.0 | brown |
| 39q | 11 | 9.2 | brown |
| 39r | 15 | 4.9 | brown |
| 39s | 9 | 7.0 | brown |
| 39t | 8 | 6.3 | brown |
| 39u | 32 | 11.1 | brown |
| 39v | 18 | 7.4 | brown |
| 39z | 16 | 11.0 | brown |
| 40a | 10 | 7.4 | brown |
| 40b | 20 | 7.4 | brown |
| 40c | 13 | 8.8 | brown |
| 40d | 16 | 8.4 | brown |
| 40e | 17 | 8.0 | yellowish brown |
| 40f | 21 | 8.8 | light brown |
| 40g | 25 | 8.9 | dark brown |
| 40h | 24 | 4.7 | brown |
| 40i | 11 | 7.3 | brown |
| 40j | 12 | 4.7 | brown |
| 40k | 24 | 4.2 | brown |
| | 24 | 8.4 | brown |
| | 24 | 16.8 | brown |
| 40l | 29 | 16.8 | brown |
| 40m | 25 | 12.4 | brown |
| 40n | 16 | 14.1 | brown |
| 40o | 34 | 8.6 | brown |
| 40p | 1 | 12.0 | brown |
| 40q | 28 | 4.2 | brown |
| 40r | 22 | 8.6 | brown |
| 40s | 24 | 9.0 | brown |
| 40t | 27 | 9.0 | brown |
| 40u | 11 | 5.9 | brown |
| 40v | 2 | 12.7 | brown |
| 40z | 21 | 4.5 | brown |
| 41a | 13 | 8.8 | brown |
| 41b | 9 | 8.6 | brown |
| 41c | 21 | 9.0 | brown |
| 41d | 32 | 8.8 | brown |
| 41e | 30 | 6.2 | brown |
| 41f | 33 | 8.6 | brown |
| 41g | 24 | 9.0 | brown |
| 41h | 29 | 7.4 | brown |
| 41i | 9 | 4.2 | brown |
| | 9 | 8.4 | brown |
| | 9 | 16.8 | brown |
| 41j | 30 | 16.8 | brown |
| 41k | 15 | 12.4 | brown |
| 41l | 14 | 12.4 | brown |
| 41m | 17 | 14.0 | brown |
| 41n | 18 | 9.8 | brown |
| 41o | 27 | 4.2 | brown |
| 41p | 24 | 12.1 | brown |
| 41q | 27 | 12.4 | brown |
| 41r | 11 | 12.4 | brown |
| 41s | 13 | 11.8 | brown |
| 41t | 9 | 14.2 | brown |
| 41u | 10 | 14.0 | brown |
| 42a | 12 | 2.4 | brown |
| 42b | 25 | 4.6 | brown |
| 42c | 16 | 6.8 | dark brown |
| 42d | 31 | 8.7 | brown |
| 42e | 17 | 8.8 | brown |
| | 19 | 8.8 | brown |
| 42f | 32 | 8.6 | dark brown |
| 42g | 25 | 9.0 | brown |
| 42h | 14 | 11.0 | brown |
| 42i | 33 | 8.6 | brown |

TABLE 19-continued

| Dye example No. | Dyeing prescription | Parts by weight (%) | Color of leather |
|---|---|---|---|
| 42j | 24 | 9.0 | brown |
| 42k | 16 | 8.8 | brown |
| | 16 | 16.8 | brown |
| 42l | 10 | 14.0 | brown |
| 42m | 12 | 2.4 | brown |
| 42n | 4 | 15.0 | brown |
| 42o | 23 | 18.6 | brown |
| 43a | 25 | 4.6 | brown |
| 43b | 16 | 6.8 | brown |
| 43c | 31 | 8.7 | brown |
| 43d | 8 | 4.4 | brown |
| 43e | 5 | 4.6 | brown |
| 43f | 29 | 5.4 | brown |
| 43g | 32 | 10.8 | brown |
| 43h | 11 | 14.1 | brown |
| | 33 | 14.4 | brown |
| 43i | 17 | 12.2 | brown |
| 43j | 19 | 12.2 | brown |
| 43k | 7 | 11.0 | brown |
| 43l | 9 | 12.2 | brown |
| 43m | 5 | 11.0 | brown |
| 43n | 22 | 8.8 | brown |
| | 22 | 16.8 | brown |
| 43o | 28 | 2.4 | green |
| 43p | 34 | 4.6 | green |
| 43q | 21 | 4.8 | green |
| 43r | 20 | 8.7 | green |
| 43s | 18 | 6.9 | green |
| | 18 | 15.1 | green |
| 43t | 15 | 12.2 | greenish brown |
| 43u | 25 | 8.7 | green |
| 43v | 1 | 11.0 | brown |
| 43z | 26 | 5.4 | green |
| 43aa | 14 | 5.4 | green |
| 43ab | 2 | 11.1 | green |
| 43ac | 13 | 10.0 | green |
| 43ad | 27 | 12.7 | brown |
| 43ae | 30 | 16.8 | brown |
| 43af | 11 | 5.4 | green |
| 43ag | 24 | 11.9 | green |
| 43ah | 23 | 10.5 | green |
| 43ai | 29 | 2.7 | brown |
| 44 | 15 | 12.4 | brown |
| 45 | 14 | 12.4 | brown |
| 46a | 17 | 14.0 | olive green |
| 46b | 18 | 9.8 | green |
| 46c | 10 | 8.8 | green |
| 46d | 21 | 7.4 | green |
| 46e | 32 | 7.4 | green |
| 46f | 13 | 8.2 | green |
| 46g | 4 | 7.4 | brown |
| 46h | 15 | 5.6 | light brown |
| 46i | 21 | 7.4 | brown |
| 46j | 32 | 7.4 | brown |
| 46k | 26 | 5.6 | brown |
| 46l | 23 | 12.1 | dark brown |
| 46m | 12 | 14.6 | brown |
| 47a | 6 | 6.8 | green |
| 47b | 24 | 8.7 | brown |
| 47c | 11 | 8.7 | brown |
| 47d | 28 | 2.4 | brown |
| 47e | 34 | 4.6 | brown |
| 47f | 16 | 10.6 | brown |
| 47g | 24 | 10.6 | brown |
| 47h | 34 | 4.8 | brown |
| 47i | 33 | 4.8 | brown |
| 47j | 18 | 4.2 | brown |
| 47k | 29 | 17.9 | brown |
| 47l | 1 | 11.0 | brown |
| 47m | 10 | 8.8 | brown |
| 47n | 1 | 11.0 | brown |
| 47o | 16 | 10.6 | brown |
| 47p | 24 | 10.6 | green |
| 47q | 2 | 11.1 | green |
| 47r | 19 | 10.1 | green |
| 47s | 10 | 8.8 | green |

TABLE 19-continued

| Dye example No. | Dyeing prescription | Parts by weight (%) | Color of leather |
|---|---|---|---|
| 47t | 20 | 8.8 | green |
| 47u | 16 | 10.6 | green |
| 47v | 24 | 10.6 | green |
| 47z | 10 | 8.8 | green |
| 47aa | 28 | 2.4 | green |
| 47ab | 34 | 4.6 | green |
| 47ac | 10 | 8.8 | green |
| 47ad | 28 | 2.4 | green |
| 47ae | 34 | 4.6 | green |
| 47af | 9 | 4.8 | green |
| 47ag | 32 | 12.6 | green |
| 47ah | 7 | 11.6 | green |
| 47ai | 20 | 7.8 | green |
| 48 | 23 | 12.0 | brown |
| 49a | 16 | 10.6 | brown |
| 49b | 24 | 10.6 | brown |
| 49c | 28 | 10.4 | brown |
| 50a | 33 | 4.8 | reddish brown |
| 50b | 31 | 16.4 | rusty red |
| 50c | 29 | 17.9 | reddish brown |
| 51 | 30 | 12.0 | yellowish brown |
| 52a | 23 | 7.8 | brown |
| 52b | 23 | 7.8 | brown |
| 52c | 30 | 14.4 | brown |
| 52d | 19 | 7.8 | brown |
| 52e | 22 | 7.8 | brown |
| 53a | 27 | 7.8 | brown |
| 53b | 9 | 6.6 | brown |
| 53c | 21 | 6.6 | brown |
| 53d | 14 | 10.2 | brown |
| 54 | 17 | 10.2 | brown |
| 55 | 34 | 14.6 | brown |
| 56 | 15 | 7.3 | brown |
| 57 | 19 | 7.3 | brown |
| 58a | 17 | 11.0 | red |
| 58b | 11 | 9.2 | red |
| 58c | 15 | 4.9 | red |
| 59a | 9 | 7.0 | red |
| 59b | 8 | 6.3 | bordeaux |
| 59c | 32 | 11.1 | red |
| 59d | 10 | 7.4 | yellow |
| 59e | 20 | 7.4 | red |
| 59f | 13 | 8.8 | red |
| 59g | 16 | 8.4 | red |
| 59h | 17 | 8.0 | yellowish brown |
| 59i | 21 | 8.8 | red |
| 59j | 25 | 8.9 | red |
| 59k | 24 | 8.8 | beige |

The process of the present invention will now be more particularly described by way of example with reference to article recipes for producing dyed leathers for the most important article segments: footwear, apparel, automotive, handwear and furniture. However, the process of the present invention is not restricted to these 5 leather segments; for example, the process of the present invention likewise makes possible the production of bag leather and reptile leather for accessories.

In the article recipes which follow, parts are by weight. All information provided relates to commercial material. All data relating to tanning materials, hydrophobicizers, fatliquors and auxiliaries are based on commercially available products. Data regarding dye are based on the total amount of colored, organochemical constituents, any salts present because of the conditions of the synthesis (synthesis salts) and any standardizers present. In the article recipes, the following abbreviations for the chemicals of the wet-end process have been used.

Main ingredients of commercial fatliquors (F):

F1: aqueous emulsion of vegetable oils and sulfited fish oils.

F2: aqueous preparation based on the sodium salt of an anionic vinyl polymer and a nonionic surfactant (ethoxylated oleic acid).

F3: aqueous preparation based on modified fatty acids.

F4: aqueous preparation based on synthetic oils and phosphoric esters of ethoxylated fatty alcohols, comprising fatty alcohol sulfonates and butyldiglycol.

F5: aqueous preparation based on bisulfited fish oils (sodium salts) and the hydrolyzates of sulfochlorinated paraffin oils, ethoxylated isotridecanol.

F6: aqueous preparation based on sodium salts of sulfonated vegetable oils and modified synthetic oils and polymer.

F7: aqueous preparation based on sulfated fatty acid esters.

F8: aqueous preparation based on nonionic surfactants, sulfited oils (sodium salt).

F9: mixture of surfactants based on paraffin sulfonate, alkyl phospate and monoalkyl sulfate in the form of a preparation of the ammonium salts in solvent/water.

Main ingredients of commercial hydrophobicizers (H):

H1: aqueous preparation based on paraffins, functionalized polysiloxanes, N-oleoylsarcosine sodium salt.

H2: aqueous preparation based on paraffins, modified silicones, N-oleoylsarcosine sodium salt H3: aqueous preparation based on paraffins and anionic surfactants.

H4 aqueous preparation based on functionalized polysiloxanes and an emulsifier system H5: aqueous preparation based on modified silicone with a salt of a vinyl polymer.

H6: aqueous preparation based on functionalized polysiloxane with anionic surfactants.

H7: aqueous preparation based on functionalized polysiloxane.

H8: aqueous preparation based on paraffins and sodium salts of anionic surfactants.

"Mixture" as used in what follows is to be understood in relation to retanning materials and auxiliaries not only that the mixture is produced by mixing the components at room temperature and atmospheric pressure but also by mixing at elevated temperatures and pressures for a short or prolonged period.

Main ingredients of commercial retans (G):

G1: condensation product of phenolsulfonic acid, formaldehyde and aniline in the form of the sodium salt.

G2: aqueous preparation of the sodium salt of a condensation product of phenolsulfonic acid, formaldehyde and aniline.

G3: aqueous preparation of a mixture of a sodium-ammonium salt of a condensation product of phenolsulfonic acid, formaldehyde, melamine, urea and aniline with an amphoteric addition copolymer based on acrylic acid and a basic monomer.

G4: aqueous preparation of an ammonium salt of a condensation product of phenol, phenolsulfonic acid and formaldehyde.

G5: sodium salt of a condensation product based on dihydroxydiphenyl sulfone, phenolsulfonic acid, urea and formaldehyde.

G6: aqueous solution of a sodium-ammonium salt of a condensation product based on dihydroxydiphenyl sulfone, phenolsulfonic acid, urea and formaldehyde.

G7: high molecular weight condensation product based on dihydroxydiphenyl sulfone, phenolsulfonic acid, urea and formaldehyde in the form of the sodium salt.

G8: aqueous preparation based on a mixture of the sodium-ammonium salt of a low molecular weight condensation product based on dihydroxydiphenyl sulfone, urea and formaldehyde with a low molecular weight condensation product of diphenyl sulfone with formaldehyde.

G9: fat-tanning material based on a modified paraffin ($C_{16}$-$C_{34}$-alkyl sulfochloride).

G10: aqueous preparation based on a copolymer of acrylic acid with acrylonitrile and an amine.

G11: mixture of an naphthalenesulfonic acid-melamine condensate with hydroxymethanesulfonate and urea.

G12: 24% by weight solution of glutaraldehyde in water.

G13: 50% by weight solution of glutaraldehyde in water.

G14: aqueous solvent-containing preparation based on an aldehyde-based polymeric tanning agent (condensation product of formaldehyde and glutaraldehyde).

G15: aqueous preparation based on a copolymer of acrylic acid with acrylonitrile.

G16: aqueous preparation based on a low molecular weight polyacrylic acid (Mn<8000, number average).

G17: aqueous preparation based on a high molecular weight polyacrylic acid (Mn>40000, number average).

G18: aqueous preparation based on polymethacrylic acid.

G19: aqueous preparation of a copolymer of maleic acid and styrene

G20: chrome syntan (mixture of a condensation product based on an aromatic oligosulfone and a chromium preparation)

G21: Tara.

G22: mimosa.

G23: chestnut.

G24: lightly masked chrome tanning material having a $Cr_2O_3$ content of 24% by weight and a basicity of 40%.

G25: liquid preparation of tetrakis(hydroxymethyl)phosphonium chloride and sulfate G26: 4,4-dimethyl-1,3-oxazolidine.

G27: 1-aza-3,7-dioxybicyclo-5-ethyl[3.3.0]octane.

G28: mixture of a polycondensation product based on urea and formaldehyde with a polycondensation product based on phenol and formaldehyde.

G29; 30% by weight aqueous formaldehyde solution.

G30: mineral tanning material mixture based on aluminum hydroxide in an amount of 14% by weight (reckoned as $Al_2O_3$) and 3% by weight of chromium salts (reckoned as $Cr_2O_3$)

Main ingredients of commercial auxiliaries (HM):

HM1: mixture of hydroxymethanesulfonate with the sodium salt of a condensation product formed from naphthalenesulfonic acid, urea and formaldehyde.

HM2: mixture of ethoxylated alkylamines ($C_{16}$-$C_{18}$).

HM3: aqueous preparation of a partially hydrolyzed poly-N-vinylformamide, slightly cationic.

HM4: aqueous preparation of an anionically modified addition copolymer.

HM5: hydroxymethylated urea.

HM6: mixture based on aromatic sulfonic acids as sodium salts, phenol, formaldehyde and urea.

HM7: aqueous preparation of a cationic, amino-containing polycondensate.

Fastnesses were determined in accordance with the following, internationally recognized standards:

Perspirationfastness: on the lines of Veslic C4260

Washfastness: on the lines of DIN EN ISO 15703

Migrationfastness: on the lines of DIN EN ISO 15701 and also by 16 h storage at 85° C. in a humidity of 95% under otherwise analogous conditions to DIN EN ISO 15701

Rubfastness: on the lines of DIN EN ISO 105-X12 (Crockmeter, rubbing with woven cotton) and also on the lines of DIN EN ISO 11640 (Veslic, rubbing with felt)

Maeser: on the lines of ASTM D 2099

Penetrometer: on the lines of DIN EN ISO 5403

Water vapor permeability: on the lines of DIN EN ISO 14268

Flex resistance: on the lines of DIN EN ISO 5402

Stitch pullout test: on the lines of DIN 5331

Tear strength: on the lines of DIN EN ISO 3377

Tensile strength: on the lines of DIN EN ISO 3376

A Shoe Upper Leather Recipes:

Shoe Upper Leather Recipe 1:

A piece of 100 parts by weight of a conventionally chrome-tanned cattlehide leather, 2.0 mm in shaved thickness was washed at 35° C. for 10 minutes in a float of 200 parts of water and subsequently drummed for 5 minutes at 40° C. in a float consisting of 150 parts of water, 2 parts of sodium formate and 1 part of sodium acetate, subsequently admixed with 2 parts of sodium bicarbonate and neutralized at 40° C. for 10 minutes. The deacidifying float then had a pH of 7.3. The deacidifying float was admixed with 4.6 parts of dye 1e and dyed at pH 6.8 and 40° C. for 30 minutes. A total of 6 parts of sodium carbonate were added a little at a time to set the float pH between 9.2-9.6 for fixation and the leather was drummed at 40° C. for 60 minutes. After float change, the leather was washed twice with 300 parts of water each time for a total of 30 minutes. A pH of 6.5 was set in the course of 30 minutes in a float of 300 parts water by portionwise addition of a total of 0.5 part of formic acid.

The leather thus dyed was retanned for 20 minutes at 40° C. in a freshly set float composed of 200 parts of water and 5 parts of the fatliquoring and tanning hydrophobicizer H5. A pH of 5.0 was set in the course of 20 minutes by addition of 0.5 part of formic acid. Using 3 parts of the polymeric tanning material G15, retanning was effected at 40° C. for 30 minutes. The float was subsequently admixed with a mixture of 5 parts of the hydrophobicizer H2 and 0.3 part of the auxiliary HM4. Following a drumming time of a further 60 minutes, a total of 2.5 parts of formic acid were added a little at a time to acidify the pH to 3.7 in the course of 60 minutes. This was followed by 10 minutes of drumming at 30° C. in a freshly set float composed of 150 parts of water and 0.5 part of formic acid. This was followed by 90 minutes of rechroming by addition of 5 parts of the chrome tanning material G24. A pH of 3.6 was obtained. Finally, the leather was washed twice in 300 parts of water each time at 30° C. for 10 minutes.

The leather thus dyed, retanned and hydrophobicized was horsed up overnight, subsequently set out, subjected to reduced pressure at 60° C. for 3 minutes, suspension dried at room temperature overnight, conditioned, staked and vacuum dried at 60° C. for 2 minutes.

This gave a hydrophobicized shoe upper leather having excellent wash-, perspiration-, migration- and rubfastnesses. A shoe upper leather dyed with one of the dyes of examples 1a to 59k can be produced in an analogous manner.

Shoe Upper Leather Recipe 2:

A piece of 100 parts by weight of a conventionally chrome-tanned cattlehide leather, 2.0 mm in shaved thickness was washed at 35° C. for 10 minutes in a float of 200 parts of water and subsequently drummed for 5 minutes at 40° C. in a float consisting of 150 parts of water, 2 parts of sodium formate and 1 part of sodium acetate, subsequently admixed with 2 parts of sodium bicarbonate and neutralized at 40° C. for 10 minutes. The deacidifying float then had a pH of 7.3. The deacidifying float was admixed with 7.5 parts of dye 2f and dyed at pH 6.8 and 40° C. for 30 minutes. A total of 8 parts of sodium carbonate were added a little at a time to set the float pH between 9.2-9.6 for fixation and the leather was drummed at 40° C. for 60 minutes. After float change, the leather was washed twice with 300 parts of water each time for a total of 30 minutes. A pH of 6.5 was set in the course of 30 minutes in a float of 300 parts of water by portionwise addition of a total of 0.5 part of formic acid.

The leather thus dyed was retanned for 20 minutes at 40° C. in a freshly set float composed of 200 parts of water and 5 parts of the fatliquoring and tanning hydrophobicizer H5. A pH of 5.0 was set in the course of 20 minutes by addition of 0.5 part of formic acid. Using 3 parts of the polymeric tanning material G15, retanning was effected at 40° C. for 20 minutes. Thereafter, 5 parts of retanning material G1 were added to the float before a further 30 minutes of drumming. The float was subsequently admixed with a mixture of 6 parts of the hydrophobicizer H2 and 0.3 part of the auxiliary HM 4. Following a drumming time of a further 60 minutes, a total of 2.5 parts of formic acid were added a little at a time to acidify the pH to 3.6 in the course of 60 minutes. This was followed by 10 minutes of drumming at 30° C. in a freshly set float composed of 150 parts of water and 0.5 part of formic acid. This was followed by 90 minutes of rechroming by addition of 5 parts of the chrome tanning material G 24. A pH of 3.6 was obtained. Finally, the leather was washed twice in 300 parts of water each time at 30° C. for 10 minutes.

The leather thus dyed, retanned and hydrophobicized was horsed up overnight, subsequently set out, subjected to reduced pressure at 60° C. for 3 minutes, suspension dried at room temperature overnight, conditioned, staked and vacuum dried at 60° C. for 2 minutes.

This gave a hydrophobicized shoe upper leather having excellent wash-, perspiration-, migration- and rubfastnesses.

A shoe upper leather dyed with one of the dyes of examples 1a to 59k can be produced in an analogous manner.

Shoe Upper Leather Recipe 3:

A piece of 100 parts by weight of a conventionally chrome-tanned cattlehide leather, 2.0 mm in shaved thickness was washed at 35° C. for 10 minutes in a float of 200 parts of water and subsequently drummed for 5 minutes at 40° C. in a float consisting of 150 parts of water, 2 parts of sodium formate and 1 part of sodium acetate, subsequently admixed with 2 parts of sodium bicarbonate and neutralized at 40° C. for 10 minutes. The deacidifying float then had a pH of 7.3. The deacidifying float was admixed with 5.1 parts of dye 3 and dyed at pH 6.8 and 40° C. for 30 minutes. A total of 6 parts of sodium carbonate were added a little at a time to set the float pH between 9.2-9.6 for fixation and the leather was drummed at 40° C. for 60 minutes. After float change, the leather was washed twice with 300 parts of water each time for a total of 30 minutes. A pH of 6.5 was set in the course of 30 minutes in a float of 300 parts of water by portionwise addition of a total of 0.5 part of formic acid.

The leather thus dyed was retanned for 20 minutes at 40° C. in a freshly set float composed of 200 parts of water and 5 parts of the fatliquoring and tanning hydrophobicizer H5. A pH of 5.0 was set in the course of 20 minutes by addition of 0.5 part of formic acid. Using 3 parts of the polymeric tanning material G15, retanning was effected at 40° C. for 20 minutes. Thereafter, 5 parts of retanning material G11 were added to the liquor for a further 30 minutes of drumming. The float was subsequently admixed with a mixture of 6 parts of the hydrophobicizer H2 and 0.3 part of the auxiliary HM4. Following a drumming time of a further 60 minutes, a total of 2.5 parts of formic acid were added a little at a time to acidify the pH to 3.6 in the course of 60 minutes. This was followed by 10 minutes of drumming at 30° C. in a freshly set float composed of 150 parts of water and 0.5 part of formic acid. This was followed by 90 minutes of rechroming by addition of 5 parts of the chrome tanning material G24. A pH of 3.7 was obtained. Finally, the leather was washed twice in 300 parts of water each time at 30° C. for 10 minutes.

The leather thus dyed, retanned and hydrophobicized was horsed up overnight, subsequently set out, subjected to reduced pressure at 60° C. for 3 minutes, suspension dried at room temperature overnight, conditioned, staked and vacuum dried at 60° C. for 2 minutes.

This gave a hydrophobicized shoe upper leather having excellent wash-, perspiration-, migration- and rubfastnesses. A shoe upper leather dyed with one of the dyes of examples 1a to 59k can be produced in an analogous manner.

Shoe Upper Leather Recipe 4:

A piece of 100 parts by weight of a conventionally organic-tanned cattlehide leather 1.3-1.4 mm in shaved thickness was washed for 15 minutes at 30° C. in a float composed of 300 parts of water and subsequently drummed for 10 minutes at 35° C. in a float consisting of 100 parts of water and 1.5 parts of sodium formate. The float had a pH of 4.2-4.6. The float was admixed with 8.5 parts of dye 4d before dyeing at pH 5.5 and 35° C. for 60 minutes. A total of 3 parts of sodium bicarbonate were added a little at a time to set a pH of 7.3-7.8 in the course of 20 minutes. For fixation, the pH of the float was set between 9.2-9.6 by portionwise addition of a total of 8 parts of sodium carbonate and drumming at 35° C. for 60 minutes. After float change, the leather was washed twice with 300 parts of water and 1.5 parts of HM3 each time at 40° C. for a total of 50 minutes. A pH of 4.3-4.6 was set at 40° C. in the course of 70 minutes in a float of 200 parts of water by portionwise addition of a total of 2 parts of formic acid.

The leather thus dyed was retanned for 30 minutes at 35° C. in a freshly set float composed of 100 parts of water, 6 parts of polymeric tanning material G18 and 1.5 parts of the fatliqour F6. After addition of 10 parts of retanning material G18 and a drumming time of 60 minutes, tanning was completed by adding 10 parts of vegetable tanning material G22 and 10 parts of retanning material G4 and drumming at 35° C. for 60 minutes. The float was admixed with 5.5 parts of fatliquor F6 and the leather fatliquored at 35° C. for 90 minutes. To fix the fatliquor, the addition of 100 parts of hot water at 40° C. and a drumming time of 20 minutes was followed by addition over 50 minutes of formic acid to set a pH of 3.5. This was followed by 15 minutes of rinsing.

The leather thus dyed, retanned and fatliquored was horsed up overnight, subsequently set out, subjected to reduced pressure at 45° C. for 4 minutes, suspension dried at room temperature overnight, conditioned, staked and vacuum dried.

This gave a wet-white shoe upper leather having excellent wash-, perspiration-, migration- and rubfastnesses. A wet-white shoe upper leather dyed with one of the dyes of examples 1a to 59k can be produced in an analogous manner.

Shoe Upper Leather Recipe 5:

A piece of 100 parts by weight of a conventionally organic-tanned cattlehide leather 1.3-1.4 mm in shaved thickness was washed for 15 minutes at 30° C. in a float composed of 300 parts of water and subsequently drummed for 10 minutes at 35° C. in a float consisting of 100 parts of water and 1.5 parts of sodium formate. The float had a pH of 4.2-4.6. The float was admixed with 10 parts of dye 5b before dyeing at pH 5.5 and 35° C. for 60 minutes. A total of 3 parts of sodium bicarbonate were added a little at a time to set a pH of 7.3-7.8 in the course of 20 minutes. For fixation, the pH of the float was set between 9.2-9.6 by portionwise addition of a total of 9 parts of sodium carbonate and drumming at 35° C. for 60 minutes. After float change, the leather was washed three times with 300 parts of water each time at 40° C. for a total of 60 minutes. A pH of 4.3-4.6 was set at 40° C. in the course of 70 minutes in a float of 200 parts of water by portionwise addition of a total of 2 parts of formic acid.

The leather thus dyed was retanned for 30 minutes at 35° C. in a freshly set float composed of 100 parts of water, 6 parts of polymeric tanning material G18 and 1.5 parts of the fatliqour F6. After addition of 10 parts of retanning material G18 and a drumming time of 60 minutes, tanning was completed by adding 10 parts of vegetable tanning material G22 and 10 parts of retanning material G4 and drumming at 35° C. for 60 minutes. The float was admixed with 5.5 parts of fatliquor F6 and the leather fatliquored at 35° C. for 90 minutes. To fix the fatliquor, the addition of 100 parts of hot water at 40° C. and a drumming time of 20 minutes was followed by addition over 50 minutes of formic acid to set a pH of 3.5. This was followed by 15 minutes of rinsing.

The leather thus dyed, retanned and fatliquored was horsed up overnight, subsequently set out, subjected to reduced pressure at 45° C. for 4 minutes, suspension dried at room temperature overnight, conditioned, staked and vacuum dried.

This gave a wet-white shoe upper leather having excellent wash-, perspiration-, migration- and rubfastnesses. A wet-white shoe upper leather dyed with one of the dyes of examples 1a to 59k can be produced in an analogous manner.

Shoe Leather Upper Recipe 6:

A piece of 100 parts by weight of a conventionally chrome-tanned cattlehide leather, 1.8 mm in shaved thickness was washed at 35° C. for 10 minutes in a float of 200 parts of water and subsequently drummed for 5 minutes at 40° C. in a float consisting of 150 parts of water and 1.5 parts of sodium formate and subsequently admixed with 1.5 parts of sodium bicarbonate and neutralized at 40° C. for 10 minutes. Addition of a further 1.5 parts of sodium bicarbonate and 3 parts of HM4 was followed by drumming for a further 15 minutes. The deacidifying float then had a pH of 7.6. The deacidifying float was admixed with 9 parts of dye 6c and dyed at pH 7.2 and 40° C. for 90 minutes. A total of 8 parts of sodium carbonate were added a little at a time to set the float pH between 9.3-9.9 for fixation and the leather was drummed at 40° C. for 60 minutes. After float change, the leather was washed three times with 300 parts of water each time for a total of 60 minutes. A pH of 4.5 was set in the course of 60 minutes in a float of 200 parts of water by portionwise addition of a total of 2 parts of formic acid.

The leather thus dyed was retanned in a freshly set float composed of 80 parts of water and 4 parts of polymeric tanning material G15 at 45° C. for 30 minutes. Drumming was continued for a further 40 minutes after addition of 5 parts of vegetable tanning material G22 and 3 parts of resin tanning material G11. For fatliquoring, the float was subsequently admixed with a mixture of 6 parts of hydrophobicizer H1 and 0.4 part of auxiliary HM4. Following a drumming time of a further 90 minutes, 70 parts of hot water at 60° C. were added, drummed for 10 minutes and subsequently acidified to a pH of 3.4 in the course of 60 minutes by portionwise addition of a total of 5 parts of formic acid.

After a 10 minute wash with 200 parts of water at 30° C. the leather was drummed in a freshly set float composed of 200 parts of water, 1 part of hydrophobicizer H6 and 0.2 part of auxiliary H4 at 30° C. for 20 minutes. Subsequently the leather was rechromed overnight by addition of 4 parts of chrome tanning material G 24. The float pH was 3.4. Finally, the leather was washed twice in 200 parts of water each time at 30° C. for 10 minutes.

The leather thus dyed, retanned and hydrophobicized was horsed up overnight, subsequently set out, subjected to reduced pressure at 50° C. for 6 minutes, suspension dried at room temperature overnight, conditioned, staked and vacuum dried at 50° C. for 2 minutes.

This gave a hydrophobicized shoe upper leather having excellent wash-, perspiration-, migration- and rubfastnesses. A hydrophobicized shoe upper leather dyed with one of the dyes of examples 1a to 59k can be produced in an analogous manner.

Shoe Upper Leather Recipe 7:

A piece of 100 parts by weight of a conventionally chrome-tanned cattlehide leather, 1.8 mm in shaved thickness was washed at 35° C. for 10 minutes in a float of 200 parts of water and subsequently drummed for 5 minutes at 40° C. in a float consisting of 150 parts of water and 1.5 parts of sodium formate and subsequently admixed with 1.5 parts of sodium bicarbonate and neutralized at 40° C. for 10 minutes. Addition of a further 1.5 parts of sodium bicarbonate and 3 parts of HM4 was followed by drumming for a further 15 minutes. The deacidifying float then had a pH of 7.6. The deacidifying float was admixed with 11.5 parts of dye 7 and dyed at pH 7.2 and 40° C. for 90 minutes. A total of 10 parts of sodium carbonate were added a little at a time to set the float pH between 9.3-9.9 for fixation and the leather was drummed at 40° C. for 60 minutes. After float change, the leather was washed three times with 300 parts of water each time for a total of 60 minutes. A pH of 4.6 was set in the course of 60 minutes in a float of 200 parts water by portionwise addition of a total of 2 parts of formic acid.

The leather thus dyed was retanned in a freshly set float composed of 80 parts of water and 4 parts of polymeric tanning material G15 at 45° C. for 30 minutes. Drumming was continued for a further 40 minutes after addition of 5 parts of vegetable tanning material G22 and 3 parts of resin tanning material G11. For fatliquoring, the float was subsequently admixed with a mixture of 6 parts of hydrophobicizer H1 and 0.4 part of auxiliary HM4. Following a drumming time of a further 90 minutes, 70 parts of hot water at 60° C. were added, drummed for 10 minutes and subsequently acidified to a pH of 3.3 in the course of 60 minutes by portionwise addition of a total of 5 parts of formic acid.

After a 10 minute wash with 200 parts of water at 30° C. the leather was drummed in a freshly set float composed of 100 parts of water and 3 parts of auxiliary G24 at 30° C. overnight. After a 10 minute wash with 200 parts of water at 30° C. a freshly set float composed of 100 parts of water and 2 parts of hydrophobicizer H6 over the course of 20 minutes at 30° C. Subsequently the leather was rechromed for 90 minutes by addition of 3 parts of chrome tanning material G 24. The float pH was 3.4. Finally, the leather was washed twice in 200 parts of water each time at 30° C. for 10 minutes.

The leather thus dyed, retanned and hydrophobicized was horsed up overnight, subsequently set out, subjected to reduced pressure at 50° C. for 6 minutes, suspension dried at room temperature overnight, conditioned, staked and vacuum dried at 50° C. for 2 minutes.

This gave a hydrophobicized shoe upper leather having excellent wash-, perspiration-, migration- and rubfastnesses. A hydrophobicized shoe upper leather dyed with one of the dyes of examples 1a to 59k can be produced in an analogous manner.

Shoe Upper Leather Recipe 8:

A piece of 100 parts by weight of a conventionally chrome-tanned cattlehide leather 1.8 mm in shaved thickness was washed in a float of 200 parts of water at 35° C. for 10 minutes and subsequently drummed for 5 minutes at 40° C. in a float consisting of 100 parts of water and 1.5 parts of sodium formate, thereafter a total of 3 parts of sodium bicarbonate were added a little at a time over 20 minutes and a neutralization pH of 7.7 was achieved. After addition of 1.5 parts of HM2 the leather was drummed at 40° C. for 5 minutes and subsequently 6.5 parts of dye 8 were added to the acidifying liquor before dyeing at pH 7.5 and 40° C. for 40 minutes. A total of 7.1 parts of sodium carbonate were added a little at a time to set the float pH between 9.2-9.6 for fixation before drumming at 40° C. for 90 minutes. After float change, the leather was washed three times with 300 parts of water each time for a total of 60 minutes. A total of 2 parts of formic acid were added a little at a time over 90 minutes to set a pH of 4.3 in a float of 200 parts of water.

The leather thus dyed was retanned in a freshly set float composed of 80 parts of water and 3 parts of polymeric tanning material G15 at 45° C. for 40 minutes. The leather was retanned at 45° C. for 60 minutes by addition of 3 parts of retanning material G1, 3 parts of vegetable tanning material G22 and 3 parts of resin tanning material G11. Following addition of 70 parts of hot water at 60° C. the leather was drummed at 60° C. for 20 minutes and fatliquored at 60° C. for 60 minutes after addition of 2.5 parts of fatliquor F7 and 2.5 parts of fatliquor F4. A total of 4 parts of formic acid were added a little at a time to acidify the leather to a pH of 3.5 in the course of 60 minutes. This was followed by 15 minutes of rinsing.

The leather thus dyed, retanned and fatliquored was horsed up overnight, subsequently set out, subjected to reduced pressure at 60° C. for 2 minutes, suspension dried at room temperature overnight, conditioned, staked and vacuum dried at 60° C. for 2 minutes.

This gave a shoe upper leather having excellent wash-, perspiration-, migration- and rubfastnesses. A shoe upper leather dyed with one of the dyes of examples 1a to 59k can be prepared in an analogous manner.

Shoe Upper Leather Recipe 9:

A piece of 100 parts by weight of a conventionally chrome-tanned cattlehide leather 1.8 mm in shaved thickness was washed in a float of 200 parts of water at 35° C. for 10 minutes and subsequently drummed for 5 minutes at 40° C. in a float consisting of 100 parts of water and 1.5 parts of sodium formate, thereafter a total of 3 parts of sodium bicarbonate were added a little at a time over 20 minutes and a neutralization pH of 7.7 was achieved. After addition of 1.5 parts of HM2 the leather was drummed at 40° C. for 5 minutes and subsequently 4 parts of dye 9b were added to the acidifying float before dyeing at pH 7.5 and 40° C. for 40 minutes. A total of 5 parts of sodium carbonate were added a little at a time to set the float pH between 9.2-9.6 for fixation before drumming at 40° C. for 90 minutes. After float change, the leather was washed three times with 300 parts of water each time for a total of 60 minutes. A total of 2 parts of formic acid were added a little at a time over 90 minutes to set a pH of 4.3 in a float of 200 parts of water.

The leather thus dyed was retanned in a freshly set float composed of 80 parts of water and 3 parts of polymeric tanning material G17 at 45° C. for 40 minutes. The leather was retanned at 45° C. for 60 minutes by addition of 3 parts of retanning material G7, 2 parts of vegetable tanning material G22, 2 parts of vegetable tanning material G23 and 3 parts of resin tanning material G11. Following addition of 70 parts of hot water at 60° C. the leather was drummed at 60° C. for 20 minutes and fatliquored at 60° C. for 60 minutes after addition of 2.5 parts of fatliquor F7 and 2.5 parts of fatliquor F4. A total of 4 parts of formic acid were added a little at a time to acidify the leather to a pH of 3.5 in the course of 60 minutes. This was followed by 15 minutes of rinsing.

The leather thus dyed, retanned and fatliquored was horsed up overnight, subsequently set out, subjected to reduced pressure at 60° C. for 2 minutes, suspension dried at room temperature overnight, conditioned, staked and vacuum dried at 60° C. for 2 minutes.

This gave a shoe upper leather having excellent wash-, perspiration-, migration- and rubfastnesses. A shoe upper leather dyed with one of the dyes of examples 1a to 59k can be prepared in an analogous manner.

Shoe Upper Leather Recipe 10:

A piece of 100 parts by weight of a conventionally chrome-tanned cattlehide leather 1.8 mm in shaved thickness was washed in a float of 200 parts of water at 35° C. for 10 minutes and subsequently drummed for 5 minutes at 40° C. in a float consisting of 100 parts of water and 1.5 parts of sodium formate, thereafter a total of 3 parts of sodium bicarbonate were added a little at a time over 20 minutes and a neutralization pH of 7.7 was achieved. After addition of 1.5 parts of HM2 the leather was drummed at 40° C. for 5 minutes and subsequently 6.9 parts of dye 10 were added to the acidifying float before dyeing at pH 7.5 and 40° C. for 40 minutes. A total of 7.2 parts of sodium carbonate were added a little at a time to set the float pH between 9.2-9.6 for fixation before drumming at 40° C. for 90 minutes. After float change, the leather was washed three times with 300 parts of water each time for a total of 60 minutes. A total of 2 parts of formic acid were added a little at a time over 90 minutes to set a pH of 4.3 in a float of 200 parts of water.

The leather thus dyed was retanned in a freshly set float composed of 80 parts of water and 5 parts of polymeric tanning material G18 at 45° C. for 40 minutes. The leather was retanned at 45° C. for 60 minutes by addition of 3 parts of retanning material G1, 2 parts of vegetable tanning material G22 and 4 parts of polymeric tanning material G10. Following addition of 70 parts of hot water at 60° C. the leather was drummed at 60° C. for 20 minutes and fatliquored at 60° C. for 60 minutes after addition of 4.5 parts of fatliquor F5 and 0.5 part of fatliquor F8. A total of 4 parts of formic acid were added a little at a time to acidify the leather to a pH of 3.5 in the course of 60 minutes. This was followed by 15 minutes of rinsing.

The leather thus dyed, retanned and fatliquored was horsed up overnight, subsequently set out, subjected to reduced pressure at 60° C. for 2 minutes, suspension dried at room temperature overnight, conditioned, staked and vacuum dried at 60° C. for 2 minutes.

This gave a shoe upper leather having excellent wash-, perspiration-, migration- and rubfastnesses. A shoe upper leather dyed with one of the dyes of examples 1a to 59k can be prepared in an analogous manner.

Shoe Upper Leather Recipe 11:

A piece of 100 parts by weight of a conventionally chrome-tanned cattlehide leather 1.8 mm in shaved thickness was washed in a float of 200 parts of water at 35° C. for 10 minutes and subsequently drummed for 5 minutes at 40° C. in a float consisting of 100 parts of water and 1.5 parts of sodium formate, thereafter a total of 3 parts of sodium bicarbonate were added a little at a time over 20 minutes and a neutralization pH of 7.7 was achieved. After addition of 1.5 parts of HM2 the leather was drummed at 40° C. for 5 minutes and subsequently 9 parts of dye 11 b were added to the deacidifying float before dyeing at pH 7.5 and 40° C. for 40 minutes. A total of 9.5 parts of sodium carbonate were added a little at a time to set the float pH between 9.2-9.6 for fixation before drumming at 40° C. for 90 minutes. After float change, the leather was washed three times with 300 parts of water each time for a total of 60 minutes. A total of 2 parts of formic acid were added a little at a time over 90 minutes to set a pH of 4.3 in a float of 200 parts of water.

The leather thus dyed was retanned in a freshly set float composed of 80 parts of water, 1.5 parts of retanning material G13 and 2.5 parts of polymeric tanning material G16 at 45° C.

for 40 minutes. The leather was retanned at 45° C. for 60 minutes by addition of 3 parts of retanning material G1, 3 parts of vegetable tanning material G22 and 3 parts of resin tanning material G11. Following addition of 70 parts of hot water at 60° C. the leather was drummed at 60° C. for 20 minutes and fatliquored at 60° C. for 60 minutes after addition of 4.5 parts of fatliquor F5 and 0.5 part of fatliquor F8. A total of 4 parts of formic acid were added a little at a time to acidify the leather to a pH of 3.5 in the course of 60 minutes. This was followed by 15 minutes of cold rinsing.

The leather thus dyed, retanned and fatliquored was horsed up overnight, subsequently set out, subjected to reduced pressure at 60° C. for 2 minutes, suspension dried at room temperature overnight, conditioned, staked and vacuum dried at 60° C. for 2 minutes.

This gave a shoe upper leather having excellent wash-, perspiration-, migration- and rubfastnesses. A shoe upper leather dyed with one of the dyes of examples 1a to 59k can be prepared in an analogous manner.

Shoe Upper Leather Recipe 12:

A piece of 100 parts by weight of a conventionally chrome-tanned cattlehide leather 1.8 mm in shaved thickness was washed in a float of 200 parts of water at 35° C. for 10 minutes and subsequently drummed for 5 minutes at 40° C. in a float consisting of 100 parts of water and 1.5 parts of sodium formate, thereafter a total of 3 parts of sodium bicarbonate were added a little at a time over 20 minutes and a neutralization pH of 7.7 was achieved. After addition of 1.5 parts of HM2 the leather was drummed at 40° C. for 5 minutes and subsequently 8.5 parts of dye 12d were added to the deacidifying float before dyeing at pH 7.5 and 40° C. for 40 minutes. A total of 9 parts of sodium carbonate were added a little at a time to set the float pH between 9.2-9.6 for fixation before drumming at 40° C. for 90 minutes. After float change, the leather was washed three times with 300 parts of water each time for a total of 60 minutes. A total of 2 parts of formic acid were added a little at a time over 90 minutes to set a pH of 4.3 in a float of 200 parts of water.

The leather thus dyed was retanned in a freshly set float composed of 80 parts of water, 1.5 parts of retanning material G13 and 2.5 parts of polymeric tanning material G16 at 45° C. for 40 minutes. The leather was retanned at 45° C. for 60 minutes by addition of 8 parts of retanning material G2, 3 parts of polymeric tanning material G19 and 3 parts of resin tanning material G11. Following addition of 70 parts of hot water at 60° C. the leather was drummed at 60° C. for 20 minutes and fatliquored at 60° C. for 60 minutes after addition of 4.5 parts of fatliquor F5 and 0.5 part of fatliquor F8. A total of 4 parts of formic acid were added a little at a time to acidify the leather to a pH of 3.5 in the course of 60 minutes. This was followed by 15 minutes of cold rinsing.

The leather thus dyed, retanned and fatliquored was horsed up overnight, subsequently set out, subjected to reduced pressure at 60° C. for 2 minutes, suspension dried at room temperature overnight, conditioned, staked and vacuum dried at 60° C. for 2 minutes.

This gave a shoe upper leather having excellent wash-, perspiration-, migration- and rubfastnesses. A shoe upper leather dyed with one of the dyes of examples 1a to 59k can be prepared in an analogous manner.

Shoe Upper Leather Recipe 13

A piece of 100 parts by weight of a conventionally chrome-tanned cattlehide leather 1.8 mm in shaved thickness was washed in a float of 200 parts of water at 35° C. for 10 minutes and subsequently drummed for 5 minutes at 40° C. in a float consisting of 100 parts of water and 1.5 parts of sodium formate, thereafter a total of 3 parts of sodium bicarbonate were added a little at a time over 20 minutes and a neutralization pH of 7.7 was achieved. After addition of 1.5 parts of HM2 the leather was drummed at 40° C. for 5 minutes and subsequently 8 parts of dye 12at were added to the deacidifying float before dyeing at pH 7.5 and 40° C. for 40 minutes. A total of 9 parts of sodium carbonate were added a little at a time to set the float pH between 9.2-9.6 for fixation before drumming at 40° C. for 90 minutes. After float change, the leather was washed three times with 300 parts of water each time for a total of 60 minutes. A total of 2 parts of formic acid were added a little at a time over 90 minutes to set a pH of 4.3 in a float of 200 parts of water.

The leather thus dyed was retanned in a freshly set float composed of 80 parts of water, 1 part of retanning material G13 and 3 parts of polymeric tanning material G16 at 45° C. for 40 minutes. The leather was retanned at 45° C. for 60 minutes by addition of 1.5 parts of auxiliary HM4, 3 parts of polymeric tanning material G19 and 3 parts of polymeric tanning material G10. Following addition of 70 parts of hot water at 60° C. the leather was drummed at 60° C. for 20 minutes and fatliquored at 60° C. for 60 minutes after addition of 1.5 parts of fatliquor F2 and 3.5 parts of hydrophobicizer H3. A total of 4 parts of formic acid were added a little at a time to acidify the leather to a pH of 3.5 in the course of 60 minutes. This was followed by 10 minutes of cold rinsing.

The leather thus dyed, retanned and fatliquored was horsed up overnight, subsequently set out, subjected to reduced pressure at 60° C. for 2 minutes, suspension dried at room temperature overnight, conditioned, staked and vacuum dried at 60° C. for 2 minutes.

This gave a shoe upper leather having excellent wash-, perspiration-, migration- and rubfastnesses. A shoe upper leather dyed with one of the dyes of examples 1a to 59k can be prepared in an analogous manner.

Shoe Upper Leather Recipe 14:

A piece of 100 parts by weight of a conventionally chrome-tanned cattlehide leather 1.3 mm in shaved thickness was washed in a float of 200 parts of water at 35° C. for 10 minutes and subsequently drummed for 5 minutes at 40° C. in a float consisting of 100 parts of water and 1.5 parts of sodium formate, thereafter a total of 3 parts of sodium bicarbonate were added a little at a time over 20 minutes and a neutralization pH of 7.7 was achieved. After addition of 1.5 parts of HM2 the leather was drummed at 40° C. for 5 minutes and subsequently 8 parts of dye 12bx were added to the deacidifying float before dyeing at pH 7.5 and 40° C. for 40 minutes. A total of 8.5 parts of sodium carbonate were added a little at a time to set the float pH between 9.2-9.6 for fixation before drumming at 40° C. for 90 minutes. After float change, the leather was washed three times with 300 parts of water each time for a total of 60 minutes. A total of 2 parts of formic acid were added a little at a time over 90 minutes to set a pH of 4.3 in a float of 200 parts of water.

The leather thus dyed was retanned in a freshly set float composed of 80 parts of water and 1 part of retanning material G13 for 10 minutes. The leather was retanned for 40 minutes at 35° C. by addition of 4 parts of chrome tanning material G24, 2 parts of retanning material G1, 1 part of fatliquor F1. This was followed by the addition of 1 part of sodium formate and drumming for 20 min. After 0.3 part of sodium bicarbonate had been added the leather was retanned for a further 90 minutes. After a 10 minute wash at 35° C. in 300 parts of water the leather was neutralized in a new float composed of 100 parts of water and 1.5 parts of sodium formate at 35° C. for 10 minutes. The neutralization float was admixed with 0.5 part of sodium bicarbonate before drumming for 30 minutes. After a 30 minute retan with 5 parts of polymeric tanning material G18, the tanning of the leather was completed by adding 5 parts of retanning material G5 and 3 parts of retanning material G1. Following a drumming time of 40 minutes the float was diluted with 100 parts of hot water at 60° C. before drumming at 60° C. for 10 minutes. After addition of 3.5 parts of fatliquor F1 and 3.5 parts of hydrophobicizer H3 the leather was fatliquored at 60° C. for 60 minutes. A total of 4 parts of formic acid was added a little at a time to acidify to a pH of 3.5 over 60 minutes. This was followed by a 10 minute cold rinse.

The leather thus dyed, retanned and fatliquored was horsed up overnight, subsequently set out, subjected to reduced pressure at 60° C. for 2 minutes, suspension dried at room temperature overnight, conditioned, staked and vacuum dried at 60° C. for 2 minutes.

This gave a softy shoe upper leather having excellent wash-, perspiration-, migration- and rubfastnesses. A softy shoe upper leather dyed with one of the dyes of examples 1a to 59k can be prepared in an analogous manner.

Shoe Upper Leather Recipe 15:

A piece of 100 parts by weight of a conventionally chrome-tanned cattlehide leather 1.3 mm in shaved thickness was washed in a float of 200 parts of water at 35° C. for 10 minutes and subsequently drummed for 5 minutes at 40° C. in a float consisting of 100 parts of water and 1.5 parts of sodium formate, thereafter a total of 3 parts of sodium bicarbonate were added a little at a time over 20 minutes and a neutralization pH of 7.7 was achieved. After addition of 1.5 parts of HM2 the leather was drummed at 40° C. for 5 minutes and subsequently 8 parts of dye mixture 12gz were added to the deacidifying float before dyeing at pH 7.5 and 40° C. for 40 minutes. A total of 8.5 parts of sodium carbonate were added a little at a time to set the float pH between 9.2-9.6 for fixation before drumming at 40° C. for 90 minutes. After float change, the leather was washed three times with 300 parts of water each time for a total of 60 minutes. A total of 2 parts of formic acid were added a little at a time over 90 minutes to set a pH of 4.3 in a float of 200 parts of water.

The leather thus dyed was retanned in a freshly set float composed of 80 parts of water and 1.5 parts of retanning material G14 for 10 minutes. The leather was retanned for 40 minutes at 35° C. by addition of 6 parts of chrome syntan G20 and 1 part of fatliquor F1. This was followed by the addition of 1 part of sodium formate and drumming for 20 min. After 0.3 part of sodium bicarbonate had been added the leather was retanned for a further 90 minutes. After a 10 minute wash at 35° C. in 300 parts of water the leather was neutralized in a new float composed of 100 parts of water and 1.5 parts sodium formate at 35° C. for 10 minutes. The neutralization float was admixed with 0.5 part of sodium bicarbonate before drumming for 30 minutes. After a 30 minute retan with 6 parts of polymeric tanning material G18, the tanning of the leather was completed by adding 6 parts of retanning material G5 and 6 parts of retanning material G3. Following a drumming time of 40 minutes the float was diluted with 100 parts of hot water at 60° C. before drumming at 60° C. for 10 minutes. After addition of 3.5 parts of fatliquor F1 and 3.5 parts of hydrophobicizer H3 the leather was fatliquored at 60° C. for 60 minutes. A total of 4 parts of formic acid was added a little at a time to acidify to a pH of 3.5 over 60 minutes. This was followed by a 10 minute cold rinse.

The leather thus dyed, retanned and fatliquored was horsed up overnight, subsequently set out, subjected to reduced pressure at 60° C. for 2 minutes, suspension dried at room temperature overnight, conditioned, staked and vacuum dried at 60° C. for 2 minutes.

This gave a softy shoe upper leather having excellent wash-, perspiration-, migration- and rubfastnesses. A shoe upper leather dyed with one of the dyes of examples 1a to 59k can be prepared in an analogous manner.

Shoe Upper Leather Recipe 16:

A piece of 100 parts by weight of a conventionally chrome-tanned cattlehide leather 1.8 mm in shaved thickness was washed in a float of 200 parts of water at 35° C. for 10 minutes and subsequently drummed for 5 minutes at 40° C. in a float consisting of 100 parts of water and 1.5 parts of sodium formate, thereafter a total of 3 parts of sodium bicarbonate were added a little at a time over 20 minutes and a neutralization pH of 7.4 was achieved. After addition of 1.5 parts of HM2 the leather was drummed at 40° C. for 5 minutes and subsequently 7 parts of dye mixture 12hf were added to the deacidifying float before dyeing at pH 7.5 and 40° C. for 40 minutes. A total of 8 parts of sodium carbonate were added a little at a time to set the float pH between 9.2-9.6 for fixation before drumming at 40° C. for 90 minutes. After float change, the leather was washed three times with 300 parts of water each time for a total of 60 minutes. A total of 4 parts of formic acid were added a little at a time over 90 minutes to set a pH of 3.7 in a float of 200 parts of water.

The leather thus dyed was retanned for 40 minutes at 45° C. in a freshly set float composed of 80 parts of water, 1.5 parts of aldehyde tanning material G13 and 6 parts of polymeric tanning material G18. This was followed by the addition of 8 parts of retanning material G2, 2 parts of polymeric tanning material G19 and 3 parts of resin tanning material G11 before tannage was completed in 60 min at 45° C. The float was subsequently diluted with 70 parts of hot water at 60° C. before drumming at 60° C. for 20 minutes. After addition of 6.5 parts of fatliquor F1 and 3.5 parts of fatliquor F3 the leather was fatliquored at 60° C. for 60 minutes. A total of 4 parts of formic acid were added a little at a time to acidify to pH 3.5 in the course of 60 minutes. This was followed by a 10 minute cold rinse.

The leather thus dyed, retanned and fatliquored was horsed up overnight, subsequently set out, subjected to reduced pressure at 60° C. for 2 minutes, suspension dried at room temperature overnight, conditioned, staked and vacuum dried at 60° C. for 2 minutes.

This gave a softy shoe upper leather having excellent wash-, perspiration-, migration- and rubfastnesses. A softy shoe upper leather dyed with one of the dyes of examples 1a to 59k can be prepared in an analogous manner.

Shoe Upper Leather Recipe 17:

A piece of 100 parts by weight of a conventionally chrome-tanned cattlehide leather 1.5 mm in shaved thickness was washed in a float of 200 parts of water at 35° C. for 10 minutes and subsequently drummed for 5 minutes at 40° C. in a float consisting of 100 parts of water and 1.5 parts of sodium formate, thereafter a total of 3 parts of sodium bicarbonate were added a little at a time over 25 minutes and a neutralization pH of 7.6 was achieved. 9 parts of dye mixture 12hr were added to the deacidifying float before dyeing at pH 7.5 and 40° C. for 40 minutes. A total of 9 parts of solid sodium carbonate were added a little at a time to set the float pH between 9.2-9.6 for fixation before drumming at 40° C. for 90 minutes. After float change, the leather was washed three times with 300 parts of water each time for a total of 60 minutes. A total of 4 parts of formic acid were added a little at a time over 90 minutes to set a pH of 3.5 in a float of 200 parts of water.

The leather thus dyed was drummed for 10 minutes at 35° C. in a freshly set float composed of 100 parts of water and 4 parts of aldehyde tanning material G 12. Thereafter, 6 parts of chrome tanning material G24 and 2 parts of retanning material G1 were added before 50 minutes of retanning at 35° C. The float was then admixed with 1 part of sodium formate before drumming for 10 minutes. After addition of 1.5 parts of fatliquor F1 the leather was drummed at 35° C. for 90 minutes. The float was dropped and the leather washed once with 300 parts of water at 45° C. for 10 minutes.

Subsequently, the leather was prefatliquored for 15 minutes at 45° C. in a freshly set float composed of 70 parts of water and 2 parts of hydrophobicizer H3. This was followed by the addition of 2 parts of sodium formate, 1 part of sodium bicarbonate and 3 parts of auxiliary HM4 before drumming for 30 minutes. The neutralization float was admixed with 12 parts of retanning material G6, followed after a drumming time of 10 minutes by 2 parts of polymeric tanning material G19 before completing tannage in the course of a further 50 minutes. The retanning float was admixed with 4 parts of fatliquor F4, 4 parts of fatliquor F1 and 2 parts of fatliquor F6 before fatliquoring at 45° C. for 60 minutes. A total of 4 parts of formic acid were added a little at a time to acidify to pH 3.5 in the course of 60 minutes. Subsequently, the float was dropped and the leather rinsed cold for 5 minutes.

The leather thus dyed, retanned and hydrophobicized was horsed up overnight, subsequently set out, subjected to reduced pressure at 55° C. for 1 minute, suspension dried at room temperature overnight, conditioned, staked, dry-drummed overnight and toggle frame dried.

This gave a shoe upper leather having dry-drumming grain and excellent wash-, perspiration-, migration- and rubfastnesses. A shoe upper leather which has dry-drumming grain and has been dyed with one of the dyes of examples 1a to 59k can be prepared in an analogous manner.

Shoe Upper Leather Recipe 18:

A piece of 100 parts by weight of a conventionally chrome-tanned cattlehide leather 2.1 mm in shaved thickness was washed in a float of 200 parts of water at 35° C. for 10 minutes and subsequently drummed for 5 minutes at 40° C. in a float consisting of 100 parts of water and 1.5 parts of sodium formate, thereafter a total of 3 parts of sodium bicarbonate were added a little at a time over 25 minutes and a neutralization pH of 7.6 was achieved. 7.5 parts of dye mixture 13b were added to the deacidifying float before dyeing at pH 7.5 and 40° C. for 30 minutes. A total of 8 parts of sodium carbonate were added a little at a time to set the float pH between 9.2-9.6 for fixation before drumming at 40° C. for 75 minutes. After float change, the leather was washed twice with 300 parts of water each time for a total of 60 minutes.

The leather thus dyed was drummed for 30 minutes at 45° C. in a freshly set float composed of 80 parts of water and 3 parts of aldehyde tanning material G12. Thereafter, 5 parts of retanning material G5 were added and the leather was retanned at 45° C. for 30 minutes. The float was subsequently admixed with 1 part of fatliquor F1 and 1 fatliquor F4 and the leather was prefatliquored at 45° C. for 40 minutes. This was followed by the addition of 70 parts of hot water at 55° C. and drumming at 55° C. for 20 minutes. A pH of 5.0 was set in the course of 55 minutes by portionwise addition of 1.5 parts of formic acid. The float was dropped and the leather was washed once with 300 parts of water at 45° C. for 10 minutes.

The leather was subsequently drummed for 15 minutes at 45° C. in a freshly set float composed of 100 parts of water and 2 parts of hydrophobicizer H3. Thereafter, 2 parts of polymeric tanning material G19 were added. After a drumming time of 15 minutes 2 parts of polymeric tanning material G15 were added and the tannage was completed in the course of a further 30 minutes. The retanning float was admixed with 2.5 parts of fatliquor F1, 2.5 parts of fatliquor F4, 1 part of fatliquor F3 and 1 part of fatliquor F2 before fatliquoring at 45° C. for 60 minutes. A total of 4 parts of formic acid were added a little at a time to acidify to pH 3.5 in the course of 60 minutes. Subsequently, the float was dropped and the leather rinsed cold for 5 minutes.

The leather thus dyed, retanned and hydrophobicized was horsed up overnight, subsequently set out, wet-strained and dried at 40° C., conditioned, staked, dry-drummed overnight and toggle frame dried.

This gave a floater shoe upper leather having excellent wash-, perspiration-, migration- and rubfastnesses. A floater shoe upper leather dyed with one of the dyes of examples 1a to 59k can be prepared in an analogous manner.

Shoe Upper Leather Recipe 19:

A piece of 100 parts by weight of a conventionally chrome-tanned cattlehide leather 2.1 mm in shaved thickness was washed in a float of 200 parts of water at 35° C. for 10 minutes and subsequently drummed for 5 minutes at 40° C. in a float consisting of 100 parts of water and 1.5 parts of sodium formate, thereafter a total of 3 parts of sodium bicarbonate were added a little at a time over 20 minutes and a neutralization pH of 7.7 was achieved. 5.9 parts of dye 13ae were added to the deacidifying float before dyeing at pH 7.5 and 40° C. for 40 minutes. A total of 6.5 parts of sodium carbonate were added a little at a time to set the float pH between 9.2-9.6 for fixation before drumming at 40° C. for 90 minutes. After float change, the leather was washed three times with 300 parts of water each time for a total of 60 minutes. A total of 4 parts of formic acid were added a little at a time over 60 minutes to set a pH of 3.6 in a float of 200 parts of water.

The leather thus dyed was drummed for 60 minutes at 45° C. in a freshly set float composed of 80 parts of water and 1 part of aldehyde tanning material G13 and 3 parts of polymeric tanning material G16. Thereafter, 0.5 part of sodium bicarbonate was added, followed after a drumming time of 30 minutes by 5 parts of polymeric tanning material G18 before retanning for 30 minutes at 45° C. The float was subsequently admixed with 0.8 part of auxiliary HM5, 3 parts of polymeric tanning material G17 and 2 parts of polymeric tanning material G19 and tannage was completed at 45° C. for 60 minutes. This was followed by the addition of 70 parts of water before drumming at 60° C. for 10 minutes. The retanning float was admixed with 2.5 parts of fatliquor F6, 1.5 parts of hydrophobicizer H3 and 1.5 parts of fatilquor F2 before fatliquoring at 45° C. for 60 minutes. A pH of 3.5 was subsequently set in the course of 60 minutes by portionwise addition of 4 parts of formic acid. Thereafter, the float was dropped and the leather briefly rinsed cold.

The leather thus dyed, retanned and fatliquored was horsed up overnight, subsequently set out, subjected to reduced pressure at 60° C. for 2 minutes, suspension dried at room temperature, conditioned, staked and vacuum dried at 60° C. for 2 minutes.

This gave a purely polymeric-based shoe upper leather having excellent wash-, perspiration-, migration- and rubfastnesses. A purely polymer-based shoe upper leather dyed with one of the dyes of examples 1a to 59k can be prepared in an analogous manner.

Shoe Upper Leather Recipe 20:

A piece of 100 parts by weight of a conventionally chrome-tanned cattlehide leather 2.0 mm in shaved thickness was washed in a float of 200 parts of water at 35° C. for 10 minutes and subsequently drummed for 5 minutes at 40° C. in a float consisting of 100 parts of water and 1.5 parts of sodium formate, thereafter a total of 3 parts of sodium bicarbonate were added a little at a time over 20 minutes and a neutralization pH of 7.8 was achieved. After addition of 4.8 parts of dye 13dt to the deacidifying float the leather was dyed at pH 7.6 and 40° C. for 35 minutes. A total of 6 parts of sodium carbonate were added a little at a time to set the float pH between 9.4-9.9 for fixation before drumming at 40° C. for 60 minutes. After float change, the leather was washed three times with 300 parts of water each time for a total of 60 minutes. A total of 2 parts of formic acid were added a little at a time over 60 minutes to set a pH of 4.3 in a float of 200 parts of water.

The leather thus dyed was drummed for 20 minutes in a freshly set float composed of 80 parts of water and 1.5 parts of hydrophobicizer H3. Subsequently, 5 parts of polymeric tanning material G18 were added, followed after a drumming time of 40 minutes by an addition of 1 part of auxiliary HM5 and 5 parts of polymeric tanning material G18. A further 30 minutes of drumming at 45° C. was followed by the addition of 3 parts of polymeric tanning material G19 before retanning at 45° C. for 60 minutes. Then 70 parts of water were added before drumming at 60° C. for 10 minutes. The retanning float was admixed with 2.5 parts of fatliquor F6, 0.5 part of hydrophobicizer H3 and 1.5 parts of fatliquor F2 before fatliquoring at 60° C. for 60 minutes. A pH of 3.4 was subsequently set in the course of 60 minutes by portionwise addition of 4 parts of formic acid. Thereafter, the float was dropped and the leather briefly rinsed cold.

The leather thus dyed, retanned and fatliquored was horsed up overnight, subsequently set out, subjected to reduced pressure at 60° C. for 2 minutes, suspension dried at room temperature, conditioned, staked and vacuum dried at 60° C. for 2 minutes.

This gave a purely polymeric-based shoe upper leather having excellent wash-, perspiration-, migration- and rubfastnesses. A purely polymer-based shoe upper leather dyed with one of the dyes of examples 1a to 59k can be prepared in an analogous manner.

Shoe Upper Leather Recipe 21:

A piece of 100 parts by weight of a conventionally chrome-tanned cattlehide leather 2.2 mm in shaved thickness was washed in a float of 200 parts of water at 35° C. for 10 minutes and subsequently drummed for 5 minutes at 40° C. in a float consisting of 100 parts of water and 1.5 parts of sodium formate, thereafter a total of 3 parts of sodium bicarbonate were added a little at a time over 20 minutes and a neutralization pH of 7.8 was achieved. 7.7 parts of dye mixture 13hb were added to the deacidifying float before dyeing at pH 7.6 and 40° C. for 35 minutes. A total of 8 parts of sodium carbonate were added a little at a time to set the float pH between 9.5-10.0 for fixation before drumming at 40° C. for 55 minutes. After float change, the leather was washed twice with 300 parts of water each time for a total of 60 minutes. A total of 2 parts of formic acid were added a little at a time over 60 minutes to set a pH of 4.4 in a float of 200 parts of water.

The leather thus dyed was drummed for 15 minutes in a freshly set float composed of 80 parts of water and 1.5 parts of hydrophobicizer H3. Then 5 parts of polymeric tanning material G18 were added, followed after a drumming time of 40 minutes by an addition of 1 part of auxiliary HM5, 3 parts of polymeric tanning material G17, 3 parts of vegetable tanning material G23 and 2 parts of tanning material G11. A further 30 minutes of drumming at 45° C. was followed by the addition of 3 parts of polymeric tanning material G19 before retanning at 45° C. for 60 minutes. Then 70 parts of water were added before drumming at 60° C. for 10 minutes. The retanning float was admixed with 2.5 parts of fatliquor F7 and 2 parts of fatliquor F4 before fatliquoring at 60° C. for 60 minutes. A pH of 3.5 was subsequently set in the course of 60 minutes by portionwise addition of 4 parts of formic acid. Thereafter, the float was dropped and the leather briefly rinsed cold.

The leather thus dyed, retanned and fatliquored was horsed up overnight, subsequently set out, subjected to reduced pressure at 60° C. for 2 minutes, suspension dried at room temperature, conditioned, staked and vacuum dried at 60° C. for 2 minutes.

This gave a shoe upper leather having excellent wash-, perspiration-, migration- and rubfastnesses. A shoe upper leather dyed with one of the dyes of examples 1a to 59k can be prepared in an analogous manner.

Shoe Leather Upper Recipe 22:

A piece of 100 parts by weight of a conventionally chrome-tanned cattlehide leather 1.9 mm in shaved thickness was washed for 10 minutes at 35° C. in a float composed of 200 parts of water and subsequently drummed for 5 minutes at 40° C. in a float consisting of 100 parts of water and 1.5 parts of sodium formate, before a total of 3 parts of sodium bicarbonate were added portionwise in the course of 20 minutes to set a neutralization pH of 7.8. The deacidifying float was admixed with 10.5 parts of dye mixture 13hp before dyeing for 20 minutes at pH 7.6 and 40° C. A total of 9 parts of sodium carbonate were added a little at a time to set the float pH between 9.5-10.0 for fixation before drumming at 40° C. for 70 minutes. After float change, the leather was washed three times with 300 parts of water each time for a total of 60 minutes. A pH of 4.3 was set in a float of 200 parts of water in the course of 60 minutes by portionwise addition of 2 parts of formic acid.

The leather thus dyed was drummed for 5 minutes in a freshly set float composed of 80 parts of water and 3 parts of polymeric tanning material G19. Then 6 parts of retanning material G2 were added, followed after a drumming time of 30 minutes by an addition of 5 parts of polymeric tanning material G18, 3 parts of polymeric tanning material G19 and 4 parts of retanning material G2. A further 60 minutes of drumming time at 45° C. was followed by addition of 70 parts of water and drumming at 65° C. for 20 minutes. The retanning float was admixed with 3 parts of fatliquor F1 and 2 parts of fatliquor F2 before fatliquoring at 65° C. for 60 minutes. A pH of 3.6 was subsequently set in the course of 60 minutes by portionwise addition of 4 parts of formic acid. Thereafter, the float was dropped and the leather briefly rinsed cold.

The leather thus dyed, retanned and fatliquored was horsed up overnight, subsequently set out, subjected to reduced pressure at 55° C. for 4 minutes, suspension dried at room temperature, conditioned, staked and vacuum dried at 55° C. for 3 minutes, nubucked with 220 gauge emery paper, dedusted and toggle frame dried.

This gave a direct-route nubuck shoe upper leather having excellent wash-, perspiration-, migration- and rubfastnesses. A direct-route nubuck shoe upper leather dyed with one of the dyes of examples 1a to 59k can be prepared in an analogous manner.

Shoe Upper Leather Recipe 23:

A piece of 100 parts by weight of a conventionally chrome-tanned cattlehide leather 2.0 mm in shaved thickness was washed for 10 minutes at 35° C. in a float composed of 200 parts of water and subsequently drummed for 5 minutes at 40° C. in a float consisting of 100 parts of water and 1.5 parts of sodium formate, before a total of 3 parts of sodium bicarbonate were added portionwise in the course of 20 minutes to set a neutralization pH of 7.6. The deacidifying float was admixed with 6.1 parts of dye mixture 13hw before dyeing for 15 minutes at pH 7.5 and 40° C. A total of 8 parts of sodium carbonate were added a little at a time to set the float pH between 9.2-9.6 for fixation before drumming at 40° C. for 90 minutes. After float change, the leather was washed three times with 300 parts of water each time for a total of 60 minutes. A pH of 4.2 was set in a float of 200 parts of water in the course of 60 minutes by portionwise addition of 2 parts of formic acid.

The leather thus dyed was drummed for 3 minutes in a freshly set float composed of 80 parts of water and 1 part of aldehyde tanning material G13. After addition of 3 parts of polymeric tanning material G19 the leather was drummed for a further 30 minutes. This was followed by the addition of 0.8 part of sodium bicarbonate. A drumming time of 30 minutes was followed by the addition of 3 parts of hydrophobicizer H5 before, after a further 30 minutes drumming time, retanning for 30 minutes with 5 parts of polymeric tanning material G18. The retanning float was admixed with 5 parts of hydrophobicizer H1 and 0.5 part of auxiliary HM4 before fatliquoring at 45° C. for 60 minutes. Then 70 parts of water were added before drumming at 65° C. for 20 minutes. A pH of 3.5 was subsequently set in the course of 60 minutes by portionwise addition of 4 parts of formic acid. Thereafter the float was dropped. The leather was drummed for 10 minutes at 30° C. in a freshly set float composed of 150 parts of water and 0.5 part of formic acid. The hydrophobicization was fixed for 90 minutes at 30° C. by addition of 5 parts of chrome tanning material G24. This was followed by a single wash with 300 parts of water for 10 minutes and thereafter the leather was drummed for 10 minutes in a float composed of 300 parts of water and 0.2 part of formic acid. The float was drained and the leather was briefly rinsed cold.

The leather thus dyed, retanned and hydrophobicized was horsed up overnight, subsequently set out, subjected to reduced pressure at 55° C. for 4 minutes, suspension dried at room temperature, conditioned, staked and vacuum dried at 55° C. for 3 minutes, nubucked with 220 gauge emery paper, dedusted and toggle frame dried.

This gave a hydrophobicized direct-route nubuck shoe upper leather having excellent wash-, perspiration-, migration- and rubfastnesses. A hydrophobicized direct-route nubuck shoe upper leather dyed with one of the dyes of examples 1a to 59k can be prepared in an analogous manner.

Shoe Upper Leather Recipe 24:

A piece of 100 parts by weight of a conventionally chrome-tanned cattlehide leather 1.8 mm in shaved thickness was washed for 10 minutes at 35° C. in a float composed of 200 parts of water and subsequently drummed for 5 minutes at 40° C. in a float consisting of 100 parts of water and 1.5 parts of sodium formate, before a total of 3 parts of sodium bicarbonate were added portionwise in the course of 20 minutes to set a neutralization pH of 7.5. The deacidifying float was admixed with 9.2 parts of dye 14 before dyeing for 25 minutes at pH 7.5 and 40° C. A total of 9 parts of sodium carbonate were added a little at a time to set the float pH between 9.2-9.6 for fixation before drumming at 40° C. for 50 minutes. After float change, the leather was washed twice with 300 parts of water each time for a total of 60 minutes. A pH of 4.3 was set in a float of 200 parts of water in the course of 60 minutes by portionwise addition of a total of 2 parts of formic acid.

The leather thus dyed was drummed for 15 minutes in a freshly set float composed of 80 parts of water and 3 parts of polymeric tanning material G19. Thereafter, 2 parts of hydrophobicizer H1 were added. A drumming time of 15 minutes was followed by the addition of 5 parts of polymeric tanning material G18, 3 parts of retanning material G1 and 1 part of polymeric tanning material G19 before retanning for 30 minutes. The retanning float was admixed with 4 parts of hydrophobicizer H1 and 0.3 part of auxiliary HM4 before fatliquoring at 45° C. for 60 minutes. Then 70 parts of water were added before drumming at 65° C. for 20 minutes. A pH of 3.5 was subsequently set in the course of 60 minutes by portionwise addition of 4 parts of formic acid. Thereafter the float was dropped. The leather was drummed for 10 minutes at 30° C. in a freshly set float composed of 150 parts of water and 0.5 part of formic acid. The hydrophobicization was fixed for 90 minutes at 30° C. by addition of 5 parts of chrome tanning material G24. This was followed by a single wash with 300 parts of water for 10 minutes and thereafter the leather was drummed for 10 minutes in a float composed of 300 parts of water and 0.2 part of formic acid. The float was drained and the leather was briefly rinsed cold.

The leather thus dyed, retanned and hydrophobicized was horsed up overnight, subsequently set out, subjected to reduced pressure at 55° C. for 4 minutes, suspension dried at room temperature, conditioned, staked and vacuum dried at 55° C. for 3 minutes, nubucked with 220 gauge emery paper, dedusted and toggle frame dried.

This gave a hydrophobicized direct-route nubuck shoe upper leather having excellent wash-, perspiration-, migration- and rubfastnesses. A hydrophobicized direct-route nubuck shoe upper leather dyed with one of the dyes of examples 1a to 59k can be prepared in an analogous manner.

Shoe Upper Leather Recipe 25:

A piece of 100 parts by weight of a conventionally chrome-tanned cattlehide leather 1.8 mm in shaved thickness was washed for 10 minutes at 35° C. in a float composed of 200 parts of water and subsequently drummed for 5 minutes at 40° C. in a float consisting of 100 parts of water and 1.5 parts of sodium formate, before a total of 3 parts of sodium bicarbonate were added portionwise in the course of 20 minutes to set a neutralization pH of 7.5. The deacidifying float was admixed with 6.8 parts of dye 15 before dyeing for 30 minutes at pH 7.5 and 40° C. A total of 8 parts of sodium carbonate were added a little at a time to set the float pH between 9.2-9.6 for fixation before drumming at 40° C. for 90 minutes. After float change, the leather was washed three times with 300 parts of water each time for a total of 60 minutes. A pH of 3.0 was set in a float of 200 parts of water in the course of 90 minutes by portionwise addition of 5 parts of formic acid.

The leather thus dyed was drummed for 10 min in a freshly set float composed of 80 parts of water and 0.4 part of formic acid. Then 1 part of retanning material G14 was added before drumming for 30 minutes. This was followed by the addition of 4 parts of chrome tanning material G24 and of 2 parts of retanning material G28. A drumming time of 30 minutes was followed by the addition of 0.5 part of sodium formate before rechroming for 60 minutes. The float was admixed with 100 parts of water before drumming overnight. The float was subsequently dropped.

The leather was drummed for 30 minutes at 30° C. in a freshly set float composed of 80 parts of water, 1.5 parts of sodium formate and 0.5 part of sodium bicarbonate. This was followed by the addition of 2 parts of polymeric tanning material G19. A drumming time of 15 minutes was followed by the addition of 2 parts of hydrophobicizer H1 before drumming for 15 minutes. The addition of 5 parts of polymeric tanning material G18 and a drumming time of 30 minutes were followed by the addition, to complete tannage, of 4 parts of retanning material G28 and 3 parts of retanning material G11 before retanning for a further 30 minutes. The retanning float was admixed with 4 parts of hydrophobicizer H1 and 0.3 part of auxiliary HM4 before fatliquoring for 60 minutes. Then 70 parts of water were added to the float before drumming at 65° C. for 20 minutes. A pH of 3.5 was subsequently set in the course of 45 minutes by portionwise addition of a total of 3.5 parts of formic acid. The leather was drummed for 10 minutes at 30° C. in a freshly set float composed of 150 parts of water and 0.5 part of formic acid. The hydrophobicization was fixed for 90 minutes at 30° C. by addition of 5 parts of chrome tanning material G24. This was followed by a single wash with 300 parts of water for 10 minutes and thereafter the leather was drummed for 10 minutes in a float composed of 300 parts of water and 0.2 part of formic acid. The float was dropped and the leather was briefly rinsed cold.

The leather thus dyed, retanned and hydrophobicized was horsed up overnight, subsequently set out, subjected to reduced pressure at 55° C. for 4 minutes, suspension dried at room temperature, conditioned, staked and vacuum dried at 55° C. for 3 minutes, nubucked with 220 gauge emery paper, dedusted and toggle frame dried.

This gave a hydrophobicized direct-route nubuck shoe upper leather having excellent wash-, perspiration-, migration- and rubfastnesses. A hydrophobicized direct-route nubuck shoe upper leather dyed with one of the dyes of examples 1a to 59k can be prepared in an analogous manner.

Shoe Upper Leather Recipe 26:

A piece of 100 parts by weight of a conventionally chrome-tanned cattlehide leather 1.9 mm in shaved thickness was washed for 10 minutes at 35° C. in a float composed of 200 parts of water and subsequently drummed for 5 minutes at 40° C. in a float consisting of 100 parts of water and 1.5 parts of sodium formate, before a total of 3 parts of sodium bicarbonate were added portionwise in the course of 20 minutes to set a neutralization pH of 7.6. The deacidifying float was admixed with 8.8 parts of dye 16j before dyeing for 40 minutes at pH 7.5 and 40° C. A total of 8 parts of sodium carbonate were added a little at a time to set the float pH between 9.1-9.7 for fixation before drumming at 40° C. for 60 minutes. After float change, the leather was washed twice with 300 parts of water each time for a total of 60 minutes. A pH of 4.2 was set in a float of 200 parts of water in the course of 60 minutes by portionwise addition of 2 parts of formic acid.

The leather thus dyed was drummed for 5 minutes in a freshly set float composed of 80 parts of water and 1 part of retanning material G14. This was followed by the addition of 2 parts of polymeric tanning material G19, followed after a drumming time of 15 minutes by the addition of 5 parts of polymeric tanning material G18. A further 40 minutes of drumming time at 45° C. was followed by the addition of 3 parts of vegetable tanning material G22 and 3 parts of retanning material G28 before retanning at 45° C. for 60 minutes. This is followed by the addition of 70 parts of water before drumming at 60° C. for 10 minutes. The retanning float was admixed with 2.5 parts of fatliquor F1 and 2.5 parts of hydrophobicizer H3 and fatliquoring at 50° C. for 60 minutes. A pH of 3.5 was subsequently set in the course of 60 minutes by portionwise addition of 4 parts of formic acid. Thereafter, the float was dropped and the leather briefly rinsed cold.

The leather thus dyed, retanned and fatliquored was horsed up overnight, subsequently set out, subjected to reduced pressure at 55° C. for 4 minutes, suspension dried at room temperature, conditioned, staked and vacuum dried at 55° C. for 3 minutes, nubucked with 220 gauge emery paper, dedusted and toggle frame dried.

This gave a direct-route nubuck shoe upper leather having excellent wash-, perspiration-, migration- and rubfastnesses. A direct-route nubuck shoe upper leather dyed with one of the dyes of examples 1a to 59k can be prepared in an analogous manner.

Shoe Upper Leather Recipe 27:

A piece of 100 parts by weight of a conventionally chrome-tanned cattlehide leather 1.9 mm in shaved thickness was washed for 10 minutes at 35° C. in a float composed of 200 parts of water and subsequently drummed for 5 minutes at 40° C. in a float consisting of 100 parts of water and 1.5 parts of sodium formate, before a total of 3 parts of sodium bicarbonate were added portionwise in the course of 20 minutes to set a neutralization pH of 7.6. The deacidifying float was admixed with 9 parts of dye 17b before dyeing for 40 minutes at pH 7.5 and 40° C. A total of 9.5 parts of sodium carbonate were added a little at a time to set the float pH between 9.2-9.8 for fixation before drumming at 40° C. for 60 minutes. After float change, the leather was washed twice with 300 parts of water each time for a total of 60 minutes. A pH of 4.3 was set in a float of 200 parts of water in the course of 60 minutes by portionwise addition of 2 parts of formic acid.

The leather thus dyed was drummed at 45° C. for 5 minutes in a freshly set float composed of 80 parts of water and 1 part of retanning material G14. This was followed by the addition of 2 parts of polymeric tanning material G19, followed after a drumming time of 15 minutes by the addition of 5 parts of polymeric tanning material G18. A further 40 minutes of drumming time at 45° C. was followed by the addition of 4 parts of resin tanning material G28 and 4 parts of resin tanning material G11 before retanning at 45° C. for 60 minutes. This is followed by the addition of 70 parts of water before drumming at 60° C. for 10 minutes. The retanning float was admixed with 2.5 parts of fatliquor F1 and 2.5 parts of hydrophobicizer H3 and fatliquoring at 55° C. for 60 minutes. A pH of 3.5 was subsequently set in the course of 60 minutes by portionwise addition of 4 parts of formic acid. Thereafter, the float was dropped and the leather briefly rinsed cold.

The leather thus dyed, retanned and fatliquored was horsed up overnight, subsequently set out, subjected to reduced pressure at 55° C. for 4 minutes, suspension dried at room temperature, conditioned, staked and vacuum dried at 55° C. for 3 minutes, nubucked with 220 gauge emery paper, dedusted and toggle frame dried.

This gave a direct-route nubuck shoe upper leather having excellent wash-, perspiration-, migration- and rubfastnesses. A direct-route nubuck shoe upper leather dyed with one of the dyes of examples 1a to 59k can be prepared in an analogous manner.

Shoe Upper Leather Recipe 28:

A piece of 100 parts by weight of a conventionally chrome-tanned cattlehide leather 1.9 mm in shaved thickness was washed for 10 minutes at 35° C. in a float composed of 200 parts of water and subsequently drummed for 5 minutes at 40° C. in a float consisting of 100 parts of water and 1.5 parts of sodium formate, before a total of 3 parts of sodium bicarbonate were added portionwise in the course of 20 minutes to set a neutralization pH of 7.6. The deacidifying float was admixed with 5 parts of dye 19 before dyeing for 30 minutes at pH 7.5 and 40° C. A total of 6.5 parts of sodium carbonate were added a little at a time to set the float pH between 9.2-9.8 for fixation before drumming at 40° C. for 65 minutes. After float change, the leather was washed twice with 300 parts of water each time for a total of 60 minutes. A pH of 4.3 was set in a float of 200 parts of water in the course of 60 minutes by portionwise addition of a total of 2 parts of formic acid.

The leather thus dyed was drummed at 45° C. for 5 minutes in a freshly set float composed of 80 parts of water and 1 part of retanning material G14. This was followed by the addition of 2 parts of polymeric tanning material G19, followed after a drumming time of 15 minutes by the addition of 5 parts of polymeric tanning material G18. A further 40 minutes of drumming time at 45° C. was followed by the addition of 2 parts of vegetable tanning material G22 and 4 parts of resin tanning material G28 before retanning at 45° C. for 60 minutes. This is followed by the addition of 70 parts of water before drumming at 60° C. for 10 minutes. The retanning float was admixed with 2.5 parts of fatliquor F1 and 2.5 parts of hydrophobicizer H3 and fatliquoring at 60° C. for 60 minutes. A pH of 3.5 was subsequently set in the course of 50 minutes by portionwise addition of 4 parts of formic acid. Thereafter, the float was dropped and the leather briefly rinsed cold.

The leather thus dyed, retanned and fatliquored was horsed up overnight, subsequently set out, subjected to reduced pressure at 55° C. for 4 minutes, suspension dried at room temperature, conditioned, staked and vacuum dried at 55° C. for 3 minutes, nubucked with 220 gauge emery paper, dedusted and toggle frame dried.

This gave a direct-route nubuck shoe upper leather having excellent wash-, perspiration-, migration- and rubfastnesses. A direct-route nubuck shoe upper leather dyed with one of the dyes of examples 1a to 59k can be prepared in an analogous manner.

Shoe Upper Leather Recipe 29:

A piece of 100 parts by weight of a conventionally chrome-tanned cattlehide leather 1.9 mm in shaved thickness was washed for 10 minutes at 35° C. in a float composed of 200 parts of water and subsequently drummed for 5 minutes at 40° C. in a float consisting of 100 parts of water and 1.5 parts of sodium formate, before a total of 3 parts of sodium bicarbonate were added portionwise in the course of 20 minutes to set a neutralization pH of 7.6. The deacidifying float was admixed with 7.1 parts of dye 22 before dyeing for 40 minutes at pH 7.5 and 40° C. A total of 8 parts of sodium carbonate were added a little at a time to set the float pH between 9.2-9.8 for fixation before drumming at 40° C. for 60 minutes. After float change, the leather was washed twice with 300 parts of water each time for a total of 60 minutes. A pH of 3.9 was set in a float of 200 parts of water in the course of 60 minutes by portionwise addition of 3 parts of formic acid.

The leather thus dyed was drummed for 20 minutes at 45° C. in a freshly set float composed of 80 parts of water and 2 parts of retanning material G29. This was followed by the addition of 2 parts of polymeric tanning material G19, followed after a drumming time of 15 minutes by the addition of 5 parts of polymeric tanning material G18. A further 40 minutes of drumming time at 45° C. was followed by the addition of 4 parts of resin tanning material G28 and 4 parts of resin tanning material G11 before retanning at 45° C. for 60 minutes. This is followed by the addition of 70 parts of water before drumming at 60° C. for 10 minutes. The retanning float was admixed with 2.5 parts of fatliquor F1 and 2.5 parts of hydrophobicizer H3 and fatliquoring at 55° C. for 60 minutes. A pH of 3.5 was subsequently set in the course of 60 minutes by portionwise addition of 4 parts of formic acid. Thereafter, the float was dropped and the leather briefly rinsed cold.

The leather thus dyed, retanned and fatliquored was horsed up overnight, subsequently set out, subjected to reduced pressure at 55° C. for 4 minutes, suspension dried at room temperature, conditioned, staked and vacuum dried at 55° C. for 3 minutes, nubucked with 220 gauge emery paper, dedusted and toggle frame dried.

This gave a direct-route nubuck shoe upper leather having excellent wash-, perspiration-, migration- and rubfastnesses. A direct-route nubuck shoe upper leather dyed with one of the dyes of examples 1a to 59k can be prepared in an analogous manner.

Shoe Upper Leather Recipe 30:

A piece of 100 parts by weight of a conventionally chrome-tanned cattlehide leather 2.0 mm in shaved thickness was washed for 10 minutes at 35° C. in a float composed of 200 parts of water and subsequently drummed for 5 minutes at 40° C. in a float consisting of 100 parts of water and 1.5 parts of sodium formate, before a total of 3 parts of sodium bicarbonate were added portionwise in the course of 20 minutes to set a neutralization pH of 7.6. The deacidifying float was admixed with 7.2 parts of dye 24 before dyeing for 40 minutes at pH 7.5 and 40° C. A total of 8 parts of sodium carbonate were added a little at a time to set the float pH between 9.2-9.8 for fixation before drumming at 40° C. for 60 minutes. After float change, the leather was washed twice with 300 parts of water each time for a total of 60 minutes. A pH of 4.0 was set in a float of 200 parts of water in the course of 60 minutes by portionwise addition of 4 parts of formic acid.

The leather thus dyed was drummed for 35 minutes at 45° C. in a freshly set float composed of 80 parts of water and 3 parts of retanning material G25. This was followed by the addition of 2 parts of polymeric tanning material G19, followed after a drumming time of 15 minutes by the addition of 5 parts of polymeric tanning material G18. A further 40 minutes of drumming time at 45° C. was followed by the addition of 4 parts of resin tanning material G28 and 4 parts of resin tanning material G11 before retanning at 45° C. for 60 minutes. This is followed by the addition of 70 parts of water before drumming at 60° C. for 10 minutes. The retanning float was admixed with 2.5 parts of fatliquor F1 and 2.5 parts of hydrophobicizer H3 before fatliquoring at 55° C. for 60 minutes. A pH of 3.5 was subsequently set in the course of 60 minutes by portionwise addition of 4 parts of formic acid. Thereafter, the float was dropped and the leather briefly rinsed cold.

The leather thus dyed, retanned and fatliquored was horsed up overnight, subsequently set out, subjected to reduced pressure at 55° C. for 4 minutes, suspension dried at room temperature, conditioned, staked and vacuum dried at 55° C. for 3 minutes, nubucked with 220 gauge emery paper, dedusted and toggle frame dried.

This gave a direct-route nubuck shoe upper leather having excellent wash-, perspiration-, migration- and rubfastnesses. A direct-route nubuck shoe upper leather dyed with one of the dyes of examples 1a to 59k can be prepared in an analogous manner.

Shoe Upper Leather Recipe 31:

A piece of 100 parts by weight of a conventionally chrome-tanned cattlehide leather 2.0 mm in thickness was washed in a float of 200 parts of water for 10 minutes at 35° C. and subsequently drummed for 5 minutes at 40° C. in a float consisting of 100 parts of water and 1.5 parts of sodium formate, before a total of 3 parts of sodium bicarbonate were added a little at a time in the course of 25 minutes to set a neutralization pH of 7.7. The deacidifying float was admixed with 4.9 parts of dye 28a before dyeing for 30 minutes at pH 7.5 and 40° C. The pH of the float was set between 9.5-10.0 by portionwise addition of a total 6.8 parts of sodium carbonate for fixation, followed by drumming at 40° C. for 60 minutes. After float change, the leather was washed twice with a total of 300 parts of water each time for a total of 60 minutes. A pH of 5.5 was set in the course of 50 minutes in a float of 200 parts of water by portionwise addition of a total of 1.5 parts of formic acid.

The leather thus dyed was drummed for 20 minutes at 45° C. in a freshly set float composed of 80 parts of water and 5 parts of hydrophobicizer H5. Then 5 parts of polymeric tanning material G18 were added, followed after a drumming time of 40 minutes by the addition of 5 parts of hydrophobicizer H1 and 0.3 part of auxiliary HM4. A 60 minute period of fatliquoring at 45° C., was followed by the addition of 70 parts of water before drumming at 60° C. for 10 minutes. A pH of 3.5 was then set in the course of 60 minutes by portionwise addition of 4 parts of formic acid. Thereafter, the float was dropped and the leather was drummed for 5 minutes in a freshly set float composed of 150 parts of water and 0.5 part of formic acid. The addition of 5 parts of chrome tanning material G24 was followed by 90 minutes of fixing. Finally, the leather was rinsed twice with 300 parts of water each time for 10 minutes at 30° C.

The leather thus dyed, retanned and hydrophobicized was horsed up overnight, subsequently set out, subjected to reduced pressure at 55° C. for 4 minutes, suspension dried at room temperature, conditioned, staked and vacuum dried at 55° C. for 2 minutes.

This gave a hydrophobicized shoe upper leather having excellent wash-, perspiration-, migration- and rubfastnesses. A hydrophobicized shoe upper leather dyed with one of the dyes of examples 1a to 59k can be prepared in an analogous manner.

Shoe Upper Leather Recipe 32:

A piece of 100 parts by weight of a conventionally chrome-tanned cattlehide leather 1.9 mm in shaved thickness was washed in a float of 200 parts of water at 35° C. for 10 minutes and subsequently drummed for 5 minutes at 40° C. in a float consisting of 100 parts of water and 1.5 parts of sodium formate, thereafter a total of 3 parts of sodium bicarbonate were added a little at a time over 25 minutes and a neutralization pH of 7.7 was achieved. 9.1 parts of dye 30 were added to the deacidifying float before dyeing at pH 7.6 and 40° C. for 40 minutes. A total of 9.2 parts of solid sodium carbonate were added a little at a time to set the float pH between 9.3-9.8 for fixation before drumming at 40° C. for 60 minutes. After float change, the leather was washed three times with 300 parts of water each time for a total of 60 minutes. A total of 2 parts of formic acid were added a little at a time over 50 minutes to set a pH of 4.3 in a float of 150 parts of water.

The leather thus dyed was drummed for 40 minutes at 45° C. in a freshly set float composed of 80 parts of water, 1.5 parts or retanning material G13 and 2 parts of polymeric tanning material G19. This was followed by the addition of 0.7 part of sodium bicarbonate to obtain, after a 20 minute drumming time, a pH of 5.5. This was followed by the addition of 3 parts of hydrophobicizer H1 and of 0.2 part of auxiliary HM4 before drumming for 20 minutes. The addition of 6 parts of polymeric tanning material G18 was followed by a further 30 minutes of retanning. To fatliquor the leather, 5 parts of hydrophobicizer H1 and 0.3 part of auxiliary HM4 were added and drummed in for 60 minutes. This was followed by the addition of 70 parts of water. A drumming time of 10 minutes at 60° C. was followed by portionwise addition of 4 parts of formic acid in the course of 60 minutes to set a pH of 3.5. Thereafter the float was dropped and the leather was drummed for 5 minutes in a freshly set float composed of 150 parts of water and 0.5 part of formic acid. The addition of 5 parts of chrome tanning material G24 was followed by 90 minutes of fixing. Finally, the leather was rinsed twice with 300 parts of water each time for 10 minutes at 30° C.

The leather thus dyed, retanned and hydrophobicized was horsed up overnight, subsequently set out, subjected to reduced pressure at 55° C. for 4 minutes, suspension dried at room temperature overnight, conditioned, staked and vacuum dried at 55° C. for 2 minutes.

This gave a hydrophobicized softy shoe upper leather having excellent wash-, perspiration-, migration- and rubfastnesses. A hydrophobicized softy shoe upper leather dyed with one of the dyes of examples 1a to 59k can be prepared in an analogous manner.

Shoe Upper Leather Recipe 33:

A piece of 100 parts by weight of a conventionally chrome-tanned cattlehide leather 2.0 mm in thickness was washed in a float of 200 parts of water for 10 minutes at 35° C. and subsequently drummed for 5 minutes at 40° C. in a float consisting of 100 parts of water and 1.5 parts of sodium formate, before a total of 3 parts of sodium bicarbonate were added a little at a time in the course of 25 minutes to set a neutralization pH of 7.7. The deacidifying float was admixed with 9.9 parts of dye 32 before dyeing for 40 minutes at pH 7.6 and 40° C. The pH of the float was set between 9.2-9.7 by portionwise addition of a total 10.0 parts of sodium carbonate for fixation followed by drumming at 40° C. for 60 minutes. After float change, the leather was washed twice with a total of 300 parts of water each time for a total of 60 minutes. A pH of 5.4 was set in the course of 50 minutes in a float of 200 parts of water by portionwise addition of a total of 1.5 parts of formic acid.

The leather thus dyed was drummed for 15 minutes at 45° C. in a freshly set float composed of 80 parts of water and 3 parts of polymeric tanning material G19. This was followed by the addition of 1.5 parts of hydrophobicizer H1 before drumming for 15 minutes. The addition of 5 parts of polymeric tanning material G18 was followed by retanning for a further 30 minutes. Then 2 parts of vegetable tanning material G22, 2 parts of retanning material G1, 2 parts of resin tanning material G28 and 3 parts of retanning material G11 were added before drumming for 30 minutes. To fatliquor the leather, 4.5 parts of hydrophobicizer H1 and 0.3 part of auxiliary HM4 were added and drummed in for 60 minutes. This was followed by the addition of 70 parts of water. A drumming time of 10 minutes at 60° C. was followed by portionwise addition of 4 parts of formic acid in the course of 50 minutes to set a pH of 3.5. Thereafter the float was dropped and the leather was drummed for 10 minutes in a freshly set float composed of 150 parts of water and 0.5 part of formic acid. The addition of 5 parts of chrome tanning material G24 was followed by 90 minutes of fixing. This was followed by a single wash with 300 parts of water for 10 minutes at 30° C. and a single wash with a float composed of 300 parts of water and 0.2 part of formic acid. Finally, the leather was briefly rinsed.

The leather thus dyed, retanned and hydrophobicized was horsed up overnight, subsequently set out, subjected to reduced pressure at 55° C. for 4 minutes, suspension dried at room temperature, conditioned, staked and vacuum dried at 55° C. for 2 minutes.

This gave a hydrophobicized shoe upper leather having excellent wash-, perspiration-, migration- and rubfastnesses. A hydrophobicized shoe upper leather dyed with one of the dyes of examples 1a to 59k can be prepared in an analogous manner.

Shoe Upper Leather Recipe 34:

A piece of 100 parts by weight of a conventionally chrome-tanned cattlehide leather 1.8-2.0 mm in thickness was washed in a float of 200 parts of water for 10 minutes at 35° C. and subsequently drummed for 5 minutes at 40° C. in a float consisting of 100 parts of water and 1.5 parts of sodium formate, before a total of 3 parts of sodium bicarbonate were added a little at a time in the course of 25 minutes to set a neutralization pH of 7.7. The deacidifying float was admixed with 6.8 parts of dye 34p before dyeing for 40 minutes at pH 7.6 and 40° C. The pH of the float was set between 9.2-9.6 by portionwise addition of a total of 7.5 parts of sodium carbonate for fixation and drumming at 40° C. for 90 minutes. After float change, the leather was washed three times with a total of 300 parts of water each time for a total of 60 minutes. A pH of 4.3 was set in the course of 60 minutes in a float of 200 parts of water by portionwise addition of a total of 2 parts of formic acid.

The leather thus dyed was drummed for 40 minutes at 45° C. in a freshly set float composed of 80 parts of water, 1 part of retanning material G14 and 2 parts of polymeric tanning material G19. This was followed by the addition of 0.8 part of sodium bicarbonate to obtain a pH of 5.6. Then 3 parts of hydrophobicizer H5 and 0.15 part of HM4 were added and drummed in for 20 minutes. The addition of 5 parts of polymeric tanning material G18 was followed by a further 30 minutes of retanning. Then 2 parts of retanning material G1, 2 parts of vegetable tanning material G22 and 2 parts of resin tanning material G28 were added and drummed in for 30 minutes. To fatliquor the leather, 5 parts of hydrophobicizer H1 and 0.15 part of auxiliary HM4 were added and drummed in for 60 minutes. This was followed by the addition of 70 parts of water. A drumming time of 10 minutes at 60° C. was followed by portionwise addition of 4 parts of formic acid in the course of 40 minutes to set a pH of 3.5. Thereafter the float was dropped and the leather was drummed for 10 minutes in a freshly set float composed of 150 parts of water and 0.5 part of formic acid. The addition of 5 parts of chrome tanning material G24 was followed by 90 minutes of fixing. This was followed by a single wash with 300 parts of water for 10 minutes at 30° C. and a single wash with a float composed of 300 parts of water and 0.2 part of formic acid. Finally, the leather was briefly rinsed.

The leather thus dyed, retanned and hydrophobicized was horsed up overnight, subsequently set out, subjected to reduced pressure at 55° C. for 4 minutes, suspension dried at room temperature, conditioned, staked and vacuum dried at 55° C. for 2 minutes.

This gave a hydrophobicized shoe upper leather having excellent wash-, perspiration-, migration- and rubfastnesses. A hydrophobicized shoe upper leather dyed with one of the dyes of examples 1a to 59k can be prepared in an analogous manner.

Shoe Upper Leather Recipe 35:

A piece of 100 parts by weight of a conventionally chrome-tanned cattlehide leather 1.8 mm in shaved thickness was washed in a float of 300 parts of water at 30° C. for 10 minutes and subsequently drummed for 5 minutes at 40° C. in a float consisting of 100 parts of water and 1.5 parts of sodium formate, thereafter a total of 3 parts of sodium bicarbonate were added a little at a time over 25 minutes and a neutralization pH of 7.7 was achieved. After addition of 8.1 parts of dye 36 to the deacidifying float the leather was dyed at pH 7.6 and 40° C. for 50 minutes. A total of 8.7 parts of sodium carbonate were added a little at a time to set the float pH between 9.2-9.6 for fixation before drumming at 40° C. for 60 minutes. After float change, the leather was washed three times with 300 parts of water each time for a total of 60 minutes. A total of 1.5 parts of formic acid were added a little at a time over 60 minutes to set a pH of 5.3 in a float of 150 parts of water.

The leather thus dyed was prefatliquored for 20 minutes in a freshly set float composed of 100 parts of water and 3 parts of hydrophobicizer H5. This was followed by the addition of 5 parts of polymeric tanning material G18 before drumming for 40 minutes. The addition of 3 parts of polymeric tanning material G16 was followed by a further 30 minutes of retanning. Thereafter, 2 parts of polymeric tanning material G19 were added and tannage completed over 30 minutes. The retanning float was admixed with 5 parts of hydrophobicizer H1 and 0.5 part of auxiliary HM4 before fatliquoring for 60 minutes. This is followed by the addition of 100 parts of water. A drumming time of 10 minutes at 60° C. was followed by a portionwise addition of 4 parts of formic acid over 55 minutes to set a pH of 3.5. Thereafter, the float was dropped and the leather was drummed for 10 minutes in a freshly set float composed of 120 parts of water and 0.5 part of formic acid. The addition of 5 parts of chrome tanning material G24 was followed by 90 minutes of fixation, Subsequently the leather was washed twice with 300 parts of water each time for 10 minutes at 30° C.

The leather thus dyed, retanned and hydrophobicized was horsed up overnight, subsequently set out, subjected to reduced pressure at 55° C. for 4 minutes, suspension dried at room temperature, conditioned, staked and vacuum dried at 55° C. for 3 minutes.

This gave a purely polymer-based hydrophobicized shoe upper leather having excellent wash-, perspiration-, migration- and rubfastnesses. A purely polymer-based hydrophobicized shoe upper leather dyed with one of the dyes of examples 1a to 59k can be prepared in an analogous manner.

Shoe Upper Leather Recipe 36:

A piece of 100 parts by weight of a conventionally chrome-tanned cattlehide leather 1.8 mm in shaved thickness was washed in a float of 300 parts of water at 30° C. for 10 minutes and subsequently drummed for 5 minutes at 40° C. in a float consisting of 100 parts of water and 1.5 parts of sodium formate, thereafter a total of 3 parts of sodium bicarbonate were added a little at a time over 25 minutes and a neutralization pH of 7.7 was achieved. After addition of 5.7 parts of dye 35v to the deacidifying float the leather was drummed at 40° C. for 50 minutes at pH 7.6. A total of 6.5 parts of sodium carbonate were added a little at a time to set the float pH between 9.2-9.6 for fixation before drumming at 40° C. for 60 minutes. After float change, the leather was washed three times with 300 parts of water each time for a total of 60 minutes. A total of 1.5 parts of formic acid were added a little at a time over 60 minutes to set a pH of 5.3 in a float of 150 parts of water.

The leather thus dyed was prefatliquored for 20 minutes in a freshly set float composed of 100 parts of water and 2 parts of hydrophobicizer H5. This was followed by the addition of 5 parts of polymeric tanning material G18 before drumming for 40 minutes. The addition of 3 parts of polymeric tanning material G1 was followed by a further 30 minutes of retanning. Thereafter, 2 parts of vegetable tanning material G22 were added and tannage completed over 30 minutes. The retanning float was admixed with 5 parts of hydrophobicizer H1 and 0.5 part of auxiliary HM4 before fatliquoring for 60 minutes. This is followed by the addition of 100 parts of water. A drumming time of 10 minutes at 60° C. was followed by a portionwise addition of 4 parts of formic acid over 55 minutes to set a pH of 3.5. Thereafter, the float was dropped and the leather was drummed for 10 minutes in a freshly set float composed of 120 parts of water and 0.5 part of formic acid. The addition of 5 parts of chrome tanning material G24 was followed by 90 minutes of fixation, Subsequently the leather was washed twice with 300 parts of water each time for 10 minutes at 30° C.

The leather thus dyed, retanned and hydrophobicized was horsed up overnight, subsequently set out, subjected to reduced pressure at 55° C. for 4 minutes, suspension dried at room temperature, conditioned, staked and vacuum dried at 55° C. for 3 minutes.

This gave a hydrophobicized shoe upper leather having excellent wash-, perspiration-, migration- and rubfastnesses. A hydrophobicized shoe upper leather dyed with one of the dyes of examples 1a to 59k can be prepared in an analogous manner.

Shoe Upper Leather Recipe 37:

A piece of 100 parts by weight of a conventionally chrome-tanned cattlehide leather 1.8 mm in shaved thickness was washed in a float of 300 parts of water at 30° C. for 10 minutes and subsequently drummed for 5 minutes at 40° C. in a float consisting of 100 parts of water and 1.5 parts of sodium formate, thereafter a total of 3 parts of sodium bicarbonate were added a little at a time over 25 minutes and a neutralization pH of 7.7 was achieved. After addition of 7.8 parts of dye 38o to the deacidifying float the leather was drummed at 40° C. for 50 minutes at pH 7.6. A total of 8.1 parts of sodium carbonate were added a little at a time to set the float pH between 9.2-9.6 for fixation before drumming at 40° C. for 60 minutes. After float change, the leather was washed three times with 300 parts of water each time for a total of 60 minutes. A total of 2 parts of formic acid were added a little at a time over 60 minutes to set a pH of 4.5 in a float of 150 parts of water.

The leather thus dyed was drummed for 40 minutes in a freshly set float composed of 100 parts of water, 1.5 parts of retanning material G14, 1.5 parts of polymeric tanning material G16 and 1.5 parts of retanning material G19. The addition of 2 parts of vegetable tanning material G22 and of 3 parts of vegetable tanning material G28 was followed by 60 minutes of tanning to completion. The retanning float was admixed with 6 parts of hydrophobicizer H1 and 0.5 part of auxiliary HM4 before fatliquoring for 90 minutes. Then 100 parts of water were added. A drumming time of 10 minutes at 60° C. was followed by a portionwise addition of 4 parts of formic acid over 50 minutes to set a pH of 3.5. Thereafter, the float was dropped and the leather was drummed for 5 minutes in a freshly set float composed of 120 parts of water and 0.5 part of formic acid. The addition of 5 parts of chrome tanning material G24 was followed by 90 minutes of fixation. Subsequently the leather was washed twice with 300 parts of water each time for 10 minutes at 30° C.

The leather thus dyed, retanned and hydrophobicized was horsed up overnight, subsequently set out, subjected to reduced pressure at 55° C. for 4 minutes, suspension dried at room temperature overnight, conditioned, staked and vacuum dried at 55° C. for 3 minutes.

This gave a hydrophobicized shoe upper leather having excellent wash-, perspiration-, migration- and rubfastnesses. A hydrophobicized shoe upper leather dyed with one of the dyes of examples 1a to 59k can be prepared in an analogous manner.

Shoe Upper Leather Recipe 38:

A piece of 100 parts by weight of a conventionally chrome-tanned cattlehide leather 2.0 mm in shaved thickness was washed for 10 minutes at 35° C. in a float composed of 200 parts of water and subsequently drummed for 5 minutes at 40° C. in a float consisting of 100 parts of water and 1.5 parts of sodium formate, before a total of 3 parts of sodium bicarbonate were added portionwise in the course of 20 minutes to set a neutralization pH of 7.6. The deacidifying float was admixed with 9.2 parts of dye 40d before dyeing for 40 minutes at pH 7.5 and 40° C. A total of 9.3 parts of sodium carbonate were added a little at a time to set a float pH of between 9.2-9.8 for fixation before drumming at 40° C. for 60 minutes. After float change, the leather was washed twice with 300 parts of water each time for a total of 60 minutes. A pH of 3.8 was set in a float of 200 parts of water in the course of 60 minutes by portionwise addition of a total of 3.5 parts of formic acid.

The leather thus dyed was drummed for 60 minutes at 45° C. in a freshly set float composed of 80 parts of water and 3 parts of retanning material G26. Then 2 parts of polymeric tanning material G19 were added, followed after a drumming time of 15 minutes by the addition of 5 parts of polymeric tanning material G18. A further 40 minutes of drumming time at 45° C. was followed by addition of 4 parts of resin tanning material G28 and 4 parts of resin tanning material G11 and drumming at 45° C. for 60 minutes. Subsequently 70 parts of water were added followed by drumming at 60° C. for 10 minutes. The retanning float was admixed with 2.5 parts of fatliquor F1 and 2.5 parts of hydrophobicizer H3 before fatliquoring at 55° C. for 60 minutes. A pH of 3.5 was subsequently set in the course of 60 minutes by portionwise addition of 4 parts of formic acid. Thereafter, the float was dropped and the leather briefly rinsed cold.

The leather thus dyed, retanned and fatliquored was horsed up overnight, subsequently set out, subjected to reduced pressure at 55° C. for 4 minutes, suspension dried at room temperature, conditioned, staked and vacuum dried at 55° C. for 3 minutes, nubucked with 220 gauge emery paper, dedusted and toggle frame dried.

This gave a direct-route nubuck shoe upper leather having excellent wash-, perspiration-, migration- and rubfastnesses. A direct-route nubuck shoe upper leather dyed with one of the dyes of examples 1a to 59k can be prepared in an analogous manner.

Shoe Upper Leather Recipe 39:

A piece of 100 parts by weight of a conventionally chrome-tanned cattlehide leather 2.1 mm in shaved thickness was washed for 10 minutes at 35° C. in a float composed of 200 parts of water and subsequently drummed for 5 minutes at 40° C. in a float consisting of 100 parts of water and 1.5 parts of sodium formate, before a total of 3 parts of sodium bicarbonate were added portionwise in the course of 20 minutes to set a neutralization pH of 7.6. The deacidifying float was admixed with 8 parts of dye 391 before dyeing for 40 minutes at pH 7.5 and 40° C. A total of 8.6 parts of sodium carbonate were added a little at a time to set the float pH between 9.2-9.8 for fixation before drumming at 40° C. for 60 minutes. After float change, the leather was washed twice with 300 parts of water each time for a total of 60 minutes. A pH of 3.8 was set in a float of 200 parts of water in the course of 60 minutes by portionwise addition of a total of 3.5 parts of formic acid.

The leather thus dyed was drummed for 50 minutes at 45° C. in a freshly set float composed of 80 parts of water and 3.5 parts of retanning material G27. Then 2 parts of polymeric tanning material G19 were added, followed after a drumming time of 15 minutes by the addition of 5 parts of polymeric tanning material G18. A further 40 minutes of drumming time at 45° C. was followed by addition of 4 parts of resin tanning material G28 and 4 parts of resin tanning material G11 and drumming at 45° C. for 60 minutes. This is followed by the addition of 70 parts of water before drumming at 60° C. for 10 minutes. The retanning float was admixed with 2.5 parts of fatliquor F1 and 2.5 parts of hydrophobicizer H3 before fatliquoring at 55° C. for 60 minutes. A pH of 3.5 was subsequently set in the course of 60 minutes by portionwise addition of 4 parts of formic acid. Thereafter, the float was dropped and the leather briefly rinsed cold.

The leather thus dyed, retanned and fatliquored was horsed up overnight, subsequently set out, subjected to reduced pressure at 55° C. for 4 minutes, suspension dried at room temperature, conditioned, staked and vacuum dried at 55° C. for 3 minutes, nubucked with 220 gauge emery paper, dedusted and toggle frame dried.

This gave a direct-route nubuck shoe upper leather having excellent wash-, perspiration-, migration- and rubfastnesses. A direct-route nubuck shoe upper leather dyed with one of the dyes of examples 1a to 59k can be prepared in an analogous manner.

Shoe Upper Leather Recipe 40:

A piece of 100 parts by weight of a conventionally chrome-tanned cattlehide leather 1.8 mm in shaved thickness was washed in a float of 300 parts of water at 30° C. for 10 minutes and subsequently drummed for 60 minutes at 40° C. in a float consisting of 100 parts of water, 1.5 parts of tanning material G1 and 1 part of auxiliary HM7. Then the float was admixed with 1.5 parts of sodium formate followed by drumming at 40° C. for 30 minutes. Thereafter a total of 3 parts of sodium bicarbonate were added a little at a time over 25 minutes and a neutralization pH of 7.6 was achieved. 8.0 parts of dye 13ae were added to the deacidifying float before dyeing at pH 7.0 and 40° C. for 45 minutes. A total of 7.5 parts of sodium carbonate were added a little at a time to set the float pH between 9.2-9.5 for fixation before drumming at 40° C. for 60 minutes. After float change, the leather was washed three times with 300 parts of water each time for a total of 60 minutes. A total of 4 parts of formic acid were added a little at a time over 60 minutes to set a pH of 3.6 in a float of 200 parts of water.

The leather thus dyed was retanned for 60 minutes at 45° C. in a freshly set float composed of 80 parts of water, 1 part of aldehyde tanning material G13 and 3 parts of polymeric tanning material G16. Then 0.5 part of sodium bicarbonate was added, followed after a drumming time of 30 minutes by addition of 5 parts of polymeric tanning material G18 and retanning at 45° C. for a further 30 minutes. Then the float was admixed with 0.8 part of auxiliary HM5, 3 parts of polymeric tanning material G17 and 2 parts of polymeric tanning material G19, followed by tanning to completion at 45° C. for 60 minutes. 70 parts of water were than added followed by drumming at 60° C. for 10 minutes. The retanning float was admixed with 2.5 parts of fatliquor F6, 1.5 parts of hydrophobicizer H3 and 1.5 parts of fatliquor F2, and fatliquored at 45° C. for 60 minutes. A total of 4 parts of formic acid were added a little at a time to set a pH 3.5 in the course of 60 minutes. Thereafter, the float was dropped and the leather briefly rinsed cold.

The leather thus dyed, retanned and fatliquored was horsed up overnight, subsequently set out, subjected to reduced pressure at 60° C. for 2 minutes, suspension dried at room temperature, conditioned, staked and vacuum dried at 60° C. for 2 minutes.

This gave a shoe upper leather having excellent wash-, perspiration-, migration- and rubfastnesses. A shoe upper leather dyed with one of the dyes of examples 1a to 59k can be prepared in an analogous manner.

Furniture Leather Recipe 1:

A piece of 100 parts by weight of a conventionally chrome-tanned cattlehide leather 1.1 mm in shaved thickness was washed in a float of 300 parts of water at 30° C. for 10 minutes and subsequently drummed for 5 minutes at 35° C. in a float consisting of 100 parts of water and 1.5 parts of sodium formate, thereafter a total of 3 parts of sodium bicarbonate were added a little at a time over 25 minutes and a neutralization pH of 7.8 was achieved. After addition of 1.5 parts of HM2 the leather was drummed for 5 minutes. Subsequently 10.5 parts of dye 41c were added to the deacidifying float before dyeing at pH 7.3 and 35° C. for 30 minutes. This was followed by the addition of 0.5 part of sodium bicarbonate and drumming for 60 minutes. A total of 9.5 parts of sodium carbonate were added a little at a time to set the float pH between 9.3-9.5 for fixation before drumming at 35° C. for 60 minutes. After float change, the leather was washed twice with 300 parts of water each time at 40° C. for a total of 60 minutes. A total of 3 parts of formic acid were added a little at a time over 60 minutes to set a pH of 3.7 in a float of 200 parts of water.

The leather thus dyed was drummed for 60 minutes at 45° C. in a freshly set float composed of 150 parts of water and 2 parts of retanning material G13. Then 2 parts of polymeric tanning material G18 were added. A drumming time of 60 minutes was followed by the addition of 1.5 parts of sodium bicarbonate. A further 20 minutes of drumming at 45° C. was followed by addition of 2 parts of fatliquor F1 and 0.2 part of auxiliary HM4 before fatliquoring for 20 minutes. The float was admixed with 5 parts of retanning material G5, 3 parts of vegetable tanning material G22 and 2 parts of resin tanning material G11 before retanning for 60 minutes. The retanning float was admixed with 7 parts of fatliquor F1 and 3 parts of fatliquor F6 before fatliquoring at 45° C. for 60 minutes. A pH of 3.5 was then set in the course of 45 minutes by portionwise addition of 5 parts of formic acid. Thereafter, the float was dropped and the leather briefly rinsed cold.

The leather thus dyed, retanned and fatliquored was horsed up overnight, subsequently set out, wet-strained and toggle frame dried, conditioned, staked and dry drummed.

This gave a furniture leather having excellent wash-, perspiration-, migration- and rubfastnesses. A furniture leather dyed with one of the dyes of examples 1a to 59k can be prepared in an analogous manner.

Furniture Leather Recipe 2:

A piece of 100 parts by weight of a conventionally organic-tanned cattlehide leather 1.0-1.1 mm in shaved thickness was washed for 15 minutes at 30° C. in a float of 300 parts of water and subsequently drummed for 10 minutes at 35° C. in a float consisting of 100 parts of water and 1.5 parts of sodium formate. The float had a pH of 4.2-4.6. The float was admixed with 8.7 parts of dye 42g before dyeing for 40 minutes at pH 5.5 and 35° C. A pH of 7.3-7.8 was set in the course of 20 minutes by portionwise addition of a total of 3 parts of sodium bicarbonate. For fixation, the pH of the float was set between 9.2-9.6 by portionwise addition of a total of 9 parts of sodium carbonate before drumming at 35° C. for 60 minutes. After float change, the leather was washed twice with a float composed in each case of 300 parts of water and 1.5 parts of auxiliary HM3 for a total of 60 minutes at 40° C. A pH of 4.3-4.6 was set in the course of 60 minutes at 40° C. in a float of 200 parts of water by portionwise addition of a total of 2 parts of formic acid.

The leather thus dyed was retanned for 30 minutes at 35° C. in a freshly set float composed of 100 parts of water, 3 parts of polymeric tanning material G18 and 1.5 parts of fatliquor F6. Then 6 parts of polymeric tanning material G18 and 10 parts of retanning material G18 were added before drumming at 35° C. for 60 minutes. Addition of 1.5 parts of fatliquor F6 and a drumming time of 30 minutes were followed by the addition of 6 parts of polymeric tanning material G18 and of 10 parts of retanning material G8 and retanning at 35° C. for 60 minutes. The retanning float was admixed with 10 parts of fatliquor F6 before fatliquoring at 35° C. for 60 minutes. To fix the fatliquor, the addition of 100 parts of hot water at 45° C. and a drumming time of 20 minutes was followed by the addition in the course of 50 minutes of formic acid to set a pH of 3.5. This was followed by a 15 minute wash with 300 parts of water.

The leather thus dyed, retanned and fatliquored was horsed up overnight, subsequently set out, wet-strained, toggle frame dried, conditioned, staked, dry drummed and strained.

This gave a wet-white furniture leather having excellent wash-, perspiration-, migration- and rubfastnesses. A wet-white furniture leather dyed with one of the dyes of examples 1a to 59k can be prepared in an analogous manner.

Furniture Leather Recipe 3:

A piece of 100 parts by weight of a conventionally organic-tanned cattlehide leather 1.0-1.1 mm in shaved thickness was washed for 15 minutes at 30° C. in a float of 300 parts of water and subsequently drummed for 10 minutes at 35° C. in a float consisting of 100 parts of water and 1.5 parts of sodium formate. The float had a pH of 4.4. The float was admixed with 7.5 parts of dye 46e before dyeing for 45 minutes at pH 5.3 and 35° C. A pH of 7.3-7.8 was set in the course of 20 minutes by portionwise addition of a total of 3 parts of sodium bicarbonate. For fixation, the pH of the float was set between 9.5-10.0 by portionwise addition of a total of 8 parts of sodium carbonate before drumming at 35° C. for 60 minutes. After float change, the leather was washed three times with a float composed of 300 parts of water each time for a total of 60 minutes, at 40° C. A pH of 4.7-5.0 was set in the course of 60 minutes at 40° C. in a float of 200 parts of water by portionwise addition of a total of 1.5 parts of formic acid.

The leather thus dyed was retanned for 90 minutes at 35° C. in a freshly set float composed of 50 parts of water, 15 parts of hydrophobicizer H5 and 15 parts of polymeric tanning material G18. Then 8 parts of hydrophobicizer H5 and 6 parts of fatliquor F6 were added before fatliquoring at 35° C. for 150 minutes. This was followed by the addition 100 parts of hot water at 45° C. and drumming for 10 minutes. A pH of 3.5 was subsequently set in the course of 40 minutes by addition of 3 parts of formic acid. Finally, the leather was briefly rinsed with water.

The leather thus dyed, retanned and fatliquored was horsed up overnight, subsequently set out, wet-strained, toggle frame dried, conditioned, staked, dry drummed overnight and strained.

This gave a purely polymer-based wet-white furniture leather having excellent wash-, perspiration-, migration- and rubfastnesses. A purely polymer-based wet-white furniture leather dyed with one of the dyes of examples 1a to 59k can be prepared in an analogous manner.

Furniture Leather Recipe 4:

A piece of 100 parts by weight of a conventionally chrome-tanned cattlehide leather 1.1 mm in shaved thickness was washed in a float of 300 parts of water at 30° C. for 10 minutes and subsequently drummed for 5 minutes at 35° C. in a float consisting of 100 parts of water and 1.5 parts of sodium formate, thereafter a total of 4 parts of sodium bicarbonate were added a little at a time over 30 minutes and a neutralization pH of 7.7 was set. After addition of 1.5 parts of HM2 the leather was drummed for 5 minutes. Subsequently 9 parts of dye 43ag were added to the deacidifying float before dyeing at pH 7.4 and 35° C. for 30 minutes. This was followed by the addition of 0.5 part of sodium bicarbonate and drumming for 60 minutes at pH 7.5. A total of 9.8 parts of sodium carbonate were added a little at a time to set the float pH between 9.3-9.8 for fixation before drumming at 35° C. for 60 minutes. After float change, the leather was washed three times with 300 parts of water at 40° C. each time for a total of 60 minutes. A total of 1.8 parts of formic acid were added a little at a time over 60 minutes to set a pH of 4.6 in a float of 200 parts of water.

The leather thus dyed was drummed for 40 minutes at 45° C. in a freshly set float composed of 150 parts of water and 6 parts of retanning material G18. The float pH was 5.0. Addition of 0.8 part of sodium bicarbonate and a drumming time of 20 minutes took the float pH to 6.9. The retanning float was admixed with 2 parts of fatliquor F1 and 0.2 part of auxiliary HM4 before prefatliquoring at 45° C. for 20 minutes. The float was admixed with 3 parts of retanning material G5, 3 parts of vegetable tanning material G22 and 2 parts of resin tanning material G11 before retanning for 60 minutes. The retanning float was admixed with 7 parts of fatliquor F1 and 3 parts of fatliquor F6 before fatliquoring at 45° C. for 60 minutes. A pH of 3.5 was then set in the course of 45 minutes by portionwise addition of 5 parts of formic acid. Thereafter, the float was dropped and the leather briefly rinsed cold.

The thus dyed, retanned and fatliquored leather was horsed up overnight, subsequently set out, wet-strained and toggle frame dried, conditioned, staked and dry drummed.

This gave a furniture leather having excellent wash-, perspiration-, migration- and rubfastnesses. A furniture leather dyed with one of the dyes of examples 1a to 59k can be prepared in an analogous manner.

Furniture Leather Recipe 5:

A piece of 100 parts by weight of a conventionally chrome-tanned cattlehide leather 1.1 mm in shaved thickness was washed in a float of 300 parts of water at 30° C. for 10 minutes and subsequently drummed for 5 minutes at 35° C. in a float consisting of 100 parts of water and 1.5 parts of sodium formate, thereafter a total of 4 parts of sodium bicarbonate were added a little at a time over 30 minutes and a neutralization pH of 7.7 was set. After addition of 1.5 parts of HM2 the leather was drummed for 5 minutes. Subsequently 8 parts of dye 47ac were added to the deacidifying float before dyeing at pH 7.5 and 35° C. for 30 minutes. This was followed by the addition of 0.5 part of sodium bicarbonate and drumming for 60 minutes at pH 7.6. A total of 9 parts of sodium carbonate were added a little at a time to set the float pH between 9.5-9.9 for fixation before drumming at 35° C. for 60 minutes. After float change, the leather was washed three times with 300 parts of water at 40° C. each time for a total of 60 minutes. A total of 3.0 parts of formic acid were added a little at a time over 60 minutes to set a pH of 3.7 in a float of 200 parts of water.

The leather thus dyed was drummed for 60 minutes at 45° C. in a freshly set float composed of 150 parts of water and 1 part of retanning material G13. This was followed by the addition of 6 parts of polymeric tanning material G18 and 40 minutes of retanning at 45° C. The float pH was 4.2. Addition of 1.5 parts of sodium bicarbonate and a drumming time of 20 minutes took the float pH to 6.2. The retanning float was admixed with 2 parts of fatliquor F1 and 0.2 part of auxiliary HM4 before prefatliquoring at 45° C. for 20 minutes. The float was admixed with 3 parts of retanning material G5, 3 parts of vegetable tanning material G22 and 2 parts of resin tanning material G11 before retanning for 60 minutes. The retanning float was admixed with 7 parts of fatliquor F1 and 3 parts of fatliquor F6 before fatliquoring at 45° C. for 60 minutes. The float pH was 5.6. A pH of 3.5 was then set in the course of 45 minutes by portionwise addition of 5 parts of formic acid. Thereafter, the float was dropped and the leather briefly rinsed cold.

The thus dyed, retanned and fatliquored leather was horsed up overnight, subsequently set out, wet-strained and toggle frame dried, conditioned, staked and dry drummed.

This gave a furniture leather having excellent wash-, perspiration-, migration- and rubfastnesses. A furniture leather dyed with one of the dyes of examples 1a to 59k can be prepared in an analogous manner.

Furniture Leather Recipe 6:

A piece of 100 parts by weight of a conventionally chrome-tanned cattlehide leather 1.1 mm in shaved thickness was washed in a float of 300 parts of water at 30° C. for 10 minutes and subsequently drummed for 5 minutes at 35° C. in a float consisting of 100 parts of water and 1.5 parts of sodium formate, thereafter a total of 4 parts of sodium bicarbonate were added a little at a time over 30 minutes and a neutralization pH of 7.7 was set. After addition of 1.5 parts of HM2 the leather was drummed for 5 minutes. Subsequently 7 parts of dye 49b were added to the deacidifying float before dyeing at pH 7.5 and 35° C. for 30 minutes. This was followed by the addition of 0.5 part of sodium bicarbonate and drumming for 60 minutes at pH 7.6. A total of 8 parts of sodium carbonate were added a little at a time to set the float pH between 9.5-9.9 for fixation before drumming at 35° C. for 60 minutes. After float change, the leather was washed three times with 300 parts of water at 40° C. each time for a total of 60 minutes. A total of 3.0 parts of formic acid were added a little at a time over 60 minutes to set a pH of 3.7 in a float of 200 parts of water.

The leather thus dyed was drummed for 40 minutes at 45° C. in a freshly set float composed of 150 parts of water and 1 part of retanning material G13. This is followed by the addition of 6 parts of polymeric tanning material G18 and 40 minutes of retanning at 45° C. The float pH was 4.2. This was followed by addition of 1 part of sodium bicarbonate and a drumming time of 20 minutes. The retanning float was admixed with 2 parts of fatliquor F1 and fatliquored at 45° C. for 20 minutes. The float was admixed with 10 parts of retanning material G3, followed by drumming for 90 minutes. Then fatliquoring was carried out with 6 parts of fatliquor F1 and 2 parts of fatliquor F6 at 45° C. for 60 minutes. A pH of 3.5 was then set in the course of 45 minutes by portionwise addition of 5 parts of formic acid. Thereafter, the float was dropped and the leather briefly rinsed cold.

The thus dyed, retanned and fatliquored leather was horsed up overnight, subsequently set out, wet-strained and toggle frame dried, conditioned, staked and dry drummed.

This gave a furniture leather having excellent wash-, perspiration-, migration- and rubfastnesses. A furniture leather dyed with one of the dyes of examples 1a to 59k can be prepared in an analogous manner.

Furniture Leather Recipe 7:

A piece of 100 parts by weight of a conventionally chrome-tanned cattlehide leather 1.1 mm in shaved thickness was washed in a float of 300 parts of water at 30° C. for 10 minutes and subsequently drummed for 5 minutes at 35° C. in a float consisting of 100 parts of water and 1.5 parts of sodium formate, thereafter a total of 3 parts of sodium bicarbonate were added a little at a time over 30 minutes and a neutralization pH of 7.6 was set. Subsequently 5.5 parts of dye 52e were added to the deacidifying float before dyeing at pH 7.5 and 35° C. for 40 minutes. A total of 7 parts of sodium carbonate were added a little at a time to set the float pH between 9.2-9.6 for fixation before drumming at 35° C. for 60 minutes. After float change, the leather was washed three times with 300 parts of water each time at 40° C. for a total of 60 minutes. A total of 2.0 parts of formic acid were added a little at a time over 60 minutes to set a pH of 5.2 in a float of 150 parts of water.

The leather thus dyed was drummed for 20 minutes at 45° C. in a freshly set float composed of 100 parts of water, 3 parts of polymeric tanning material G18 and 1.5 parts of polymeric tanning material G19. The retanning float was admixed with 1 part of fatliquor F6 and 0.5 part of fatliquor F2 before prefatliquoring at 45° C. for 20 minutes. The float was admixed with 3 parts of polymeric tanning material G18, 6 parts of retanning material G8 and 2 parts of vegetable tanning material G22 before retanning for 60 minutes. This was followed by fatliquoring with 6 parts of fatliquor F6, 2 parts of fatliquor F2 and 1 part of fatliquor F3 at 45° C. for 60 minutes. A pH of 3.5 was set in the course of 45 minutes by portionwise addition of 4 parts of formic acid following addition of 100 parts of water and a drumming time of 10 minutes. Thereafter, the float was dropped and the leather briefly rinsed cold.

The thus dyed, retanned and fatliquored leather was horsed up overnight, subsequently set out, wet-strained and toggle frame dried, conditioned, staked and dry drummed.

This gave a furniture leather having excellent wash-, perspiration-, migration- and rubfastnesses. A furniture leather dyed with one of the dyes of examples 1a to 59k can be prepared in an analogous manner.

Furniture Leather Recipe 8:

A piece of 100 parts by weight of a conventionally chrome-tanned cattlehide leather 1.1 mm in shaved thickness was washed in a float of 300 parts of water at 30° C. for 10 minutes and subsequently drummed for 5 minutes at 35° C. in a float consisting of 100 parts of water and 1.5 parts of sodium formate, thereafter a total of 3 parts of sodium bicarbonate were added a little at a time over 25 minutes and a neutralization pH of 7.6 was set. Subsequently 6 parts of dye 53b were added to the deacidifying float before dyeing at pH 7.5 and 35° C. for 50 minutes. A total of 7 parts of solid sodium carbonate were added a little at a time to set the float pH between 9.5-10.0 for fixation before drumming at 35° C. for 60 minutes. After float change, the leather was washed three times with 300 parts of water at 40° C. each time for a total of 60 minutes. A pH of 4.9 was set a little at a time over 60 minutes in a float of 150 parts of water and 2.2 parts of formic acid.

The leather thus dyed was drummed for 30 minutes in a freshly set float composed 100 parts of water and 2 parts of retanning material G14. Then 5 parts of polymeric tanning material G18 were added before retanning at 45° C. for 40 minutes. The retanning float was admixed with 2 parts of fatliquor F6 and 1 part of fatliquor F2 before prefatliquoring at 45° C. for 20 minutes. The float was admixed with 6 parts of retanning material G2, 2 parts of vegetable tanning material G22 and 2 parts of resin tanning material G28 before retanning for 60 minutes. This was followed by fatliquoring with 8 parts of fatliquor F6, 2 parts of fatliquor F2 and 1 part of fatliquor F3 at 45° C. for 60 minutes. A pH of 3.5 was set by portionwise addition of 4 parts of formic acid in the course of 45 minutes following addition of 100 parts of water and a drumming time of 10 minutes. Then the float was drained and the leather briefly rinsed cold.

The thus dyed, retanned and fatliquored leather was horsed up overnight, subsequently set out, wet-strained and toggle frame dried, conditioned, staked and dry drummed.

This gave a furniture leather having excellent wash-, perspiration-, migration- and rubfastnesses. A furniture leather dyed with one of the dyes of examples 1a to 59k can be prepared in an analogous manner.

Furniture Leather Recipe 9:

A piece of 100 parts by weight of a conventionally chrome-tanned cattlehide leather 1.1 mm in shaved thickness was washed in a float of 300 parts of water at 30° C. for 10 minutes and subsequently drummed for 5 minutes at 35° C. in a float consisting of 100 parts of water and 1.5 parts of sodium formate, thereafter a total of 3 parts of sodium bicarbonate were added a little at a time over 25 minutes and a neutralization pH of 7.8 was set. Subsequently 5.7 parts of dye 58b were added to the deacidifying float before dyeing at pH 7.7 and 35° C. for 60 minutes. A total of 9 parts of sodium carbonate were added a little at a time to set the float pH between 9.5-10.0 for fixation before drumming at 35° C. for 60 minutes. After float change, the leather was washed three times with 300 parts of water at 40° C. each time for a total of 60 minutes. A total of 2.3 parts of formic acid were added a little at a time over 60 minutes to set a pH of 5.0 in a float of 150 parts of water.

The leather thus dyed was drummed for 30 minutes in a freshly set float composed 100 parts of water and 2 parts of retanning material G14. Then 6 parts of polymeric tanning material G18 were added before retanning at 45° C. for 40 minutes. The retanning float was admixed with 2 parts of fatliquor F1 before prefatliquoring at 45° C. for 20 minutes. The float was admixed with 4 parts of retanning material G3 and 2 parts of vegetable tanning material G22 before drumming for 60 minutes. Addition of 2 parts of polymeric tanning material G19 was followed by retanning for a further 20 minutes. Then 6 parts of fatliquor F1, 4 parts of fatliquor F6 and 1 part of fatliquor F3 were added to the retanning float before fatliquoring at 45° C. for 60 minutes. A pH of 3.5 was set by portionwise addition of 4 parts of formic acid in the course of 45 minutes following addition of 100 parts of water and a drumming time of 10 minutes. Then the float was drained and the leather briefly rinsed cold.

The thus dyed, retanned and fatliquored leather was horsed up overnight, subsequently set out, wet-strained and toggle frame dried, conditioned, staked and dry drummed.

This gave a furniture leather having excellent wash-, perspiration-, migration- and rubfastnesses. A furniture leather dyed with one of the dyes of examples 1a to 59k can be prepared in an analogous manner.

Automotive Leather Recipe 1:

A piece of 100 parts by weight of a conventionally chrome-tanned cattlehide leather 1.2-1.3 mm in shaved thickness was washed in a float of 300 parts of water at 30° C. for 10 minutes and subsequently drummed for 5 minutes at 35° C. in a float consisting of 100 parts of water and 1.5 parts of sodium formate, thereafter a total of 3 parts of sodium bicarbonate were added a little at a time over 25 minutes and a neutralization pH of 7.8 was set. After addition of 1.5 parts of HM2 the leather was drummed for 5 minutes. Subsequently 4.7 parts of dye 59d were added to the deacidifying float before dyeing at pH 7.3 and 35° C. for 30 minutes. This was followed by the addition of 0.5 part of sodium bicarbonate and drumming at pH 7.4 for 60 minutes. A total of 5 parts of sodium carbonate were added a little at a time to set the float pH between 9.4-9.8 for fixation before drumming at 35° C. for 60 minutes. After float change, the leather was washed three times with 300 parts of water at 40° C. each time for a total of 60 minutes. A total of 3 parts of formic acid were added a little at a time over 60 minutes to set a pH of 3.7 in a float of 200 parts of water.

The leather thus dyed was drummed for 60 minutes at 45° C. in a freshly set float composed of 150 parts of water and 1.5 parts of retanning material G13. Then 8 parts of polymeric tanning material G18 were added before retanning at 45° C. for 40 minutes. Addition of 1.5 parts of sodium bicarbonate and a drumming time of 20 minutes was followed by prefatliquoring with 2 parts of fatliquor F1 and 0.2 part of auxiliary HM4 at 45° C. for 20 minutes. The float was admixed with 4 parts of retanning material G5, 4 parts of vegetable tanning material G21 and 2 parts of resin tanning material G11 before retanning for 60 minutes. The retanning float was admixed with 7 parts of fatliquor F1 and 3 parts of fatliquor F6 before fatliquoring at 45° C. for 60 minutes. A pH of 3.5 was then set in the course of 45 minutes by portionwise addition of 5 parts of formic acid. Thereafter, the float was dropped and the leather briefly rinsed cold.

The thus dyed, retanned and fatliquored leather was horsed up overnight, subsequently set out, wet-strained and toggle frame dried, conditioned, staked and dry drummed.

This gave an automotive leather having excellent wash-, perspiration-, migration- and rubfastnesses. An automotive leather dyed with one of the dyes of examples 1a to 59k can be prepared in an analogous manner.

Automotive Leather Recipe 2:

A piece of 100 parts by weight of a conventionally organic-tanned cattlehide leather 1.1-1.2 mm in shaved thickness was washed for 15 minutes at 30° C. in a float of 300 parts of water and subsequently drummed for 10 minutes at 35° C. in a float consisting of 100 parts of water and 1.5 parts of sodium formate. The float had a pH of 4.4. The float was admixed with 7.2 parts of dye 56 before dyeing for 60 minutes at pH 4.5 and 35° C. A pH of 7.1-7.6 was set in the course of 20 minutes by portionwise addition of a total of 3 parts of sodium bicarbonate. For fixation, the pH of the float was set between 9.6-9.7 by portionwise addition of a total of 8 parts of sodium carbonate before drumming at 35° C. for 90 minutes. After float change, the leather was washed three times with a float composed in each case of 300 parts of water for a total of 60 minutes, at 40° C. A pH of 4.2 was set in the course of 60 minutes at 40° C. in a float of 300 parts of water by portionwise addition of a total of 2 parts of formic acid.

The leather thus dyed was retanned for 10 minutes at 35° C. in a freshly set float composed of 100 parts of water and 5 parts of polymeric tanning material G18. Then 1 part of fatliquor F6 and 0.5 part of fatliquor F2 were added for 20 minutes prefatliquoring at 35° C. 5 parts of polymeric tanning material G18 and 10 parts of retanning material G8 were added for 60 minute retanning. The retanning float was admixed with 1 part of fatliquor F6 and 0.5 parts of fatliquor F2 for 30 minutes fatliquoring at 35° C. Tanning was subsequently taken to completion with 5 parts of polymeric tanning material G18 and 10 parts of retanning material G18 and 10 parts of retanning material G8 over 90 minutes. This was followed by 60 minute fatliquoring at 35° C. after addition of fatliquor F6 and 2 parts of fatliquor F2. To fix the fatliquor, the addition of 100 parts of hot water at 45° C. and a drumming time of 20 minutes was followed by the addition in the course of 60 minutes of 3 part of formic acid to set a pH of 3.5. This was followed by a 15 minute wash of the leather with 300 parts of water.

The leather thus dyed, retanned and fatliquored was horsed up overnight, subsequently set out, wet-strained, toggle frame dried, conditioned, staked, dry drummed and strained.

This gave a wet-white automotive leather having excellent wash-, perspiration-, migration- and rubfastnesses. A wet-white automotive leather dyed with one of the dyes of examples 1a to 59k can be prepared in an analogous manner.

Furniture Leather Recipe 3:

A piece of 100 parts by weight of a conventionally organic-tanned cattlehide leather 1.1-1.2 mm in shaved thickness was washed for 15 minutes at 30° C. in a float of 300 parts of water and subsequently drummed for 10 minutes at 35° C. in a float consisting of 100 parts of water and 1.5 parts of sodium formate. The float had a pH of 4.4. The float was admixed with 3.5 parts of dye 54 before dyeing for 40 minutes at pH 4.5 and 35° C. A pH of 7.6 was set in the course of 20 minutes by portionwise addition of a total of 3 parts of sodium bicarbonate. For fixation, the pH of the float was set between 9.6-9.7 by portionwise addition of a total of 5 parts of sodium carbonate before drumming at 35° C. for 90 minutes. After float change, the leather was washed three times with 300 parts of water for a total of 60 minutes, at 40° C. A pH of 5.0 was set in the course of 60 minutes at 40° C. in a float of 200 parts of water by portionwise addition of a total of 1.5 parts of formic acid.

The leather thus dyed was retanned for 90 minutes at 35° C. in a freshly set float composed of 50 parts of water, 15 parts of hydrophobicizer H5 and 15 parts of polymeric tanning material G18. Then 4 parts of hydrophobicizer H5, 6 parts of fatliquor F6 and 4 parts of fatliquor F2 were added before fatliquoring at 35° C. for 150 minutes. This was followed by the addition 100 parts of hot water at 45° C. and drumming for 10 minutes. A pH of 3.5 was subsequently set in the course of 60 minutes by portionwise addition of 4 parts of formic acid. Finally, the leather was subsequently washed with 300 parts of water for 15 minutes.

The leather thus dyed, retanned and fatliquored was horsed up overnight, subsequently set out, wet-strained, toggle frame dried, conditioned, staked, dry drummed overnight, staked and toggle frame dried.

This gave a purely polymer-based wet-white automotive leather having excellent wash-, perspiration-, migration- and rubfastnesses. A wet-white automotive leather dyed with one of the dyes of examples 1a to 59k can be prepared in an analogous manner.

Automotive Leather Recipe 4:

A piece of 100 parts by weight of a conventionally chrome-tanned cattlehide leather 1.1-1.2 mm in shaved thickness was washed in a float of 300 parts of water at 30° C. for 10 minutes and subsequently drummed for 5 minutes at 35° C. in a float consisting of 100 parts of water and 1.5 parts of sodium formate, thereafter a total of 3.5 parts of sodium bicarbonate were added a little at a time over 30 minutes and a neutralization pH of 7.6 was set. Subsequently 5.2 parts of dye 51 were added to the deacidifying float before dyeing at pH 7.5 and 35° C. for 30 minutes. This was followed by the addition of 0.5 part of sodium bicarbonate and drumming at pH 7.6 for 60 minutes. A total of 7 parts of sodium carbonate were added a little at a time to set the float pH between 9.3-9.9 for fixation before drumming at 35° C. for 60 minutes. After float change, the leather was washed three times with 300 parts of water at 40° C. each time for a total of 60 minutes, at 40° C. A total of 3.5 parts of formic acid were added a little at a time over 60 minutes to set a pH of 3.5 in a float of 200 parts of water.

The leather thus dyed was drummed for 10 minutes at 45° C. in a freshly set float composed of 150 parts of water and 3 parts of retanning material G12. After addition of 1.5 parts of fatliquor F1 the leather was prefatliquored at 45° C. for 50 minutes. This was followed by the addition of 0.5 part of sodium bicarbonate and drumming for 30 minutes. The float was admixed with 5 parts of polymeric tanning material G18 and 1.5 parts of fatliquor F1 before drumming for 40 minutes. The retanning float was admixed with 1.5 parts of fatliquor F1 and 1.5 parts of fatliquor F2 before fatliquoring at 45° C. for 20 minutes. This is followed by the addition of 8 parts of retanning material G6, 8 parts of retanning material G8 and 2 parts of polymeric tanning material G19. A drumming time of a further 60 minutes was followed by the addition of 3 parts of fatliquor F1, 1.5 parts of fatliquor F6 and 1.5 parts of fatliquor F2 before fatliquoring at 45° C. for 90 minutes. A pH of 3.5 was subsequently set in the course of 50 minutes by portionwise addition of 3.5 parts of formic acid. Thereafter, the float was dropped and the leather was washed with 300 parts of water for 15 minutes.

The thus dyed, retanned and fatliquored leather was horsed up overnight, subsequently set out, wet-strained and toggle frame dried, conditioned, staked and dry drummed.

This gave an automotive leather having excellent wash-, perspiration-, migration- and rubfastnesses. An automotive leather dyed with one of the dyes of examples 1a to 59k can be prepared in an analogous manner.

Automotive Leather 5:

A piece of 100 parts by weight of a conventionally chrome-tanned cattlehide leather 1.1-1.2 mm in shaved thickness was washed in a float of 300 parts of water at 30° C. for 10 minutes and subsequently drummed for 5 minutes at 35° C. in a float consisting of 100 parts of water and 1.5 parts of sodium formate, thereafter a total of 3.5 parts of sodium bicarbonate were added a little at a time over 30 minutes and a neutralization pH of 7.5 was set. 4.7 parts of dye 48 were added to the deacidifying float before dyeing at pH 7.5 and 35° C. for 30 minutes. This was followed by the addition of 0.5 part of sodium bicarbonate and drumming at pH 7.6 for 60 minutes. A total of 6 parts of solid sodium carbonate were added a little at a time to set the float pH between 9.3-9.9 for fixation before drumming at 35° C. for 60 minutes. After float change, the leather was washed three times with 300 parts of water at 40° C. each time for a total of 60 minutes. A total of 1.5 parts of formic acid were added a little at a time over 60 minutes to set a pH of 5.5 in a float of 200 parts of water.

The leather thus dyed was drummed for 5 minutes at 45° C. in a freshly set float composed of 120 parts of water and 6 parts of polymeric tanning material G18. Then 2 parts of polymeric tanning material G19 were added. A drumming time of a further 5 minutes was followed by the addition of 1.5 parts of fatliquor F1 and drumming at 45° C. for 30 minutes. Then 1.5 parts of fatliquor F1 and 1 part of fatliquor F2 were added before prefatliquoring for a further 20 minutes. The float was admixed with 4 parts of polymeric tanning material G18 before drumming for 20 minutes. This was followed by the addition of 8 parts of retanning material G6 and 8 parts of retanning material G8. A drumming time of a further 40 minutes was followed by the addition of 1 part of polymeric tanning material G19 before tanning to completion for 20 minutes. The retanning float was admixed with 6 parts of fatliquor F1 and 2 parts of fatliquor F2 before fatliquoring at 45° C. for 90 minutes. A pH of 3.5 was then set in the course of 45 minutes by portionwise addition of 3.5 parts of formic acid. Thereafter, the float was dropped and the leather washed with 300 parts of water for 15 minutes.

The thus dyed, retanned and fatliquored leather was horsed up overnight, subsequently set out, wet-strained and toggle frame dried, conditioned, staked and dry drummed.

This gave an automotive leather having excellent wash-, perspiration-, migration- and rubfastnesses. An automotive leather dyed with one of the dyes of examples 1a to 59k can be prepared in an analogous manner.

Apparel Leather Recipe 1:

A piece of 100 parts by weight of a conventionally chrome-tanned sheep leather 0.7 mm in shaved thickness was washed in a float of 300 parts of water at 35° C. for 10 minutes and subsequently drummed for 5 minutes at 40° C. in a float consisting of 150 parts of water and 1.5 parts of sodium formate before 3 parts of sodium bicarbonate in total were added a little at a time over 20 minutes. This was followed by the addition of 3 parts of auxiliary HM4 and drumming for 10 minutes. The float pH was 7.7. The deacidifying float was admixed with 9 parts of dye 44 before dyeing for 40 minutes at pH 7.4 and 40° C. A total of 10 parts of sodium carbonate were added a little at a time to set the float pH between 9.6-9.8 for fixation and the leather was drummed at 40° C. for 60 minutes. After float change, the leather was washed three times with 300 parts of water each time for a total of 60 minutes at 40° C. A pH of 3.6 was set in the course of 55 minutes by portionwise addition of a total of 4 parts of formic acid in a float of 150 parts of water.

The leather thus dyed was drummed for 40 minutes at 45° C. in a freshly set float composed of 150 parts of water and 2 parts of retanning material G14. This is followed by the addition of 2 parts of sodium formate. A drumming time of a further 20 minutes was followed by the addition 2 parts of sodium bicarbonate and drumming at 45° C. for 20 minutes. The float pH was 5.2. The float was admixed with 8 parts of retanning material G3 and 2 parts of retanning material G11 before drumming for 40 minutes. Then 6 parts of fat liquor F1, 4 parts of fatliquor F3 and 1 part of hydrophobicizer H7 were added. A drumming time of 20 minutes was followed by addition of 4 parts of polymeric tanning material G10 and 20 minutes of drumming. Then 6 parts of fatliquor F1, 4 parts of fatliquor F3 and 1 part of hydrophobicizer H7 were added. A fatliquoring time of a further 40 minutes was followed by portionwise addition of 5 parts of formic acid in the course of 45 minutes to set a pH of 3.5. Thereafter, the float was dropped and the leather washed with 300 parts of water for 15 minutes.

The leather thus dyed, retanned and fatliquored was horsed up overnight, subsequently set out, suspension dried, conditioned, staked, dry-drummed and toggle frame dried.

This gave an apparel leather having excellent wash-, perspiration-, migration- and rubfastnesses. An apparel leather dyed with one of the dyes of examples 1a to 59k can be prepared in an analogous manner.

Apparel Leather Recipe 2:

A piece of 100 parts by weight of a conventionally chrome-tanned cattlehide leather 0.8-0.9 mm in shaved thickness was washed in a float of 200 parts of water at 35° C. for 10 minutes and subsequently drummed for 5 minutes at 40° C. in a float consisting of 100 parts of water and 1.5 parts of sodium formate before 3.2 parts of sodium bicarbonate in total were added a little at a time over 25 minutes to set a neutralization pH of 7.6. The deacidifying float was admixed with 8 parts of dye mixture 12hu before dyeing for 40 minutes at pH 7.5 and 40° C. A total of 8.7 parts of sodium carbonate were added a little at a time to set the float pH between 9.6-9.8 for fixation and the leather was drummed at 40° C. for 90 minutes. After float change, the leather was washed three times with 300 parts of water each time for a total of 60 minutes. A pH of 3.3 was set in the course of 60 minutes by portionwise addition of a total of 5 parts of formic acid in a float of 200 parts of water.

The leather thus dyed was drummed for 10 minutes at 30° C. in a freshly set float composed of 100 parts of water and 3 parts of retanning material G12. Addition of 4 parts of chrome tanning material G24 and 1.5 parts of auxiliary HM6 were followed by rechroming at 30° C. for 50 minutes. Then 1 part of sodium formate was added before drumming for 90 minutes. The leather was rechromed overnight after addition of 100 parts of water. Then the float was drained and the leather was washed with 300 parts of water at 45° C. for 10 minutes. The leather was drummed at 45° C. for 20 minutes in a freshly set float composed of 100 parts of water and 1.5 parts of hydrophobicizer H5. Then 5 parts of polymeric tanning material G18 were added, followed after a drumming time of 5 minutes by the addition of 2 parts of retanning material G5. After a further 30 minutes of retanning, 2 parts of polymeric tanning material G19 were added, the leather was drummed for 10 minutes and subsequently 5 parts of retanning material G5 were added. After a further 60 minutes of retanning time 4 parts of hydrophobicizer H8, 6 parts of hydrophobicizer H2, 7 parts of hydrophobicizer H7 and 0.8 part of auxiliary HM4 were added before fatliquoring at 45° C. for 60 minutes. This was followed by the addition of 100 parts of water and 10 minutes of drumming at 60° C. A pH of 3.5 was then set by portionwise addition of 4 parts of formic acid in the course of 45 minutes. Thereafter, the float was drained and the leather was washed for 15 minutes in a newly set float composed of 300 parts of water and 0.15 part of formic acid. The leather was drummed at 30° C. for 20 minutes in newly set float composed of 150 parts of water, 2 parts of hydrophobicizer H7 and 0.2 part of auxiliary HM4. The addition of 5 parts of the mineral tanning material G30 was followed by 90 minutes of fixation. Finally, the leather was washed once with a float composed of 300 parts of water and 0.2 part of formic acid and once with a float composed of 300 parts of water and 0.1 part of formic acid, each at 30° C. for 10 minutes.

The leather thus dyed, retanned and hydrophobicized was horsed up overnight, subsequently set out, wet-strained and toggle frame dried, conditioned, staked, dry-drummed and toggle frame dried.

This gave a hydrophobicized motor-cycling apparel leather having excellent wash-, perspiration-, migration- and rubfastnesses. A motor-cycling apparel leather dyed with one of the dyes of examples 1a to 59k can be prepared in an analogous manner.

Handwear Leather Recipe 1:

A piece of 100 parts by weight of a conventionally chrome-tanned goat leather 0.5-0.7 mm in shaved thickness was washed in a float of 300 parts of water at 30° C. for 10 minutes and subsequently drummed for 5 minutes at 35° C. in a float consisting of 120 parts of water and 1.5 parts of sodium formate before 3.1 parts of sodium bicarbonate in total were added a little at a time over 30 minutes. This was followed by the addition of 3 parts of auxiliary HM2 and drumming for 5 minutes. The float pH was 7.8. The deacidifying float was admixed with 10 parts of dye mixture 13hi before dyeing for 40 minutes at pH 7.4 and 35° C. A total of 9 parts of sodium carbonate were added a little at a time to set the float pH between 9.6-9.8 for fixation and the leather was drummed at 35° C. for 90 minutes. After float change, the leather was washed twice with 300 parts of water and 1.5 parts of auxiliary HM3 each time for a total of 50 minutes at 40° C. A pH of 3.4 was set in the course of 60 minutes by portionwise addition of a total of 3 parts of formic acid in a float of 200 parts of water.

The leather thus dyed was drummed for 60 minutes at 40° C. in a freshly set float composed of 150 parts of water and 1.5 parts of retanning material G13. This was followed by the addition of 1.5 parts of sodium formate. A drumming time of a further 20 minutes was followed by the addition of 1 part of sodium bicarbonate and drumming at 40° C. for 30 minutes. The float was admixed with 6 parts of polymeric tanning material G18 before drumming for 40 minutes. Thereafter 6 parts of retanning material G3 were added before retanning for 30 minutes. Then 5 parts of hydrophobicizer H3, 2 parts of polymeric tanning material G19, 10 parts of retanning material G9, 4 parts of fatliquor F9 and 1 part of sodium carbonate were added before retanning for 120 minutes. A pH of 3.5 was set in the course of 45 minutes by portionwise addition of 3.5 parts of formic acid. Then 3 parts of hydrophobicizer H4 were added before drumming for 20 minutes. Thereafter, the float was dropped and the leather washed twice with a float composed in each case of 300 parts of water and 0.2 part of formic acid for 15 minutes.

The leather thus dyed, retanned and fatliquored was horsed up overnight, subsequently set out, wet-strained and toggle frame dried, conditioned, staked and dry-drummed.

This gave a handwear leather having excellent wash-, perspiration-, migration- and rubfastnesses. A handwear leather dyed with one of the dyes of examples 1a to 59k can be prepared in an analogous manner.

Handwear Leather Recipe 2:

A piece of 100 parts by weight of a conventionally chrome-tanned goat leather 0.5-0.7 mm in shaved thickness was washed in a float of 300 parts of water at 30° C. for 10 minutes and subsequently drummed for 5 minutes at 35° C. in a float consisting of 120 parts of water and 1.5 parts of sodium formate before 3.1 parts of sodium bicarbonate in total were added a little at a time over 30 minutes. This was followed by the addition of 3 parts of auxiliary HM2 and drumming for 5 minutes. The float pH was 7.8. The deacidifying float was admixed with 8 parts of dye mixture 13gz before dyeing for 40 minutes at pH 7.4 and 35° C. A total of 8 parts of solid sodium carbonate were added a little at a time to set the float pH between 9.6-9.8 for fixation and the leather was drummed at 35° C. for 90 minutes. After float change, the leather was washed twice with 300 parts of water and 1.5 parts of auxiliary HM3 each time for a total of 50 minutes at 40° C. A pH of 5.8 was set in the course of 60 minutes by portionwise addition of a total of 1.3 parts of formic acid in a float of 200 parts of water.

The leather thus dyed was drummed for 20 minutes in a freshly set float composed of 150 parts of water and 4 parts of hydrophobicizer H3. Then 8 parts of polymeric tanning material G18 were added before retanning for 40 minutes. Thereafter, 8 parts of retanning material G2 were added before drumming at 40° C. for 30 minutes. Then 4 parts of hydrophobicizer H3, 0.5 part of auxiliary HM4, 8 parts of retanning material G9, 3 parts of fatliquor F9 and 0.8 part of sodium carbonate were added before retanning for 120 minutes. A pH of 3.5 was set in the course of 35 minutes by portionwise addition of 3.5 parts of formic acid. Then 3 parts of hydrophobicizer H7 and 3 parts of auxiliary HM4 were added and drummed in for 20 minutes. Thereafter, the float was dropped and the leather washed twice with a float composed in each case of 300 parts of water and 0.2 part of formic acid for 15 minutes.

The leather thus dyed, retanned and fatliquored was horsed up overnight, subsequently set out, wet-strained and toggle frame dried, conditioned, staked and dry-drummed.

This gave a handwear leather having excellent wash-, perspiration-, migration- and rubfastnesses. A handwear leather dyed with one of the dyes of examples 1a to 59k can be prepared in an analogous manner.

Handwear Leather Recipe 3:

A piece of 100 parts by weight of a conventionally chrome-tanned goat leather 0.5-0.7 mm in shaved thickness was washed in a float of 300 parts of water at 30° C. for 10 minutes and subsequently drummed for 5 minutes at 35° C. in a float consisting of 120 parts of water and 1.5 parts of sodium formate before 3.1 parts of sodium bicarbonate in total were added a little at a time over 30 minutes. This was followed by the addition of 3 parts of auxiliary HM2 and drumming for 5 minutes. The float pH was 7.8. The deacidifying float was admixed with 8.2 parts of dye mixture 12hb before dyeing for 40 minutes at pH 7.4 and 35° C. A total of 8 parts of solid sodium carbonate were added a little at a time to set the float pH between 9.6-9.8 for fixation and the leather was drummed at 35° C. for 90 minutes. After float change, the leather was washed three times with 300 parts of water each time for a total of 60 minutes at 40° C. A pH of 5.7 was set in the course of 60 minutes by portionwise addition of a total of 1.2 parts of formic acid in a float of 200 parts of water.

The leather thus dyed was drummed for 20 minutes in a freshly set float composed of 100 parts of water, 1 part of hydrophobicizer H1 and 0.2 part of auxiliary HM4. Then 10 parts of hydrophobicizer H5 were added and drummed in for 5 minutes. This was followed by the addition of 10 parts of polymeric tanning material G18 and 55 minutes of retanning. The retanning float was admixed with 5 parts of hydrophobicizer H5, 8 parts of hydrophobicizer H1 and 0.8 part of auxiliary HM4 before fatliquoring for 120 minutes. After addition of 100 parts of water and a drumming time of 20 minutes a pH of 3.5 was set in the course of 50 minutes by portionwise addition of 4 parts of formic acid. Thereafter, the float was dropped and the leather washed twice with a float composed in each case of 300 parts of water and 0.2 part of formic acid for 15 minutes.

The leather thus dyed, retanned and fatliquored was horsed up overnight, subsequently set out, wet-strained and toggle frame dried, conditioned, staked and dry-drummed.

This gave a purely polymer-based hydrophobicized handwear leather having excellent wash-, perspiration-, migration- and rubfastnesses. A handwear leather dyed with one of the dyes of examples 1a to 59k can be prepared in an analogous manner.

We claim:

1. A process, comprising contacting leather with a float that comprises at least one dye F which has at least one group represented by formula A:

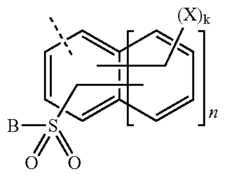

(A)

where

- - - - denotes the bond to the dye molecule;

X is an electron-attracting radical, wherein at least one radical X is present and is an $SO_3H$ group;

k is 1, 2 or 3;

n is 0 or 1; and

B is a $CH{=}CH_2$ group or a $CH_2{-}CH_2\text{-}Q$ group, where Q is an alkaline-detachable group, wherein during said contacting said float has a pH of from 8.5 to 11, or during said contacting said float initially has a pH of from 3.5 to 7.4 which is then set to a value of from 8.5 to 11 to fix the dye to said leather, and wherein said at least one dye is selected from the group consisting of $$Dk^1\text{-}N{=}N\text{-}Kk^1[\text{-}N{=}N\text{-}Dk^2]_m; \quad (I)$$

$$Dk^1\text{-}N{=}N\text{-}Napht^1\text{-}N{=}N\text{-}Tk^1\text{-}N{=}N\text{-}Kk^1[\text{-}N{=}N\text{-}Dk^2]_n \quad (IIb)$$

$$Dk^1\text{-}N{=}N\text{-}Napht^1\text{-}N{=}N\text{-}Tk^1\text{-}N{=}N\text{-}Kk^1\text{-}N{=}N\text{-}Tk^2\text{-}N{=}N\text{-}Napht^2\text{-}N{=}N\text{-}Dk^2; \quad (III)$$

$$Dk^1\text{-}N{=}N\text{-}Kk^1\text{-}N{=}N\text{-}Tk^1\text{-}N{=}N\text{-}Kk^2\text{-}N{=}N\text{-}Dk^2; \quad (IV)$$

$$Dk^1\text{-}N{=}N{-}[P{-}N{=}N\text{-}]_p Napht^1\text{-}[\text{-}N{=}N{-}R]_r{-}NH\text{-}Tr^1{-}NH\text{-}Dk^2; \quad (V)$$

$$Dk^1\text{-}N{=}N{-}P{-}NH\text{-}Tr^1\text{-}NH{-}R{-}N{=}N\text{-}Dk^2; \quad (VI)$$

$$Dk^1\text{-}N{=}N\text{-}Napht^1\text{-}N{=}N\text{-}Tk^1\text{-}N{=}N{-}P{-}NH\text{-}Tr^1\text{-}NH\text{-}Dk^2; \quad (VII)$$

$Dk^1$-N═N-$Napht^1$-NH-$Tr^1$-NH—P—NH-$Tr^2$—NH-$Napht^2$-N═N-$Dk^2$; (VIII)

$Dk^1$-N═N-$Napht^1$—NH-$Tr^1$-NH-$Tk^1$-NH-$Tr^2$-NH-$Napht^2$-N═N-$Dk^2$; (IX)

$Dk^1$[-N═N-L]$_k$-NH-$Tr^1$-NH-M-N═N-$Napht^1$-N═N—P—NH-$Tr^2$-NH—[R—N═N-]$_n$$Dk^2$; (X)

$Dk^1$-N═N-$Kk^1$-N═N-$Tk^1$-NH-$Tr^1$-NH-$Dk^2$; (XI)

$Dk^1$-N═N-Pyr-A; (XIII)

$Kk^3$-N═N-$Tk^1$-N═N-$Kk^1$-N═N-A; (XIV)

$Dk^1$-N═N—P—N═N-$Kk^1$-N═N—R—N═N-$Dk^2$; (XV), and a metal complex thereof, where k, n', p and r are independently 0 or 1;

m is 0, 1 or 2;

each of $Dk^1$ and $Dk^2$ independently represents an aromatic amine radical or represents a group of formula A where, in each of the formulae I, IIb, III-XI and XIII-XV, at least one of $Dk^1$ and $Dk^2$ represents a radical of formula A;

each of $Kk^1$ and $Kk^2$ independently represents a monovalent, a divalent or a trivalent aromatic radical selected from the group consisting of benzene; naphthalene; pyrazole; quinoline; diphenylamine; diphenylmethane; pyrimidine; pyridine; and diphenyl ether, where each optionally has at least one substituent selected from the group consisting $SO_3H$, COOH, CN, $CONH_2$, OH, $NH_2$, $NO_2$, halogen, $C_1$-$C_4$-alkyl, $C_1$-$C_4$-hydroxyalkyl, carboxy-$C_1$-$C_4$-alkyl, $C_1$-$C_4$-alkoxy, $C_1$-$C_4$-alkylamino, $C_1$-$C_4$-dialkylamino, $C_1$-$C_4$-alkylaminocarbonyl, $C_1$-$C_4$-dialkylaminocarbonyl, $C_1$-$C_4$-alkylcarbonylamino, N—($C_1$-$C_4$-alkylcarbonyl)-N—($C_1$-$C_4$-alkylcarbonyl)amino, $C_1$-$C_4$-alkylaminocarbonyloxy, $C_1$-$C_4$-dialkylaminocarbonyloxy, $C_1$-$C_4$-alkylaminocarbonylamino, $C_1$-$C_4$-dialkylaminocarbonylamino, phenylaminocarbonyloxy, phenylaminocarbonylamino, $C_1$-$C_4$-alkoxycarbonylamino, $C_1$-$C_4$-hydroxy-$C_1$-$C_4$-alkylamino, carboxy-$C_1$-$C_4$-alkylamino, phenylcarbonylamino, $C_1$-$C_4$-alkylsulfonyl, hydroxy-$C_1$-$C_4$-alkylsulfonyl, $C_1$-$C_4$-alkylaminosulfonyl, $C_1$-$C_4$-alkylsulfonylamino, phenylsulfonyl, phenylsulfonylamino, formamide, and a radical represented by formula $SO_2NR^{56}R^{57}$, where each of $R^{56}$ and $R^{57}$ independently represent hydrogen; $C_1$-$C_4$-alkyl; formyl; $C_1$-$C_4$-alkylcarbonyl; $C_1$-$C_4$-alkyloxycarbonyl; $NH_2$—CO-alkylaminocarbonyl; $C_1$-$C_4$-alkylaminocarbonyl; $C_1$-$C_4$-alkylaminosulfonylamino; di-$C_1$-$C_4$-alkylaminosulfonylamino; phenylsulfonylamino which may be substituted on the phenyl ring by 1 or 2 substituents selected from the group consisting of $C_1$-$C_4$-alkyl, $C_1$-$C_4$-alkoxy and halogen; or a 5- or 6-membered heterocyclyl, which is optionally substituted by 1, 2 or 3 radicals selected from the group consisting of OH, halogen, $C_1$-$C_4$-alkyl, $C_1$-$C_4$-phenyl, and a 5-membered aromatic heterocyclyl optionally bearing on the nitrogen a phenyl or naphthyl group which can optionally have 1 or 2 radicals selected from the group consisting of OH, $SO_3H$, $C_1$-$C_4$-alkyl, and $C_1$-$C_4$-alkoxy;

$Kk^3$ is a monovalent radical selected from the group consisting of benzene, pyrimidine, pyridine, and naphthalene, which optionally has 1 or 2 hydroxysulfonyl groups as substituents, and optionally 1, 2 or 3 further substituents selected from the group consisting of $SO_3H$, COOH, CN, $CONH_2$, OH, $NH_2$, $NO_2$, halogen, $C_1$-$C_4$-alkyl, $C_1$-$C_4$-hydroxyalkyl, carboxy-$C_1$-$C_4$-alkyl, $C_1$-$C_4$-alkoxy, $C_1$-$C_4$-alkylamino, $C_1$-$C_4$-dialkylamino, $C_1$-$C_4$-alkylaminocarbonyl, $C_1$-$C_4$-dialkylaminocarbonyl, $C_1$-$C_4$-alkylcarbonylamino, N—($C_1$-$C_4$-alkylcarbonyl)-N—($C_1$-$C_4$-alkylcarbonyl)amino, $C_1$-$C_4$-alkylaminocarbonyloxy, $C_1$-$C_4$-dialkylaminocarbonyloxy, $C_1$-$C_4$-alkylaminocarbonylamino, $C_1$-$C_4$-dialkylaminocarbonylamino, phenylaminocarbonyloxy, phenylaminocarbonylamino, $C_1$-$C_4$-alkoxycarbonylamino, $C_1$-$C_4$-hydroxy-$C_1$-$C_4$-alkylamino, carboxy-$C_1$-$C_4$-alkylamino, phenylcarbonylamino, $C_1$-$C_4$-alkylsulfonyl, hydroxy-$C_1$-$C_4$-alkylsulfonyl, $C_1$-$C_4$-alkylaminosulfonyl, $C_1$-$C_4$-alkylsulfonylamino, phenylsulfonyl, phenylsulfonylamino, formamide, and a radical of the formula $SO_2NR^{56}R^{57}$, where $R^{56}$ and $R^{57}$ independently represent hydrogen; $C_1$-$C_4$-alkyl; formyl; $C_1$-$C_4$-alkylcarbonyl; $C_1$-$C_4$-alkoxycarbonyl; $NH_2$—CO-alkylaminocarbonyl; $C_1$-$C_4$-alkylaminocarbonyl; $C_1$-$C_4$-alkylaminosulfonylamino; di-$C_1$-$C_4$-alkylaminosulfonylamino; phenylsulfonylamino which may be substituted on the phenyl ring by 1 or 2 substituents selected from the group consisting of $C_1$-$C_4$-alkyl, $C_1$-$C_4$-alkoxy and halogen; or a 5- or 6-membered heterocyclyl, which is optionally substituted by 1, 2 or 3 radicals selected from the group consisting of OH, halogen, $C_1$-$C_4$-alkyl, $C_1$-$C_4$-phenyl, and a 5-membered aromatic heterocyclyl optionally bearing on the nitrogen a phenyl or naphthyl group which can optionally comprise 1 or 2 radicals selected from the group consisting of OH, $SO_3H$, $C_1$-$C_4$-alkyl, and $C_1$-$C_4$-alkoxy;

each of $Tk^1$ and $Tk^2$ independently represents a divalent aromatic radical selected from the group consisting of benzene, diphenylamine, biphenyl, diphenylmethane, 2-phenylbenzimidazole, phenylsulfonylbenzene, phenylaminosulfonylbenzene, stilbene and phenylaminocarbonylbenzene, where each optionally has at least one substituent selected from the group consisting of $SO_3H$, COOH, OH, $NH_2$, $NO_2$, halogen, and $C_1$-$C_4$-alkyl;

each of L, M, P and R independently represents a divalent aromatic radical selected from the group consisting of benzene and naphthalene, where each optionally has at least one substituent selected from the group consisting of $SO_3H$, COOH, CN, $CONH_2$, OH, $NH_2$, $NO_2$, halogen, $C_1$-$C_4$-alkyl, $C_1$-$C_4$-hydroxyalkyl, carboxy-$C_1$-$C_4$-alkyl, $C_1$-$C_4$-alkoxy, $C_1$-$C_4$-alkylamino, $C_1$-$C_4$-dialkylamino, $C_1$-$C_4$-alkylaminocarbonyl, $C_1$-$C_4$-dialkylaminocarbonyl, $C_1$-$C_4$-alkylcarbonylamino, N—($C_1$-$C_4$-alkylcarbonyl)-N—($C_1$-$C_4$-alkylcarbonyl) amino, $C_1$-$C_4$-alkylaminocarbonyloxy, $C_1$-$C_4$-dialkylaminocarbonyloxy, $C_1$-$C_4$-alkylaminocarbonylamino, $C_1$-$C_4$-dialkylaminocarbonylamino, phenylaminocarbonyloxy, phenylaminocarbonylamino, $C_1$-$C_4$-alkoxycarbonylamino, $C_1$-$C_4$-hydroxy-$C_1$-$C_4$-alkylamino, carboxy-$C_1$-$C_4$-alkylamino, phenylcarbonylamino, $C_1$-$C_4$-alkylsulfonyl, hydroxy-$C_1$-$C_4$-alkylsulfonyl, $C_1$-$C_4$-alkylaminosulfonyl, $C_1$-$C_4$-alkylsulfonylamino, phenylsulfonyl, phenylsulfonylamino, formamide, and a radical of the formula $SO_2NR^{56}R^{57}$, where $R^{56}$ and $R^{57}$ independently represent hydrogen; $C_1$-$C_4$-alkyl; formyl; $C_1$-$C_4$-alkylcarbonyl; $C_1$-$C_4$-alkoxycarbonyl; $NH_2$—CO-alkylaminocarbonyl; $C_1$-$C_4$-alkylaminocarbonyl; $C_1$-$C_4$-alkylaminosulfonyl amino; di-$C_1$-$C_4$-alkylaminosulfonylamino; phenylsulfonylamino which may be substituted on the phenyl ring by 1 or 2 substituents selected from the group consisting of $C_1$-$C_4$-alkyl, $C_1$-$C_4$-alkoxy and halogen; or 5- or 6-membered heterocyclyl, which is optionally substituted by 1, 2 or 3 radicals selected from the group consisting of OH, halogen, $C_1$-$C_4$-alkyl, phenyl, and a 5-membered aromatic heterocyclyl optionally bearing on the nitrogen a phenyl or naphthyl group which can optionally have 1 or 2 of radicals selected from the group consisting of OH, S $O_3H$, $C_1$-$C_4$-alkyl, and $C_1$-$C_4$-alkoxy;

Napht[1], Napht[2] independently represent a naphthalene radical having 1 or 2 hydroxysulfonyl groups and may optionally have 1, 2 or 3 further substituents selected from the group consisting of OH, $NH_2$, $C_1$-$C_4$-alkylamino, $C_1$-$C_4$-dialkylamino, $C_1$-$C_4$-alkylsulfonylamino, phenylsulfonylamino, 4-methylphenylsulfonylamino, $C_1$-$C_4$-alkylaminosulfonyl, di-$C_1$-$C_4$-alkylaminosulfonyl, phenylaminosulfonyl, 4-methylphenylaminosulfonyl, and a NHC(O)Rx radical, where $R^x$ hydrogen, $C_1$-$C_4$-alkyl, maleyl or phenyl;

Pyr represents pyrazole-1,4-diyl which attaches through the nitrogen atom to the A group and optionally has 1 or 2 substituents selected from the group consisting of halogen, $C_1$-$C_4$-alkyl, hydroxyl and $C_1$-$C_4$-alkoxy; and Tr[1], Tr[2] independently represent a 1,3,5-triazine-2,4-diyl radical which optionally has at least one substituent selected from the group consisting of a halogen atom, a methyl group and a methoxy group.

2. The process according to claim 1, wherein B in the formula A is $CH{=}CH_2$, a $CH_2$—$CH_2$—O—$SO_3H$ group or a $CH_2$—$CH_2$—O—$C(O)CH_3$ group.

3. The process according to claim 1, wherein the group represented by formula A is attached to the dye molecule via an —NH— or —N=N— group.

4. The process according to claim 3, wherein the at least one dye F is selected from the group consisting of a phthalocyanine dye, an anthraquinone dye, an azo dye, a formazan dye, a dioxazine dye, an actidine dye, a xanthene dye, a polymethine dye, a stilbene dye, a sulfur dye and a triarylmethane dye.

5. The process according to claim 1, wherein n is 0.

6. The process according to claim 5, wherein the at least one group represented by formula A is selected from the group consisting of (A1)

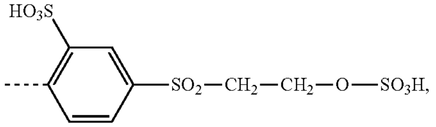

(A2)

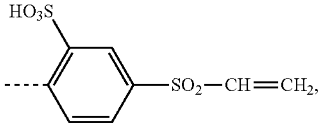

-continued (A3)

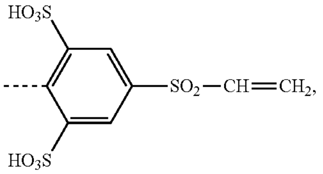

(A4)

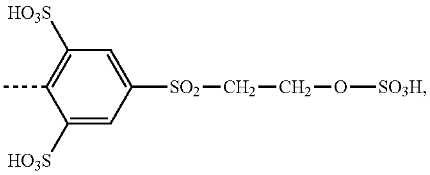

(A5)

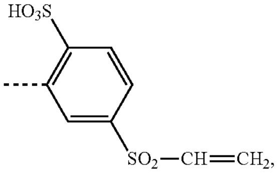

(A6)

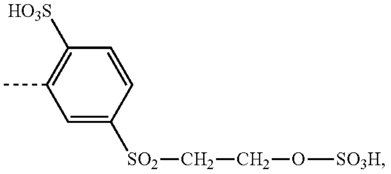

(A7)

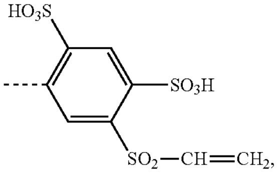

(A8)

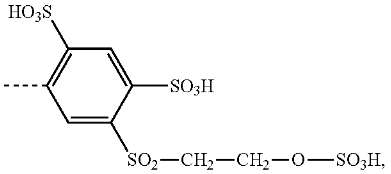

(A9)

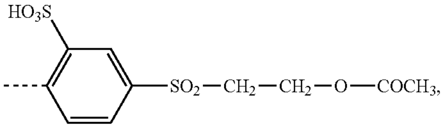

(A10)

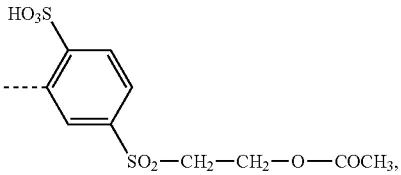

(A11)

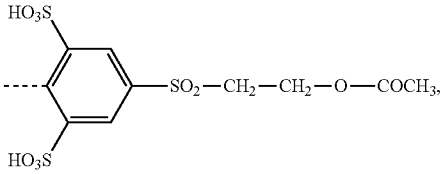

and

-continued (A12)

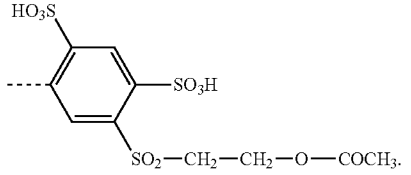

7. The process according to claim 1, which further comprises initially treating the leather with an aqueous float comprising at least one dye F at a pH in the range from 3 to 6.5 prior to said contacting.

8. The process according to claim 1, wherein the contacting occurs before retanning.

9. The process according to claim 1, wherein said contacting occurs at temperatures in the range from 10 to 60° C.

10. A dyed leather obtainable by a dyeing process according to claim 1.

11. The dyed leather according to claim 10 for handwear, footwear, automobiles, apparel or furniture.

12. The process according to claim 1, wherein said float exhibits a pH of from 8.5 to 10.5.

13. The process according to claim 1, wherein said float exhibits a pH of from 8.5 to 10.

14. The process according to claim 1, wherein said float exhibits a pH of from 9.5 to 11.

15. The process according to claim 14, wherein said contacting is carried out for a time of from 0.5 to 2 hours.

16. The process according to claim 1, wherein when said contacting is carried out for at most four hours, said at least one dye exhibits a fixation to said leather of at least 85%, as determined by UV/VIS spectroscopy and HPLC.

17. The process according to claim 1, wherein when said contacting is carried out for four hours, said at least one dye exhibits a fixation to said leather of at least 90%, as determined by UV/VIS spectroscopy and HPLC.

18. The process according to claim 1, wherein Q is selected from the group consisting of chlorine; bromine; iodine; —O—$SO_3H$; —S—$SO_3H$; tri-$C_1$-$C_4$-alkylammonium; benzyldi-$C_1$-$C_4$-alkylammonium; N-attached pyridinium; $R^3S(O)_2$—; $R^4S(O)_2$—O—; and $R^5C(O)$—O—, where each of $R^3$ and $R^4$ is independently an alkyl group, a haloalkyl group, a phenyl group, or a substituted phenyl group, and $R^5$ is a hydrogen, an alkyl group, a haloalkyl group, a phenyl group, or a substituted phenyl group.

19. The process according to claim 1, wherein n in the group represented by formula A is 1.

20. The process according to claim 19, wherein B in the formula A is CH═$CH_2$, a $CH_2$—$CH_2$—O—$SO_3H$ group or a $CH_2$—$CH_2$—O—C(O)$CH_3$ group.

21. The process according to claim 1, wherein for the $Dk^1$ and $Dk^2$ moiety that is not a group represented by formula A, such moiety is selected from the group consisting of benzene-, naphthalene- and quinoline-derived radicals and 1-phenylpyrazol-4-yl which are unsubstituted or comprise 1, 2 or 3, substituents selected from the group consisting of $SO_3H$, COOH, OH, $NH_2$, $NO_2$, CN, $CONH_2$, halogen, $C_1$-$C_4$-alkyl, $C_1$-$C_4$-hydroxyalkyl, carboxy-$C_1$-$C_4$-alkyl, $C_1$-$C_4$-alkoxy, $C_1$-$C_4$-alkylamino, $C_1$-$C_4$-dialkylamino, $C_1$-$C_4$-alkylaminocarbonyl, $C_1$-$C_4$-dialkylaminocarbonyl, $C_1$-$C_4$-alkylaminocarbonyloxy, $C_1$-$C_4$-dialkylaminocarbonyloxy, $C_1$-$C_4$-alkylaminocarbonylamino, $C_1$-$C_4$-dialkylaminocarbonylamino, phenylaminocarbonyloxy, phenylaminocarbonylamino, $C_1$-$C_4$-alkoxycarbonylamino, $C_1$-$C_4$-alkylcarbonylamino, N—($C_1$-$C_4$-alkylcarbonyl)-N—($C_1$-$C_4$-alkylcarbonylamino, $C_1$-$C_4$-hydroxy-$C_1$-$C_4$-alkylamino, carboxy-$C_1$-$C_4$-alkylamino, phenylcarbonylamino, $C_1$-$C_4$-alkylsulfonyl, $C_1$-$C_4$-hydroxyalkylsulfonyl, $C_1$-$C_4$-alkylaminosulfonyl, $C_1$-$C_4$-alkylsulfonylamino, phenylsulfonyl, phenylsulfonylamino, formamide, and $SO_2NR^{56}R^{57}$, where $R^{56}$ and $R^{57}$ independently represent hydrogen, $C_1$-$C_4$-alkyl, formyl, $C_1$-$C_4$-alkylcarbonyl, $C_1$-$C_4$-alkoxycarbonyl, $NH_2$—CO, $C_1$-$C_4$-alkylaminocarbonyl or 5- or 6-membered heterocyclyl, which is optionally substituted by 1, 2 or 3 of OH, halogen, $C_1$-$C_4$-alkyl or phenyl radicals, 5-membered aromatic heterocyclyl optionally bearing on the nitrogen a phenyl or naphthyl group which phenyl or naphthyl group are unsubstituted or which comprise one or two of the following radicals: OH, $SO_3H$, $C_1$-$C_4$-alkyl, and/or $C_1$-$C_4$-alkoxy.

22. The process according to claim 1, wherein said at least one dye is selected from the group consisting of $Dk^1$-N═N-$Napht^1$-N═N-$Tk^1$-N═N-$Kk^1$-N═N-$Tk^2$-N═N-$Napht^2$-N═N-$Dk^2$; (III)

$Dk^1$-N═N-$Kk^1$-N═N-$Tk^1$-N═N-$Kk^2$-N═N-$Dk^2$; (IV)

$Dk^1$-N═N—[P—N═N-]$_p$$Napht^1$[-N═N—R]$_r$—NH-$Tr^1$-NH-$Dk^2$; (V)

$Dk^1$-N═N—P—NH-$Tr^1$-NH—R—N═N-$Dk^2$; (VI)

$Dk^1$-N═N-$Napht^1$-N═N-$Tk^1$-N═N—P—NH-$Tr^1$-NH-$Dk^2$; (VII)

$Dk^1$-N═N-$Napht^1$-NH-$Tr^1$-NH—P—NH-$Tr^2$-NH-$Napht^2$-N═N-$Dk^2$; (VIII)

$Dk^1$-N═N-$Napht^1$-NH-$Tr^1$-NH-$Tk^1$-NH-$Tr^2$-NH-$Napht^2$-N═N-$Dk^2$; (IX)

$Dk^1$[-N═N-L]$_k$-NH-$Tr^1$-NH-M-N═N-$Napht^1$-N═N—P—NH-$Tr^2$-NH—[R—N═N-]$_n$$Dk^2$; (X)

$Dk^1$-N═N-$Kk^1$-N═N-$Tk^1$-NH-$Tr^1$-NH-$Dk^2$; (XI)

$Dk^1$-N═N-Pyr-A; (XIII)

$Kk^3$-N═N-$Tk^1$-N═N-$Kk^1$-N═N-A; (XIV)

$Dk^1$-N═N—P—N═N-$Kk^1$-N═N—R—N═N-$Dk^2$; (XV), and a metal complex thereof, where k, n', p and r are independently 0 or 1, and m is 0, 1 or 2.

23. The process according to claim 1, further comprising adding an alkali metal carbonate, an alkali metal bicarbonate, and an alkali metal hydroxide to said float during said contacting to control the pH of the float during said contacting.

24. The process according to claim 1, further comprising reacting the at least one group represented by formula A of dye F with amino groups present on a surface of said leather to covalently bond said dye F to said leather.

25. The process according to claim 1, wherein said contacting is carried out for a period of from 0.5 to 4 hours and a temperature of from 10 to 60° C.

26. The process according to claim 1, wherein said at least one dye is at least one dye represented by formula (IIb)

$Dk^1$-N═N-$Napht^1$-N═N-$Tk^1$-N═N-$Kk^1$[-N═N-$Dk^2$]$_n$ (IIb)

wherein n is 0 or 1, $Tk^1$ represents

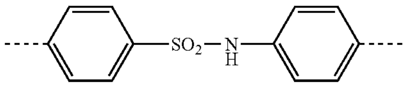

and

- - - - represent the bonds to the azo groups.

27. The process according to claim 1, wherein said at least one dye is at least one dye represented by one of formulae (IIIa) and (IVa)

$$Dk^1\text{-N=N-Napht}^1\text{-N=N-Tk}^1\text{-N=N-Kk}^1\text{-N=N-Tk}^2\text{-N=N-Napht}^2\text{-N=N-Dk}^2 \quad \text{(IIIa)}$$

$$Dk^1\text{-N=N-Napht}^1\text{-N=N-Tk}^1\text{-N=N-Napht}^2\text{-N=N-Dk}^2 \quad \text{(IVa)}$$

wherein n and k represent 0 or 1, and n+k is =1 or 2.

28. The process according to claim 27, wherein at least one of $Tk^1$ and $Tk^2$ in formulae (IIIa) and (IVa) represents

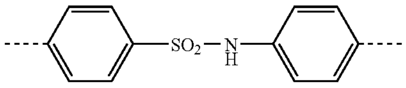

wherein - - - - represent the bonds to the azo groups.

29. The process according to claim 1, wherein said float consists of at least one dye F having the at least one group represented by formula A.

30. The process according to claim 1, wherein each X in the formula A is, individually, selected from the group consisting of fluorine, chlorine, CN, $NO_2$, —C(O)—$R^1$ and $S(O)_2R^2$, where each of $R^1$ and $R^2$ is, independently, OH, an alkyl group, a haloalkyl group, an alkoxy group, or an optionally substituted phenyl group.

* * * * *